US012487233B2

(12) United States Patent
Van De Stolpe et al.

(10) Patent No.: US 12,487,233 B2
(45) Date of Patent: Dec. 2, 2025

(54) DETERMINING FUNCTIONAL STATUS OF IMMUNE CELLS TYPES AND IMMUNE RESPONSE

(71) Applicant: KONINKLIJKE PHILIPS N.V., Eindhoven (NL)

(72) Inventors: Anja Van De Stolpe, Vught (NL); Arie Rombertus Van Doorn, Zaltbommel (NL); Wilhelmus Franciscus Johannes Verhaegh, Heusden Gem. Asten (NL); Steven Paulus Lambertus Kuijpers, Veldhoven (NL); Michael Van Hartskamp, Eindhoven (NL); Hussam Nachabe, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 814 days.

(21) Appl. No.: 16/652,555

(22) PCT Filed: Oct. 1, 2018

(86) PCT No.: PCT/EP2018/076614

§ 371 (c)(1),
(2) Date: Mar. 31, 2020

(87) PCT Pub. No.: WO2019/068623

PCT Pub. Date: Apr. 11, 2019

(65) Prior Publication Data

US 2020/0240979 A1 Jul. 30, 2020

Related U.S. Application Data

(60) Provisional application No. 62/683,710, filed on Jun. 12, 2018, provisional application No. 62/566,755, filed on Oct. 2, 2017.

(51) Int. Cl.
*G01N 33/50* (2006.01)
*G16B 5/20* (2019.01)
(Continued)

(52) U.S. Cl.
CPC ..... *G01N 33/5041* (2013.01); *G01N 33/5091* (2013.01); *G16B 5/20* (2019.02);
(Continued)

(58) Field of Classification Search
CPC .......... G16B 5/20; G16B 10/00; G16B 20/20; G16B 25/10; G16B 40/00; G16H 50/20;
(Continued)

(56) References Cited

U.S. PATENT DOCUMENTS

2006/0182726 A1 8/2006 O'Sullivan et al.
2006/0263365 A1 11/2006 Hart
(Continued)

FOREIGN PATENT DOCUMENTS

WO 2019007633 A1 1/2019

OTHER PUBLICATIONS

Fragiadakis GK, et al. Mapping the Fetomaternal Peripheral Immune System at Term Pregnancy. J Immunol. Dec. 1, 2016;197(11):4482-4492. doi: 10.4049/jimmunol.1601195. Epub Oct. 28, 2016. PMID: 27793998; PMCID: PMC5125527. (Year: 2016).*
(Continued)

*Primary Examiner* — Larry D Riggs, II
*Assistant Examiner* — Emilie A Neulen

(57) ABSTRACT

A method for determining functional status of at least one immune cell type in at least one sample of a subject comprises determining the functional status of the at least one immune cell type based on activity of at least one signaling pathway in the at least one immune cell type in the at least one sample of the subject; and optionally providing
(Continued)

Calibration set

Neutrophil centroid model

| GSE_set | Array | Sample_title | State | Model_input | QC_passed | FOXO | NFKB | NOTCH |
|---|---|---|---|---|---|---|---|---|
| GSE22103 | GSM549573 | Microfluidics isolated human neutrophils, unstimulated | Resting | Calibration | Yes | 11.5856983 | 4.94855438 | -0.0222778 |
| GSE22103 | GSM549574 | Microfluidics isolated human neutrophils, unstimulated | Resting | Calibration | Yes | 11.5229484 | 8.64962007 | -0.0541318 |
| GSE22103 | GSM549575 | Microfluidics isolated human neutrophils, unstimulated | Resting | Calibration | Yes | 11.7200677 | 14.1520826 | -0.3085227 |
| GSE22103 | GSM549576 | Microfluidics isolated human neutrophils, unstimulated | Resting | Calibration | Yes | 12.1985148 | 11.0592776 | 0.04198182 |
| GSE22103 | GSM549577 | Microfluidics isolated human neutrophils, LPS stimulated | Supportive | Calibration | Yes | -2.0342779 | 27.9321512 | 2.03818039 |
| GSE22103 | GSM549578 | Microfluidics isolated human neutrophils, LPS stimulated | Supportive | Calibration | Yes | -0.7154972 | 27.3629341 | 1.24158667 |

| STAT12_1 | STAT12_2 | STAT3_Blood | TGFB_1 | WNT | Distance: Sample to calibration resting | Distance: Sample to calibration supportive | Detected as: | Model prediction |
|---|---|---|---|---|---|---|---|---|
| -5.9699415 | -6.272706 | 1.732563585 | -2.7101993 | -20.73288 | 5.511594927 | 31.92045056 | Resting | OK |
| -4.1779113 | -5.8647277 | 4.629845317 | -3.2846816 | -19.555737 | 2.207219437 | 27.92337567 | Resting | OK |
| -5.0832226 | -5.6303456 | 5.409446985 | -2.3291269 | -21.95154 | 4.694724094 | 25.02878542 | Resting | OK |
| -4.5347833 | -6.0365324 | 5.258432945 | -2.5865204 | -22.516954 | 2.238220051 | 27.34835238 | Resting | OK |
| 1.23152903 | 1.83640949 | 12.05034933 | 5.96695526 | -11.29089 | 29.32714769 | 2.108718009 | Suppotive | OK |
| -0.5017988 | -0.9924669 | 11.66357309 | 5.81998109 | -13.268477 | 26.53607521 | 2.108718009 | Supportive | OK |

Percentage correct output calibration: 100% the functional status of the at least one immune cell type in the at least one sample of the subject.

3 Claims, 151 Drawing Sheets

(51) Int. Cl.

| | |
|---|---|
| ***G16B 10/00*** | (2019.01) |
| ***G16B 20/20*** | (2019.01) |
| ***G16B 25/10*** | (2019.01) |
| ***G16B 40/00*** | (2019.01) |
| ***G16H 50/20*** | (2018.01) |
| ***G16H 50/30*** | (2018.01) |

(52) U.S. Cl.
CPC ............. *G16B 10/00* (2019.02); *G16B 20/20* (2019.02); *G16B 25/10* (2019.02); *G16B 40/00* (2019.02); *G16H 50/20* (2018.01); *G16H 50/30* (2018.01); *G01N 2800/60* (2013.01); *Y10S 706/924* (2013.01)

(58) Field of Classification Search
CPC . G16H 50/30; G01N 2800/60; Y10S 706/924
See application file for complete search history.

(56) References Cited

U.S. PATENT DOCUMENTS

| | | | | |
|---|---|---|---|---|
| 2012/0270745 | A1* | 10/2012 | Singh ................. | G01N 33/5041 506/9 |
| 2014/0156200 | A1 | 6/2014 | Alves et al. | |
| 2015/0347672 | A1 | 12/2015 | Van De Wiel et al. | |
| 2016/0110494 | A1 | 4/2016 | Alves et al. | |
| 2016/0117439 | A1 | 4/2016 | Catharina et al. | |
| 2016/0117443 | A1 | 4/2016 | Brussel et al. | |
| 2016/0298196 | A1 | 10/2016 | Stolpe et al. | |
| 2017/0046477 | A1 | 2/2017 | Van Ooijen | |
| 2017/0370934 | A1 | 12/2017 | Conroy et al. | |
| 2018/0260515 | A1 | 9/2018 | Narain et al. | |
| 2018/0271438 | A1 | 9/2018 | Van De Stolpe et al. | |
| 2019/0100790 | A1 | 4/2019 | Holtzer et al. | |
| 2019/0102510 | A1 | 4/2019 | Dou Meng et al. | |
| 2019/0188359 | A1 | 6/2019 | Holtzer et al. | |
| 2019/0255107 | A1 | 8/2019 | Anderson et al. | |
| 2019/0376142 | A1 | 12/2019 | Akse et al. | |

OTHER PUBLICATIONS

Rina Gendelman et al.; Bayesian Network Inference Modeling Identifies TRIB1 as a Novel Regulator of Cell-Cycle Progression and Survival in Cancer Cells. Cancer Res Apr. 1, 2017; 77 (7): 1575-1585. https://doi.org/10.1158/0008-5472.CAN-16-0512 (Year: 2017).*

Lim, P.S., Li, J., Holloway, A.F. and Rao, S. (2013), Epigenetic regulation of inducible gene expression in the immune system. Immunology, 139: 285-293. https://doi.org/10.1111/imm. 12100 (Year: 2013).*

Dybkaer, K., Iqbal, J., Zhou, G. et al. Genome wide transcriptional analysis of resting and IL2 activated human natural killer cells: gene expression signatures indicative of novel molecular signaling pathways. BMC Genomics 8, 230 (2007). https://doi.org/10.1186/1471-2164-8-230 (Year: 2007).*

Katoh et al. (Current Molecular Medicine (2009) vol. 9, Issue 7: 873-886). (Year: 2009).*

Dirk Fey et al. ,Signaling pathway models as biomarkers: Patient-specific simulations of JNK activity predict the survival of neuroblastoma patients.Sci. Signal.8,ra130-ra130(2015).DOI:10.1126/scisignal. aab0990 (Year: 2015).*

Chen, D.S. et al., "Oncology meets immunology: The cancer-immunity cycle", Immunity, vol. 39, No. 1, Jul. 2013, pp. 1-10.

Khan, S. et al., "Dendritic cells as targets for therapy in rheumatoid arthritis", Nature Reviews Rheumatology, vol. 5, No. 10, Oct. 2009, pp. 566-571.

Verhaegh, W. et al., "Selection of personalized patient therapy signal transduction pathways", Cancer research, vol. 74, No. 11, Jun. 2014, pp. 2936-2945.

Verhaegh, W. et al., "Knowledge-based computational models", Oncotarget, vol. 5, No. 14, Jul. 2014, pp. 5196-5197.

Verhaegh, W. et al., "Selection of personalized patient therapy through the use of knowledge-based computational models that identify tumor-driving signal transduction pathways", Cancer Research, vol. 74, No. 11, 2014, pp. 2936-2945.

Zaslavsky, E. et al., "Antiviral response dictated by choreographed cascade of transcription factors", Journal of Immunology, vol. 184, No. 6, Mar. 2010, pp. 2908-2917.

Bisset, L.R. et al., "Reference values for peripheral blood lymphocyte phenotypes applicable to the healthy adult population in Switzerland". Eur J Haematol. Mar. 2004; 72(3):203-12.

Jansen, B.M. et al., "MicroRNA genes preferentially expressed in dendritic cells contain sites for conserved transcription factor binding motifs in their promoters", BMC Genomics, Jun. 2011, 12:330.

Cabezon, R. et al., MERTK as negative regulator of human T cell activation, Journal of Leukocyte Biology, vol. 97, No. 4, pp. 751-760.

Szeles, L. et al., "1,25-dihydroxyvitamin D3 is an autonomous regulator of the transcriptional changes leading to a tolerogenic dendritic cell phenotype", Journal of Immunology, vol. 182, No. 4, Feb. 2009, pp. 2074-2083.

Van Acker, H.H. et al., "Desirable cytolytic immune effector cell recruitment by interleukin-15 dendritic cells", Oncotarget, vol. 8, No. 8, 2017, pp. 13652-13665.

Ceppi, M. et al., "Ribosomal protein mRNAs are translationally-regulated during human dendritic cells activation by LPS", Immunome Research, Nov. 2009, Nov, 5:5.

International Search Report for PCT/EP2018/076614 dated Oct. 1, 2018.

Nikolic, T. et al., "Differential transcriptome of tolerogenic versus inflammatory dendritic cells points to modulated T1D genetic risk and enriched immune regulation", Genes and Immunity, vol. 18, No. 3, Aug. 31, 2017, pp. 176-183.

Dybkaer, K. et al., "Genome wide transcriptional analysis of resting and IL2 activated human natural killer cells: gene expression signatures indicative of novel molecular signaling pathways", GMC Genomics, Biomed Central, vol. 8, No. 1, Jul. 10, 2007, p. 230.

Malinarich, F. et al., "High Mitochondrial Respiration and Glycolytic Capacity Represent a Metabolic Phenotype of Human Tolerogenic Dendritic Cells", The Journal of Immunology, vol. 194, No. 11, Apr. 27, 2015, pp. 5174-5186.

Qian, F. et al., "Systems Immunology Reveals Markers of Susceptibility to West Nile Virus Infection", Clinical and Vaccine Immunology, vol. 22, No. Jan. 1, 2015, pp. 6-16.

Baltathakis, I. et al., "Expression of different NF -?B pathway genes in dendritic cells (DCs) or macrophages assessed by gene expression profililng", Journal of Cellular Biochemistry, vol. 83, No. 1, Jan. 1, 2001, Abstract.

Woolf, P.J. et al., "Bayesian analysis of signaling networks governing embryonic stem cell fate decisions", Bioinformatics, vol. 21, No. 6, Mar. 15, 2005, pp. 741-753.

Affymetrix GeneChip Human Genome U133 Array Set HG-U133A:, GEO, Mar. 11, 2002. Abstract.

* cited by examiner

Calibration set

Neutrophil centroid model

| GSE_set | Array | Sample_title | State | Model_input | QC_passed | FOXO | NFKB | NOTCH |
|---|---|---|---|---|---|---|---|---|
| GSE22103 | GSM549573 | Microfluidics isolated human neutrophils, unstimulated | Resting | Calibration | Yes | 11.5856983 | 4.94855438 | -0.0222778 |
| GSE22103 | GSM549574 | Microfluidics isolated human neutrophils, unstimulated | Resting | Calibration | Yes | 11.5229484 | 8.64962007 | -0.0541318 |
| GSE22103 | GSM549575 | Microfluidics isolated human neutrophils, unstimulated | Resting | Calibration | Yes | 11.7200677 | 14.1520826 | -0.3085227 |
| GSE22103 | GSM549576 | Microfluidics isolated human neutrophils, unstimulated | Resting | Calibration | Yes | 12.1985148 | 11.0592776 | 0.04198182 |
| GSE22103 | GSM549577 | Microfluidics isolated human neutrophils, LPS stimulated | Supportive | Calibration | Yes | -2.0342779 | 27.9321512 | 2.03818039 |
| GSE22103 | GSM549578 | Microfluidics isolated human neutrophils, LPS stimulated | Supportive | Calibration | Yes | -0.7154972 | 27.3629341 | 1.24158667 |

| STAT12_1 | STAT12_2 | STAT3_Blood | TGFB_1 | WNT | Distance: Sample to calibration resting | Distance: Sample to calibration supportive | Detected as: | Model prediction |
|---|---|---|---|---|---|---|---|---|
| -5.9699415 | -6.272706 | 1.732563585 | -2.7101993 | -20.73288 | 5.511594927 | 31.92045056 | Resting | OK |
| -4.1779113 | -5.8647277 | 4.629845317 | -3.2846816 | -19.555737 | 2.207219437 | 27.92337567 | Resting | OK |
| -5.0832226 | -5.6303456 | 5.409446985 | -2.3291269 | -21.95154 | 4.694724094 | 25.02878542 | Resting | OK |
| -4.5347833 | -6.0365324 | 5.258432945 | -2.5865204 | -22.516954 | 2.238220051 | 27.34835238 | Resting | OK |
| 1.23152903 | 1.83640949 | 12.05034933 | 5.96695526 | -11.29089 | 29.32714769 | 2.108718009 | Suppotive | OK |
| -0.5017988 | -0.9924669 | 11.66357309 | 5.81998109 | -13.268477 | 26.53607521 | 2.108718009 | Supportive | OK |

Percentage correct output calibration: 100%

FIG. 1A

Validation set

Neutrophil centroid model

| GSE_set | Array | Sample_title | State | Model_input | QC_passed | FOXO | NFKB | NOTCH |
|---|---|---|---|---|---|---|---|---|
| GSE28490 | GSM705326 | Neutrophils rep1 mRNA (Roche) | Resting | Validation | Yes | 15.934107 | 8.4273697 | -2.7256704 |
| GSE28490 | GSM705327 | Neutrophils rep2 mRNA (Roche) | Resting | Validation | Yes | 15.5873993 | 9.3393635 | -2.2908794 |
| GSE28490 | GSM705328 | Neutrophils rep3 mRNA (Roche) | Resting | Validation | Yes | 15.8965741 | 4.9562311 | -4.0368977 |
| GSE22103 | GSM549579 | Microfluidics isolated human neutrophils, LPS stimulated | Supportive | Validation | Yes | -1.2728941 | 26.6232084 | 2.5528633 |
| GSE22103 | GSM549580 | Microfluidics isolated human neutrophils, LPS stimulated | Supportive | Validation | Yes | -1.3289571 | 27.6759416 | 0.78646104 |

| STAT12_1 | STAT12_2 | STAT3_Blood | TGFB_1 | WNT | Distance: Sample to calibration resting | Distance: Sample to calibration supportive | Detected as: | Model prediction |
|---|---|---|---|---|---|---|---|---|
| -3.2990248 | -3.6293297 | -1.6419872 | -6.279293 | -21.05902 | 9.031551691 | 33.5467733 | Resting | OK |
| -3.2372583 | -4.238228 | -1.7270556 | -6.545972 | -21.40857 | 8.71490805 | 33.10066458 | Resting | OK |
| -3.9675097 | -4.757045 | -4.549144 | -8.736533 | -20.24616 | 13.12266032 | 37.91673111 | Resting | OK |
| 1.45946453 | 2.25588592 | 11.22248168 | 5.72409015 | -12.237663 | 27.77496652 | 2.624424688 | Supportive | OK |
| -0.3258575 | 0.2156716 | 14.05118853 | 5.24181253 | -13.811736 | 27.1704295 | 2.972772251 | Supportive | OK |

Percentage correct output validation: 100%

FIG. 1A (Continued)

Calibration set

Neutrophil linear model

| GSE_set | Array | Sample_title | State | Model_input | QC_passed | FOXO | NFKB |
|---|---|---|---|---|---|---|---|
| GSE22103 | GSM549573 | Microfluidics isolated human neutrophils, unstimulated | Resting | Calibration | Yes | 11.5856983 | 4.94855438 |
| GSE22103 | GSM549574 | Microfluidics isolated human neutrophils, unstimulated | Resting | Calibration | Yes | 11.5229484 | 8.64962007 |
| GSE22103 | GSM549575 | Microfluidics isolated human neutrophils, unstimulated | Resting | Calibration | Yes | 11.7200677 | 14.1520826 |
| GSE22103 | GSM549576 | Microfluidics isolated human neutrophils, unstimulated | Resting | Calibration | Yes | 12.1985148 | 11.0592776 |
| GSE22103 | GSM549577 | Microfluidics isolated human neutrophils, LPS stimulated | Supportive | Calibration | Yes | -2.0342779 | 27.9321512 |
| GSE22103 | GSM549578 | Microfluidics isolated human neutrophils, LPS stimulated | Supportive | Calibration | Yes | -0.7154972 | 27.3629341 |

| NOTCH | STAT12_1 | STAT12_2 | STAT3_Blood | TGFB_1 | WNT | Linear value | Dummy variable for Jitter effect | Model prediction |
|---|---|---|---|---|---|---|---|---|
| -0.0222778 | -5.9699415 | -6.272706 | 1.732563585 | -2.7101993 | -20.73288 | -35.192186 | 0.805 | OK |
| -0.0541318 | -4.1779113 | -5.8647277 | 4.629845317 | -3.2846816 | -19.555737 | -24.611309 | 0.918 | OK |
| -0.3085227 | -5.0832226 | -5.6303456 | 5.409446985 | -2.3291269 | -21.95154 | -22.80304249 | 0.927 | OK |
| 0.04198182 | -4.5347833 | -6.0365324 | 5.258432945 | -2.5865204 | -22.516954 | -26.34057132 | 1.166 | OK |
| 2.03818039 | 1.23152903 | 1.83640949 | 12.05034933 | 5.96695526 | -11.29089 | 29.86505168 | 0.879 | OK |
| 1.24158667 | -0.5017988 | -0.9924669 | 11.66357309 | 5.81998109 | -13.268477 | 20.40086695 | 0.915 | OK |

Percentage correct output calibration: 100%

FIG. 1B

Validation set

Neutrophil linear model

| GSE_set | Array | Sample_title | State | Model_ input | QC_ passed | FOXO | NFKB |
|---|---|---|---|---|---|---|---|
| GSE28490 | GSM705326 | Neutrophils rep1 mRNA (Roche) | Resting | Validation | Yes | 15.934107 | 8.4273697 |
| GSE28490 | GSM705327 | Neutrophils rep2 mRNA (Roche) | Resting | Validation | Yes | 15.5873993 | 9.3393635 |
| GSE28490 | GSM705328 | Neutrophils rep3 mRNA (Roche) | Resting | Validation | Yes | 15.8965741 | 4.9562311 |
| GSE22103 | GSM549579 | Microfluidics isolated human neutrophils, LPS stimulated | Supportive | Validation | Yes | -1.2728941 | 26.6232084 |
| GSE22103 | GSM549580 | Microfluidics isolated human neutrophils, LPS stimulated | Supportive | Validation | Yes | -1.3289571 | 27.6759416 |

| NOTCH | STAT12_1 | STAT12_2 | STAT3_ Blood | TGFB_1 | WNT | Linear value | Dummy variable for Jitter effect | Model prediction |
|---|---|---|---|---|---|---|---|---|
| -2.7256704 | -3.2990248 | -3.6293297 | -1.6419872 | -6.279293 | -21.05902 | -33.582476 | 1.083 | OK |
| -2.2908794 | -3.2372583 | -4.238228 | -1.7270556 | -6.545972 | -21.40857 | -32.60405514 | 0.769 | OK |
| -4.0368977 | -3.9675097 | -4.757045 | -4.549144 | -8.736533 | -20.24616 | -39.76056638 | 0.962 | OK |
| 2.5528633 | 1.45946453 | 2.25588592 | 11.22248168 | 5.72409015 | -12.237663 | 27.42504435 | 1.282 | OK |
| 0.78646104 | -0.3258575 | 0.2156716 | 14.05118853 | 5.24181253 | -13.811736 | 24.67881412 | 1.037 | OK |

Percentage correct output validation: 100%

FIG. 1B (Continued)

Monocyte centroid model

Calibration set

| GSE_set | Array | Sample_title | State | Model_input | QC_passed | FOXO | NFKB |
|---|---|---|---|---|---|---|---|
| GSE28490 | GSM705287 | Monocytes rep1 mRNA (Roche) | Resting | Calibration | Yes | 11.0563038 | -4.5003348 |
| GSE28490 | GSM705293 | Monocytes rep7 mRNA (Roche) | Resting | Calibration | Yes | 10.5797106 | 0.5712472 |
| GSE28490 | GSM705294 | Monocytes rep8 mRNA (Roche) | Resting | Calibration | Yes | 16.8966377 | -2.0532476 |
| GSE28490 | GSM705295 | Monocytes rep9 mRNA (Roche) | Resting | Calibration | Yes | 18.2067828 | -4.2069773 |
| GSE28490 | GSM705296 | Monocytes rep10 mRNA (Roche) | Resting | Calibration | Yes | 18.4909863 | -4.6857826 |
| GSE43700 | GSM1068613 | A6_media | Supportive | Calibration | Yes | 8.97111 | 22.92135 |
| GSE43700 | GSM1068615 | B6_media | Supportive | Calibration | Yes | 6.589622 | 24.97329 |
| GSE43700 | GSM1068617 | C6_media | Supportive | Calibration | Yes | 11.898654 | 23.82625 |
| GSE43700 | GSM1068619 | D6_media | Supportive | Calibration | Yes | 11.834351 | 24.11007 |

| NOTCH | STAT12_1 | STAT12_2 | STAT3_Blood | TGFB_1 | Distance: Sample to calibration resting | Distance: Sample to calibration supportive | Detected as: | Model prediction |
|---|---|---|---|---|---|---|---|---|
| -3.0822659 | -5.2122795 | -5.7407097 | -6.1894849 | -7.858473 | 4.759070927 | 29.72382616 | Resting | OK |
| -2.505643 | -5.0738484 | -5.9064562 | -7.6429444 | -10.545239 | 6.027871946 | 25.4555208 | Resting | OK |
| -4.6969619 | -5.9319596 | -6.165079 | -8.5165436 | -9.539683 | 2.7101872 | 29.16782626 | Resting | OK |
| -3.9626932 | -6.3481139 | -6.5555548 | -8.3509197 | -8.695973 | 3.578333042 | 31.3112259 | Resting | OK |
| -1.8191978 | -6.652387 | -6.5262743 | -8.3872245 | -8.005105 | 4.323246933 | 31.72813208 | Resting | OK |
| -1.4765885 | -9.071134 | -8.4319012 | 1.421305 | -7.729449 | 28.51015567 | 5.299856723 | Supportive | OK |
| -1.4294469 | -6.550589 | -5.0946958 | 2.52668 | -8.783378 | 31.05637908 | 3.594821869 | Supportive | OK |
| -1.3845724 | -3.889274 | -0.2024172 | 1.687692 | -8.640374 | 29.35177024 | 5.12578986 | Supportive | OK |
| -1.0495601 | -6.070049 | -2.8924394 | 1.784875 | -8.94102 | 29.18312947 | 2.455289072 | Supportive | OK |

Percentage correct output calibration: 100%

FIG. 2A

Validation set

Monocyte centroid model

| GSE_set | Array | Sample_title | State | Model_input | QC_passed | FOXO | NFKB |
|---|---|---|---|---|---|---|---|
| GSE72642 | GSM1867068 | Peripheral blood CD14+ monocytes, replicate 1 | Resting | Validation | Yes | 8.9665857 | 2.1320098 |
| GSE72642 | GSM1867074 | Peripheral blood CD14+ monocytes, replicate 2 | Resting | Validation | Yes | 8.8787413 | 1.7156852 |
| GSE72642 | GSM1867080 | Peripheral blood CD14+ monocytes, replicate 3 | Resting | Validation | Yes | 8.607163 | 0.8384339 |
| GSE16385 | GSM411183 | 1 Monocyte | Supportive | Validation | Yes | 8.9726194 | 15.67046 |
| GSE16385 | GSM411196 | 2 Monocyte | Supportive | Validation | Yes | 14.4936559 | 14.97189 |

| NOTCH | STAT12_1 | STAT12_2 | STAT3_Blood | TGFB_1 | Distance: Sample to calibration resting | Distance: Sample to calibration supportive | Detected as: | Model prediction |
|---|---|---|---|---|---|---|---|---|
| -3.691878 | -4.842604 | -5.433236 | -8.63179184 | -12.110427 | 8.695659461 | 24.68879127 | Resting | OK |
| -2.778363 | -4.502189 | -5.162697 | -8.19886657 | -11.112629 | 8.244660713 | 24.69958253 | Resting | OK |
| -3.680864 | -5.222607 | -5.438438 | -8.16225507 | -11.454923 | 7.978368367 | 25.56260924 | Resting | OK |
| -2.6538502 | -3.021257 | -4.332604 | 0.3825983 | 0.71349117 | 24.30135114 | 13.57279915 | Supportive | OK |
| 1.3452802 | -4.894119 | -5.35676 | -1.1311078 | 0.51089713 | 21.87628505 | 14.28202975 | Supportive | OK |

Percentage correct output validation: 100%

FIG. 2A (Continued)

Monocyte linear model

Calibration set

| GSE_set | Array | Sample_title | State | Model_input | QC_passed | FOXO | NFKB | NOTCH | STAT12_1 | STAT12_2 | STAT3_Blood | TGFB_1 | Linear value | Dummy variable for Jitter effect | Model prediction |
|---|---|---|---|---|---|---|---|---|---|---|---|---|---|---|---|
| GSE28490 | GSM705287 | Monocytes rep1 mRNA (Roche) | Resting | Calibration | Yes | 11.0563038 | -4.5003348 | -3.0822659 | -5.2122795 | -5.7407097 | -6.1894849 | -7.858473 | -27.922906 | 0.747 | OK |
| GSE28490 | GSM705293 | Monocytes rep7 mRNA (Roche) | Resting | Calibration | Yes | 10.5797106 | 0.5712472 | -2.505643 | -5.0738484 | -5.9064562 | -7.6429444 | -10.545239 | -20.592116 | 0.890 | OK |
| GSE28490 | GSM705294 | Monocytes rep8 mRNA (Roche) | Resting | Calibration | Yes | 16.8966377 | -2.0532476 | -4.6969619 | -5.9319596 | -6.165079 | -8.5165436 | -9.539683 | -34.720746 | 1.139 | OK |
| GSE28490 | GSM705295 | Monocytes rep9 mRNA (Roche) | Resting | Calibration | Yes | 18.2067828 | -4.2069773 | -3.9626932 | -6.3481139 | -6.5555548 | -8.3509197 | -8.695973 | -38.935069 | 0.952 | OK |
| GSE28490 | GSM705296 | Monocytes rep10 mRNA (Roche) | Resting | Calibration | Yes | 18.4909863 | -4.6857826 | -1.8191978 | -6.652387 | -6.5262743 | -8.3872245 | -8.005105 | -38.556748 | 1.172 | OK |
| GSE43700 | GSM1068613 | A6_media | Supportive | Calibration | Yes | 8.97111 | 22.92135 | -1.4765885 | -9.071134 | -8.4319012 | 1.421305 | -7.729449 | 4.121370 | 1.044 | OK |
| GSE43700 | GSM1068615 | B6_media | Supportive | Calibration | Yes | 6.589622 | 24.97329 | -1.4294469 | -6.550589 | -5.0946958 | 2.52668 | -8.783378 | 16.618994 | 1.116 | OK |
| GSE43700 | GSM1068617 | C6_media | Supportive | Calibration | Yes | 11.898654 | 23.82625 | -1.3845724 | -3.889274 | -0.2024172 | 1.687692 | -8.640374 | 16.779398 | 1.086 | OK |
| GSE43700 | GSM1068619 | D6_media | Supportive | Calibration | Yes | 11.834351 | 24.11007 | -1.0495601 | -6.070049 | -2.8924394 | 1.784875 | -8.94102 | 12.989566 | 1.286 | OK |

Percentage correct output calibration: 100%

FIG. 2B

Validation set

Monocyte linear model

| GSE_set | Array | Sample_title | State | Model_input | QC_passed | FOXO | NFKB |
|---|---|---|---|---|---|---|---|
| GSE72642 | GSM1867068 | Peripheral blood CD14+ monocytes, replicate 1 | Resting | Validation | Yes | 8.9665857 | 2.1320098 |
| GSE72642 | GSM1867074 | Peripheral blood CD14+ monocytes, replicate 2 | Resting | Validation | Yes | 8.8787413 | 1.7156852 |
| GSE72642 | GSM1867080 | Peripheral blood CD14+ monocytes, replicate 3 | Resting | Validation | Yes | 8.607163 | 0.8384339 |
| GSE16385 | GSM411183 | 1 Monocyte | Supportive | Validation | Yes | 8.9726194 | 15.67046 |
| GSE16385 | GSM411196 | 2 Monocyte | Supportive | Validation | Yes | 14.4936559 | 14.97189 |

| NOTCH | STAT12_1 | STAT12_2 | STAT3_Blood | TGFB_1 | Linear value | Dummy variable for Jitter effect | Model prediction |
|---|---|---|---|---|---|---|---|
| -3.691878 | -4.842604 | -5.433236 | -8.63179184 | -12.110427 | -17.323659 | 0.778 | OK |
| -2.778363 | -4.502189 | -5.162697 | -8.19886657 | -11.112629 | -16.692543 | 1.218 | OK |
| -3.680864 | -5.222607 | -5.438438 | -8.16225507 | -11.454923 | -18.817970 | 1.124 | OK |
| 2.6538502 | -3.021257 | -4.332604 | 0.3825983 | 0.71349117 | 1.666937 | 1.263 | OK |
| 1.3452802 | -4.894119 | -5.35676 | -1.1311078 | 0.51089713 | -10.069370 | 1.198 | FALSE |

Percentage correct output validation: 80%

FIG. 2B (Continued)

Dendritic cell -2 state - centroid model

Calibration set

| GSE_set | Array | Sample_title | State | Model_input | QC_passed | FOXO | NFKB |
|---|---|---|---|---|---|---|---|
| GSE18791 | GSM466185 | Dentritic cell, control, 10 hours post infection, donor 1, sample 1 | Resting | Calibration | Yes | 6.7237173 | 17.131732 |
| GSE18791 | GSM466200 | Dentritic cell, control, 18 hours post infection, donor 1, sample 2 | Resting | Calibration | Yes | 0.6936436 | 10.553369 |
| GSE18791 | GSM466216 | Dentritic cell, control, 18 hours post infection, donor 2, sample 1 | Resting | Calibration | Yes | 9.5382661 | 17.868395 |
| GSE18791 | GSM466229 | Dentritic cell, control, 10 hours post infection, donor 2, sample 2 | Resting | Calibration | Yes | 10.2336825 | 14.267936 |
| GSE18791 | GSM466194 | Dentritic cell, NDV, 16 hours post infection, donor 1, sample 1 | Supportive | Calibration | Yes | 15.938014 | 24.953624 |
| GSE18791 | GSM466209 | Dentritic cell, NDV, 16 hours post infection, donor 1, sample 2 | Supportive | Calibration | Yes | 2.3776033 | 19.562674 |
| GSE18791 | GSM466226 | Dentritic cell, NDV, 18 hours post infection, donor 2, sample 1 | Supportive | Calibration | Yes | 13.4272408 | 32.284088 |
| GSE18791 | GSM466239 | Dentritic cell, NDV, 18 hours post infection, donor 2, sample 2 | Supportive | Calibration | Yes | 10.9583489 | 27.930954 |

| NOTCH | STAT12_1 | STAT12_2 | STAT3_Blood | TGFB_1 | Distance: Sample to calibration resting | Distance: Sample to calibration supportive | Detected as: | Model prediction |
|---|---|---|---|---|---|---|---|---|
| -3.3466625 | -10.434627 | -10.57042 | 0.4333976 | -9.7731103 | 4.055529075 | 24.24596445 | Resting | OK |
| -3.5896727 | -8.4996551 | -9.7288492 | -6.1806922 | -9.9797131 | 8.380912972 | 28.52135677 | Resting | OK |
| -4.2660003 | -8.3876236 | -9.0838883 | -3.5721421 | -11.220799 | 4.534908617 | 22.47289156 | Resting | OK |
| -3.2106769 | -8.8261555 | -9.2664632 | -0.8508393 | -7.828494 | 4.359231395 | 23.11518522 | Resting | OK |
| -1.6595683 | 7.903191 | 8.2426881 | 5.7837097 | -0.970427 | 30.66594105 | 9.13814943 | Supportive | OK |
| -2.8969501 | -2.7836435 | -2.5086614 | -1.0138333 | -11.834934 | 11.76578146 | 16.82658049 | Resting | FALSE |
| -2.0600597 | 8.2323293 | 6.6891233 | -1.6606081 | -0.3251236 | 31.63701806 | 9.256983552 | Supportive | OK |
| -2.1762369 | 5.1644967 | 5.8914435 | 2.2015208 | -3.4051382 | 26.33362973 | 2.537966865 | Supportive | OK |

Percentage correct output calibration: 88%

FIG. 3A

Validation set

Dendritic cell -2 state - centroid model

| GSE_set | Array | Sample_title | State | Model_input | QC_passed | FOXO | NFKB |
|---|---|---|---|---|---|---|---|
| GSE52081 | GSM1259099 | DCs-naive-1 | Resting | Validation | Yes | 7.02849 | 22.36137 |
| GSE52081 | GSM1259100 | DCs-naive-2 | Resting | Validation | Yes | 5.574212 | 20.60751 |
| GSE52081 | GSM1259101 | DCs-naive-3 | Resting | Validation | Yes | 5.972026 | 22.13417 |
| GSE52081 | GSM1259097 | DCs-NDV supernatant-8h-1 | Supportive | Validation | Yes | 5.563515 | 30.58595 |
| GSE52081 | GSM1259098 | DCs-NDV supernatant-8h-2 | Supportive | Validation | Yes | 6.768314 | 30.17675 |
| GSE52081 | GSM1259102 | DCs-NDV infected-8h-1 | Supportive | Validation | Yes | 10.97447 | 30.20297 |
| GSE52081 | GSM1259103 | DCs-NDV infected-8h-2 | Supportive | Validation | Yes | 9.039628 | 31.09628 |
| GSE52081 | GSM1259104 | DCs-NDV infected-8h-3 | Supportive | Validation | Yes | 7.920681 | 30.89372 |

| NOTCH | STAT12_1 | STAT12_2 | STAT3_Blood | TGFB_1 | Distance: Sample to calibration resting | Distance: Sample to calibration supportive | Detected as: | Model prediction |
|---|---|---|---|---|---|---|---|---|
| -1.5670356 | -11.78945 | -10.44292 | 1.042366 | -9.417994 | 8.95350861 | 23.48446911 | Resting | OK |
| -2.2492085 | -12.031546 | -10.310056 | 1.099997 | -10.233355 | 7.629883758 | 24.36418517 | Resting | OK |
| -2.2170944 | -11.781261 | -10.119054 | 1.429899 | -10.80201 | 8.880938769 | 23.83923418 | Resting | OK |
| 1.2008704 | 9.800387 | 8.095471 | 4.449418 | 0.1742259 | 32.947016 | 11.15737193 | Supportive | OK |
| 1.500172 | 9.493498 | 7.570276 | 6.318627 | -0.2384506 | 32.6517 | 10.84389746 | Supportive | OK |
| 2.1121078 | 13.110253 | 10.038934 | 5.767883 | -2.1584203 | 35.87749741 | 12.65671176 | Supportive | OK |
| 0.8017218 | 12.261255 | 9.822172 | 4.698675 | -0.9752494 | 35.30994572 | 11.9541606 | Supportive | OK |
| 1.7155729 | 12.304841 | 9.880003 | 5.313993 | -1.7827966 | 35.28993936 | 12.39103511 | Supportive | OK |

Percentage correct output validation: 100%

FIG. 3A (Continued)

Dendritic cell -2 state - linear model

Calibration set

| GSE_set | Array | Sample_title | State | Model_input | QC_passed | FOXO | NFKB |
|---|---|---|---|---|---|---|---|
| GSE18791 | GSM466185 | Dentritic cell, control, 10 hours post infection, donor 1, sample 1 | Resting | Calibration | Yes | 6.7237173 | 17.131732 |
| GSE18791 | GSM466200 | Dentritic cell, control, 18 hours post infection, donor 1, sample 2 | Resting | Calibration | Yes | 0.6936436 | 10.553369 |
| GSE18791 | GSM466216 | Dentritic cell, control, 18 hours post infection, donor 2, sample 1 | Resting | Calibration | Yes | 9.5382661 | 17.868395 |
| GSE18791 | GSM466229 | Dentritic cell, control, 10 hours post infection, donor 2, sample 2 | Resting | Calibration | Yes | 10.2336825 | 14.267936 |
| GSE18791 | GSM466194 | Dentritic cell, NDV, 16 hours post infection, donor 1, sample 1 | Supportive | Calibration | Yes | 15.938014 | 24.953624 |
| GSE18791 | GSM466209 | Dentritic cell, NDV, 16 hours post infection, donor 1, sample 2 | Supportive | Calibration | Yes | 2.3776033 | 19.562674 |
| GSE18791 | GSM466226 | Dentritic cell, NDV, 18 hours post infection, donor 2, sample 1 | Supportive | Calibration | Yes | 13.4272408 | 32.284088 |
| GSE18791 | GSM466239 | Dentritic cell, NDV, 18 hours post infection, donor 2, sample 2 | Supportive | Calibration | Yes | 10.9583489 | 27.930954 |

| NOTCH | STAT12_1 | STAT12_2 | STAT3_Blood | TGFB_1 | Linear value | Dummy variable for Jitter effect | Model prediction |
|---|---|---|---|---|---|---|---|
| -3.3466625 | -10.434627 | -10.57042 | 0.4333976 | -9.7731103 | -3.737187 | 0.809 | OK |
| -3.5896727 | -8.4996551 | -9.7288492 | -6.1806922 | -9.9797131 | -8.159431 | 1.019 | OK |
| -4.2660003 | -8.3876236 | -9.0838883 | -3.5721421 | -11.220799 | -5.758726 | 0.944 | OK |
| -3.2106769 | -8.8261555 | -9.2664632 | -0.8508393 | -7.828494 | -10.291387 | 1.260 | OK |
| -1.6595683 | 7.903191 | 8.2426881 | 5.7837097 | -0.970427 | 30.256058 | 0.773 | OK |
| -2.8969501 | -2.7836435 | -2.5086614 | -1.0138333 | -11.834934 | 19.816917 | 0.705 | OK |
| -2.0600597 | 8.2323293 | 6.6891233 | -1.6606081 | -0.3251236 | 30.382756 | 1.219 | OK |
| -2.1762369 | 5.1644967 | 5.8914435 | 2.2015208 | -3.4051382 | 31.458967 | 1.152 | OK |

Percentage correct output calibration: 100%

FIG. 3B

Validation set

Dendritic cell -2 state - linear model

| GSE_set | Array | Sample_title | State | Model_input | QC_passed | FOXO | NFKB |
|---|---|---|---|---|---|---|---|
| GSE52081 | GSM1259099 | DCs-naive-1 | Resting | Validation | Yes | 7.02849 | 22.36137 |
| GSE52081 | GSM1259100 | DCs-naive-2 | Resting | Validation | Yes | 5.574212 | 20.60751 |
| GSE52081 | GSM1259101 | DCs-naive-3 | Resting | Validation | Yes | 5.972026 | 22.13417 |
| GSE52081 | GSM1259097 | DCs-NDV supernatant-8h-1 | Supportive | Validation | Yes | 5.563515 | 30.58595 |
| GSE52081 | GSM1259098 | DCs-NDV supernatant-8h-2 | Supportive | Validation | Yes | 6.768314 | 30.17675 |
| GSE52081 | GSM1259102 | DCs-NDV infected-8h-1 | Supportive | Validation | Yes | 10.97447 | 30.20297 |
| GSE52081 | GSM1259103 | DCs-NDV infected-8h-2 | Supportive | Validation | Yes | 9.039628 | 31.09628 |
| GSE52081 | GSM1259104 | DCs-NDV infected-8h-3 | Supportive | Validation | Yes | 7.920681 | 30.89372 |

| NOTCH | STAT12_1 | STAT12_2 | STAT3_Blood | TGFB_1 | Linear value | Dummy variable for Jitter effect | Model prediction |
|---|---|---|---|---|---|---|---|
| -1.5670356 | -11.78945 | -10.44292 | 1.042366 | -9.417994 | 1.993834 | 0.882 | OK |
| -2.2492085 | -12.031546 | -10.310056 | 1.099997 | -10.233355 | 1.775840 | 0.995 | OK |
| -2.2170944 | -11.781261 | -10.119054 | 1.429899 | -10.80201 | 4.276643 | 1.246 | OK |
| 1.2008704 | 9.800387 | 8.095471 | 4.449418 | 0.1742259 | 48.394356 | 1.139 | OK |
| 1.500172 | 9.493498 | 7.570276 | 6.318627 | -0.2384506 | 48.529460 | 0.923 | OK |
| 2.1121078 | 13.110253 | 10.038934 | 5.767883 | -2.1584203 | 52.416098 | 1.248 | OK |
| 0.8017218 | 12.261255 | 9.822172 | 4.698675 | -0.9752494 | 50.615725 | 1.242 | OK |
| 1.7155729 | 12.304841 | 9.880003 | 5.313993 | -1.7827966 | 53.970246 | 0.992 | OK |

Percentage correct output validation: 100%

FIG. 3B (Continued)

Calibration set

Dendritic cell - 3 state (4 pathway arguments) - centroid model

| GSE_set | Array | Sample_title | State | Model_input | QC_passed | FOXO | NFKB | STAT12_1 | TGFB_1 | Distance: Sample to calibration resting | Distance: Sample to calibration supportive | Distance: Sample to calibration suppressive | Detected as: | Model prediction |
|---|---|---|---|---|---|---|---|---|---|---|---|---|---|---|
| GSE23371 | GSM573357 | Immature DCs, technical replicate 1 | Resting | Calibration | Yes | 5.168025 | 14.20782 | -11.691128 | -10.841801 | 0.994703213 | 24.59081226 | 7.897310765 | Resting | OK |
| GSE23371 | GSM573358 | Immature DCs, technical replicate 2 | Resting | Calibration | Yes | 6.205997 | 14.2223 | -11.416177 | -9.4391754 | 0.821933277 | 23.39392989 | 7.184823183 | Resting | OK |
| GSE23371 | GSM573359 | Immature DCs, technical replicate 3 | Resting | Calibration | Yes | 5.952649 | 13.72241 | -11.161871 | -10.07313 | 0.457674041 | 23.85001134 | 6.874597622 | Resting | OK |
| GSE23371 | GSM573360 | Maturing DCs, technical replicate 1 | Supportive | Calibration | Yes | 16.417886 | 27.64863 | 1.684919 | -1.6109416 | 23.28838108 | 2.123573318 | 21.83476522 | Supportive | OK |
| GSE23371 | GSM573361 | Maturing DCs, technical replicate 2 | Supportive | Calibration | Yes | 17.972991 | 24.89694 | 3.847916 | -0.046236 | 24.51650509 | 2.140118458 | 22.03656365 | Supportive | OK |
| GSE23371 | GSM573362 | Maturing DCs, technical replicate 3 | Supportive | Calibration | Yes | 17.303083 | 26.51662 | 3.775443 | -1.9692342 | 24.20076152 | 1.030694989 | 22.02976754 | Supportive | OK |
| GSE23371 | GSM573363 | Tolerogenic DCs, technical replicate 1 | Suppressive | Calibration | Yes | 10.1859 | 10.07174 | -6.863341 | -11.568447 | 7.627523104 | 22.8341272 | 1.159922054 | Suppressive | OK |
| GSE23371 | GSM573364 | Tolerogenic DCs, technical replicate 2 | Suppressive | Calibration | Yes | 11.121825 | 12.20205 | -6.97088 | -10.342426 | 7.202281876 | 20.554967 | 1.5711542 | Suppressive | OK |
| GSE23371 | GSM573365 | Tolerogenic DCs, technical replicate 3 | Suppressive | Calibration | Yes | 10.228134 | 10.15819 | -7.085161 | -10.318691 | 7.337289067 | 22.31893133 | 0.836073834 | Suppressive | OK |

Percentage correct output calibration: 100%

FIG. 4A

Validation set

Dendritic cell - 3 state (4 pathway arguments) - centroid model

| GSE_set | Array | Sample_title | State | Model_input | QC_passed | FOXO | NFKB | STAT12_1 | TGFB_1 | Distance: Sample to calibration resting | Distance: Sample to calibration supportive | Distance: Sample to calibration suppressive | Detected as: | Model prediction |
|---|---|---|---|---|---|---|---|---|---|---|---|---|---|---|
| GSE13672 | GSM346559 | GSM CSF + IL4 | Resting | Validation | Yes | -3.9318696 | 10.902335 | -11.699104 | -10.525337 | 10.21710975 | 31.50443548 | 15.19916873 | Resting | OK |
| GSE13672 | GSM346571 | GSM CSF + IL4 | Resting | Validation | Yes | -3.6427663 | 9.356165 | -11.8695 | -11.072186 | 10.57613027 | 32.34363743 | 15.05172213 | Resting | OK |
| GSE13672 | GSM346590 | GSM CSF + IL4 | Resting | Validation | Yes | -3.1890559 | 13.592228 | -12.474268 | -7.6027505 | 9.381167943 | 29.3833716 | 15.34860459 | Resting | OK |
| GSE56017 | GSM1350445 | Mature monocyte derived dendritic cells: B54 3 | Supportive | Validation | Yes | 12.4535058 | 27.247474 | -9.270928 | -1.4613201 | 17.27183975 | 13.29652563 | 19.11469185 | Supportive | OK |
| GSE56017 | GSM1350449 | Mature monocyte derived dendritic cells: B55 3 | Supportive | Validation | Yes | 12.1255171 | 27.324317 | -9.867735 | -4.0656175 | 15.98617814 | 14.26203781 | 18.11831008 | Supportive | OK |
| GSE56017 | GSM1350453 | Mature monocyte derived dendritic cells: B66 3 | Supportive | Validation | Yes | 11.0009932 | 25.35234 | -10.641144 | 0.91765567 | 16.6561364 | 15.27210303 | 19.00340082 | Supportive | OK |
| GSE56017 | GSM1350460 | Mature monocyte derived dendritic cells: x4 | Supportive | Validation | Yes | 13.9409238 | 28.232169 | -9.833366 | -1.6178677 | 18.50846261 | 13.48572059 | 20.16728182 | Supportive | OK |
| GSE56017 | GSM1350461 | Mature monocyte derived dendritic cells: x7 | Supportive | Validation | Yes | 10.1385725 | 29.704148 | -10.070177 | -0.095297 | 19.14020444 | 15.37193168 | 21.9105592 | Supportive | OK |
| GSE56017 | GSM1350462 | Mature monocyte derived dendritic cells: x24 | Supportive | Validation | Yes | 9.9906884 | 29.317571 | -9.832771 | -1.5346461 | 18.08435498 | 15.12095373 | 20.87468038 | Supportive | OK |

Percentage correct output validation: 100%

FIG. 4A (Continued)

Calibration set

Dendritic cell - 3 state (4 pathway arguments) - linear model

| GSE_set | Array | Sample_title | State | Model_input | QC_passed | FOXO | NFKB | STAT12_1 | TGFB_1 | Linear value | Dummy variable for Jitter effect | Model prediction |
|---|---|---|---|---|---|---|---|---|---|---|---|---|
| GSE23371 | GSM573357 | Immature DCs, technical replicate 1 | Resting | Calibration | Yes | 5.168025 | 14.20782 | -11.691128 | -10.841801 | 8.190468 | 1.153 | OK |
| GSE23371 | GSM573358 | Immature DCs, technical replicate 2 | Resting | Calibration | Yes | 6.205997 | 14.2223 | -11.416177 | -9.4391754 | 6.039301 | 0.773 | OK |
| GSE23371 | GSM573359 | Immature DCs, technical replicate 3 | Resting | Calibration | Yes | 5.952649 | 13.72241 | -11.161871 | -10.07313 | 6.681020 | 0.983 | OK |
| GSE23371 | GSM573360 | Maturing DCs, technical replicate 1 | Supportive | Calibration | Yes | 16.417886 | 27.64863 | 1.684919 | -1.6109416 | 14.526605 | 1.066 | OK |
| GSE23371 | GSM573361 | Maturing DCs, technical replicate 2 | Supportive | Calibration | Yes | 17.972991 | 24.89694 | 3.847916 | -0.046236 | 10.818101 | 1.199 | OK |
| GSE23371 | GSM573362 | Maturing DCs, technical replicate 3 | Supportive | Calibration | Yes | 17.303083 | 26.51662 | 3.775443 | -1.9692342 | 14.958214 | 1.017 | OK |
| GSE23371 | GSM573363 | Tolerogenic DCs, technical replicate 1 | Suppressive | Calibration | Yes | 10.1859 | 10.07174 | -6.863341 | -11.568447 | 4.590946 | 1.105 | OK |
| GSE23371 | GSM573364 | Tolerogenic DCs, technical replicate 2 | Suppressive | Calibration | Yes | 11.121825 | 12.20205 | -6.97088 | -10.342426 | 4.451771 | 1.093 | OK |
| GSE23371 | GSM573365 | Tolerogenic DCs, technical replicate 3 | Suppressive | Calibration | Yes | 10.228134 | 10.15819 | -7.085161 | -10.318691 | 3.163586 | 0.888 | OK |

Percentage correct output calibration: 100%

FIG. 4B

Validation set

Dendritic cell - 3 state (4 pathway arguments) - linear model

| GSE_set | Array | Sample_title | State | Model_input | QC_passed | FOXO | NFKB | STAT12_1 | TGFB_1 | Linear value | Dummy variable for Jitter effect | Model prediction |
|---|---|---|---|---|---|---|---|---|---|---|---|---|
| GSE13672 | GSM346559 | GSM CSF + IL4 | Resting | Validation | Yes | -3.9318696 | 10.902335 | -11.699104 | -10.525337 | 13.660438 | 1.249 | FALSE |
| GSE13672 | GSM346571 | GSM CSF + IL4 | Resting | Validation | Yes | -3.6427663 | 9.356165 | -11.8695 | -11.072186 | 12.201617 | 1.079 | FALSE |
| GSE13672 | GSM346590 | GSM CSF + IL4 | Resting | Validation | Yes | -3.1890559 | 13.592228 | -12.474268 | -7.6027505 | 11.909766 | 0.851 | FALSE |
| GSE56017 | GSM1350445 | Mature monocyte derived dendritic cells: B54 3 | Supportive | Validation | Yes | 12.4535058 | 27.247474 | -9.270928 | -1.4613201 | 6.984360 | 1.131 | FALSE |
| GSE56017 | GSM1350449 | Mature monocyte derived dendritic cells: B55 3 | Supportive | Validation | Yes | 12.1255171 | 27.324317 | -9.867735 | -4.0656175 | 9.396682 | 0.744 | FALSE |
| GSE56017 | GSM1350453 | Mature monocyte derived dendritic cells: B66 3 | Supportive | Validation | Yes | 11.0009932 | 25.35234 | -10.641144 | 0.91765567 | 2.792547 | 0.759 | FALSE |
| GSE56017 | GSM1350460 | Mature monocyte derived dendritic cells: x4 | Supportive | Validation | Yes | 13.9409238 | 28.232169 | -9.833366 | -1.6178677 | 6.075747 | 1.239 | FALSE |
| GSE56017 | GSM1350461 | Mature monocyte derived dendritic cells: x7 | Supportive | Validation | Yes | 10.1385725 | 29.704148 | -10.070177 | -0.095297 | 9.590696 | 0.886 | FALSE |
| GSE56017 | GSM1350462 | Mature monocyte derived dendritic cells: x24 | Supportive | Validation | Yes | 9.9906884 | 29.317571 | -9.832771 | -1.5346461 | 11.028758 | 1.276 | OK |

Percentage correct output validation: 11%

FIG. 4B
(Continued)

Calibration set

Dendritic cell - 3 state (3 pathway arguments) - centroid model

| GSE_set | Array | Sample_title | State | Model_input | QC_passed | FOXO | NFKB | TGFB_1 | Distance: Sample to calibration resting | Distance: Sample to calibration supportive | Distance: Sample to calibration suppressive | Detected as: | Model prediction |
|---|---|---|---|---|---|---|---|---|---|---|---|---|---|
| GSE23371 | GSM573357 | Immature DCs, technical replicate 1 | Resting | Calibration | Yes | 5.168025 | 14.20782 | -10.841801 | 0.957900472 | 19.64303809 | 6.33308669 | Resting | OK |
| GSE23371 | GSM573358 | Immature DCs, technical replicate 2 | Resting | Calibration | Yes | 6.205997 | 14.2223 | -9.4391754 | 0.821904468 | 18.34329424 | 5.646325692 | Resting | OK |
| GSE23371 | GSM573359 | Immature DCs, technical replicate 3 | Resting | Calibration | Yes | 5.952649 | 13.72241 | -10.07313 | 0.375827794 | 19.11395727 | 5.451102545 | Resting | OK |
| GSE23371 | GSM573360 | Maturing DCs, technical replicate 1 | Supportive | Calibration | Yes | 16.417886 | 27.64863 | -1.6109416 | 19.24914582 | 1.58091506 | 20.0448299 | Supportive | OK |
| GSE23371 | GSM573361 | Maturing DCs, technical replicate 2 | Supportive | Calibration | Yes | 17.972991 | 24.89694 | -0.046236 | 19.1795817 | 2.006202522 | 19.19674865 | Supportive | OK |
| GSE23371 | GSM573362 | Maturing DCs, technical replicate 3 | Supportive | Calibration | Yes | 17.303083 | 26.51662 | -1.9692342 | 18.8330137 | 0.780915389 | 19.22963582 | Supportive | OK |
| GSE23371 | GSM573363 | Tolerogenic DCs, technical replicate 1 | Suppressive | Calibration | Yes | 10.1859 | 10.07174 | -11.568447 | 6.114579585 | 20.54444472 | 1.154714741 | Suppressive | OK |
| GSE23371 | GSM573364 | Tolerogenic DCs, technical replicate 2 | Suppressive | Calibration | Yes | 11.121825 | 12.20205 | -10.342426 | 5.661357552 | 17.91726706 | 1.571152592 | Suppressive | OK |
| GSE23371 | GSM573365 | Tolerogenic DCs, technical replicate 3 | Suppressive | Calibration | Yes | 10.228134 | 10.15819 | -10.318691 | 5.917639283 | 19.85802042 | 0.828533592 | Suppressive | OK |

Percentage correct output calibration: 100%

FIG. 5A

Validation set

Dendritic cell - 3 state (3 pathway arguments) - centroid model

| GSE_set | Array | Sample_title | State | Model_input | QC_passed | FOXO | NFKB |
|---|---|---|---|---|---|---|---|
| GSE13672 | GSM346559 | GSM CSF + IL4 | Resting | Validation | Yes | -3.9318696 | 10.902335 |
| GSE13672 | GSM346571 | GSM CSF + IL4 | Resting | Validation | Yes | -3.6427663 | 9.356165 |
| GSE13672 | GSM346590 | GSM CSF + IL4 | Resting | Validation | Yes | -3.1890559 | 13.592228 |
| GSE56017 | GSM1350445 | Mature monocyte derived dendritic cells: B54 3 | Supportive | Validation | Yes | 12.4535058 | 27.247474 |
| GSE56017 | GSM1350449 | Mature monocyte derived dendritic cells: B55 3 | Supportive | Validation | Yes | 12.1255171 | 27.324317 |
| GSE56017 | GSM1350453 | Mature monocyte derived dendritic cells: B66 3 | Supportive | Validation | Yes | 11.0009932 | 25.35234 |
| GSE56017 | GSM1350460 | Mature monocyte derived dendritic cells: x4 | Supportive | Validation | Yes | 13.9409238 | 28.232169 |
| GSE56017 | GSM1350461 | Mature monocyte derived dendritic cells: x7 | Supportive | Validation | Yes | 10.1385725 | 29.704148 |
| GSE56017 | GSM1350462 | Mature monocyte derived dendritic cells: x24 | Supportive | Validation | Yes | 9.9906884 | 29.317571 |

| TGFB_1 | Distance: Sample to calibration resting | Distance: Sample to calibration supportive | Distance: Sample to calibration suppressive | Detected as: | Model prediction |
|---|---|---|---|---|---|
| -10.525337 | 10.21337998 | 27.81068673 | 14.44575628 | Resting | OK |
| -11.072186 | 10.56670344 | 28.66953666 | 14.23305567 | Resting | OK |
| -7.6027505 | 9.322085116 | 24.91462915 | 14.32889089 | Resting | OK |
| -1.4613201 | 17.13723379 | 4.867181481 | 18.97607853 | Supportive | OK |
| -4.0656175 | 15.91033814 | 5.93059855 | 17.88559215 | Supportive | OK |
| 0.91765567 | 16.63777296 | 6.658997829 | 18.64604238 | Supportive | OK |
| -1.6178677 | 18.44006685 | 3.810685133 | 19.96342383 | Supportive | OK |
| -0.095297 | 19.09233189 | 7.922754067 | 21.6905714 | Supportive | OK |
| -1.5346461 | 18.01429655 | 7.830408467 | 20.67787995 | Supportive | OK |

Percentage correct output validation: 100%

Removed pathway Stat1/2 from the centroid model, results in a simular validation prediction as previous models!

FIG. 5A (Continued)

Calibration set

Dendritic cell - 3 state (3 pathway arguments) - linear model

| GSE_set | Array | Sample_title | State | Model_input | QC_passed | FOXO | NFKB | TGFB_1 | Linear value | Dummy variable for Jitter effect | Model prediction |
|---|---|---|---|---|---|---|---|---|---|---|---|
| GSE23371 | GSM573357 | Immature DCs, technical replicate 1 | Resting | Calibration | Yes | 5.168025 | 14.20782 | -10.841801 | 19.881596 | 1.105 | OK |
| GSE23371 | GSM573358 | Immature DCs, technical replicate 2 | Resting | Calibration | Yes | 6.205997 | 14.2223 | -9.4391754 | 17.455478 | 0.999 | OK |
| GSE23371 | GSM573359 | Immature DCs, technical replicate 3 | Resting | Calibration | Yes | 5.952649 | 13.72241 | -10.07313 | 17.842891 | 1.063 | OK |
| GSE23371 | GSM573360 | Maturing DCs, technical replicate 1 | Supportive | Calibration | Yes | 16.417886 | 27.64863 | -1.6109416 | 12.841686 | 1.015 | FALSE |
| GSE23371 | GSM573361 | Maturing DCs, technical replicate 2 | Supportive | Calibration | Yes | 17.972991 | 24.89694 | -0.046236 | 6.970185 | 1.137 | OK |
| GSE23371 | GSM573362 | Maturing DCs, technical replicate 3 | Supportive | Calibration | Yes | 17.303083 | 26.51662 | -1.9692342 | 11.182771 | 1.108 | FALSE |
| GSE23371 | GSM573363 | Tolerogenic DCs, technical replicate 1 | Suppressive | Calibration | Yes | 10.1859 | 10.07174 | -11.568447 | 11.454287 | 0.870 | OK |
| GSE23371 | GSM573364 | Tolerogenic DCs, technical replicate 2 | Suppressive | Calibration | Yes | 11.121825 | 12.20205 | -10.342426 | 11.422651 | 0.723 | OK |
| GSE23371 | GSM573365 | Tolerogenic DCs, technical replicate 3 | Suppressive | Calibration | Yes | 10.228134 | 10.15819 | -10.318691 | 10.248747 | 1.259 | FALSE |

Percentage correct output calibration: 67%

FIG. 5B

Validation set

Dendritic cell - 3 state (3 pathway arguments) - linear model

| GSE_set | Array | Sample_title | State | Model_input | QC_passed | FOXO | NFKB | TGFB_1 | Linear value | Dummy variable for Jitter effect | Model prediction |
|---|---|---|---|---|---|---|---|---|---|---|---|
| GSE13672 | GSM346559 | GSM CSF + IL4 | Resting | Validation | Yes | -3.9318696 | 10.902335 | -10.525337 | 25.359542 | 1.035 | OK |
| GSE13672 | GSM346571 | GSM CSF + IL4 | Resting | Validation | Yes | -3.6427663 | 9.356165 | -11.072186 | 24.071117 | 0.938 | OK |
| GSE13672 | GSM346590 | GSM CSF + IL4 | Resting | Validation | Yes | -3.1890559 | 13.592228 | -7.6027505 | 24.384034 | 1.209 | OK |
| GSE56017 | GSM1350445 | Mature monocyte derived dendritic cells: B54 3 | Supportive | Validation | Yes | 12.4535058 | 27.247474 | -1.4613201 | 16.255288 | 1.009 | FALSE |
| GSE56017 | GSM1350449 | Mature monocyte derived dendritic cells: B55 3 | Supportive | Validation | Yes | 12.1255171 | 27.324317 | -4.0656175 | 19.264417 | 0.913 | FALSE |
| GSE56017 | GSM1350453 | Mature monocyte derived dendritic cells: B66 3 | Supportive | Validation | Yes | 11.0009932 | 25.35234 | 0.91765567 | 13.433691 | 0.764 | FALSE |
| GSE56017 | GSM1350460 | Mature monocyte derived dendritic cells: x4 | Supportive | Validation | Yes | 13.9409238 | 28.232169 | -1.6178677 | 15.909113 | 1.184 | FALSE |
| GSE56017 | GSM1350461 | Mature monocyte derived dendritic cells: x7 | Supportive | Validation | Yes | 10.1385725 | 29.704148 | -0.095297 | 19.660873 | 1.208 | FALSE |
| GSE56017 | GSM1350462 | Mature monocyte derived dendritic cells: x24 | Supportive | Validation | Yes | 9.9906884 | 29.317571 | -1.5346461 | 20.861529 | 1.233 | FALSE |

Percentage correct output validation: 33%

FIG. 5B
(Continued)

Calibration set

Macrophages - centroid model

| GSE_set | Array | Sample_title | State | Model_input | QC_passed | FOXO | NFKB | NOTCH | STAT12_1 |
|---|---|---|---|---|---|---|---|---|---|
| GSE43596 | GSM1066056 | 155 no treatment replicate 1 | Resting | Calibration | Yes | -3.5489269 | 10.880193 | -2.0278584 | -9.018864 |
| GSE43596 | GSM1066057 | 155 no treatment replicate 2 | Resting | Calibration | Yes | -4.2228404 | 9.715557 | -4.0574028 | -8.678037 |
| GSE43596 | GSM1066058 | 155 no treatment replicate 3 | Resting | Calibration | Yes | -5.4465001 | 14.198069 | -2.9859208 | -9.163326 |
| GSE43596 | GSM1066068 | 154 no treatment replicate 1 | Resting | Calibration | Yes | 5.506425 | 5.627797 | -1.8429552 | -8.343754 |
| GSE43596 | GSM1066069 | 154 no treatment replicate 2 | Resting | Calibration | Yes | 6.765379 | 2.480039 | -1.3926529 | -8.434061 |
| GSE43596 | GSM1066070 | 154 no treatment replicate 3 | Resting | Calibration | Yes | 6.841642 | 5.888786 | -1.8458475 | -7.675313 |
| GSE43596 | GSM1066059 | 155 LPS replicate 1 | Supportive | Calibration | Yes | -0.1517426 | 26.49242 | 2.8153567 | -6.890367 |
| GSE43596 | GSM1066060 | 155 LPS replicate 2 | Supportive | Calibration | Yes | 0.48034011 | 26.506436 | 2.8267471 | -6.779696 |
| GSE43596 | GSM1066061 | 155 LPS replicate 3 | Supportive | Calibration | Yes | 0.03449065 | 27.19861 | 2.3797658 | -7.640215 |
| GSE43596 | GSM1066071 | 154 LPS replicate 1 | Supportive | Calibration | Yes | -0.7178749 | 27.008839 | 1.9292845 | -5.85213 |
| GSE43596 | GSM1066072 | 154 LPS replicate 2 | Supportive | Calibration | Yes | -1.240569 | 27.299044 | 2.596333 | -4.925865 |
| GSE43596 | GSM1066073 | 154 LPS replicate 3 | Supportive | Calibration | Yes | -1.5537751 | 27.824226 | 2.0773813 | -5.878446 |

| STAT12_2 | STAT3_Blood | TGFB_1 | Distance: Sample to calibration resting | Distance: Sample to calibration supportive | Detected as: | Model prediction |
|---|---|---|---|---|---|---|
| -8.63492 | -2.6178594 | -17.1915 | 9.432795014 | 22.5674397 | Resting | OK |
| -8.504918 | -4.235204 | -18.085608 | 10.46389376 | 24.96778156 | Resting | OK |
| -8.447021 | -2.6382485 | -18.800662 | 12.92502054 | 21.63307112 | Resting | OK |
| -8.389389 | -4.43707065 | 0.8961149 | 11.65219103 | 27.73571681 | Resting | OK |
| -8.801106 | -3.36473004 | -0.087549 | 12.39527869 | 29.85352958 | Resting | OK |
| -8.286313 | -0.04720382 | -3.2212667 | 9.321347106 | 25.11274185 | Resting | OK |
| -2.903445 | 7.8736119 | -8.82951 | 22.70625925 | 1.262070228 | Supportive | OK |
| -2.773036 | 7.7584263 | -8.644477 | 22.6895752 | 1.434146133 | Supportive | OK |
| -3.381167 | 7.6456507 | -8.386515 | 22.93686996 | 1.56174861 | Supportive | OK |
| -2.741604 | 6.4804697 | -8.794236 | 22.50306135 | 1.232052068 | Supportive | OK |
| -2.297429 | 6.6837085 | -7.236825 | 23.34601894 | 2.074885753 | Supportive | OK |
| -3.268749 | 7.3377467 | -7.561919 | 23.59183341 | 1.60837425 | Supportive | OK |

FIG. 6A

Validation set

Macrophages - centroid model

| GSE_set | Array | Sample_title | State | Model_input | QC_passed | FOXO | NFKB | NOTCH | STAT12_1 |
|---|---|---|---|---|---|---|---|---|---|
| GSE40885 | GSM1004101 | Subject 1/lung subsegment instillated by Saline | Resting | Validation | Yes | 0.1383857 | 6.675352 | -3.3438796 | -4.5902332 |
| GSE40885 | GSM1004103 | Subject 2/lung subsegment instillated by Saline | Resting | Validation | Yes | -0.4579262 | -3.082366 | -4.4558155 | -4.8432897 |
| GSE40885 | GSM1004105 | Subject 3/lung subsegment instillated by Saline | Resting | Validation | Yes | 5.7054944 | 6.092794 | -4.1374449 | -5.2818693 |
| GSE40885 | GSM1004109 | Subject 5/lung subsegment instillated by Saline | Resting | Validation | Yes | 4.1599902 | 11.750623 | -0.9790541 | -5.4454579 |
| GSE40885 | GSM1004111 | Subject 6/lung subsegment instillated by Saline | Resting | Validation | Yes | 4.7310599 | 6.143833 | -4.8852581 | -6.2962223 |
| GSE40885 | GSM1004113 | Subject 7/lung subsegment instillated by Saline | Resting | Validation | Yes | 2.2048318 | 9.285219 | -1.5883848 | -5.7663049 |
| GSE40885 | GSM1004102 | Subject 1/lung subsegment instillated by LPS | Supportive | Validation | Yes | 1.1864254 | 18.915274 | -2.3613839 | 0.9257202 |
| GSE40885 | GSM1004106 | Subject 3/lung subsegment instillated by LPS | Supportive | Validation | Yes | 1.7038166 | 23.061414 | -2.5396916 | 4.0353796 |
| GSE40885 | GSM1004108 | Subject 4/lung subsegment instillated by LPS | Supportive | Validation | Yes | 1.0618737 | 21.047858 | -1.9768907 | 0.9949486 |
| GSE40885 | GSM1004110 | Subject 5/lung subsegment instillated by LPS | Supportive | Validation | Yes | 0.9555533 | 22.676535 | 0.5176107 | 2.398741 |
| GSE40885 | GSM1004112 | Subject 6/lung subsegment instillated by LPS | Supportive | Validation | Yes | 0.6649148 | 22.261598 | -0.5480236 | 1.9638511 |
| GSE40885 | GSM1004114 | Subject 7/lung subsegment instillated by LPS | Supportive | Validation | Yes | 0.8304339 | 23.123124 | -0.6916628 | 3.6847793 |

| STAT12_2 | STAT3_Blood | TGFB_1 | Distance: Sample to calibration resting | Distance: Sample to calibration supportive | Detected as: | Model prediction |
|---|---|---|---|---|---|---|
| -3.4668404 | 4.2885863 | -5.7324257 | 10.48979884 | 21.63066061 | Resting | OK |
| -3.5182196 | -2.2828663 | -7.5118195 | 13.22497369 | 32.41406119 | Resting | OK |
| -3.7859955 | 4.4026519 | -5.1371764 | 11.58138946 | 23.26722082 | Resting | OK |
| -4.6632954 | 4.0001501 | -2.7123653 | 11.91433154 | 17.69735887 | Resting | OK |
| -6.1083073 | -0.7510518 | -4.751219 | 7.846904239 | 24.61309203 | Resting | OK |
| -5.1586225 | 4.731901 | -4.1840845 | 10.386178 | 19.18099151 | Resting | OK |
| -2.0454497 | 6.7374726 | -2.7884211 | 19.61014503 | 13.25149761 | Supportive | OK |
| 1.88827637 | 11.8040522 | -3.6805595 | 27.1815056 | 14.73367283 | Supportive | OK |
| -1.7916847 | 8.3249222 | -3.3085219 | 21.59482435 | 11.76122544 | Supportive | OK |
| -0.7356669 | 11.1206356 | 0.06729701 | 26.19949681 | 13.76703675 | Supportive | OK |
| -0.0247137 | 10.314525 | -2.5515064 | 24.63940747 | 12.32000848 | Supportive | OK |
| 0.44016244 | 12.3867543 | -2.3082258 | 27.22669297 | 14.12725667 | Supportive | OK |
| | | | | Percentage correct output validation: 100% | | |

FIG. 6A
(Continued)

Macrophages - linear model

Calibration set

| GSE_set | Array | Sample_title | State | Model_input | QC_passed | FOXO | NFKB | NOTCH |
|---|---|---|---|---|---|---|---|---|
| GSE43596 | GSM1066056 | 155 no treatment replicate 1 | Resting | Calibration | Yes | -3.5489269 | 10.880193 | -2.0278584 |
| GSE43596 | GSM1066057 | 155 no treatment replicate 2 | Resting | Calibration | Yes | -4.2228404 | 9.715557 | -4.0574028 |
| GSE43596 | GSM1066058 | 155 no treatment replicate 3 | Resting | Calibration | Yes | -5.4465001 | 14.198069 | -2.9859208 |
| GSE43596 | GSM1066068 | 154 no treatment replicate 1 | Resting | Calibration | Yes | 5.506425 | 5.627797 | -1.8429552 |
| GSE43596 | GSM1066069 | 154 no treatment replicate 2 | Resting | Calibration | Yes | 6.765379 | 2.480039 | -1.3926529 |
| GSE43596 | GSM1066070 | 154 no treatment replicate 3 | Resting | Calibration | Yes | 6.841642 | 5.888786 | -1.8458475 |
| GSE43596 | GSM1066059 | 155 LPS replicate 1 | Supportive | Calibration | Yes | -0.1517426 | 26.49242 | 2.8153567 |
| GSE43596 | GSM1066060 | 155 LPS replicate 2 | Supportive | Calibration | Yes | 0.48034011 | 26.506436 | 2.8267471 |
| GSE43596 | GSM1066061 | 155 LPS replicate 3 | Supportive | Calibration | Yes | 0.03449065 | 27.19861 | 2.3797658 |
| GSE43596 | GSM1066071 | 154 LPS replicate 1 | Supportive | Calibration | Yes | -0.7178749 | 27.008839 | 1.9292845 |
| GSE43596 | GSM1066072 | 154 LPS replicate 2 | Supportive | Calibration | Yes | -1.240569 | 27.299044 | 2.596333 |
| GSE43596 | GSM1066073 | 154 LPS replicate 3 | Supportive | Calibration | Yes | -1.5537751 | 27.824226 | 2.0773813 |

| STAT12_1 | STAT12_2 | STAT3_Blood | TGFB_1 | Linear value | Dummy variable for Jitter effect | Model prediction |
|---|---|---|---|---|---|---|
| -9.018864 | -8.63492 | -2.6178594 | -17.1915 | 9.321118 | 0.840 | OK |
| -8.678037 | -8.504918 | -4.235204 | -18.085608 | 6.548444 | 1.084 | OK |
| -9.163326 | -8.447021 | -2.6382485 | -18.800662 | 15.210715 | 1.178 | OK |
| -8.343754 | -8.389389 | -4.43707065 | 0.8961149 | -23.787912 | 0.972 | OK |
| -8.434061 | -8.801106 | -3.36473004 | -0.087549 | -26.190341 | 0.861 | OK |
| -7.675313 | -8.286313 | -0.04720382 | -3.2212667 | -15.586267 | 0.847 | OK |
| -6.890367 | -2.903445 | 7.8736119 | -8.82951 | 36.368829 | 0.909 | OK |
| -6.779696 | -2.773036 | 7.7584263 | -8.644477 | 35.703014 | 1.250 | OK |
| -7.640215 | -3.381167 | 7.6456507 | -8.386515 | 34.554669 | 0.707 | OK |
| -5.85213 | -2.741604 | 6.4804697 | -8.794236 | 36.336970 | 0.948 | OK |
| -4.925865 | -2.297429 | 6.6837085 | -7.236825 | 37.833186 | 1.250 | OK |
| -5.878446 | -3.268749 | 7.3377467 | -7.561919 | 37.207853 | 1.272 | OK |
| | | | | Percentage correct output calibration: 100% | | |

FIG. 6B

Validation set

Macrophages - linear model

| GSE_set | Array | Sample_title | State | Model_input | QC_passed | FOXO | NFKB | NOTCH |
|---|---|---|---|---|---|---|---|---|
| GSE40885 | GSM1004101 | Subject 1/lung subsegment instillated by Saline | Resting | Validation | Yes | 0.1383857 | 6.675352 | -3.3438796 |
| GSE40885 | GSM1004103 | Subject 2/lung subsegment instillated by Saline | Resting | Validation | Yes | -0.4579262 | -3.082366 | -4.4558155 |
| GSE40885 | GSM1004105 | Subject 3/lung subsegment instillated by Saline | Resting | Validation | Yes | 5.7054944 | 6.092794 | -4.1374449 |
| GSE40885 | GSM1004109 | Subject 5/lung subsegment instillated by Saline | Resting | Validation | Yes | 4.1599902 | 11.750623 | -0.9790541 |
| GSE40885 | GSM1004111 | Subject 6/lung subsegment instillated by Saline | Resting | Validation | Yes | 4.7310599 | 6.143833 | -4.8852581 |
| GSE40885 | GSM1004113 | Subject 7/lung subsegment instillated by Saline | Resting | Validation | Yes | 2.2048318 | 9.285219 | -1.5883848 |
| GSE40885 | GSM1004102 | Subject 1/lung subsegment instillated by LPS | Supportive | Validation | Yes | 1.1864254 | 18.915274 | -2.3613839 |
| GSE40885 | GSM1004106 | Subject 3/lung subsegment instillated by LPS | Supportive | Validation | Yes | 1.7038166 | 23.061414 | -2.5396916 |
| GSE40885 | GSM1004108 | Subject 4/lung subsegment instillated by LPS | Supportive | Validation | Yes | 1.0618737 | 21.047858 | -1.9768907 |
| GSE40885 | GSM1004110 | Subject 5/lung subsegment instillated by LPS | Supportive | Validation | Yes | 0.9555533 | 22.676535 | 0.5176107 |
| GSE40885 | GSM1004112 | Subject 6/lung subsegment instillated by LPS | Supportive | Validation | Yes | 0.6649148 | 22.261598 | -0.5480236 |
| GSE40885 | GSM1004114 | Subject 7/lung subsegment instillated by LPS | Supportive | Validation | Yes | 0.8304339 | 23.123124 | -0.6916628 |

| STAT12_1 | STAT12_2 | STAT3_Blood | TGFB_1 | Linear value | Dummy variable for Jitter effect | Model prediction |
|---|---|---|---|---|---|---|
| -4.5902332 | -3.4668404 | 4.2885863 | -5.7324257 | 5.157025 | 0.790 | OK |
| -4.8432897 | -3.5182196 | -2.2828663 | -7.5118195 | -10.212811 | 1.176 | OK |
| -5.2818693 | -3.7859955 | 4.4026519 | -5.1371764 | -3.278182 | 0.899 | OK |
| -5.4454579 | -4.6632954 | 4.0001501 | -2.7123653 | 3.215341 | 1.105 | OK |
| -6.2962223 | -6.1083073 | -0.7510518 | -4.751219 | -11.876847 | 1.009 | OK |
| -5.7663049 | -5.1586225 | 4.731901 | -4.1840845 | 3.483060 | 1.260 | OK |
| 0.9257202 | -2.0454497 | 6.7374726 | -2.7884211 | 23.773629 | 0.813 | OK |
| 4.0353796 | 1.88827637 | 11.8040522 | -3.6805595 | 40.226174 | 0.857 | OK |
| 0.9949486 | -1.7916847 | 8.3249222 | -3.3085219 | 28.845802 | 0.968 | OK |
| 2.398741 | -0.7356669 | 11.1206356 | 0.06729701 | 34.955005 | 1.036 | OK |
| 1.9638511 | -0.0247137 | 10.314525 | -2.5515064 | 35.853828 | 0.909 | OK |
| 3.6847793 | 0.44016244 | 12.3867543 | -2.3082258 | 40.420949 | 0.853 | OK |
| | | | | Percentage correct output validation: 100% | | |

FIG. 6B
(Continued)

Calibration set

CD4 centroid model

| GSE_set | Array | Sample_title | State | FOXO | NFKB | NOTCH | STAT12_1 |
|---|---|---|---|---|---|---|---|
| GSE36766 | GSM900560 | Memory CD4 NS at 24h, biological rep 1 | Resting | -2.72698 | -10.8721 | -7.46402 | -7.39794 |
| GSE36766 | GSM900561 | Memory CD4 NS at 24h, biological rep 2 | Resting | -2.36017 | -10.8071 | -7.32936 | -7.61601 |
| GSE36766 | GSM900562 | Memory CD4 NS at 24h, biological rep 3 | Resting | -3.21483 | -11.0984 | -7.07029 | -7.39848 |
| GSE36766 | GSM900563 | Memory CD4 NS + SN034 at 24h | Resting | -2.64841 | -9.11951 | -6.84125 | -7.26043 |
| GSE36766 | GSM900564 | Memory CD4 NS + SN043 at 24h | Resting | -2.40458 | -11.4919 | -7.18416 | -7.16606 |
| GSE36766 | GSM900565 | Memory CD4 NS + SN019 at 24h | Resting | -1.66216 | -9.22023 | -7.37053 | -7.05646 |
| GSE36766 | GSM900566 | Memory CD4 NS + SN027 at 24h | Resting | -1.96451 | -11.1947 | -7.82257 | -7.43761 |
| GSE36766 | GSM900567 | Memory CD4 S at 24h, biological rep 1 | Supportive | -7.48634 | 3.491202 | -4.18418 | -5.50399 |
| GSE36766 | GSM900568 | Memory CD4 S at 24h, biological rep 2 | Supportive | -7.17917 | 2.300803 | -4.29458 | -5.15239 |
| GSE36766 | GSM900569 | Memory CD4 S at 24h, biological rep 3 | Supportive | -7.51309 | 3.109677 | -4.20625 | -5.28132 |
| GSE36766 | GSM900570 | Memory CD4 S + SN034 at 24h | Suppressive | 9.113114 | -9.98772 | -7.34874 | -7.97037 |
| GSE36766 | GSM900571 | Memory CD4 S + SN043 at 24h | Suppressive | 8.525245 | -9.98345 | -5.82279 | -7.67034 |
| GSE36766 | GSM900572 | Memory CD4 S + SN019 at 24h | Suppressive | 3.510553 | -4.42606 | -4.82071 | -6.0361 |
| GSE36766 | GSM900573 | Memory CD4 S + SN027 at 24h | Suppressive | 5.929468 | -5.87112 | -4.26328 | -7.6137 |
| | | | | | | | |

FIG. 7A

CD4 centroid model

Calibration set

| STAT12_2 | STAT3_Blood | TGFB_1 | Distance: Sample to calibration resting | Distance: Sample to calibration supportive | Distance: Sample to calibration suppressive | Detected as: | Model prediction |
|---|---|---|---|---|---|---|---|
| -7.69027 | -5.54199 | -13.261 | 2.233799796 | 22.15802023 | 17.94310366 | Resting | OK |
| -8.21279 | -5.40294 | -12.7229 | 1.796395756 | 22.2191558 | 17.32582011 | Resting | OK |
| -8.16883 | -6.27531 | -13.235 | 2.281973299 | 22.74786237 | 18.59382456 | Resting | OK |
| -7.72429 | -7.83997 | -8.52998 | 3.476933757 | 23.61820431 | 16.52200998 | Resting | OK |
| -7.83023 | -7.71608 | -8.80152 | 2.991277992 | 24.84966144 | 16.83209343 | Resting | OK |
| -7.66855 | -4.52033 | -10.1806 | 2.524663531 | 21.09038723 | 14.68567347 | Resting | OK |
| -8.10702 | -6.19152 | -11.6494 | 1.079670301 | 23.27233911 | 17.04683215 | Resting | OK |
| -4.97785 | 10.85576 | -14.2532 | 23.34316908 | 0.97427842 | 23.23468335 | Supportive | OK |
| -4.70053 | 9.919636 | -14.8222 | 22.02408143 | 0.844447418 | 22.60556519 | Supportive | OK |
| -4.81531 | 10.24217 | -15.4291 | 22.89815979 | 0.631969399 | 23.58447431 | Supportive | OK |
| -8.57291 | 2.569599 | -0.05049 | 18.32133818 | 27.3864599 | 4.577631707 | Suppressive | OK |
| -8.45546 | 2.947767 | -0.10647 | 18.15872987 | 26.71875195 | 3.724719146 | Suppressive | OK |
| -4.81914 | 5.738355 | -5.03619 | 16.45739762 | 17.07615335 | 6.608889609 | Suppressive | OK |
| -8.24557 | 4.02347 | -2.3207 | 16.87078159 | 21.66027643 | 2.475826845 | Suppressive | OK |
| | | | | | Percentage correct output calibration: 100% | | |

FIG. 7A
(Continued)

CD4 centroid model

Validation set

| GSE_set | Array | Sample_title | State | Model_input | QC_passed | FOXO | NFKB | NOTCH | STAT12_1 |
|---|---|---|---|---|---|---|---|---|---|
| GSE11292 | GSM723834 | Human_Teff_T0min | Resting | Extended validation | Yes | 4.828595 | -3.6926 | -8.03563 | -1.42613 |
| GSE11292 | GSM723865 | Human_Teff_repeated_T240min | Supportive | Extended validation | Yes | 13.37458 | 10.4217 | -2.01316 | -5.41915 |
| GSE11292 | GSM723866 | Human_Teff_repeated_T260min | Supportive | Extended validation | Yes | 10.39922 | 11.33995 | -1.85103 | -5.22031 |
| GSE11292 | GSM723867 | Human_Teff_repeated_T280min | Supportive | Extended validation | Yes | 12.93893 | 9.637768 | -1.45785 | -5.69859 |
| GSE11292 | GSM723868 | Human_Teff_repeated_T300min | Supportive | Extended validation | Yes | 12.1054 | 9.265338 | -2.79771 | -6.03292 |
| GSE11292 | GSM723869 | Human_Teff_repeated_T320min | Supportive | Extended validation | Yes | 13.93921 | 10.32996 | -1.67706 | -6.3814 |
| GSE11292 | GSM723870 | Human_Teff_repeated_T340min | Supportive | Extended validation | Yes | 13.20327 | 10.64409 | 0.541136 | -5.94598 |
| GSE11292 | GSM723871 | Human_Teff_repeated_T360min | Supportive | Extended validation | Yes | 11.35422 | 8.965331 | -0.47652 | -6.1219 |

| STAT12_2 | STAT3_Blood | TGFB_1 | Distance: Sample to calibration resting | Distance: Sample to calibration supportive | Distance: Sample to calibration suppressive | Detected as: | Model prediction |
|---|---|---|---|---|---|---|---|
| -3.34066 | -0.53441 | -15.9683 | 14.5233361 | 18.57578186 | 17.16727149 | Resting | OK |
| -5.15818 | 24.91538 | -8.15423 | 41.31087733 | 27.36737244 | 29.55478282 | Supportive | OK |
| -4.60384 | 21.20713 | -7.33625 | 38.14713634 | 23.80565141 | 27.00956902 | Supportive | OK |
| -5.35799 | 24.69762 | -6.89878 | 40.75029724 | 27.11311281 | 28.62456746 | Supportive | OK |
| -5.90945 | 23.72399 | -6.38179 | 39.35598064 | 25.96494825 | 27.20658972 | Supportive | OK |
| -5.95479 | 25.26429 | -6.90578 | 41.82179343 | 28.35145342 | 29.58576604 | Supportive | OK |
| -5.56838 | 24.90751 | -6.77715 | 41.83363861 | 27.99973126 | 29.74454803 | Supportive | OK |
| -6.23126 | 20.17909 | -6.44129 | 36.61215733 | 23.90380578 | 24.73452784 | Supportive | OK |

Percentage correct output validation: 100%

FIG. 7A
(Continued)

Calibration set

CD4 linear model

| GSE_set | Array | Sample_title | State | Model_input | QC_passed | FOXO | NFKB | NOTCH |
|---|---|---|---|---|---|---|---|---|
| GSE36766 | GSM900560 | Memory CD4 NS at 24h, biological rep 1 | Resting | Calibration | Yes | -2.72698 | -10.8721 | -7.46402 |
| GSE36766 | GSM900561 | Memory CD4 NS at 24h, biological rep 2 | Resting | Calibration | Yes | -2.36017 | -10.8071 | -7.32936 |
| GSE36766 | GSM900562 | Memory CD4 NS at 24h, biological rep 3 | Resting | Calibration | Yes | -3.21483 | -11.0984 | -7.07029 |
| GSE36766 | GSM900563 | Memory CD4 NS + SN034 at 24h | Resting | Calibration | Yes | -2.64841 | -9.11951 | -6.84125 |
| GSE36766 | GSM900564 | Memory CD4 NS + SN043 at 24h | Resting | Calibration | Yes | -2.40458 | -11.4919 | -7.18416 |
| GSE36766 | GSM900565 | Memory CD4 NS + SN019 at 24h | Resting | Calibration | Yes | -1.66216 | -9.22023 | -7.37053 |
| GSE36766 | GSM900566 | Memory CD4 NS + SN027 at 24h | Resting | Calibration | Yes | -1.96451 | -11.1947 | -7.82257 |
| GSE36766 | GSM900567 | Memory CD4 S at 24h, biological rep 1 | Supportive | Calibration | Yes | -7.48634 | 3.491202 | -4.18418 |
| GSE36766 | GSM900568 | Memory CD4 S at 24h, biological rep 2 | Supportive | Calibration | Yes | -7.17917 | 2.300803 | -4.29458 |
| GSE36766 | GSM900569 | Memory CD4 S at 24h, biological rep 3 | Supportive | Calibration | Yes | -7.51309 | 3.109677 | -4.20625 |
| GSE36766 | GSM900570 | Memory CD4 S + SN034 at 24h | Suppressive | Calibration | Yes | 9.113114 | -9.98772 | -7.34874 |
| GSE36766 | GSM900571 | Memory CD4 S + SN043 at 24h | Suppressive | Calibration | Yes | 8.525245 | -9.98345 | -5.82279 |
| GSE36766 | GSM900572 | Memory CD4 S + SN019 at 24h | Suppressive | Calibration | Yes | 3.510553 | -4.42606 | -4.82071 |
| GSE36766 | GSM900573 | Memory CD4 S + SN027 at 24h | Suppressive | Calibration | Yes | 5.929468 | -5.87112 | -4.26328 |

FIG. 7B

CD4 linear model

Calibration set

| STAT12_1 | STAT12_2 | STAT3_Blood | TGFB_1 | Linear value | Dummy variable for Jitter effect | Model prediction |
|---|---|---|---|---|---|---|
| -7.39794 | -7.69027 | -5.54199 | -13.261 | -22.978340 | 1.234 | OK |
| -7.61601 | -8.21279 | -5.40294 | -12.7229 | -24.28513 | 1.267 | OK |
| -7.39848 | -8.16883 | -6.27531 | -13.235 | -23.56148 | 0.880 | OK |
| -7.26043 | -7.72429 | -7.83997 | -8.52998 | -27.60706 | 0.934 | FALSE |
| -7.16606 | -7.83023 | -7.71608 | -8.80152 | -30.18233 | 0.861 | FALSE |
| -7.05646 | -7.66855 | -4.52033 | -10.1806 | -23.99334 | 0.798 | OK |
| -7.43761 | -8.10702 | -6.19152 | -11.6494 | -27.13951 | 1.035 | OK |
| -5.50399 | -4.97785 | 10.85576 | -14.2532 | 21.419582 | 1.060 | OK |
| -5.15239 | -4.70053 | 9.919636 | -14.8222 | 20.074309 | 0.979 | OK |
| -5.28132 | -4.81531 | 10.24217 | -15.4291 | 21.991157 | 0.772 | OK |
| -7.97037 | -8.57291 | 2.569299 | -0.05049 | -40.373065 | 0.784 | OK |
| -7.67034 | -8.45546 | 2.947767 | -0.10647 | -37.403048 | 1.224 | OK |
| -6.0361 | -4.81914 | 5.738355 | -5.03619 | -12.838018 | 0.845 | FALSE |
| -7.64137 | -8.24557 | 4.02347 | -2.3207 | -25.606638 | 1.072 | FALSE |
| | | | Percentage correct output calibration: 71% | | | |

FIG. 7B
(Continued)

CD4 linear model

Validation set

| GSE_set | Array | Sample_title | State | Model_input | QC_passed | FOXO | NFKB | NOTCH |
|---|---|---|---|---|---|---|---|---|
| GSE72642 | GSM1867066 | Peripheral blood CD4+ T cells, replicate 1 | Resting | Validation | Yes | -2.75523 | -1.34669 | -3.51355 |
| GSE72642 | GSM1867072 | Peripheral blood CD4+ T cells, replicate 2 | Resting | Validation | Yes | -3.14064 | 0.64128 | -4.22452 |
| GSE72642 | GSM1867078 | Peripheral blood CD4+ T cells, replicate 3 | Resting | Validation | Yes | -0.81834 | 1.69558 | -4.60401 |
| GSE11292 | GSM723846 | Human_Teff_T240min | Supportive | Validation | Yes | 12.72461 | 8.800734 | -1.18201 |
| GSE11292 | GSM723847 | Human_Teff_T260min | Supportive | Validation | Yes | 12.8932 | 8.928934 | -0.59289 |
| GSE11292 | GSM723848 | Human_Teff_T280min | Supportive | Validation | Yes | 13.28638 | 9.481084 | -2.13193 |
| GSE11292 | GSM723849 | Human_Teff_T300min | Supportive | Validation | Yes | 13.79279 | 9.126681 | -2.49551 |
| GSE11292 | GSM723851 | Human_Teff_T340min | Supportive | Validation | Yes | 12.83294 | 8.223748 | -1.27542 |

| STAT12_1 | STAT12_2 | STAT3_Blood | TGFB_1 | Linear value | Dummy variable for Jitter effect | Model prediction |
|---|---|---|---|---|---|---|
| -5.83787 | -6.49672 | -4.4572 | -11.925 | -6.971800 | 0.899 | OK |
| -6.07009 | -6.14073 | -5.01007 | -13.4255 | -5.52055 | 1.038 | OK |
| -6.51646 | -6.65747 | -5.47369 | -13.6168 | -10.51207 | 0.728 | OK |
| -4.82503 | -6.59076 | 22.48993 | -5.78416 | 11.752414 | 0.874 | OK |
| -5.91061 | -5.73697 | 24.55303 | -4.55491 | 12.903204 | 0.930 | OK |
| -5.62139 | -5.47778 | 23.29927 | -4.13072 | 10.393594 | 1.007 | OK |
| -6.77427 | -6.20903 | 22.32956 | -5.17636 | 7.361001 | 1.063 | OK |
| -6.3051 | -5.38184 | 23.29888 | -3.94227 | 9.669598 | 0.881 | OK |

Percentage correct output validation: 100%

FIG. 7B
(Continued)

CD4 Th1/Th2 centroid model

Calibration set

| GSE_set | Array | Sample_title | State | Model_input | QC_passed | FOXO | NFKB |
|---|---|---|---|---|---|---|---|
| GSE71566 | GSM1838550 | Cord Blood_CD4 + Act + IL12_72h_rep1 | Supportive | Calibration | Yes | -4.935718 | 5.250932 |
| GSE71566 | GSM1838551 | Cord Blood_CD4 + Act + IL12_72h_rep2 | Supportive | Calibration | Yes | -4.429501 | 6.108825 |
| GSE71566 | GSM1838552 | Cord Blood_CD4 + Act + IL12_72h_rep3 | Supportive | Calibration | Yes | -4.78945 | 5.157168 |
| GSE71566 | GSM1838553 | Cord Blood_CD4 + Act + IL4_72h_rep1 | Suppressive | Calibration | Yes | 0.596819 | -6.232721 |
| GSE71566 | GSM1838554 | Cord Blood_CD4 + Act + IL4_72h_rep2 | Suppressive | Calibration | Yes | -0.351802 | -5.052677 |
| GSE71566 | GSM1838555 | Cord Blood_CD4 + Act + IL4_72h_rep3 | Suppressive | Calibration | Yes | 0.176926 | -5.058299 |

| STAT12_1 | STAT12_2 | TGFB_1 | Distance: Sample to calibration supportive | Distance: Sample to calibration suppressive | Detected as: | Model prediction |
|---|---|---|---|---|---|---|
| -3.06517 | 0.222137 | -14.0745 | 0.879544706 | 14.75363049 | Supportive | OK |
| -2.6012 | 0.222934 | -12.68098 | 0.970467005 | 15.72272799 | Supportive | OK |
| -3.21906 | -0.10097 | -13.06953 | 0.530485989 | 14.68208153 | Supportive | OK |
| -8.37048 | -7.05722 | -17.47604 | 16.25969359 | 1.334829708 | Suppressive | OK |
| -8.5717 | -6.38129 | -16.72288 | 14.70035264 | 0.778648749 | Suppressive | OK |
| -8.02088 | -5.10071 | -16.93775 | 14.20456506 | 1.191269144 | Suppressive | OK |
| | | | | Percentage correct output calibration: 100% | | |

* Supportive = Th1, Suppressive = Th2

FIG. 8A

CD4 Th1/Th2 centroid model

Validation set

| GSE_set | Array | Sample_title | State | Model_input | QC_passed | FOXO | NFKB | STAT12_1 | STAT12_2 | TGFB_1 | Distance: Sample to calibration supportive | Distance: Sample to calibration suppressive | Detected as: | Model prediction |
|---|---|---|---|---|---|---|---|---|---|---|---|---|---|---|
| GSE32959 | GSM816021 | Cord Blood_CD4 + Act + IL-12_72h_rep2 | Supportive | Validation | Yes | -0.73172 | -2.09105 | -2.45908 | -0.17619 | -15.1084 | 8.80737281 | 9.268938433 | Supportive | OK |
| GSE32959 | GSM816022 | Cord Blood_CD4 + Act + IL-12_72h_rep3 | Supportive | Validation | Yes | -0.93087 | -2.06932 | -0.88131 | 1.07658 | -13.4899 | 8.776329825 | 11.54162479 | Supportive | OK |
| GSE32959 | GSM816032 | Cord Blood_CD4 + Act + IL-4_72h_rep1 | Suppressive | Validation | Yes | 1.751533 | -6.58551 | -7.08559 | -6.86703 | -19.1895 | 16.99367655 | 3.237938814 | Suppressive | OK |
| GSE32959 | GSM816033 | Cord Blood_CD4 + Act + IL-4_72h_rep2 | Suppressive | Validation | Yes | 1.783918 | -4.80021 | -6.81564 | -7.74402 | -17.7527 | 15.65725514 | 2.886697155 | Suppressive | OK |
| GSE32959 | GSM816034 | Cord Blood_CD4 + Act + IL-4_72h_rep3 | Suppressive | Validation | Yes | -0.82105 | -7.31459 | -4.7844 | -6.01325 | -16.5882 | 15.21174397 | 4.141734289 | Suppressive | OK |

Percentage correct output validation: 100%

* Supportive = Th1, Suppressive = Th2

FIG. 8A (Continued)

CD4 Th1/Th2 linear model

Calibration set

| GSE_set | Array | Sample_title | State | Model_input | QC_passed | FOXO | NFKB |
|---|---|---|---|---|---|---|---|
| GSE71566 | GSM1838550 | Cord Blood_CD4 + Act + IL12_72h_rep1 | Supportive | Calibration | Yes | -4.9357183 | 5.2509323 |
| GSE71566 | GSM1838551 | Cord Blood_CD4 + Act + IL12_72h_rep2 | Supportive | Calibration | Yes | -4.4295007 | 6.1088246 |
| GSE71566 | GSM1838552 | Cord Blood_CD4 + Act + IL12_72h_rep3 | Supportive | Calibration | Yes | -4.7894496 | 5.157168 |
| GSE71566 | GSM1838553 | Cord Blood_CD4 + Act + IL4_72h_rep1 | Suppressive | Calibration | Yes | 0.5968193 | -6.2327209 |
| GSE71566 | GSM1838554 | Cord Blood_CD4 + Act + IL4_72h_rep2 | Suppressive | Calibration | Yes | -0.351802 | -5.0526771 |
| GSE71566 | GSM1838555 | Cord Blood_CD4 + Act + IL4_72h_rep3 | Suppressive | Calibration | Yes | 0.1769264 | -5.0582988 |

| STAT12_1 | STAT12_2 | TGFB_1 | Linear value | Dummy variable for Jitter effect | Model prediction |
|---|---|---|---|---|---|
| -3.065174 | 0.2221368 | -14.074499 | 21.418112 | 0.793 | OK |
| -2.601203 | 0.2229342 | -12.680982 | 20.8410385 | 0.977 | OK |
| -3.219057 | -0.1009722 | -13.069533 | 19.6961214 | 1.221 | OK |
| -8.370477 | -7.0572216 | -17.476039 | -4.7811998 | 0.830 | OK |
| -8.571703 | -6.3812925 | -16.72288 | -2.9309906 | 0.801 | OK |
| -8.020875 | -5.100709 | -16.937754 | -1.4190552 | 1.096 | OK |

Percentage correct output calibration: 100%

* Supportive = Th1, Suppressive = Th2

FIG. 8B

CD4 Th1/Th2 linear model

Validation set

| GSE_set | Array | Sample_title | State | Model_input | QC_passed | FOXO | NFKB |
|---|---|---|---|---|---|---|---|
| GSE32959 | GSM816021 | Cord Blood_CD4 + Act + IL-12_72h_rep2 | Supportive | Validation | Yes | -0.73172 | -2.09105 |
| GSE32959 | GSM816022 | Cord Blood_CD4 + Act + IL-12_72h_rep3 | Supportive | Validation | Yes | -0.93087 | -2.06932 |
| GSE32959 | GSM816032 | Cord Blood_CD4 + Act + IL-4_72h_rep1 | Suppressive | Validation | Yes | 1.751533 | -6.58551 |
| GSE32959 | GSM816033 | Cord Blood_CD4 + Act + IL-4_72h_rep2 | Suppressive | Validation | Yes | 1.783918 | -4.80021 |
| GSE32959 | GSM816034 | Cord Blood_CD4 + Act + IL-4_72h_rep3 | Suppressive | Validation | Yes | -0.82105 | -7.31459 |

| STAT12_1 | STAT12_2 | TGFB_1 | Linear value | Dummy variable for Jitter effect | Model prediction |
|---|---|---|---|---|---|
| -2.45908 | -0.17619 | -15.1084 | 11.1858800 | 0.843 | OK |
| -0.88131 | 1.07658 | -13.4899 | 12.54672 | 1.183 | OK |
| -7.08559 | -6.86703 | -19.1895 | -3.100163 | 1.137 | OK |
| -6.81564 | -7.74402 | -17.7527 | -3.391088 | 0.876 | OK |
| -4.7844 | -6.01325 | -16.5882 | -0.70299 | 0.942 | OK |

Percentage correct output validation: 100%

* Supportive = Th1, Suppressive = Th2

FIG. 8B
(Continued)

T-reg centroid model

Calibration set

| GSE_set | Array | Sample_title | State | Model_input | QC_passed | FOXO | NFKB | NOTCH | STAT12_1 |
|---|---|---|---|---|---|---|---|---|---|
| GSE65010 | GSM1585732 | HC2 naive treg | Resting | Calibration | Yes | 1.002988 | -16.7282 | -7.13932 | -8.80101 |
| GSE65010 | GSM1585734 | HC1 naive treg | Resting | Calibration | Yes | 1.679672 | -12.4732 | -6.46036 | -7.55362 |
| GSE65010 | GSM1585739 | HC3 naive treg | Resting | Calibration | Yes | 2.090507 | -14.0922 | -6.30079 | -8.78557 |
| GSE65010 | GSM1585743 | HC4 naive treg | Resting | Calibration | Yes | 0.62793 | -16.1516 | -6.2424 | -8.89499 |
| GSE65010 | GSM1585747 | HC5 naive treg | Resting | Calibration | Yes | 2.069998 | -15.514 | -6.17163 | -8.63103 |
| GSE65010 | GSM1585751 | HC6 naive treg | Resting | Calibration | Yes | 2.193054 | -14.8407 | -6.89703 | -9.19614 |
| GSE11292 | GSM285042 | Human_Treg_T320min | Suppressive | Calibration | Yes | 7.529016 | 12.7709 | 0.44964 | -5.96353 |
| GSE11292 | GSM285043 | Human_Treg_T340min | Suppressive | Calibration | Yes | 7.549105 | 12.46937 | 1.161992 | -5.90473 |
| GSE11292 | GSM285044 | Human_Treg_T360min | Suppressive | Calibration | Yes | 7.696549 | 13.23438 | 0.977228 | -5.98823 |

| STAT12_2 | STAT3_Blood | TGFB_1 | Distance: Sample to calibration resting | Distance: Sample to calibration suppressive | Detected as: | Model prediction |
|---|---|---|---|---|---|---|
| -8.78242 | -2.85907 | -12.2585 | 7.418284921 | 40.59667071 | Resting | OK |
| -8.17273 | -0.67994 | -14.386 | 3.480006131 | 36.18915985 | Resting | OK |
| -8.81113 | -3.59453 | -12.5697 | 5.872167254 | 38.90185795 | Resting | OK |
| -9.31871 | -2.13771 | -11.5567 | 6.611771804 | 39.56564242 | Resting | OK |
| -8.95265 | -1.05208 | -14.9777 | 5.761180477 | 38.67779522 | Resting | OK |
| -9.19704 | -1.82068 | -13.1578 | 5.298541407 | 38.52070896 | Resting | OK |
| -7.25356 | 21.2051 | -8.00764 | 32.40223636 | 1.430683334 | Suppresive | OK |
| -7.30582 | 21.63349 | -7.60436 | 32.64953101 | 0.848929963 | Suppresive | OK |
| -8.11002 | 22.78992 | -7.10379 | 33.95781657 | 0.848929963 | Suppresive | OK |
| | | | | Percentage correct output calibration: 100% | | |

FIG. 9A

T-reg centroid model

Validation set

| GSE_set | Array | Sample_title | State | Model_input | QC_passed | FOXO | NFKB | NOTCH |
|---|---|---|---|---|---|---|---|---|
| GSE11292 | GSM285027 | Human_Treg_T0min | Resting | Validation | Yes | -0.73192 | -6.71899 | -0.63442 |
| GSE11292 | GSM723824 | Human_Treg_repeated_T180min | Suppressive | Validation | Yes | 8.893437 | 13.30834 | 3.569807 |
| GSE11292 | GSM723825 | Human_Treg_repeated_T200min | Suppressive | Validation | Yes | 10.57326 | 12.35066 | 3.254227 |
| GSE11292 | GSM723826 | Human_Treg_repeated_T220min | Suppressive | Validation | Yes | 10.04493 | 12.70848 | 1.612273 |

| STAT12_1 | STAT12_2 | STAT3_Blood | TGFB_1 | Distance: Sample to calibration resting | Distance: Sample to calibration suppressive | Detected as: | Model prediction |
|---|---|---|---|---|---|---|---|
| -3.53212 | -7.01795 | -3.8721 | -14.7584 | 10.47568922 | 34.60084359 | Resting | OK |
| -4.79651 | -6.78108 | 22.74894 | -8.56212 | 34.72878386 | 3.464571064 | Suppressive | OK |
| -4.40473 | -6.03811 | 23.51797 | -7.80616 | 35.00587156 | 4.561226852 | Suppressive | OK |
| -4.51433 | -6.40045 | 24.44856 | -6.79247 | 35.46538599 | 3.906543241 | Suppressive | OK |

Percentage correct output validation: 100%

FIG. 9A (Continued)

T-reg linear model

Calibration set

| GSE_set | Array | Sample_title | State | Model_input | QC_passed | FOXO | NFKB | NOTCH |
|---|---|---|---|---|---|---|---|---|
| GSE65010 | GSM1585732 | HC2 naive treg | Resting | Calibration | Yes | 1.002988 | -16.7282 | -7.13932 |
| GSE65010 | GSM1585734 | HC1 naive treg | Resting | Calibration | Yes | 1.679672 | -12.4732 | -6.46036 |
| GSE65010 | GSM1585739 | HC3 naive treg | Resting | Calibration | Yes | 2.090507 | -14.0922 | -6.30079 |
| GSE65010 | GSM1585743 | HC4 naive treg | Resting | Calibration | Yes | 0.62793 | -16.1516 | -6.2424 |
| GSE65010 | GSM1585747 | HC5 naive treg | Resting | Calibration | Yes | 2.069998 | -15.514 | -6.17163 |
| GSE65010 | GSM1585751 | HC6 naive treg | Resting | Calibration | Yes | 2.193054 | -14.8407 | -6.89703 |
| GSE11292 | GSM285042 | Human_Treg_T320min | Suppressive | Calibration | Yes | 7.529016 | 12.7709 | 0.44964 |
| GSE11292 | GSM285043 | Human_Treg_T340min | Suppressive | Calibration | Yes | 7.549105 | 12.46937 | 1.161992 |
| GSE11292 | GSM285044 | Human_Treg_T360min | Suppressive | Calibration | Yes | 7.696549 | 13.23438 | 0.977228 |

| STAT12_1 | STAT12_2 | STAT3_Blood | TGFB_1 | Linear value | Dummy variable for Jitter effect | Model prediction |
|---|---|---|---|---|---|---|
| -8.80101 | -8.78242 | -2.85907 | -12.2585 | -33.054508 | 1.118 | OK |
| -7.55362 | -8.17273 | -0.67994 | -14.386 | -22.633522 | 0.961 | OK |
| -8.78557 | -8.81113 | -3.59453 | -12.5697 | -31.105027 | 1.278 | OK |
| -8.89499 | -9.31871 | -2.13771 | -11.5567 | -31.816640 | 0.988 | OK |
| -8.63103 | -8.95265 | -1.05208 | -14.9777 | -27.413688 | 1.207 | OK |
| -9.19614 | -9.19704 | -1.82068 | -13.1578 | -30.986844 | 0.875 | OK |
| -5.96353 | -7.25356 | 21.2051 | -8.00764 | 21.687174 | 1.013 | OK |
| -5.90473 | -7.30582 | 21.63349 | -7.60436 | 22.109557 | 1.147 | OK |
| -5.98823 | -8.11002 | 22.78992 | -7.10379 | 22.310519 | 0.772 | OK |

Percentage correct output calibration: 100%

FIG. 9B

T-reg linear model

Validation set

| GSE_set | Array | Sample_title | State | Model_input | QC_passed | FOXO | NFKB | NOTCH | STAT12_1 | STAT12_2 | STAT3_Blood | TGFB_1 | Linear value | Dummy variable for Jitter effect | Model prediction |
|---|---|---|---|---|---|---|---|---|---|---|---|---|---|---|---|
| GSE11292 | GSM285027 | Human_Treg_T0min | Resting | Validation | Yes | -0.73192 | -6.71899 | -0.63442 | -3.53212 | -7.01795 | -3.8721 | -14.7584 | -6.285260 | 0.855 | OK |
| GSE11292 | GSM723824 | Human_Treg_repeated_T180min | Suppressive | Validation | Yes | 8.893437 | 13.30834 | 3.569807 | -4.79651 | -6.78108 | 22.74894 | -8.56212 | 27.718180 | 1.039 | OK |
| GSE11292 | GSM723825 | Human_Treg_repeated_T200min | Suppressive | Validation | Yes | 10.57326 | 12.35066 | 3.254227 | -4.40473 | -6.03811 | 23.51797 | -7.80616 | 25.912917 | 1.057 | OK |
| GSE11292 | GSM723826 | Human_Treg_repeated_T220min | Suppressive | Validation | Yes | 10.04493 | 12.70848 | 1.612273 | -4.51433 | -6.40045 | 24.44856 | -6.79247 | 24.602073 | 0.756 | OK |

Percentage correct output validation: 100%

FIG. 9B
(Continued)

CD8 centroid model

Calibration set

| Cell_type | GSM_set | Array | Sample_title | State | FOXO | NFKB | NOTCH | STAT12_1 |
|---|---|---|---|---|---|---|---|---|
| CD8 | GSE26347 | GSM647043 | Human naive CD8 T cells 1 | Resting | -1.21777 | -7.55708 | -8.41549 | -5.14031 |
| CD8 | GSE26347 | GSM647044 | Human naive CD8 T cells 2 | Resting | -3.49026 | -7.61232 | -6.70125 | -7.12269 |
| CD8 | GSE26347 | GSM647045 | Human naive CD8 T cells 3 | Resting | -0.64015 | -14.9237 | -7.26891 | -8.23708 |
| CD8 | GSE26347 | GSM647046 | Human naive CD8 T cells 4 | Resting | -1.18696 | -10.1747 | -5.15783 | -9.92227 |
| CD8 | GSE26347 | GSM691443 | Human naive CD8 T cells 5 | Resting | -1.46662 | -8.93455 | -6.66171 | -9.00247 |
| CD8 | GSE26347 | GSM691445 | Human naive CD8 T cells 7 | Resting | -3.25381 | -10.7005 | -7.6073 | -8.89862 |
| CD8 | GSE63129 | GSM1541872 | Tet + treg- | Supportive | -4.20203 | 0.523952 | -4.48194 | -4.42494 |

| STAT12_2 | STAT3_Blood | TGFB_1 | Distance: Sample to calibration resting | Distance: Sample to calibration active | Detected as: | Model prediction |
|---|---|---|---|---|---|---|
| -5.11061 | -6.85264 | -12.4846 | 5.034613271 | 14.64211563 | Resting | OK |
| -6.16518 | -5.43073 | -13.7358 | 4.015996269 | 13.27486615 | Resting | OK |
| -7.58981 | -8.95206 | -14.2118 | 5.267939602 | 21.33972125 | Resting | OK |
| -8.01657 | -8.17511 | -12.5045 | 3.109901926 | 17.65269108 | Resting | OK |
| -8.88904 | -9.04682 | -15.0275 | 2.700337589 | 17.80792204 | Resting | OK |
| -9.31279 | -7.70078 | -15.3445 | 2.983282095 | 17.94424715 | Resting | OK |
| -6.19239 | 4.205948 | -11.627 | 16.84063978 | 0 | Supportive | OK |

Percentage correct output calibration: 100%

FIG. 10A

CD8 centroid model

Validation set

| Cell_type | GSM_set | Array | Sample_title | State | FOXO | NFKB | NOTCH |
|---|---|---|---|---|---|---|---|
| CD8 | GSE72642 | GSM1867067 | Perpheral Blood CD8+ T cells, replicate 1 | Resting | -2.46766 | -3.90695 | -5.69471 |
| CD8 | GSE72642 | GSM1867073 | Perpheral Blood CD8+ T cells, replicate 2 | Resting | -1.66292 | -3.6104 | -4.94314 |
| CD8 | GSE72642 | GSM1867079 | Perpheral Blood CD8+ T cells, replicate 3 | Resting | -2.94263 | -3.33474 | -6.20316 |
| CD8 | GSE86284 | GSM2299599 | Day 3 Clone 1eAPC | Supportive | -2.00994 | 11.7799 | -2.52106 |
| CD8 | GSE86284 | GSM2299600 | Day 3 Clone 1eAPC: 4-1BBL | Supportive | -0.55209 | 15.2496 | -3.2321 |
| CD8 | GSE86284 | GSM2299601 | Day 3 Clone 2eAPC | Supportive | 6.66765 | 15.93418 | -0.51287 |
| CD8 | GSE86284 | GSM2299602 | Day 3 Clone 2eAPC: 4-1BBL | Supportive | 8.306569 | 18.35557 | 0.367477 |
| CD8 | GSE86284 | GSM2299603 | Day 3 Clone 3eAPC | Supportive | 2.388316 | 10.17909 | -3.74074 |
| CD8 | GSE86284 | GSM2299604 | Day 3 Clone 3eAPC: 4-1BBL | Supportive | 5.184341 | 10.58486 | -3.99545 |
| CD8 | GSE86284 | GSM2299605 | Day 3 Clone 4eAPC | Supportive | 3.160743 | 13.36328 | -3.89752 |
| CD8 | GSE86284 | GSM2299606 | Day 3 Clone 4eAPC: 4-1BBL | Supportive | 4.760311 | 15.53321 | -2.96888 |
| CD8 | GSE86284 | GSM2299607 | Day 3 Clone 5eAPC | Supportive | 3.620307 | 14.26038 | -1.40114 |
| CD8 | GSE86284 | GSM2299608 | Day 3 Clone 5eAPC: 4-1BBL | Supportive | 5.705924 | 19.58113 | -2.07103 |
| CD8 | GSE86284 | GSM2299609 | Day 7 Clone 6eAPC | Supportive | 2.573403 | 7.815601 | -6.24149 |
| CD8 | GSE86284 | GSM2299610 | Day 7 Clone 6eAPC: 4-1BBL | Supportive | 5.979853 | 11.93938 | -4.22322 |
| CD8 | GSE86284 | GSM2299611 | Day 7 Clone 7eAPC | Supportive | 7.273493 | 0.679874 | -5.36134 |
| CD8 | GSE86284 | GSM2299612 | Day 7 Clone 7eAPC: 4-1BBL | Supportive | 6.447116 | 1.430797 | -4.05049 |
| CD8 | GSE86284 | GSM2299613 | Day 7 Clone 8eAPC | Supportive | 7.368379 | 7.0543 | -4.96863 |
| CD8 | GSE86284 | GSM2299614 | Day 7 Clone 8eAPC: 4-1BBL | Supportive | 8.661427 | 6.372091 | -4.04319 |

FIG. 10A
(Continued)

CD8 centroid model

| STAT12_1 | STAT12_2 | STAT3_Blood | TGFB_1 | Distance: Sample to calibration resting | Distance: Sample to calibration active | Detected as: | Model prediction |
|---|---|---|---|---|---|---|---|
| -7.43269 | -7.42254 | -8.61068 | -10.4182 | 7.221848523 | 14.15622558 | Resting | OK |
| -8.1186 | -7.73412 | -8.70011 | -10.4896 | 7.57383172 | 14.4094663 | Resting | OK |
| -8.02011 | -8.04587 | -9.86044 | -12.3906 | 7.290294534 | 15.30507048 | Resting | OK |
| -9.03517 | -6.50746 | 5.712065 | -13.7452 | 25.98366349 | 12.78496475 | Supportive | OK |
| -8.99813 | -6.61876 | 15.44556 | -10.9288 | 34.61596502 | 19.48437871 | Supportive | OK |
| -7.75637 | -6.38611 | 12.20121 | -10.9485 | 34.52790406 | 21.13998858 | Supportive | OK |
| -8.34056 | -6.99745 | 15.4253 | -6.66144 | 39.33962856 | 25.77710887 | Supportive | OK |
| -8.52801 | -6.63587 | 9.311373 | -15.3357 | 26.97029527 | 13.93037708 | Supportive | OK |
| -8.82994 | -7.78529 | 13.04846 | -10.3691 | 30.41386212 | 17.06681544 | Supportive | OK |
| -9.02696 | -6.21935 | 11.37808 | -15.103 | 30.78475306 | 17.43851154 | Supportive | OK |
| -9.98369 | -8.81861 | 12.54608 | -13.2669 | 33.564654 | 20.44344734 | Supportive | OK |
| -9.44796 | -7.96892 | 11.82939 | -14.1672 | 32.13008328 | 18.77034927 | Supportive | OK |
| -9.87793 | -8.81744 | 13.46067 | -9.56236 | 37.77228892 | 24.36585065 | Supportive | OK |
| -8.18653 | -5.96962 | 5.32538 | -15.5601 | 22.62371845 | 11.53656115 | Supportive | OK |
| -8.91521 | -6.06844 | 6.895226 | -14.9431 | 27.68837216 | 16.50625026 | Supportive | OK |
| -8.29159 | -6.93044 | 4.559369 | -15.5741 | 18.79845028 | 12.79395997 | Supportive | OK |
| -10.0547 | -8.69177 | 4.218009 | -14.8978 | 18.87781035 | 12.76918962 | Supportive | OK |
| -8.56588 | -5.25823 | 8.4168 | -15.7236 | 25.45610136 | 15.14232881 | Supportive | OK |
| -8.76557 | -8.31676 | 3.781565 | -14.679 | 22.81574101 | 15.25485427 | Supportive | OK |
| | | | | | Percentage correct output validation: 100% | | |

FIG. 10A
(Continued)

CD8 Linear model

| NOTCH | STAT12_1 | STAT12_2 | STAT3_Blood | TGFB_1 | Linear value | Dummy variable for Jitter effect | Model prediction |
|---|---|---|---|---|---|---|---|
| -5.69471 | -7.43269 | -7.42254 | -8.61068 | -10.4182 | -20.181710 | 1.075 | OK |
| -4.94314 | -8.1186 | -7.73412 | -8.70011 | -10.4896 | -20.95385 | 1.220 | OK |
| -6.20316 | -8.02011 | -8.04587 | -9.86044 | -12.3906 | -20.13109 | 0.729 | OK |
| -2.52106 | -9.03517 | -6.50746 | 5.712065 | -13.7452 | 15.183415 | 0.891 | OK |
| -3.2321 | -8.99813 | -6.61867 | 15.44556 | -10.9288 | 23.32715 | 0.727 | OK |
| -0.51287 | -7.75637 | -6.38611 | 12.20121 | -10.9485 | 17.76089 | 1.094 | OK |
| 0.367477 | -8.34056 | -6.99745 | 15.4253 | -6.66144 | 17.165208 | 1.096 | OK |
| -3.74074 | -8.52801 | -6.63587 | 9.311373 | -15.3357 | 13.533227 | 0.765 | OK |
| -3.99545 | -8.82994 | -7.78529 | 13.04846 | -10.3691 | 8.207399 | 0.744 | OK |
| -3.89752 | -9.02696 | -6.21935 | 11.37808 | -15.103 | 17.539787 | 0.856 | OK |
| -2.96888 | -9.98369 | -8.81861 | 12.54608 | -13.2669 | 14.814699 | 0.764 | OK |
| -1.40114 | -9.44796 | -7.96892 | 11.82939 | -14.1672 | 17.818643 | 1.013 | OK |
| -2.07103 | -9.87793 | -8.81744 | 13.46067 | -9.56236 | 16.131836 | 0.857 | OK |
| -6.24149 | -8.18653 | -5.96962 | 5.32538 | -15.5601 | 5.730038 | 1.128 | OK |
| -4.22322 | -8.91521 | -6.06844 | 6.895226 | -14.9431 | 8.590983 | 0.770 | OK |
| -5.36134 | -8.29158 | -6.93044 | 4.559369 | -15.5741 | -7.04351 | 0.923 | OK |
| -4.05049 | -10.0547 | -8.69177 | 4.218009 | -14.8978 | -8.69747 | 0.993 | OK |
| -4.96863 | -8.56588 | -5.25823 | 8.4168 | -15.7236 | 5.033581 | 1.049 | OK |
| -4.04319 | -8.76557 | -8.31676 | 3.781565 | -14.679 | -4.954291 | 1.222 | OK |

Percentage correct output validation: 100%

FIG. 10A
(Continued)

CD8 linear model

Calibration set

| GSM_set | Array | Sample_title | State | Model_input | QC_passed | FOXO | NFKB |
|---|---|---|---|---|---|---|---|
| GSE26347 | GSM647043 | Human naive CD8 T cells 1 | Resting | Calibration | Yes | -1.21777 | -7.55708 |
| GSE26347 | GSM647044 | Human naive CD8 T cells 2 | Resting | Calibration | Yes | -3.49026 | -7.61232 |
| GSE26347 | GSM647045 | Human naive CD8 T cells 3 | Resting | Calibration | Yes | -0.64015 | -14.9237 |
| GSE26347 | GSM647046 | Human naive CD8 T cells 4 | Resting | Calibration | Yes | -1.18696 | -10.1747 |
| GSE26347 | GSM691443 | Human naive CD8 T cells 5 | Resting | Calibration | Yes | -1.46662 | -8.93455 |
| GSE26347 | GSM691445 | Human naive CD8 T cells 7 | Resting | Calibration | Yes | -3.25381 | -10.7005 |
| GSE63129 | GSM1541872 | Tet + treg- | Supportive | Calibration | Yes | -4.20203 | 0.523952 |

| NOTCH | STAT12_1 | STAT12_2 | STAT3_Blood | TGFB_1 | Linear value | Dummy variable for Jitter effect | Model prediction |
|---|---|---|---|---|---|---|---|
| -8.41549 | -5.14031 | -5.11061 | -6.85264 | -12.4846 | -19.373760 | 0.956 | OK |
| -6.70125 | -7.12269 | -6.16518 | -5.43073 | -13.7358 | -15.80611 | 0.758 | OK |
| -7.26891 | -8.23708 | -7.58981 | -8.95206 | -14.2118 | -32.11961 | 0.964 | OK |
| -5.15783 | -9.92227 | -8.01657 | -8.17511 | -12.5045 | -27.75502 | 1.298 | OK |
| -6.66171 | -9.00247 | -8.88904 | -9.04682 | -15.0275 | -26.04047 | 0.715 | OK |
| -7.6073 | -8.89862 | -9.31279 | -7.70078 | -15.3445 | -25.62168 | 1.102 | OK |
| -4.48194 | -4.42494 | -6.19239 | 4.205948 | -11.627 | 5.45966 | 0.728 | OK |

Percentage correct output calibration: 100%

FIG. 10B

Validation set

CD8 Linear model

| GSM_set | Array | Sample_title | State | Model_input | QC_passed | FOXO | NFKB |
|---|---|---|---|---|---|---|---|
| GSE72642 | GSM1867067 | Perpheral Blood CD8+ T cells, replicate 1 | Resting | Validation | Yes | -2.46766 | -3.90695 |
| GSE72642 | GSM1867073 | Perpheral Blood CD8+ T cells, replicate 2 | Resting | Validation | Yes | -1.66292 | -3.6104 |
| GSE72642 | GSM1867079 | Perpheral Blood CD8+ T cells, replicate 3 | Resting | Validation | Yes | -2.94263 | -3.33474 |
| GSE86284 | GSM2299599 | Day 3 Clone 1eAPC | Supportive | Validation | Yes | -2.00994 | 11.7799 |
| GSE86284 | GSM2299600 | Day 3 Clone 1eAPC: 4-1BBL | Supportive | Validation | Yes | -0.55209 | 15.2496 |
| GSE86284 | GSM2299601 | Day 3 Clone 2eAPC | Supportive | Validation | Yes | 6.66765 | 15.93418 |
| GSE86284 | GSM2299602 | Day 3 Clone 2eAPC: 4-1BBL | Supportive | Validation | Yes | 8.306569 | 18.35557 |
| GSE86284 | GSM2299603 | Day 3 Clone 3eAPC | Supportive | Validation | Yes | 2.388316 | 10.17909 |
| GSE86284 | GSM2299604 | Day 3 Clone 3eAPC: 4-1BBL | Supportive | Validation | Yes | 5.184341 | 10.58486 |
| GSE86284 | GSM2299605 | Day 3 Clone 4eAPC | Supportive | Validation | Yes | 3.160743 | 13.36328 |
| GSE86284 | GSM2299606 | Day 3 Clone 4eAPC: 4-1BBL | Supportive | Validation | Yes | 4.760311 | 15.53321 |
| GSE86284 | GSM2299607 | Day 3 Clone 5eAPC | Supportive | Validation | Yes | 3.620307 | 14.26038 |
| GSE86284 | GSM2299608 | Day 3 Clone 5eAPC: 4-1BBL | Supportive | Validation | Yes | 5.705924 | 19.58113 |
| GSE86284 | GSM2299609 | Day 7 Clone 6eAPC | Supportive | Validation | Yes | 2.573403 | 7.815601 |
| GSE86284 | GSM2299610 | Day 7 Clone 6eAPC: 4-1BBL | Supportive | Validation | Yes | 5.979853 | 11.93938 |
| GSE86284 | GSM2299611 | Day 7 Clone 7eAPC | Supportive | Validation | Yes | 7.273493 | 0.679874 |
| GSE86284 | GSM2299612 | Day 7 Clone 7eAPC: 4-1BBL | Supportive | Validation | Yes | 6.447116 | 1.430797 |
| GSE86284 | GSM2299613 | Day 7 Clone 8eAPC | Supportive | Validation | Yes | 7.368379 | 7.0543 |
| GSE86284 | GSM2299614 | Day 7 Clone 8eAPC: 4-1BBL | Supportive | Validation | Yes | 8.661427 | 6.372091 |

FIG. 10B (Continued)

Calibration set

T-memory centroid model

| GSE_set | Array | Sample_title | State | Model_input | QC_passed | FOXO | NFKB | TGFB_1 | Distance: Sample to calibration memory | Distance: Sample to calibration naïve | Detected as: | Model prediction |
|---|---|---|---|---|---|---|---|---|---|---|---|---|
| GSE65010 | GSM1585731 | HC1 memory T effector | Memory | Calibration | Yes | 4.884432 | -7.20098 | -11.2318 | 2.675260858 | 7.471113952 | Memory | OK |
| GSE65010 | GSM1585738 | HC2 memory T effector | Memory | Calibration | Yes | 3.56121 | -5.83111 | -7.88647 | 2.692284816 | 9.515415796 | Memory | OK |
| GSE65010 | GSM1585742 | HC3 memory T effector | Memory | Calibration | Yes | 1.314654 | -8.18334 | -9.5507 | 1.528156899 | 6.17681595 | Memory | OK |
| GSE65010 | GSM1585746 | HC4 memory T effector | Memory | Calibration | Yes | 2.434194 | -8.80982 | -7.50109 | 2.508422078 | 7.621349659 | Memory | OK |
| GSE65010 | GSM1585750 | HC5 memory T effector | Memory | Calibration | Yes | 3.0207 | -8.62079 | -12.584 | 3.058869289 | 4.908555094 | Memory | OK |
| GSE65010 | GSM1585754 | HC6 memory T effector | Memory | Calibration | Yes | 1.198698 | -7.20243 | -9.4472 | 1.618312166 | 6.955957616 | Memory | OK |
| GSE65010 | GSM1585733 | HC2 Naive T effector | Naive | Calibration | Yes | -0.66615 | -16.0954 | -14.9981 | 10.54086272 | 3.869618561 | Naïve | OK |
| GSE65010 | GSM1585735 | HC1 Naive T effector | Naive | Calibration | Yes | 1.961359 | -4.29269 | -9.98395 | 3.44876335 | 9.247145257 | Memory | FALSE |
| GSE65010 | GSM1585740 | HC3 Naive T effector | Naive | Calibration | Yes | -0.1272 | -14.3299 | -12.3668 | 7.748708091 | 2.329722525 | Naïve | OK |
| GSE65010 | GSM1585744 | HC4 Naive T effector | Naive | Calibration | Yes | -0.46287 | -15.4945 | -15.2882 | 10.15515367 | 3.389613673 | Naïve | OK |
| GSE65010 | GSM1585748 | HC5 Naive T effector | Naive | Calibration | Yes | 0.340311 | -15.3359 | -15.5612 | 9.964637165 | 3.285596619 | Naïve | OK |
| GSE65010 | GSM1585752 | HC6 Naive T effector | Naive | Calibration | Yes | 1.106513 | -9.8156 | -14.617 | 5.617472711 | 2.959393112 | Naïve | OK |

Percentage correct output calibration: 92%

FIG. 11A

T-memory centroid model

Validation set

| GSM_set | Array | Sample_title | State | Model_ input | QC_ passed |
|---|---|---|---|---|---|
| GSE65010 | GSM1585736 | HC1 memory treg | Memory | Validation | Yes |
| GSE65010 | GSM1585737 | HC2 memory treg | Memory | Validation | Yes |
| GSE65010 | GSM1585741 | HC3 memory treg | Memory | Validation | Yes |
| GSE65010 | GSM1585745 | HC4 memory treg | Memory | Validation | Yes |
| GSE65010 | GSM1585749 | HC5 memory treg | Memory | Validation | Yes |
| GSE65010 | GSM1585753 | HC6 memory treg | Memory | Validation | Yes |
| GSE26495 | GSM651416 | PD-1 high CD8 + CD3 + T cells - rep1 | Memory | Validation | Yes |
| GSE26495 | GSM651417 | PD-1 high CD8 + CD3 + T cells - rep2 | Memory | Validation | Yes |
| GSE26495 | GSM651418 | PD-1 high CD8 + CD3 + T cells - rep3 | Memory | Validation | Yes |
| GSE26495 | GSM651419 | PD-1 high CD8 + CD3 + T cells - rep4 | Memory | Validation | Yes |
| GSE26495 | GSM651420 | PD-1 high CD8 + CD3 + T cells - rep5 | Memory | Validation | Yes |
| GSE26495 | GSM651422 | PD-1 high CD8 + CD3 + T cells - rep6 | Memory | Validation | Yes |
| GSE26495 | GSM651423 | PD-1 low CD8 + CD3 + T cells - rep1 | Memory | Validation | Yes |
| GSE26495 | GSM651425 | PD-1 low CD8 + CD3 + T cells - rep2 | Memory | Validation | Yes |
| GSE26495 | GSM651426 | PD-1 low CD8 + CD3 + T cells - rep3 | Memory | Validation | Yes |
| GSE26495 | GSM651427 | PD-1 low CD8 + CD3 + T cells - rep4 | Memory | Validation | Yes |
| GSE26495 | GSM651429 | PD-1 low CD8 + CD3 + T cells - rep5 | Memory | Validation | Yes |
| GSE26495 | GSM651430 | PD-1 low CD8 + CD3 + T cells - rep6 | Memory | Validation | Yes |
| GSE65010 | GSM1585732 | HC2 Naive treg | Naive | Validation | Yes |
| GSE65010 | GSM1585734 | HC1 Naive treg | Naive | Validation | Yes |
| GSE65010 | GSM1585739 | HC3 Naive treg | Naive | Validation | Yes |
| GSE65010 | GSM1585743 | HC4 Naive treg | Naive | Validation | Yes |
| GSE65010 | GSM1585747 | HC5 Naive treg | Naive | Validation | Yes |
| GSE65010 | GSM1585751 | HC6 Naive treg | Naive | Validation | Yes |
| GSE26495 | GSM651411 | Naive CD8 + CD3 + T cells - rep1 | Naive | Validation | Yes |
| GSE26495 | GSM651412 | Naive CD8 + CD3 + T cells - rep2 | Naive | Validation | Yes |
| GSE26495 | GSM651413 | Naive CD8 + CD3 + T cells - rep3 | Naive | Validation | Yes |
| GSE26495 | GSM651415 | Naive CD8 + CD3 + T cells - rep4 | Naive | Validation | Yes |
| | | | | | |

FIG. 11A
(Continued)

T-memory centroid model

Validation set

| FOXO | NFKB | TGFB_1 | Distance: Sample to calibration memory | Distance: Sample to calibration naïve | Detected as: | Model prediction |
|---|---|---|---|---|---|---|
| 6.431967 | -9.12106 | -10.2963 | 4.02584856 | 7.810868391 | Memory | OK |
| 6.555281 | -10.6229 | -7.70249 | 5.241159617 | 8.908628915 | Memory | OK |
| 6.18798 | -10.0411 | -10.0333 | 4.217588088 | 7.384873483 | Memory | OK |
| 6.55344 | -10.5277 | -6.92417 | 5.532864916 | 9.477353878 | Memory | OK |
| 5.598484 | -12.5447 | -8.67056 | 5.770463202 | 7.334387569 | Memory | OK |
| 6.746414 | -10.2783 | -8.36608 | 4.981899923 | 8.692968436 | Memory | OK |
| -4.2645 | 0.260254 | -10.9234 | 10.62706856 | 13.92978944 | Memory | OK |
| -6.90503 | -2.20667 | -9.08198 | 11.08428156 | 13.50000424 | Memory | OK |
| -3.43459 | 4.771286 | -5.57449 | 14.46265763 | 19.55725208 | Memory | OK |
| -3.89341 | 2.857195 | -8.74829 | 12.45276289 | 16.77307278 | Memory | OK |
| -5.04277 | 4.857924 | -6.85528 | 14.99435912 | 19.51530525 | Memory | OK |
| -5.82461 | 0.545065 | -8.64664 | 11.89144344 | 15.38103751 | Memory | OK |
| -7.1685 | 0.476623 | -8.69344 | 12.84555255 | 15.8975452 | Memory | OK |
| -6.63303 | 2.522093 | -11.9949 | 14.01194336 | 16.72246672 | Memory | OK |
| -6.42705 | 4.217047 | -3.66245 | 16.15650403 | 20.7450945 | Memory | OK |
| -3.04066 | 0.998087 | -10.4301 | 10.41822493 | 14.37944708 | Memory | OK |
| -4.49198 | 2.359718 | -7.83441 | 12.47967991 | 16.78586124 | Memory | OK |
| -6.07569 | -0.59632 | -8.31306 | 11.3664937 | 14.65199053 | Memory | OK |
| 1.002988 | -16.7282 | -12.2585 | 9.597743517 | 4.490831835 | Naive | OK |
| 1.679672 | -12.4732 | -14.386 | 6.813067718 | 1.446770589 | Naive | OK |
| 2.090507 | -14.0922 | -12.5697 | 7.089629743 | 2.62007449 | Naive | OK |
| 0.62793 | -16.1516 | -11.5567 | 8.961715001 | 4.243951582 | Naive | OK |
| 2.069998 | -15.514 | -14.9777 | 9.501191383 | 3.609966865 | Naive | OK |
| 2.193054 | -14.8407 | -13.1578 | 8.004941559 | 2.996539826 | Naive | OK |
| -7.58623 | -4.01194 | -17.6477 | 13.5231959 | 12.28768598 | Naive | OK |
| -9.05689 | -9.07868 | -17.4676 | 14.19373243 | 10.68688277 | Naive | OK |
| -6.08284 | -2.57364 | -11.5654 | 10.34054999 | 12.09290701 | Memory | FALSE |
| -6.13314 | -8.62063 | -18.4325 | 12.48467692 | 8.894035288 | Naive | OK |
| | | | | Percentage correct output validation: 96% | | |

FIG. 11A
(Continued)

Calibration set

T-memory linear model

| GSE_set | Array | Sample_title | State | Model_input | QC_passed | FOXO | NFKB |
|---|---|---|---|---|---|---|---|
| GSE65010 | GSM1585731 | HC1 memory T effector | Memory | Calibration | Yes | 4.884432 | -7.20098 |
| GSE65010 | GSM1585738 | HC2 memory T effector | Memory | Calibration | Yes | 3.56121 | -5.83111 |
| GSE65010 | GSM1585742 | HC3 memory T effector | Memory | Calibration | Yes | 1.314654 | -8.18334 |
| GSE65010 | GSM1585746 | HC4 memory T effector | Memory | Calibration | Yes | 2.434194 | -8.80982 |
| GSE65010 | GSM1585750 | HC5 memory T effector | Memory | Calibration | Yes | 3.0207 | -8.62079 |
| GSE65010 | GSM1585754 | HC6 memory T effector | Memory | Calibration | Yes | 1.198698 | -7.20243 |
| GSE65010 | GSM1585733 | HC2 Naive T effector | Naive | Calibration | Yes | -0.66615 | -16.0954 |
| GSE65010 | GSM1585735 | HC1 Naive T effector | Naive | Calibration | Yes | 1.961359 | -4.29269 |
| GSE65010 | GSM1585740 | HC3 Naive T effector | Naive | Calibration | Yes | -0.1272 | -14.3299 |
| GSE65010 | GSM1585744 | HC4 Naive T effector | Naive | Calibration | Yes | -0.46287 | -15.4945 |
| GSE65010 | GSM1585748 | HC5 Naive T effector | Naive | Calibration | Yes | 0.340311 | -15.3359 |
| GSE65010 | GSM1585752 | HC6 Naive T effector | Naive | Calibration | Yes | 1.106513 | -9.8156 |

| TGFB_1 | Linear value | Dummy variable for Jitter effect | Model prediction |
|---|---|---|---|
| -11.2318 | -0.853612 | 1.027 | OK |
| -7.88647 | -1.50585 | 0.934 | OK |
| -9.5507 | 0.052706 | 0.931 | OK |
| -7.50109 | -3.742924 | 1.299 | OK |
| -12.584 | 0.94251 | 0.918 | FALSE |
| -9.4472 | 1.046072 | 1.118 | FALSE |
| -14.9981 | -0.43115 | 0.750 | FALSE |
| -9.98395 | 3.729901 | 0.804 | OK |
| -12.3668 | -1.8359 | 0.952 | FALSE |
| -15.2882 | 0.256570 | 0.744 | OK |
| -15.5612 | -0.115011 | 1.207 | FALSE |
| -14.617 | 3.694887 | 0.951 | OK |

Percentage correct output calibration: 58%

FIG. 11B

T-memory linear model

Validation set

| GSM_set | Array | Sample_title | State | Model_ input | QC_ passed |
|---|---|---|---|---|---|
| GSE65010 | GSM1585736 | HC1 memory treg | Memory | Validation | Yes |
| GSE65010 | GSM1585737 | HC2 memory treg | Memory | Validation | Yes |
| GSE65010 | GSM1585741 | HC3 memory treg | Memory | Validation | Yes |
| GSE65010 | GSM1585745 | HC4 memory treg | Memory | Validation | Yes |
| GSE65010 | GSM1585749 | HC5 memory treg | Memory | Validation | Yes |
| GSE65010 | GSM1585753 | HC6 memory treg | Memory | Validation | Yes |
| GSE26495 | GSM651416 | PD-1 high CD8 + CD3 + T cells - rep1 | Memory | Validation | Yes |
| GSE26495 | GSM651417 | PD-1 high CD8 + CD3 + T cells - rep2 | Memory | Validation | Yes |
| GSE26495 | GSM651418 | PD-1 high CD8 + CD3 + T cells - rep3 | Memory | Validation | Yes |
| GSE26495 | GSM651419 | PD-1 high CD8 + CD3 + T cells - rep4 | Memory | Validation | Yes |
| GSE26495 | GSM651420 | PD-1 high CD8 + CD3 + T cells - rep5 | Memory | Validation | Yes |
| GSE26495 | GSM651422 | PD-1 high CD8 + CD3 + T cells - rep6 | Memory | Validation | Yes |
| GSE26495 | GSM651423 | PD-1 low CD8 + CD3 + T cells - rep1 | Memory | Validation | Yes |
| GSE26495 | GSM651425 | PD-1 low CD8 + CD3 + T cells - rep2 | Memory | Validation | Yes |
| GSE26495 | GSM651426 | PD-1 low CD8 + CD3 + T cells - rep3 | Memory | Validation | Yes |
| GSE26495 | GSM651427 | PD-1 low CD8 + CD3 + T cells - rep4 | Memory | Validation | Yes |
| GSE26495 | GSM651429 | PD-1 low CD8 + CD3 + T cells - rep5 | Memory | Validation | Yes |
| GSE26495 | GSM651430 | PD-1 low CD8 + CD3 + T cells - rep6 | Memory | Validation | Yes |
| GSE65010 | GSM1585732 | HC2 Naive treg | Naive | Validation | Yes |
| GSE65010 | GSM1585734 | HC1 Naive treg | Naive | Validation | Yes |
| GSE65010 | GSM1585739 | HC3 Naive treg | Naive | Validation | Yes |
| GSE65010 | GSM1585743 | HC4 Naive treg | Naive | Validation | Yes |
| GSE65010 | GSM1585747 | HC5 Naive treg | Naive | Validation | Yes |
| GSE65010 | GSM1585751 | HC6 Naive treg | Naive | Validation | Yes |
| GSE26495 | GSM651411 | Naive CD8 + CD3 + T cells - rep1 | Naive | Validation | Yes |
| GSE26495 | GSM651412 | Naive CD8 + CD3 + T cells - rep2 | Naive | Validation | Yes |
| GSE26495 | GSM651413 | Naive CD8 + CD3 + T cells - rep3 | Naive | Validation | Yes |
| GSE26495 | GSM651415 | Naive CD8 + CD3 + T cells - rep4 | Naive | Validation | Yes |
| | | | | | |

FIG. 11B
(Continued)

T-memory linear model

Validation set

| FOXO | NFKB | TGFB_1 | Linear value | Dummy variable for Jitter effect | Model prediction |
|---|---|---|---|---|---|
| 6.431967 | -9.12106 | -10.2963 | -5.256727 | 1.056 | OK |
| 6.555281 | -10.6229 | -7.70249 | -9.475691 | 1.060 | OK |
| 6.18798 | -10.0411 | -10.0333 | -6.19578 | 0.885 | OK |
| 6.55344 | -10.5277 | -6.92417 | -10.15697 | 1.187 | OK |
| 5.598484 | -12.5447 | -8.67056 | -9.472624 | 1.264 | OK |
| 6.746414 | -10.2783 | -8.36608 | -8.658634 | 0.814 | OK |
| -4.2645 | 0.260254 | -10.9234 | 15.448154 | 0.971 | FALSE |
| -6.90503 | -2.20667 | -9.08198 | 13.78034 | 1.167 | FALSE |
| -3.43459 | 4.771286 | -5.57449 | 13.780366 | 0.726 | FALSE |
| -3.89341 | 2.857195 | -8.74829 | 15.498895 | 1.119 | FALSE |
| -5.04277 | 4.857924 | -6.85528 | 16.755974 | 0.968 | FALSE |
| -5.82461 | 0.545065 | -8.64664 | 15.016315 | 1.070 | FALSE |
| -7.1685 | 0.476623 | -8.69344 | 16.338563 | 0.761 | FALSE |
| -6.63303 | 2.522093 | -11.9949 | 21.150023 | 0.985 | FALSE |
| -6.42705 | 4.217047 | -3.66245 | 14.306547 | 1.200 | FALSE |
| -3.04066 | 0.998087 | -10.4301 | 14.468847 | 0.844 | FALSE |
| -4.49198 | 2.359718 | -7.83441 | 14.686108 | 0.857 | FALSE |
| -6.07569 | -0.59632 | -8.31306 | 13.79243 | 1.003 | FALSE |
| 1.002988 | -16.7282 | -12.2585 | -5.472688 | 0.980 | FALSE |
| 1.679672 | -12.4732 | -14.386 | 0.233128 | 0.768 | OK |
| 2.090507 | -14.0922 | -12.5697 | -3.613007 | 1.286 | FALSE |
| 0.62793 | -16.1516 | -11.5567 | -5.22283 | 0.728 | FALSE |
| 2.069998 | -15.514 | -14.9777 | -2.606298 | 1.034 | FALSE |
| 2.193054 | -14.8407 | -13.1578 | -3.875954 | 0.893 | FALSE |
| -7.58623 | -4.01194 | -17.6477 | 21.22199 | 0.990 | OK |
| -9.05689 | -9.07868 | -17.4676 | 17.44581 | 0.830 | OK |
| -6.08284 | -2.57364 | -11.5654 | 15.0746 | 0.869 | OK |
| -6.13314 | -8.62063 | -18.4325 | 15.94501 | 0.884 | OK |
| | | Percentage correct output validation: 39% | | | |

FIG. 11B
(Continued)

Calibration set

B-cells centroid model

| GSE_set | Array | Sample_title | State | Model_input | QC_passed | FOXO |
|---|---|---|---|---|---|---|
| GSE39411 | GSM967667 | Healthy B-cell, subject N1_ unstimulated cells_at 210 min | Resting | Calibration | Yes | 1.41331097 |
| GSE39411 | GSM967675 | Healthy B-cell, subject N2_ unstimulated cells_at 210 min | Resting | Calibration | Yes | 1.52271115 |
| GSE39411 | GSM967683 | Healthy B-cell, subject N3_ unstimulated cells_at 210 min | Resting | Calibration | Yes | 4.50737975 |
| GSE39411 | GSM967668 | Healthy B-cell, subject N1_ unstimulated cells_at 390 min | Resting | Calibration | Yes | 4.44924412 |
| GSE39411 | GSM967676 | Healthy B-cell, subject N2_ unstimulated cells_at 390 min | Resting | Calibration | Yes | 5.22235016 |
| GSE39411 | GSM967684 | Healthy B-cell, subject N3_ unstimulated cells_at 390 min | Resting | Calibration | Yes | 4.62552513 |
| GSE39411 | GSM967671 | Healthy B-cell, subject N1_ stimulated cells_at 210 min | Supportive | Calibration | Yes | -1.77377223 |
| GSE39411 | GSM967679 | Healthy B-cell, subject N2_ stimulated cells_at 210 min | Supportive | Calibration | Yes | -3.6471673 |
| GSE39411 | GSM967687 | Healthy B-cell, subject N3_ stimulated cells_at 210 min | Supportive | Calibration | Yes | -0.2871704 |
| GSE39411 | GSM967672 | Healthy B-cell, subject N1_ stimulated cells_at 390 min | Supportive | Calibration | Yes | 0.79181257 |
| GSE39411 | GSM967688 | Healthy B-cell, subject N3_ stimulated cells_at 390 min | Supportive | Calibration | Yes | -0.601597 |

| NFKB | STAT3_Blood | Distance: Sample to calibration resting | Distance: Sample to calibration supportive | Detected as: | Model prediction |
|---|---|---|---|---|---|
| -3.0600631 | -2.64755331 | 2.834814119 | 6.92896766 | Resting | OK |
| -1.2675292 | -5.05230169 | 3.591717516 | 8.09280281 | Resting | OK |
| -5.2240291 | -4.73690306 | 1.602123428 | 10.99653949 | Resting | OK |
| -3.8786821 | -3.52715176 | 1.035701104 | 9.458474088 | Resting | OK |
| -3.0583671 | -3.97795218 | 1.878480194 | 9.814041611 | Resting | OK |
| -7.7035733 | -4.85673578 | 3.874017983 | 12.72897265 | Resting | OK |
| -0.3619818 | 4.07106316 | 10.4836428 | 2.547004162 | Supportive | OK |
| 4.64936608 | 2.43941978 | 13.09298578 | 4.279624868 | Supportive | OK |
| -0.5827381 | 2.36479785 | 8.331451174 | 1.983995855 | Supportive | OK |
| 1.1767842 | 3.04633264 | 9.310966962 | 2.081003362 | Supportive | OK |
| 1.20282924 | -0.98092542 | 7.429053448 | 3.208602946 | Supportive | OK |
| | | | Percentage correct output calibration: 100% | | |

FIG. 12A

B - cells centroid model

Validation set

| GSE_set | Array | Sample_title | State | Model_input | QC_passed | FOXO |
|---|---|---|---|---|---|---|
| GSE9119 | GSM230915 | Primary peripheral blood B cell (resting) - repeat2 | Resting | Validation | Yes | 8.566168 |
| GSE9119 | GSM230918 | Primary peripheral blood B cell (resting) - repeat1 | Resting | Validation | Yes | 8.4242 |
| GSE9119 | GSM230916 | Primary peripheral blood B cell antiIgM - 1hr | Supportive | Validation | Yes | 6.352377 |
| GSE9119 | GSM230917 | Primary peripheral blood B cell antiIgM - 3hr | Supportive | Validation | Yes | 1.697236 |

| NFKB | STAT3_Blood | Distance: Sample to calibration resting | Distance: Sample to calibration supportive | Detected as: | Model prediction |
|---|---|---|---|---|---|
| 0.235135 | 3.308728 | 9.900522313 | 9.783828613 | Supportive | FALSE |
| 0.5383939 | 2.51569 | 9.388437673 | 9.557508867 | Resting | OK |
| 5.823139 | 10.559887 | 17.90127445 | 12.1200329 | Supportive | OK |
| 3.3031827 | 8.444814 | 14.6873959 | 7.165422781 | Supportive | OK |

Percentage correct output validation: 75%

FIG. 12A
(Continued)

Calibration set

B-cells linear model

| GSE_set | Array | Sample_title | State | Model_input | QC_passed | FOXO |
|---|---|---|---|---|---|---|
| GSE39411 | GSM967667 | Healthy B-cell, subject N1_ unstimulated cells_at 210 min | Resting | Calibration | Yes | 1.41331097 |
| GSE39411 | GSM967675 | Healthy B-cell, subject N2_ unstimulated cells_at 210 min | Resting | Calibration | Yes | 1.52271115 |
| GSE39411 | GSM967683 | Healthy B-cell, subject N3_ unstimulated cells_at 210 min | Resting | Calibration | Yes | 4.50737975 |
| GSE39411 | GSM967668 | Healthy B-cell, subject N1_ unstimulated cells_at 390 min | Resting | Calibration | Yes | 4.44924412 |
| GSE39411 | GSM967676 | Healthy B-cell, subject N2_ unstimulated cells_at 390 min | Resting | Calibration | Yes | 5.22235016 |
| GSE39411 | GSM967684 | Healthy B-cell, subject N3_ unstimulated cells_at 390 min | Resting | Calibration | Yes | 4.62552513 |
| GSE39411 | GSM967671 | Healthy B-cell, subject N1_ stimulated cells_at 210 min | Supportive | Calibration | Yes | -1.77377223 |
| GSE39411 | GSM967679 | Healthy B-cell, subject N2_ stimulated cells_at 210 min | Supportive | Calibration | Yes | -3.6471673 |
| GSE39411 | GSM967687 | Healthy B-cell, subject N3_ stimulated cells_at 210 min | Supportive | Calibration | Yes | -0.2871704 |
| GSE39411 | GSM967672 | Healthy B-cell, subject N1_ stimulated cells_at 390 min | Supportive | Calibration | Yes | 0.79181257 |
| GSE39411 | GSM967688 | Healthy B-cell, subject N3_ stimulated cells_at 390 min | Supportive | Calibration | Yes | -0.601597 |

| NFKB | STAT3_Blood | Linear value | Dummy variable for Jitter effect | Model prediction |
|---|---|---|---|---|
| -3.0600631 | -2.64755331 | -7.120927 | 0.973 | OK |
| -1.2675292 | -5.05230169 | -7.842541996 | 0.875 | OK |
| -5.2240291 | -4.73690306 | -14.46831188 | 1.198 | OK |
| -3.8786821 | -3.52715176 | -11.85507801 | 1.278 | OK |
| -3.0583671 | -3.97795218 | -12.25866945 | 0.721 | OK |
| -7.7035733 | -4.85673578 | -17.18583417 | 1.062 | OK |
| -0.3619818 | 4.07106316 | 5.482803674 | 0.725 | OK |
| 4.64936608 | 2.43941978 | 10.73595315 | 0.816 | OK |
| -0.5827381 | 2.36479785 | 2.069230161 | 0.937 | OK |
| 1.1767842 | 3.04633264 | 3.431304274 | 0.849 | OK |
| 1.20282924 | -0.98092542 | 0.823500798 | 1.254 | OK |

Percentage correct output calibration: 100%

FIG. 12B

B - cells linear model

Validation set

| GSE_set | Array | Sample_title | State | Model_input | QC_passed | FOXO | NFKB | STAT3_Blood | Linear value | Dummy variable for Jitter effect | Model prediction |
|---|---|---|---|---|---|---|---|---|---|---|---|
| GSE9119 | GSM230915 | Primary peripheral blood B cell (resting) - repeat2 | Resting | Validation | Yes | 8.566168 | 0.235135 | 3.308728 | -5.022305 | 0.957 | OK |
| GSE9119 | GSM230918 | Primary peripheral blood B cell (resting) - repeat1 | Resting | Validation | Yes | 8.4242 | 0.5383939 | 2.51569 | -5.3701161 | 1.093 | OK |
| GSE9119 | GSM230916 | Primary peripheral blood B cell antiIgM - 1hr | Supportive | Validation | Yes | 6.352377 | 5.823139 | 10.559887 | 10.030649 | 1.269 | OK |
| GSE9119 | GSM230917 | Primary peripheral blood B cell antiIgM - 3hr | Supportive | Validation | Yes | 1.697236 | 3.3031827 | 8.444814 | 10.0507607 | 1.222 | OK |

Percentage correct output validation: 100%

FIG. 12B
(Continued)

Model type 1, to measure activity of the immune response and provide a percentage immune response activity score A. Total score range can lie between 19 and 6. 19 - 6 = 13.
13 = 100%. Give activity score as percentage activation:
Percentage immune activity = [(cumulative points-6)/13] x 100%
A percentage > 77% indicates an active immune response; a percentage lower than 77% increasingly indicates an immune suppressed immune response.

To change this readout into a quantitative score for immune activity versus immune suppression, called immune response status: this "resting" threshold can be reset from 77% to 0, and % is removed.
The equation becomes as follows:
% immune response activity - 77 = immune activity status, where a positive number means that the immune response is active and a negative number means that it is suppressed.

When incorporated into the earlier equation:
Immune response status {[(cumulative points-6)/13]x100} - 77.
Negative number indicates immune response suppression; positive number indicates immune response activity.

FIG. 13E

Model type 1, to measure activity of the immune response and provide a percentage immune response activity score Calculation of percentage immune activity in case not all input values are available:
Percentage immune activity = [(score-min)/max-min] x 100%
Were:

- min = minimal point value for measured immune cell types (in the example: 0 + 1 = 1)
- max = maximal point value for measured immune cell types (in the example: 2 + 2 = 4)

For the example case percentage immune activity = [(score-1)/3] x 100%
In the example case: 100%, however the uncertainty is high because only two observable were entered into the model.

Calculation of (un)certainty:
When all 11 observables are available as input into the model = maximum certainty with respect to prediction of immune activity status = defined as 100% certainty. Assumption: linear contribution of observables to final score: (100/11) = 9% certainty contribution per observable.

In the example case: 2 cumulative points input provides an immune activity score of 100%, associated with 82% uncertainty.

FIG. 13G

Model type 2, bayesian model to measure activity of the immune response, to provide a probability or log2odds score for immune response activity

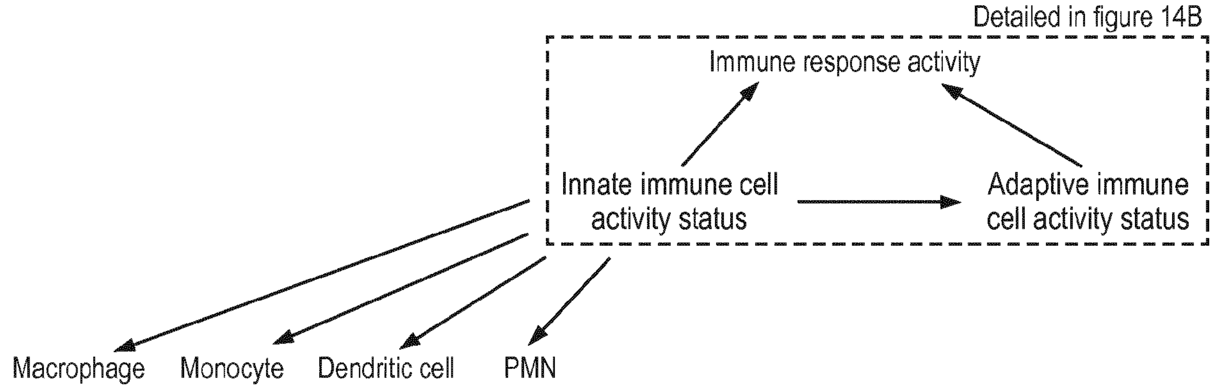

Probabilities 2 state model

| Innate immune response | Monocyte/macrophage resting | PMN/Monocyte/macrophage supportive |
|---|---|---|
| Active | 0.2 | 0.8 |
| Not active | 0.8 | 0.2 |
| Suppressed | 0.8 | 0.2 |

Probabilities 3 state model

| Innate immune response | DC 3 resting | DC supportive | DC suppressive |
|---|---|---|---|
| Active | 0.15 | 0.8 | 0.05 |
| Resting | 0.7 | 0.2 | 0.1 |
| Suppressed | 0.3 | 0.1 | 0.6 |

Directed acyclic graph for the Bayesian network model with arrows pointing from innate and adaptive immune cell activity states to immune response activity and from innate immune cell activity status to adaptive immune activity status. Arrow directions have a defining meaning in a bayesian network model.

FIG. 14A

Model type 2, bayesian model to measure activity of the immune response, to provide a probability or log2odds score for immune response activity

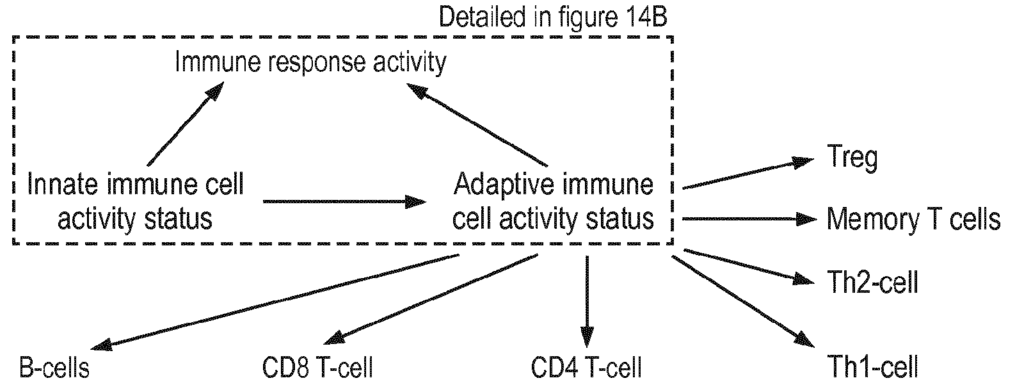

| Adaptive immune response | CD4 resting | CD4 supportive | CD4 suppressive |
|---|---|---|---|
| Active | 0.15 | 0.8 | 0.05 |
| Resting | 0.7 | 0.2 | 0.1 |
| Suppressed | 0.25 | 0.05 | 0.7 |

| Adaptive immune response | Th2/Treg resting | Th2/Treg suppressive |
|---|---|---|
| Active | 0.9 | 0.1 |
| Not active | 0.3 | 0.7 |
| Suppressed | 0.1 | 0.9 |

| Adaptive immune response | CD8/Th1/Bcell resting | CD8/Th1/Bcell supportive |
|---|---|---|
| Active | 0.2 | 0.8 |
| Not active | 0.8 | 0.2 |
| Suppressed | 0.8 | 0.2 |

| Adaptive immune response | T cell naive | T cell memory |
|---|---|---|
| Active | 0.4 | 0.6 |
| Not active | 0.6 | 0.4 |
| Suppressed | 0.7 | 0.3 |

FIG. 14A (Continued)

Model type 2. Bayesian model to measure activity of the immune response, to provide a probability or log2odds score for immune response activity

Probability (Immune Response / Adaptive Immune, Innate Immune) =

| Adaptive, innate \ Immune response | Normal | Inflammatory | Suppressed | Adaptive | Exhausted |
|---|---|---|---|---|---|
| Active, active | | | | 1 | |
| Active, resting | | | | 1 | |
| Active, suppressive | | | | 1 | |
| Resting, active | | 1 | | | |
| Resting, resting | 1 | | | | |
| Resting, suppresive | | | 1 | | |
| Suppressive, active | | | | | 1 |
| Suppressive, resting | | | | | 1 |
| Suppressive, suppressive | | | | | 1 |

This is a table for a node with 2 parents
Note that the table is in transposed format Immune response is effectively a look up table.
There is no probabilistic dependency The underlying reasoning was that the immune response activity, the immune response on system level is essentially a naming convention.

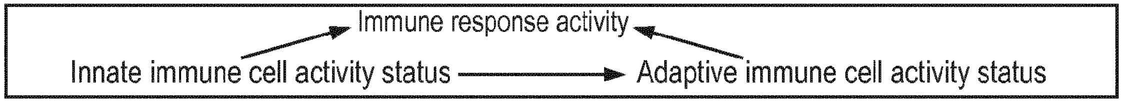

The innate immune node has a prior probability.
There is no dependency on other nodes.
Probability (innate immune) =

| Innate immune | Prob |
|---|---|
| Active | 0.33 |
| Resting | 0.34 |
| Suppressive | 0.33 |

Conditional probability Adaptive Immune (AI) given Innate Immune (II)
Probability (adaptive immune / innate immune) =

| AI \ II | Active | Resting | Suppressive |
|---|---|---|---|
| Active | 0.6 | 0.2 | 0.2 |
| Resting | 0.3 | 0.6 | 0.3 |
| Suppressive | 0.1 | 0.2 | 0.5 |

This should be read as the probability of adaptive immune system in a resting state given that the Innate Immune system is suppressive is 0.3
Note that the probabilities in a column add up to one (but not necessarily in a row) because given Innate Immune is active, (1st column) the 3 options for AI are active, resting suppressive and hence the column must sum to 1

FIG. 14B

Model type 3. Linear model to measure activity of the immune response, provides a numerical score for immune response activity

Model type 3. Linear model to measure activity of the immune response, provides a numerical score for immune response activity.

Calculation of immune response activity:
Cumulative points higher than 10 points increasingly indicates that an immune response is not inactive/suppressive;
Cumulative points below 10 increasingly indicates that an immune response is in a suppressed state

FIG. 15B

Model type 3, variant A. Linear model to measure suppressed state of the immune response

Model 3, variant A. Linear model to meassure suppressed state of the immune response, provides a percentage of immune suppressed immune response

Model 3, variant A. Linear model to measure suppressed state of the immune response, provides a percentage of immune suppressed immune response

Highest immune suppressed immune response score is 15
Lowest immune suppressed response score is 3 points
Immune suppressed immune response score = [(cumulative points - 3)/12] x 100%

FIG. 16C

GSE72462 Example of measuring activity of the immune response in 3 individual blood samples centroid model results
For 3 healthy individuals (replicate 1, 2 and 3 in the tables), measured in one blood sample:
CD4+ and CD8+ lymphocytes, B-lymphocytes, monocytes and PMNs (neutrophils)

| Cell_type | GSE_set | Array | Sample_title | State | FOXO | NFKB | Notch | STAT12_1 | STAT12_2 |
|---|---|---|---|---|---|---|---|---|---|
| CD4 | GSE72462 | GSM1867066 | Peripheral blood CD4+ T cells, replicate 1 | Resting | -2.7552296 | -1.3466875 | -3.513548 | -5.837868 | -6.496724 |
| CD4 | GSE72462 | GSM1867072 | Peripheral blood CD4+ T cells, replicate 2 | Resting | -3.1406406 | -0.6412781 | -4.224524 | -6.070089 | -6.140725 |
| CD4 | GSE72462 | GSM1867078 | Peripheral blood CD4+ T cells, replicate 3 | Resting | -0.8183422 | -1.695578 | -4.604007 | -6.516458 | -6.657472 |

| STAT3_blood | TGFB_1 | Distance: sample to calibration resting | Distance: sample to calibration supportive | Distance: sample to calibration suppressive | Detected as: |
|---|---|---|---|---|---|
| -4.45719764 | -11.924993 | 10.33749992 | 16.46440846 | 17.50253137 | Resting |
| -5.01006637 | -13.425484 | 10.91602487 | 16.46136143 | 19.04652256 | Resting |
| -5.47369461 | -13.616847 | 9.837251733 | 17.92824044 | 17.84771034 | Resting |

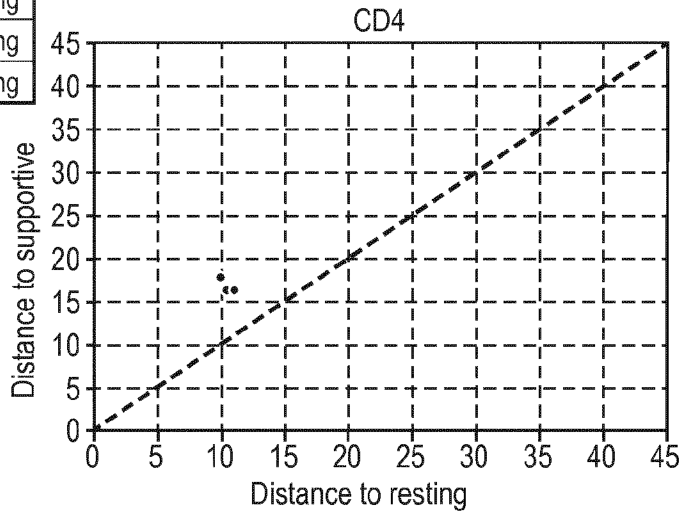

FIG. 18A

GSE72462 Example of measuring activity of the immune response in 3 individual blood samples centroid model results
For 3 healthy individuals (replicate 1, 2 and 3 in the tables), measured in one blood sample:
CD4+ and CD8+ lymphocytes, B-lymphocytes, monocytes and PMNs (neutrophils)

| Cell_type | GSE_set | Array | Sample_title | State | FOXO | NFKB | Notch | STAT12_1 | STAT12_2 | STAT3_blood | TGFB_1 | Distance: sample to calibration resting | Distance: sample to calibration active | Detected as: |
|---|---|---|---|---|---|---|---|---|---|---|---|---|---|---|
| CD8 | GSE72642 | GSM1867067 | Peripheral blood CD8+ T cells, replicate 1 | Resting | -2.4676583 | -3.9069524 | -5.694705 | -7.43269 | -7.42254 | -8.6106761 | -10.418174 | 7.221859228 | 14.15622478 | Resting |
| CD8 | GSE72642 | GSM1867073 | Peripheral blood CD8+ T cells, replicate 2 | Resting | -1.66292 | -3.6104001 | -4.943139 | -8.118599 | -7.73412 | -8.7001091 | -10.489641 | 7.573813395 | 14.40946199 | Resting |
| CD8 | GSE72642 | GSM1867079 | Peripheral blood CD8+ T cells, replicate 3 | Resting | -2.9426278 | -3.3347434 | -6.203164 | -8.02011 | -8.045866 | -9.860443 | -12.390585 | 7.290294363 | 15.30507348 | Resting |

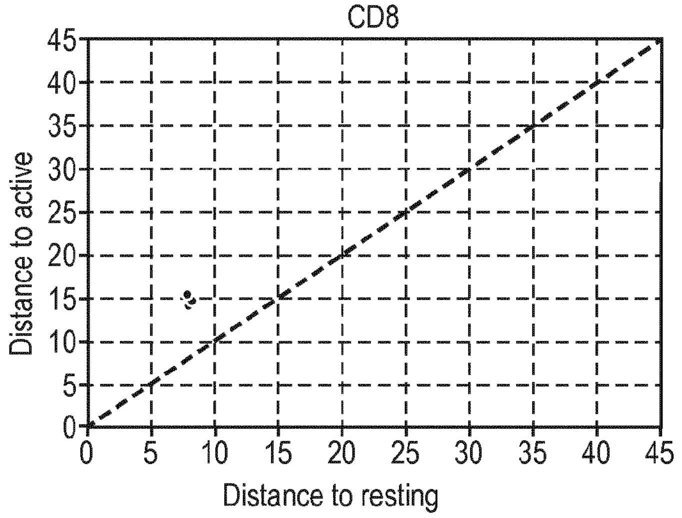

FIG. 18A
(Continued)

GSE72462 Example of measuring activity of the immune response in 3 individual blood samples centroid model results
For 3 healthy individuals (replicate 1, 2 and 3 in the tables), measured in one blood sample:
CD4+ and CD8+ lymphocytes, B-lymphocytes, monocytes and PMNs (neutrophils)

| Cell_type | GSE_set | Array | Sample_title | State | FOXO | NFKB | STAT3_blood |
|---|---|---|---|---|---|---|---|
| Bcells | GSE72642 | GSM1867065 | Peripheral blood CD19+ B cells, replicate 1 | Resting | -0.5194978 | 0.337955 | -4.4296638 |
| Bcells | GSE72642 | GSM1867071 | Peripheral blood CD19+ B cells, replicate 2 | Resting | -0.8408148 | -1.7005221 | -4.6289946 |
| Bcells | GSE7264 2 | GSM1867077 | Peripheral blood CD19+ B cells, replicate 3 | Resting | -2.2281998 | -0.1966241 | -5.160429 |

| Distance: sample to calibration resting | Distance: sample to calibration supportive | Detected as: |
|---|---|---|
| 6.028978507 | 6.701409879 | Resting |
| 5.060759301 | 7.419797956 | Resting |
| 7.071582738 | 7.567307334 | Resting |

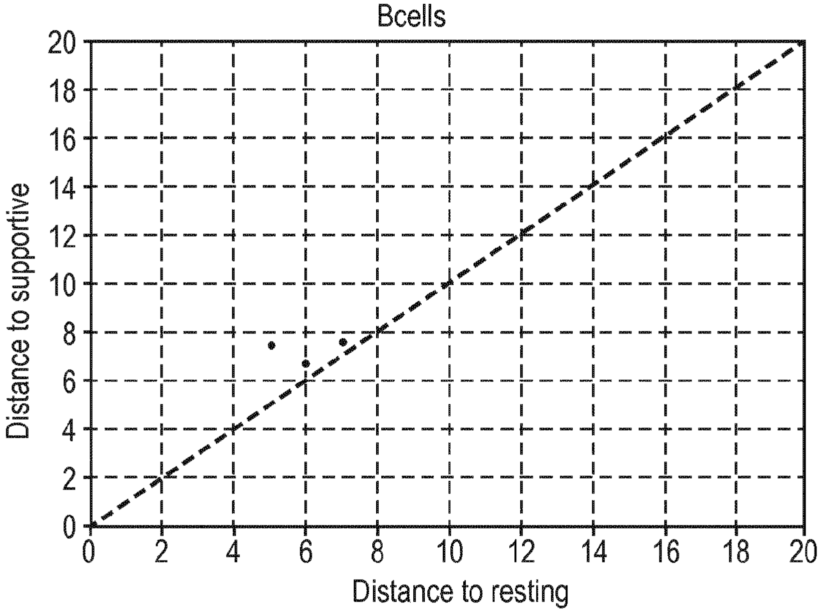

FIG. 18A (Continued)

GSE72462 Example of measuring activity of the immune response in 3 individual blood samples centroid model results
For 3 healthy individuals (replicate 1, 2 and 3 in the tables), measured in one blood sample:
CD4+ and CD8+ lymphocytes, B-lymphocytes, monocytes and PMNs (neutrophils)

| Cell_type | GSE_set | Array | Sample_title | State | FOXO | NFKB | Notch | STAT12_1 | STAT12_2 | STAT3_blood | TGFB_1 | Distance: sample to calibration resting | Distance: sample to calibration supportive | Detected as: |
|---|---|---|---|---|---|---|---|---|---|---|---|---|---|---|
| Monocytes | GSE72642 | GSM1867068 | Peripheral blood CD14+monocytes, replicate 1 | Resting | 8.9665857 | 2.1320098 | -3.691878 | -4.842604 | -5.433236 | -8.6317918 | -12.110427 | 8.695659461 | 24.68879127 | Resting |
| Monocytes | GSE72642 | GSM1867074 | Peripheral blood CD14+monocytes, replicate 2 | Resting | 8.8787413 | 1.7156852 | -2.778363 | -4.502189 | -5.162697 | -8.1988666 | -11.112629 | 8.244660713 | 24.69958253 | Resting |
| Monocytes | GSE72642 | GSM1867080 | Peripheral blood CD14+monocytes, replicate 3 | Resting | 8.607163 | 0.8384339 | -3.680864 | -5.222607 | -5.438438 | -8.1622551 | -11.454923 | 7.978368367 | 25.56260924 | Resting |

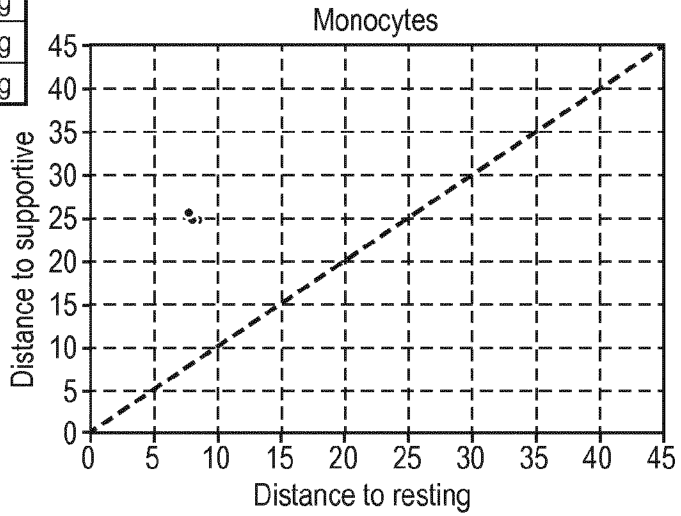

FIG. 18A (Continued)

GSE72462 Example of measuring activity of the immune response in 3 individual blood samples centroid model results
For 3 healthy individuals (replicate 1, 2 and 3 in the tables), measured in one blood sample:
CD4+ and CD8+ lymphocytes, B-lymphocytes, monocytes and PMNs (neutrophils)

| Cell_type | GSE_set | Array | Sample_title | State | FOXO | NFKB | Notch | STAT12_1 | STAT12_2 |
|---|---|---|---|---|---|---|---|---|---|
| Neutrophils | GSE72642 | GSM1867070 | Peripheral blood PMN, replicate 1 | Resting | 18.1125822 | 9.5561738 | -3.442789 | -3.701495 | -4.529694 |
| Neutrophils | GSE72642 | GSM1867076 | Peripheral blood PMN, replicate 2 | Resting | 17.6438454 | 10.5820489 | -5.80734 | -3.611952 | -3.852315 |
| Neutrophils | GSE72642 | GSM1867082 | Peripheral blood PMN, replicate 3 | Resting | 17.9515734 | 9.1346495 | -3.592317 | -3.546247 | -3.543426 |

| STAT3_blood | TGFB_1 | Distance: sample to calibration resting | Distance: sample to calibration supportive | Detected as: |
|---|---|---|---|---|
| -1.7782184 | -4.284575 | 9.70344541 | 33.7436988 | Resting |
| 0.90237165 | -5.370614 | 9.636253439 | 32.83843228 | Resting |
| -0.0488544 | -4.388409 | 8.985670294 | 33.42323157 | Resting |

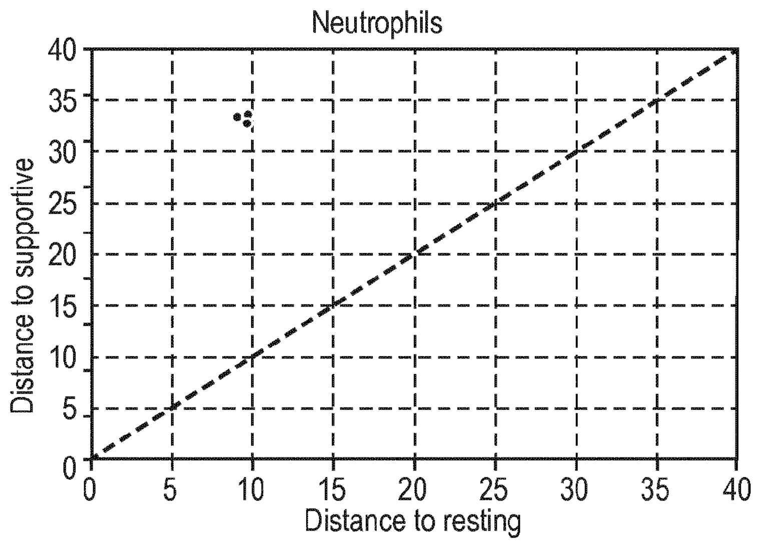

FIG. 18A
(Continued)

GSE72462 Example of measuring activity of the immune response in 3 individual blood samples

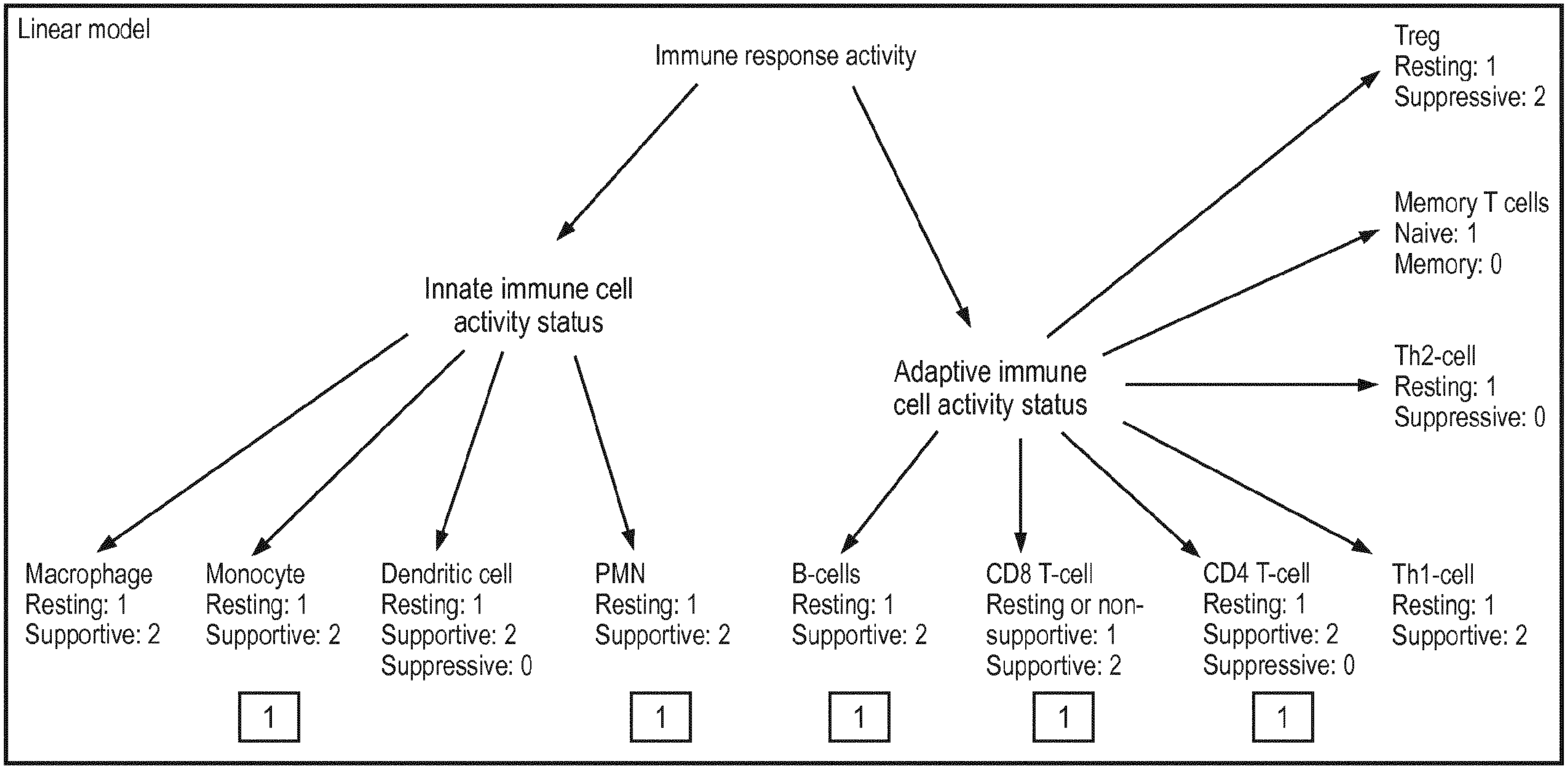

In this case, all three samples in the dataset scored similar

Calculation: percentage immune activity = [( score-min / (max-min )] x 100%. (5-4) / (10-4) x 100% = 17%

Uncertainty calculation: missing observable / variables = 6. Uncertainty 6 x 9 = 54% uncertainty. Range: 0 - 71%, threshold for an active immune response lies at 77%, indicating high confidence that these samples are representative for an inactive immune response.

FIG. 18B

GSE72462 Example of measuring activity of the immune response in 3 individual blood samples Bayesian model Derived immune cell activity status data from centroid model (figure 18A)

- One set of evidence to the Bayesian network is formed by taking the cell types CD4, CD8, bcells, monocytes and PMNs and attribute these a 100% certain resting state.
- For each of the three replicates a dataset was generated where the state is not 100% certain resting, but is defined probabilistic. The probability is derived from the in the centroid model distances (as reported in fgure 18A) - with the highest probability attributed to the state with the smallest distance.
- Softmax approach is used to determine probabilities:

$$\text{SoftMax}\left(-\binom{a}{b}\right) = \left(\frac{e^{-a}}{e^{-a}+e^{-b}}\ \ \frac{e^{-b}}{e^{-a}+e^{-b}}\right)$$

Results

| Node | State | 100% resting | Replicate 1 | Replicate 2 | Replicate 3 |
|---|---|---|---|---|---|
| Adaptive immune | active | 0 | 0.02 | 0.01 | 0.03 |
| Adaptive immune | resting | 0.78 | 0.79 | 0.8 | 0.79 |
| Adaptive immune | suppressive | 0.21 | 0.19 | 0.19 | 0.19 |
| Immune response | A) normal | 0.52 | 0.4 | 0.41 | 0.4 |
| Immune response | B) inflammatory | 0.02 | 0.19 | 0.2 | 0.19 |
| Immune response | C) suppressed | 0.25 | 0.19 | 0.2 | 0.19 |
| Immune response | D) adaptive | 0 | 0.02 | 0.01 | 0.03 |
| Immune response | E) exhausted | 0.21 | 0.19 | 0.19 | 0.19 |
| Innate immune | active | 0.02 | 0.23 | 0.23 | 0.23 |
| Innate immune | resting | 0.58 | 0.45 | 0.46 | 0.45 |
| Innate immune | suppressive | 0.4 | 0.32 | 0.32 | 0.31 |

All posterior probabilities rounded to 2 digits

FIG. 18C

2D Bayesian model for DCs
C. CPT values
D. Calibration dataset GSE23371 with pathway activity scores per sample (GSM numbers)

C. CPT values

| NFKB | Inactive pathway | Active pathway |
|---|---|---|
| Resting | 0.7 | 0.3 |
| Immune active | 0.1 | 0.9 |

| STAT 1.2 | Inactive pathway | Active pathway |
|---|---|---|
| Resting | 0.9 | 0.1 |
| Immune active | 0.1 | 0.9 |

| TGFB | Inactive pathway | Active pathway |
|---|---|---|
| Resting | 0.9 | 0.1 |
| Immune active | 0.1 | 0.9 |

D.

| GSE | Array | Title | Subgroup | NFKB | STAT1 2 | TGFB |
|---|---|---|---|---|---|---|
| GSE23371 | GSM573360 | Maturing DCs, technical replicate 1 | Calibration LPS 06h | 27.64863 | 1.684919 | -1.61094 |
| GSE23371 | GSM573361 | Maturing DCs, technical replicate 2 | Calibration LPS 06h | 24.89694 | 3.847916 | -0.04624 |
| GSE23371 | GSM573362 | Maturing DCs, technical replicate 3 | Calibration LPS 06h | 26.51662 | 3.775443 | -1.96923 |
| GSE23371 | GSM573357 | Immature DCs, technical replicate 1 | Calibration resting | 14.20782 | -11.6911 | -10.8418 |
| GSE23371 | GSM573358 | Immature DCs, technical replicate 2 | Calibration resting | 14.2223 | -11.4162 | -9.43918 |
| GSE23371 | GSM573359 | Immature DCs, technical replicate 3 | Calibration resting | 13.72241 | -11.1619 | -10.0731 |

FIG. 20C

2D Bayesian model for DCs
D. Calibration results 2D model on dataset GSE23371

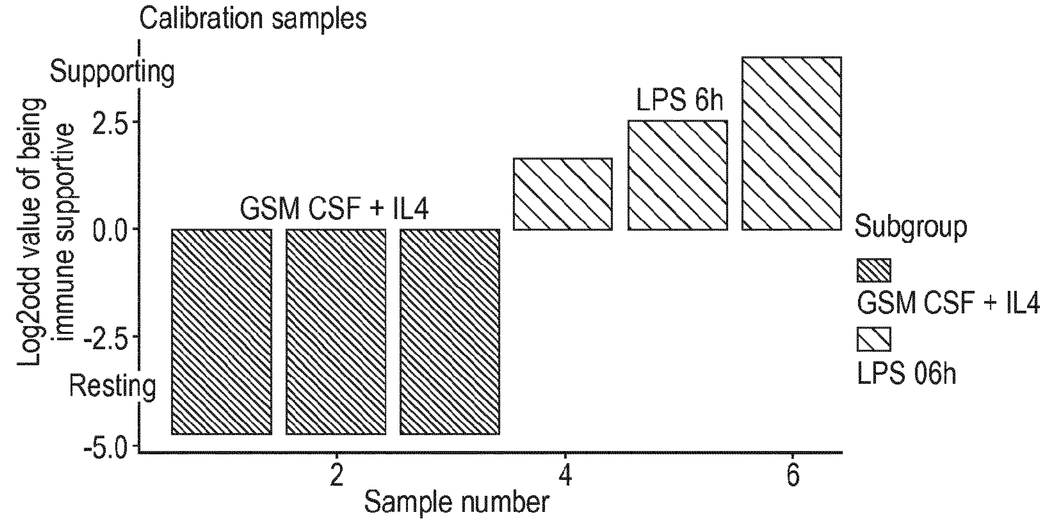

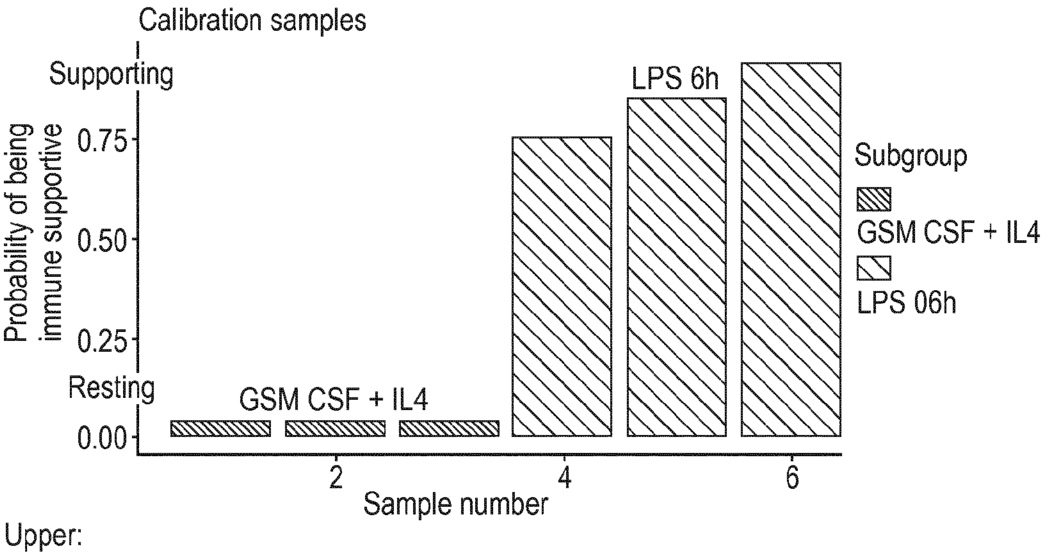

Upper:
immune score in log2odds on y-axis for calibration results with sample numbers on x-axis
Lower:
immune score in probability on y-axis for calibration results sample numbers on x-axis Summary
- The resting DCs have a high probability of being immune resting
- The supporting DCs have a high probability of being immune supportive

FIG. 20D 3D bayesian model for DCs
A. Bayesian model, inactive resting state

3 Bayesian model for DCs
C. Bayesian model, immune suppressed/tolerogenic state

3 States Bayesian model for DCs
D. CPT values

| AP1 | Inactive pathway | Active pathway |
|---|---|---|
| Immune suppressive | 0.2 | 0.8 |
| Resting | 0.65 | 0.35 |
| Immune supportive | 0.1 | 0.9 |

| FOXO | Inactive pathway | Active pathway |
|---|---|---|
| Immune suppressive | 0.1 | 0.9 |
| Resting | 0.95 | 0.05 |
| Immune supportive | 0.1 | 0.9 |

D. CPT values

| NFKB | Inactive pathway | Active pathway |
|---|---|---|
| Immune suppressive | 0.9 | 0.1 |
| Resting | 0.5 | 0.5 |
| Immune supportive | 0.1 | 0.9 |

| STAT 1.2 | Inactive pathway | Active pathway |
|---|---|---|
| Immune suppressive | 0.6 | 0.4 |
| Resting | 0.9 | 0.1 |
| Immune supportive | 0.1 | 0.9 |

| TGFB | Inactive pathway | Active pathway |
|---|---|---|
| Immune suppressive | 0.9 | 0.1 |
| Resting | 0.7 | 0.3 |
| Immune supportive | 0.1 | 0.9 |

FIG. 21D

3 States Bayesian model for DCs

E. Calibration dataset GSE23371 with pathway activity scores per sample (GSM numbers)

E

| GSE | Array | Title | Subgroup | AP1 | FOXO | NFKB | STAT1 2 | TGFB |
|---|---|---|---|---|---|---|---|---|
| GSE23371 | GSM573363 | Tolerogenic DCs, technical replicate 1 | Calibration dexamethasone | -4.2352 | 10.1859 | 10.07174 | -6.86334 | -11.5684 |
| GSE23371 | GSM573364 | Tolerogenic DCs, technical replicate 2 | Calibration dexamethasone | -3.56974 | 11.12183 | 12.20205 | -6.97088 | -10.3424 |
| GSE23371 | GSM573365 | Tolerogenic DCs, technical replicate 3 | Calibration dexamethasone | -3.63272 | 10.22813 | 10.15819 | -7.08516 | -10.3187 |
| GSE23371 | GSM573360 | Maturing DCs, technical replicate 1 | Calibration LPS 06h | 0.728707 | 16.41789 | 27.64863 | 1.684919 | -1.61094 |
| GSE23371 | GSM573361 | Maturing DCs, technical replicate 2 | Calibration LPS 06h | 0.370871 | 17.97299 | 24.89694 | 3.847916 | -0.04624 |
| GSE23371 | GSM573362 | Maturing DCs, technical replicate 3 | Calibration LPS 06h | 1.582058 | 17.30308 | 26.51662 | 3.775443 | -1.96923 |
| GSE23371 | GSM573357 | Immature DCs, technical replicate 1 | Calibration resting | -5.49413 | 5.168025 | 14.20782 | -11.6911 | -10.8418 |
| GSE23371 | GSM573358 | Immature DCs, technical replicate 2 | Calibration resting | -4.7314 | 6.205997 | 14.2223 | -11.4162 | -9.43918 |
| GSE23371 | GSM573359 | Immature DCs, technical replicate 3 | Calibration resting | -4.9621 | 5.952649 | 13.72241 | -11.1619 | -10.0731 |

FIG. 21D
(Continued)

3D Bayesian model for DCs
F. Calibration results 3D model on dataset GSE23371

Immune suppressive/tolerogenic score

Summary

- The suppressive DCs have the highest probability of being immune suppressive

Note that summation of the three probabilities score is 1.
According to our definition the state with the highest score defines the state attributed to the sample 3D Bayesian model for DCs (continued)
F. Calibration results 3D model on dataset GSE23371

Activity/supporting score

Summary

- The supportive DCs have the highest probability of being immune supportive

Note that summation of the three probabilities score is 1.
According to our definition the state with the highest score defines the state attributed to the sample 3D Bayesian model for DCs (continued)
F. Calibration results 3D model on dataset GSE23371
Inactive/resting score
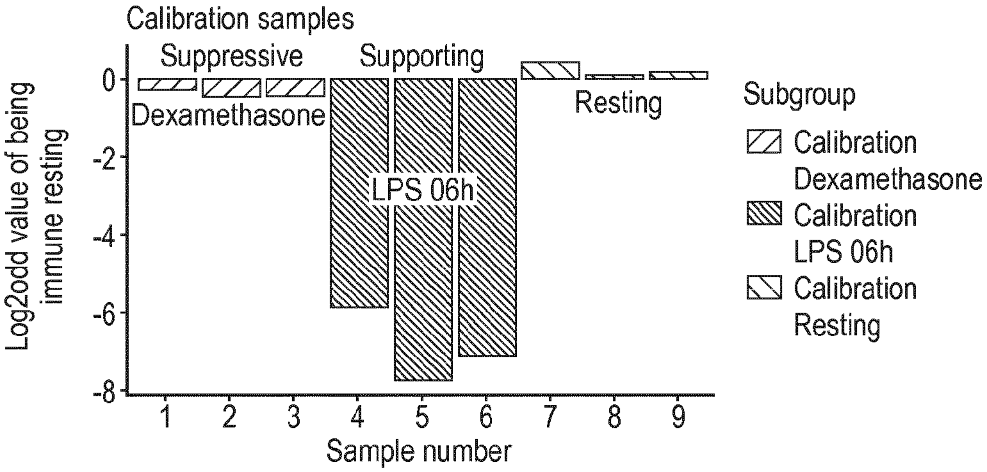
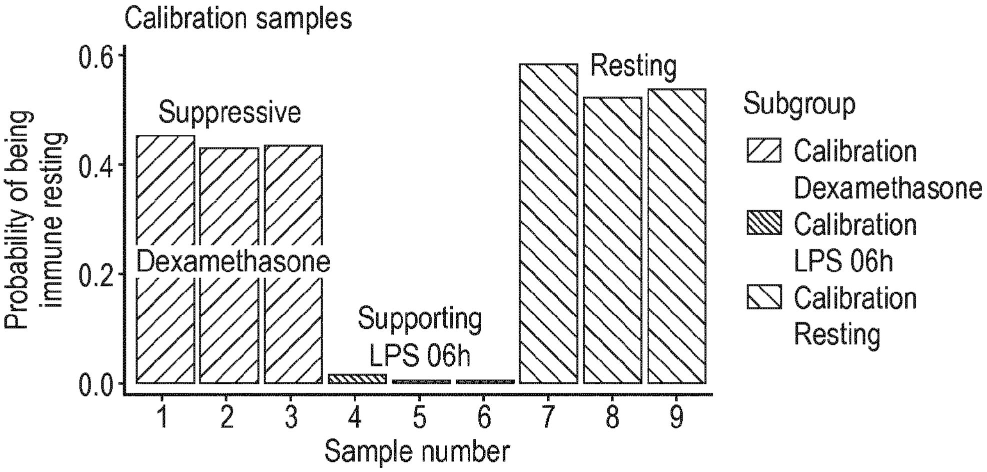
Summary
- The resting DCs have the highest probability of being immune resting
Note that summation of the three probabilities score is 1.
According to our definition the state with the highest score defines the state attributed to the sample
FIG. 21E
(Continued)

2D and 3D linear models for DCs
B. Calibration results

• 2 State linear model for DCs

| Array | Title | Subgroup | NFKB | STAT1 2 | TGFB | SUM |
|---|---|---|---|---|---|---|
| GSM573360 | Maturing DCs, technical replicate 1 | Calibration LPS 06h | 27.64863 | 1.684919 | -1.61094 | 27.72261 |
| GSM573361 | Maturing DCs, technical replicate 2 | Calibration LPS 06h | 24.89694 | 3.847916 | -0.04624 | 28.69862 |
| GSM573362 | Maturing DCs, technical replicate 3 | Calibration LPS 06h | 26.51662 | 3.775443 | -1.96923 | 28.32283 |
| GSM573357 | Immature DCs, technical replicate 1 | Calibration resting | 14.20782 | -11.6911 | -10.8418 | -8.32511 |
| GSM573358 | Immature DCs, technical replicate 2 | Calibration resting | 14.2223 | -11.4162 | -9.43918 | -6.63305 |
| GSM573359 | Immature DCs, technical replicate 3 | Calibration resting | 13.72241 | -11.1619 | -10.0731 | -7.51259 |

• 3 State linear model for DCs

| Array | Title | Subgroup | AP1 | FOXO | NFKB | STAT1 2 | TGFB | SUM |
|---|---|---|---|---|---|---|---|---|
| GSM573363 | Tolerogenic DCs, technical replicate 1 | Calibration dexamethasone | -4.2352 | 10.1859 | 10.07174 | -6.89334 | -11.5684 | -2.40935 |
| GSM573364 | Tolerogenic DCs, technical replicate 2 | Calibration dexamethasone | -3.56974 | 11.12183 | 12.20205 | -6.97088 | -10.3424 | 2.440827 |
| GSM573365 | Tolerogenic DCs, technical replicate 3 | Calibration dexamethasone | -3.63272 | 10.22813 | 10.15819 | -7.08516 | -10.3187 | -0.65024 |
| GSM573360 | Maturing DCs, technical replicate 1 | Calibration LPS 06h | 0.728707 | 16.41789 | 27.64863 | 1.684919 | -1.61094 | 44.8692 |
| GSM573361 | Maturing DCs, technical replicate 2 | Calibration LPS 06h | 0.370871 | 17.97299 | 24.89694 | 3.847916 | -0.04624 | 47.04248 |
| GSM573362 | Maturing DCs, technical replicate 3 | Calibration LPS 06h | 1.582058 | 17.30308 | 26.51662 | 3.775443 | -1.96923 | 47.20797 |
| GSM573357 | Immature DCs, technical replicate 1 | Calibration resting | -5.49413 | 5.168025 | 14.20782 | -11.6911 | -10.8418 | -8.65121 |
| GSM573358 | Immature DCs, technical replicate 2 | Calibration resting | -4.7314 | 6.205997 | 14.2223 | -11.4162 | -9.43918 | -5.15845 |
| GSM573359 | Immature DCs, technical replicate 3 | Calibration resting | -4.9621 | 5.952649 | 13.72241 | -11.1619 | -10.0731 | -6.52204 |

FIG. 22C 2D linear model for DCs (continued)
C. Validation results linear model
2 State linear model for DCs for dataset GSE1891 with scores per sample (GSM numbers)

Samples are not activated

| Array | Title | Subgroup | NFKB | STAT1 2 | TGFB | SUM |
|---|---|---|---|---|---|---|
| GSM466183 | 2.1.AF.0 | Validation resting | 12.77799 | -11.966 | -13.8588 | -13.0467 |
| GSM466184 | 2.1.AF.6 | Validation resting | 14.74605 | -9.65477 | -10.6259 | -5.53459 |
| GSM466185 | 2.1.AF.10 | Validation resting | 17.13173 | -10.4346 | -9.77311 | -3.07601 |
| GSM466195 | 2.2.AF.0 | Validation resting | 12.13655 | -10.804 | -12.9048 | -11.5723 |
| GSM466196 | 2.2.AF.1 | Validation resting | 13.30726 | -10.3272 | -12.8269 | -9.84688 |
| GSM466197 | 2.2.AF.2 | Validation resting | 12.88144 | -10.2092 | -12.9117 | -10.2394 |
| GSM466198 | 2.2.AF.6 | Validation resting | 7.605492 | -10.3313 | -8.81504 | -11.5408 |
| GSM466199 | 2.2.AF.10 | Validation resting | 12.4404 | -8.98587 | -11.3003 | -7.84572 |
| GSM466200 | 2.2.AF.18 | Validation resting | 10.55337 | -8.49966 | -9.97971 | -7.926 |
| GSM466211 | 3.1.AF.0 | Validation resting | 14.68603 | -10.6039 | -14.4586 | -10.3766 |
| GSM466212 | 3.1.AF.1 | Validation resting | 14.2164 | -9.40135 | -14.6961 | -9.88109 |
| GSM466213 | 3.1.AF.2 | Validation resting | 11.98082 | -10.0007 | -13.0303 | -11.0502 |
| GSM466214 | 3.1.AF.6 | Validation resting | 11.98645 | -8.52986 | -11.617 | -8.16043 |
| GSM466215 | 3.1.AF.10 | Validation resting | 14.49898 | -9.29207 | -9.24962 | -4.04271 |
| GSM466216 | 3.1.AF.18 | Validation resting | 17.8684 | -8.38762 | -11.2208 | -1.74003 |
| GSM466227 | 3.2.AF.0 | Validation resting | 9.632802 | -10.9222 | -12.7346 | -14.024 |
| GSM466228 | 3.2.AF.6 | Validation resting | 15.19128 | -9.07611 | -9.33163 | -3.21646 |
| GSM466229 | 3.2.AF.10 | Validation resting | 14.26794 | -8.82616 | -7.82849 | -2.38671 |

Summary: According to defined score in immune resting state

FIG. 22D
(Continued)

2D linear model for DCs
C. Validation results linear model
2 State linear model for DCs for dataset GSE1891 with scores per sample (GSM numbers)

Samples are activated for resp. for 1,2,4, 6, 8,10,12,14, 16,18 hours

| Array | Title | Subgroup | NFKB | STAT1 2 | TGFB | SUM | Summary |
|---|---|---|---|---|---|---|---|
| GSM466186 | 2.1.NDV.1 | Validation NDV 01h | 13.64465 | -11.5295 | -12.9284 | -10.8133 | According to defined score in immune resting state as activation is too short to change state |
| GSM466201 | 2.2.NDV.1 | Validation NDV 01h | 12.17247 | -11.0302 | -13.0814 | -11.9391 | |
| GSM466217 | 3.1.NDV.1 | Validation NDV 01h | 15.81161 | -10.1713 | -14.6474 | -9.00708 | |
| GSM466230 | 3.2.NDV.1 | Validation NDV 01h | 14.98252 | -11.0859 | -12.8345 | -8.93784 | |
| GSM466187 | 2.1.NDV.2 | Validation NDV 02h | 16.66285 | -10.7057 | -9.17803 | -3.22087 | |
| GSM466202 | 2.2.NDV.2 | Validation NDV 02h | 10.53704 | -10.384 | -11.8948 | -11.7417 | |
| GSM466218 | 3.1.NDV.2 | Validation NDV 02h | 16.34712 | -10.187 | -12.5834 | -6.42333 | |
| GSM466231 | 3.2.NDV.2 | Validation NDV 02h | 15.80425 | -10.35 | -11.0622 | -5.60796 | |
| GSM466188 | 2.1.NDV.4 | Validation NDV 04h | 20.14277 | 0.490902 | -10.8805 | 9.753188 | According to defined score in intermediate state between resting and supporting as activation |
| GSM466203 | 2.2.NDV.4 | Validation NDV 04h | 14.96521 | -8.35142 | -11.3852 | -4.77139 | |
| GSM466219 | 3.1.NDV.4 | Validation NDV 04h | 19.56267 | -2.78364 | -11.8349 | 4.944096 | |
| GSM466232 | 3.2.NDV.4 | Validation NDV 04h | 22.05192 | 0.172263 | -9.96001 | 12.26417 | |
| GSM466189 | 2.1.NDV.6 | Validation NDV 06h | 21.75355 | 2.396416 | -10.2473 | 13.90264 | |
| GSM466204 | 2.2.NDV.6 | Validation NDV 06h | 16.26691 | 0.107395 | -9.9798 | 6.394501 | |
| GSM466220 | 3.1.NDV.6 | Validation NDV 06h | 28.05081 | 4.011108 | -12.6763 | 19.38564 | |
| GSM466233 | 3.2.NDV.6 | Validation NDV 06h | 27.29405 | 2.909239 | -10.4938 | 19.70945 | |
| GSM466190 | 2.1.NDV.8 | Validation NDV 08h | 23.55802 | 5.711256 | -9.43279 | 19.83649 | According to defined score in immune supporting state |
| GSM466205 | 2.2.NDV.8 | Validation NDV 08h | 23.50421 | 2.646831 | -11.9163 | 14.23471 | |
| GSM466221 | 3.1.NDV.8 | Validation NDV 08h | 28.59771 | 4.892127 | -8.88754 | 24.60229 | |
| GSM466234 | 3.2.NDV.8 | Validation NDV 08h | 29.93034 | 4.546395 | -4.3029 | 30.17383 | |
| GSM466191 | 2.1.NDV.10 | Validation NDV 10h | 25.89704 | 6.21576 | -2.76428 | 29.34852 | |
| GSM466206 | 2.2.NDV.10 | Validation NDV 10h | 24.93862 | 3.957002 | -7.19207 | 21.70356 | |
| GSM466222 | 3.1.NDV.10 | Validation NDV 10h | 31.11329 | 7.465019 | -3.1372 | 35.44111 | |

FIG. 22D-I 2D linear model for DCs
C. Validation results linear model
2 State linear model for DCs for dataset GSE1891 with scores per sample (GSM numbers)

Samples are activated for resp. for 1,2,4, 6, 8,10,12,14, 16,18 hours

| Array | Title | Subgroup | NFKB | STAT1 2 | TGFB | SUM |
|---|---|---|---|---|---|---|
| GSM466235 | 3.2.NDV.10 | Validation NDV 10h | 30.22974 | 6.473285 | -5.31132 | 31.39171 |
| GSM466192 | 2.1.NDV.12 | Validation NDV 12h | 23.77109 | 7.096555 | -0.68081 | 30.18683 |
| GSM466207 | 2.2.NDV.12 | Validation NDV 12h | 24.27 | 3.718259 | -3.52333 | 24.46493 |
| GSM466223 | 3.1.NDV.12 | Validation NDV 12h | 31.59425 | 8.196645 | -1.58095 | 38.20995 |
| GSM466236 | 3.2.NDV.12 | Validation NDV 12h | 32.11379 | 7.586813 | -1.74507 | 37.95553 |
| GSM466193 | 2.1.NDV.14 | Validation NDV 14h | 23.87794 | 7.886813 | -0.09138 | 31.67337 |
| GSM466208 | 2.2.NDV.14 | Validation NDV 14h | 21.46151 | 3.229423 | -7.24289 | 17.44803 |
| GSM466224 | 3.1.NDV.14 | Validation NDV 14h | 32.95536 | 7.432144 | 0.225501 | 40.613 |
| GSM466237 | 3.2.NDV.14 | Validation NDV 14h | 31.96155 | 7.536545 | -1.69958 | 37.79852 |
| GSM466194 | 2.1.NDV.16 | Validation NDV 16h | 24.95362 | 7.903191 | -0.97043 | 31.88639 |
| GSM466209 | 2.2.NDV.16 | Validation NDV 16h | 21.89798 | 4.313294 | -6.57375 | 19.63752 |
| GSM466225 | 3.1.NDV.16 | Validation NDV 16h | 32.78408 | 7.853471 | 0.252069 | 40.88962 |
| GSM466238 | 3.2.NDV.16 | Validation NDV 16h | 28.23085 | 5.562716 | -4.73588 | 29.05768 |
| GSM466210 | 2.2.NDV.18 | Validation NDV 18h | 19.42147 | 4.957002 | -2.77141 | 21.60706 |
| GSM466226 | 3.1.NDV.18 | Validation NDV 18h | 32.28409 | 8.232329 | -0.32512 | 40.19129 |
| GSM466239 | 3.2.NDV.18 | Validation NDV 18h | 27.93095 | 5.164497 | -3.40514 | 29.69031 |

Summary

According to defined score in immune supporting state

FIG. 22D-II 3D linear model for DCs
C. Validation results linear model
3 State linear model for DCs for datasets GSE13762 and GSE1891 with scores per sample (GSM numbers)

Samples are activated for resp. for 1,2,4, 6,8,10,12,14, 16,18 hours

| Array | Title | Subgroup | AP1 | FOXO | NFKB |
|---|---|---|---|---|---|
| GSM466186 | 2.1.NDV.1 | Validation NDV 01h | -5.03399 | 3.313884 | 13.64465 |
| GSM466201 | 2.2.NDV.1 | Validation NDV 01h | -8.93957 | -0.82582 | 12.17247 |
| GSM466217 | 3.1.NDV.1 | Validation NDV 01h | -6.8055 | -0.25521 | 15.81161 |
| GSM466230 | 3.2.NDV.1 | Validation NDV 01h | -7.56636 | 3.0724 | 14.98252 |
| GSM466187 | 2.1.NDV.2 | Validation NDV 02h | -5.39003 | 3.032031 | 16.66285 |
| GSM466202 | 2.2.NDV.2 | Validation NDV 02h | -9.48918 | -2.9461 | 10.53704 |
| GSM466218 | 3.1.NDV.2 | Validation NDV 02h | -7.20877 | 0.195353 | 16.34712 |
| GSM466231 | 3.2.NDV.2 | Validation NDV 02h | -9.00751 | 5.349947 | 15.80425 |
| GSM466188 | 2.1.NDV.4 | Validation NDV 04h | -7.99051 | 8.918216 | 20.14277 |
| GSM466203 | 2.2.NDV.4 | Validation NDV 04h | -9.69298 | -0.21436 | 14.96521 |
| GSM466219 | 3.1.NDV.4 | Validation NDV 04h | -8.04639 | 2.377603 | 19.56267 |
| GSM466232 | 3.2.NDV.4 | Validation NDV 04h | -9.11514 | 10.2946 | 22.05192 |
| GSM466189 | 2.1.NDV.6 | Validation NDV 06h | -6.64532 | 8.595998 | 21.75355 |
| GSM466204 | 2.2.NDV.6 | Validation NDV 06h | -10.674 | 0.487136 | 16.26691 |
| GSM466220 | 3.1.NDV.6 | Validation NDV 06h | -6.07484 | 6.902588 | 28.05081 |
| GSM466233 | 3.2.NDV.6 | Validation NDV 06h | -7.71084 | 12.10881 | 27.29405 |
| GSM466190 | 2.1.NDV.8 | Validation NDV 08h | -7.00629 | 9.41843 | 23.55802 |
| GSM466205 | 2.2.NDV.8 | Validation NDV 08h | -10.1277 | 5.054563 | 23.50421 |
| GSM466221 | 3.1.NDV.8 | Validation NDV 08h | -6.76322 | 8.628645 | 28.59771 |
| GSM466234 | 3.2.NDV.8 | Validation NDV 08h | -3.88662 | 11.09508 | 29.93034 |
| GSM466191 | 2.1.NDV.10 | Validation NDV 10h | -4.71536 | 11.03265 | 25.89704 |
| GSM466206 | 2.2.NDV.10 | Validation NDV 10h | -9.47272 | 6.405306 | 24.93862 |
| GSM466222 | 3.1.NDV.10 | Validation NDV 10h | -5.60499 | 10.89244 | 31.11329 |

3D linear model for DCs (continued)
C. Validation results linear model
3 State linear model for DCs for datasets GSE13762 and GSE1891 with scores per sample (GSM numbers)

| | Array | Title | Subgroup | AP1 | FOXO | NFKB |
|---|---|---|---|---|---|---|
| Samples are not activated | GSM466183 | 2.1.AF.0 | Validation resting | -6.47706 | 1.111484 | 12.77799 |
| | GSM466184 | 2.1.AF.6 | Validation resting | -6.08071 | 4.327859 | 14.74605 |
| | GSM466185 | 2.1.AF.10 | Validation resting | -3.63553 | 6.723717 | 17.13173 |
| | GSM466195 | 2.2.AF.0 | Validation resting | -8.08587 | -0.87566 | 12.13655 |
| | GSM466196 | 2.2.AF.1 | Validation resting | -8.34871 | -1.9178 | 13.30726 |
| | GSM466197 | 2.2.AF.2 | Validation resting | -10.0996 | -0.21472 | 12.88144 |
| | GSM466198 | 2.2.AF.6 | Validation resting | -10.2295 | 0.841097 | 7.605492 |
| | GSM466199 | 2.2.AF.10 | Validation resting | -9.94038 | 0.192834 | 12.4404 |
| | GSM466200 | 2.2.AF.18 | Validation resting | -9.40628 | 0.693644 | 10.55337 |
| | GSM466211 | 3.1.AF.0 | Validation resting | -5.6423 | -1.34828 | 14.68603 |
| | GSM466212 | 3.1.AF.1 | Validation resting | -6.31917 | -0.39303 | 14.2164 |
| | GSM466213 | 3.1.AF.2 | Validation resting | -4.81285 | 0.134065 | 11.98082 |
| | GSM466214 | 3.1.AF.6 | Validation resting | -3.27543 | 2.72673 | 11.98645 |
| | GSM466215 | 3.1.AF.10 | Validation resting | -2.59885 | 5.011665 | 14.49898 |
| | GSM466216 | 3.1.AF.18 | Validation resting | -3.63552 | 9.538266 | 17.8684 |
| | GSM466227 | 3.2.AF.0 | Validation resting | -8.09252 | -2.53981 | 9.632802 |
| | GSM466228 | 3.2.AF.6 | Validation resting | -4.05584 | 11.11462 | 15.19128 |
| | GSM466229 | 3.2.AF.10 | Validation resting | -4.46312 | 10.23368 | 14.26794 |
| | Array | Title | Subgroup | AP1 | FOXO | NFKB |
| Samples are suppressed | GSM346562 | DC1 12h 1, 25-vitD | Immune suppressive | -0.24652 | -0.75997 | 8.992622 |
| | GSM346574 | DC2 12h 1, 25-vitD | Immune suppressive | -2.56607 | -1.01655 | 7.600755 |
| | GSM346591 | DC3 12h 1, 25-vitD | Immune suppressive | -1.17451 | -3.26444 | 14.14551 |
| Samples are not activated | GSM346559 | DC1 12h veh | Immune resting | -0.87422 | -3.93187 | 10.90234 |
| | GSM346571 | DC2 12h veh | Immune resting | -2.55472 | -3.64277 | 9.356165 |
| | GSM346590 | DC3 12h veh | Immune resting | -0.38065 | -3.18906 | 13.59223 |

3D linear model for DCs
C. Validation results linear model
3 State linear model for DCs for datasets GSE13762 and GSE1891 with scores per sample (GSM numbers)

| STAT1 2 | TGFB | SUM | Summary |
|---|---|---|---|
| -11.5295 | -12.9284 | -12.5334 | Samples are according to defined score in immune resting state as activation is too short to change state |
| -11.0302 | -13.0814 | -21.7045 | |
| -10.1713 | -14.6474 | -16.0678 | |
| -11.0859 | -12.8345 | -13.4318 | |
| -10.7057 | -9.17803 | -5.57887 | |
| -10.384 | -11.8948 | -24.177 | |
| -10.187 | -12.5834 | -13.4368 | |
| -10.35 | -11.0622 | -9.26553 | |
| 0.490902 | -10.8805 | 10.68089 | Samples are according to defined score in intermediate state between resting and supporting as activation |
| -8.35142 | -11.3852 | -14.6787 | |
| -2.78364 | -11.8349 | -0.72469 | |
| 0.172263 | -9.96001 | 13.44363 | |
| 2.396416 | -10.2473 | 15.85332 | |
| 0.107395 | -9.9798 | -3.79239 | |
| 4.011108 | -12.6763 | 20.21339 | |
| 2.909239 | -10.4938 | 24.10741 | |
| 5.711256 | -9.43279 | 22.24863 | Samples are according to defined score in immune supporting state |
| 2.646831 | -11.9163 | 9.161547 | |
| 4.892127 | -8.88754 | 26.46771 | |
| 4.546395 | -4.3029 | 37.38229 | |
| 6.21576 | -2.76428 | 35.66581 | |
| 3.957002 | -7.19207 | 18.63614 | |
| 7.465019 | -3.1372 | 40.72857 | |

FIG. 22E-II 3D linear model for DCs (continued)
C. Validation results linear model
3 State linear model for DCs for datasets GSE13762 and GSE1891 with scores per sample (GSM numbers)

| STAT1 2 | TGFB | SUM | Summary |
|---|---|---|---|
| -11.966 | -13.8588 | -18.4123 | Samples are according to defined score in immune resting state |
| -9.65477 | -10.6259 | -7.28745 | |
| -10.4346 | -9.77311 | 0.012183 | |
| -10.804 | -12.9048 | -20.5338 | |
| -10.3272 | -12.8269 | -20.1134 | |
| -10.2092 | -12.9117 | -20.5537 | |
| -10.3313 | -8.81504 | -20.9292 | |
| -8.98587 | -11.3003 | -17.5933 | |
| -8.49966 | -9.97971 | -16.6386 | |
| -10.6039 | -14.4586 | -17.3671 | |
| -9.40135 | -14.6961 | -16.5933 | |
| -10.0007 | -13.0303 | -15.729 | |
| -8.52986 | -11.617 | -8.70913 | |
| -9.29207 | -9.24962 | -1.62989 | |
| -8.38762 | -11.2208 | 4.162717 | |
| -10.9222 | -12.7346 | -24.6563 | |
| -9.07611 | -9.33163 | 3.842323 | |
| -8.82616 | -7.82849 | 3.383848 | |
| STAT 1 2 | TGFB | SUM | |
| -13.0359 | -12.7732 | -17.823 | Samples are according to defined score in immune resting state |
| -12.7425 | -12.8862 | -21.6106 | |
| -13.0227 | -9.96938 | -13.2855 | |
| -11.6991 | -10.5253 | -16.1282 | |
| -11.8695 | -11.0722 | -19.783 | |
| -12.4743 | -7.60275 | -10.0545 | |

FIG. 22E-II
(Continued)

3D linear model for DCs
C. Validation results linear model
3 State linear model for DCs for datasets GSE13762 and GSE1891 with scores per sample (GSM numbers)

Samples are activated for resp. for 1,2,4, 6, 8,10,12,14, 16,18 hours

| Array | Title | Subgroup | AP1 | FOXO | NFKB |
|---|---|---|---|---|---|
| GSM466235 | 3.2.NDV.10 | Validation NDV 10h | -7.71606 | 10.6871 | 30.22974 |
| GSM466192 | 2.1.NDV.12 | Validation NDV 12h | -5.80483 | 13.55952 | 23.77109 |
| GSM466207 | 2.2.NDV.12 | Validation NDV 12h | -9.42411 | 6.014386 | 24.27 |
| GSM466223 | 3.1.NDV.12 | Validation NDV 12h | -6.69187 | 10.90151 | 31.59425 |
| GSM466236 | 3.2.NDV.12 | Validation NDV 12h | -3.0753 | 9.637972 | 32.11379 |
| GSM466193 | 2.1.NDV.14 | Validation NDV 14h | -4.93297 | 13.01709 | 23.87794 |
| GSM466208 | 2.2.NDV.14 | Validation NDV 14h | -8.82702 | 2.361238 | 21.46151 |
| GSM466224 | 3.1.NDV.14 | Validation NDV 14h | -6.30332 | 12.83246 | 32.95536 |
| GSM466237 | 3.2.NDV.14 | Validation NDV 14h | -2.21981 | 9.715489 | 31.96155 |
| GSM466194 | 2.1.NDV.16 | Validation NDV 16h | -6.33377 | 15.93801 | 24.95362 |
| GSM466209 | 2.2.NDV.16 | Validation NDV 16h | -9.49671 | 6.064017 | 21.89798 |
| GSM466225 | 3.1.NDV.16 | Validation NDV 16h | -5.74215 | 13.8648 | 32.78408 |
| GSM466238 | 3.2.NDV.16 | Validation NDV 16h | -4.99081 | 6.970771 | 28.23085 |
| GSM466210 | 2.2.NDV.18 | Validation NDV 18h | -11.792 | 4.883697 | 19.42147 |
| GSM466226 | 3.1.NDV.18 | Validation NDV 18h | -5.28366 | 13.42724 | 32.28409 |
| GSM466239 | 3.2.NDV.18 | Validation NDV 18h | -5.36267 | 10.95835 | 27.93095 |

FIG. 22E-III 3D linear model for DCs
C. Validation results linear model
3 State linear model for DCs for datasets GSE13762 and GSE1891 with scores per sample (GSM numbers)

| STAT1 2 | TGFB | SUM | Summary |
|---|---|---|---|
| 6.473285 | -5.31132 | 34.36275 | |
| 7.096555 | -0.68081 | 37.94152 | |
| 3.718259 | -3.52333 | 21.05521 | |
| 8.196645 | -1.58095 | 42.41959 | |
| 7.586813 | -1.74507 | 44.5182 | |
| 7.886813 | -0.09138 | 39.75749 | Samples are according to defined score in immune supportive state |
| 3.229423 | -7.24289 | 10.98225 | |
| 7.432144 | 0.225501 | 47.14213 | |
| 7.536545 | -1.69958 | 45.2942 | |
| 7.903191 | -0.97043 | 41.49063 | |
| 4.313294 | -6.57375 | 16.20483 | |
| 7.853471 | 0.252069 | 49.01227 | |
| 5.562716 | -4.73588 | 31.03764 | |
| 4.957002 | -2.77141 | 14.69874 | |
| 8.232329 | -0.32512 | 48.33487 | |
| 5.164497 | -3.40514 | 35.28599 | |

FIG. 22E-IV 2D and 3D centroid model for DCs
B. Calibration results

- 2 State linear model for DCs

| GSE | Array | Title | Subgroup | NFKB | STAT1 2 | TGFB |
|---|---|---|---|---|---|---|
| GSE23371 | GSM573360 | Maturing DCs, technical replicate 1 | Calibration LPS 06h | 27.64863 | 1.684919 | -1.61094 |
| GSE23371 | GSM573361 | Maturing DCs, technical replicate 2 | Calibration LPS 06h | 24.89694 | 3.847916 | -0.04624 |
| GSE23371 | GSM573362 | Maturing DCs, technical replicate 3 | Calibration LPS 06h | 26.51662 | 3.775443 | -1.96923 |
| GSE23371 | GSM573357 | Immature DCs, technical replicate 1 | Calibration resting | 14.20782 | -11.6911 | -10.8418 |
| GSE23371 | GSM573358 | Immature DCs, technical replicate 2 | Calibration resting | 14.2223 | -11.4162 | -9.43918 |
| GSE23371 | GSM573359 | Immature DCs, technical replicate 3 | Calibration resting | 13.72241 | -11.1619 | -10.0731 |
| | | | Average calibration LPS 06h | 26.35406 | 3.102759 | -1.2088 |
| | | | Average resting | 14.05084 | -11.4231 | -10.118 |

- 3 State linear model for DCs

| GSE | Array | Title | Subgroup | AP1 | FOXO | NFKB | STAT1 2 | TGFB |
|---|---|---|---|---|---|---|---|---|
| GSE23371 | GSM573357 | Immature DCs, technical replicate 1 | Calibration resting | -5.49413 | 5.168025 | 14.20782 | -11.6911 | -10.8418 |
| GSE23371 | GSM573358 | Immature DCs, technical replicate 2 | Calibration resting | -4.7314 | 6.205997 | 14.2223 | -11.4162 | -9.43918 |
| GSE23371 | GSM573359 | Immature DCs, technical replicate 3 | Calibration resting | -4.9621 | 5.952649 | 13.72241 | -11.1619 | -10.0731 |
| GSE23371 | GSM573360 | Maturing DCs, technical replicate 1 | Calibration LPS 06h | 0.728707 | 16.41789 | 27.64863 | 1.684919 | -1.61094 |
| GSE23371 | GSM573361 | Maturing DCs, technical replicate 2 | Calibration LPS 06h | 0.370871 | 17.97299 | 24.89694 | 3.847916 | -0.04624 |
| GSE23371 | GSM573362 | Maturing DCs, technical replicate 3 | Calibration LPS 06h | 1.582058 | 17.30308 | 26.51662 | 3.775443 | -1.96923 |
| GSE23371 | GSM573363 | Tolerogenic DCs, technical replicate 1 | Calibration dexamethasone | -4.2352 | 10.1859 | 10.07174 | -6.86334 | -11.5684 |
| GSE23371 | GSM573364 | Tolerogenic DCs, technical replicate 2 | Calibration dexamethasone | -3.56974 | 11.12183 | 12.20205 | -6.97088 | -10.3424 |
| GSE23371 | GSM573365 | Tolerogenic DCs, technical replicate 3 | Calibration dexamethasone | -3.63272 | 10.22813 | 10.15819 | -7.08516 | -10.3187 |
| | | | Mean calibration resting | -5.06254 | 5.775557 | 14.05084 | -11.4231 | -10.118 |
| | | | Mean calibration LPS | 0.893879 | 17.23132 | 26.35406 | 3.102759 | -1.2088 |
| | | | Mean calibration dexamethasone | -3.81255 | 10.51195 | 10.81066 | -6.97313 | -10.7432 |

FIG. 23C 2D centroid model for DCs
C. Validation results centroid model
2D Centroid model for DCs for dataset GSE1891 with scores per sample (GSM numbers)

Samples are respectively activated for 1,2,4,6,8,10, 12,14,16 or 18 hours

| GSE | Array | Title | Subgroup | NFKB | STAT1 2 | TGFB |
|---|---|---|---|---|---|---|
| GSE18791 | GSM466186 | 2.1.NDV.1 | Validation NDV 01h | 13.64465 | -11.5295 | -12.9284 |
| GSE18791 | GSM466201 | 2.2.NDV.1 | Validation NDV 01h | 12.17247 | -11.0302 | -13.0814 |
| GSE18791 | GSM466217 | 3.1.NDV.1 | Validation NDV 01h | 15.81161 | -10.1713 | -14.6474 |
| GSE18791 | GSM466230 | 3.2.NDV.1 | Validation NDV 01h | 14.98252 | -11.0859 | -12.8345 |
| GSE18791 | GSM466187 | 2.1.NDV.2 | Validation NDV 02h | 16.66285 | -10.7057 | -9.17803 |
| GSE18791 | GSM466202 | 2.2.NDV.2 | Validation NDV 02h | 10.53704 | -10.384 | -11.8948 |
| GSE18791 | GSM466218 | 3.1.NDV.2 | Validation NDV 02h | 16.34712 | -10.187 | -12.5834 |
| GSE18791 | GSM466231 | 3.2.NDV.2 | Validation NDV 02h | 15.80425 | -10.35 | -11.0622 |
| GSE18791 | GSM466188 | 2.1.NDV.4 | Validation NDV 04h | 20.14277 | 0.490902 | -10.8805 |
| GSE18791 | GSM466203 | 2.2.NDV.4 | Validation NDV 04h | 14.96521 | -8.35142 | -11.3852 |
| GSE18791 | GSM466219 | 3.1.NDV.4 | Validation NDV 04h | 19.56267 | -2.78364 | -11.8349 |
| GSE18791 | GSM466232 | 3.2.NDV.4 | Validation NDV 04h | 22.05192 | 0.172263 | -9.96001 |
| GSE18791 | GSM466189 | 2.1.NDV.6 | Validation NDV 06h | 21.75355 | 2.396416 | -10.2473 |
| GSE18791 | GSM466204 | 2.2.NDV.6 | Validation NDV 06h | 16.26691 | 0.107395 | -9.9798 |
| GSE18791 | GSM466220 | 3.1.NDV.6 | Validation NDV 06h | 28.05081 | 4.011108 | -12.6763 |
| GSE18791 | GSM466233 | 3.2.NDV.6 | Validation NDV 06h | 27.29405 | 2.909239 | -10.4938 |
| GSE18791 | GSM466190 | 2.1.NDV.8 | Validation NDV 08h | 23.55802 | 5.711256 | -9.43279 |
| GSE18791 | GSM466205 | 2.2.NDV.8 | Validation NDV 08h | 23.50421 | 2.646831 | -11.9163 |
| GSE18791 | GSM466221 | 3.1.NDV.8 | Validation NDV 08h | 28.59771 | 4.892127 | -8.88754 |
| GSE18791 | GSM466234 | 3.2.NDV.8 | Validation NDV 08h | 29.93034 | 4.546395 | -4.3029 |
| GSE18791 | GSM466191 | 2.1.NDV.10 | Validation NDV 10h | 25.89704 | 6.21576 | -2.76428 |
| GSE18791 | GSM466206 | 2.2.NDV.10 | Validation NDV 10h | 24.93862 | 3.957002 | -7.19207 |
| GSE18791 | GSM466222 | 3.1.NDV.10 | Validation NDV 10h | 31.11329 | 7.465019 | -3.1372 |

FIG. 23D-I 2D centroid model for DCs (continued)
C. Validation results centroid model
2D Centroid model for DCs for dataset GSE1891 with scores per sample (GSM numbers)

| GSE | Array | Title | Subgroup | NFKB | STAT1 2 | TGFB |
|---|---|---|---|---|---|---|
| GSE18791 | GSM466183 | 2.1.AF.0 | Validation resting | 12.77799 | -11.966 | -13.8588 |
| GSE18791 | GSM466184 | 2.1.AF.6 | Validation resting | 14.74605 | -9.65477 | -10.6259 |
| GSE18791 | GSM466185 | 2.1.AF.10 | Validation resting | 17.13173 | -10.4346 | -9.77311 |
| GSE18791 | GSM466195 | 2.2.AF.0 | Validation resting | 12.13655 | -10.804 | -12.9048 |
| GSE18791 | GSM466196 | 2.2.AF.1 | Validation resting | 13.30726 | -10.3272 | -12.8269 |
| GSE18791 | GSM466197 | 2.2.AF.2 | Validation resting | 12.88144 | -10.2092 | -12.9117 |
| GSE18791 | GSM466198 | 2.2.AF.6 | Validation resting | 7.605492 | -10.3313 | -8.81504 |
| GSE18791 | GSM466199 | 2.2.AF.10 | Validation resting | 12.4404 | -8.98587 | -11.3003 |
| GSE18791 | GSM466200 | 2.2.AF.18 | Validation resting | 10.55337 | -8.49966 | -9.97971 |
| GSE18791 | GSM466211 | 3.1.AF.0 | Validation resting | 14.68603 | -10.6039 | -14.4586 |
| GSE18791 | GSM466212 | 3.1.AF.1 | Validation resting | 14.2164 | -9.40135 | -14.6961 |
| GSE18791 | GSM466213 | 3.1.AF.2 | Validation resting | 11.98082 | -10.0007 | -13.0303 |
| GSE18791 | GSM466214 | 3.1.AF.6 | Validation resting | 11.98645 | -8.52986 | -11.617 |
| GSE18791 | GSM466215 | 3.1.AF.10 | Validation resting | 14.49898 | -9.29207 | -9.24962 |
| GSE18791 | GSM466216 | 3.1.AF.18 | Validation resting | 17.8684 | -8.38762 | -11.2208 |
| GSE18791 | GSM466227 | 3.2.AF.0 | Validation resting | 9.632802 | -10.9222 | -12.7346 |
| GSE18791 | GSM466228 | 3.2.AF.6 | Validation resting | 15.19128 | -9.07611 | -9.33163 |
| GSE18791 | GSM466229 | 3.2.AF.10 | Validation resting | 14.26794 | -8.82616 | -7.82849 |

Samples are not activated

FIG. 23D-I
(Continued)

2D centroid model for DCs
C. Validation results centroid model
2D Centroid model for DCs for dataset GSE1891 with scores per sample (GSM numbers)

| Distance: sample to calibration LPS | Distance: sample to calibration resting | Detected as: | Summary |
|---|---|---|---|
| 22.64913265 | 2.841604302 | Immune resting | |
| 23.27695738 | 3.530430487 | Immune resting | |
| 21.63191324 | 5.018214185 | Immune resting | |
| 21.58207108 | 2.891527525 | Immune resting | According to defined score in immune resting state as activation is too short to change state |
| 18.65747381 | 2.867193112 | Immune resting | |
| 23.37222275 | 4.072243932 | Immune resting | |
| 20.15289981 | 3.588709927 | Immune resting | |
| 19.73233221 | 2.26216163 | Immune resting | |
| 11.7874243 | 13.40281206 | Immune supportive | |
| 19.09090758 | 3.446261008 | Immune resting | |
| 13.9171604 | 10.39074171 | Immune resting | |
| 10.18233359 | 14.08877871 | Immune supportive | Samples to defined score in intermediate state as activation is too short to switch all to supporting state |
| 10.16653536 | 15.8217006 | Immune supportive | |
| 13.69866172 | 11.74229147 | Immune resting | |
| 11.62785242 | 20.99421621 | Immune supportive | |
| 9.334507767 | 19.51764837 | Immune supportive | |
| 9.069509311 | 19.6071594 | Immune supportive | |
| 11.08966524 | 17.0458741 | Immune supportive | |
| 8.197484486 | 21.89316271 | Immune supportive | |
| 4.944416114 | 23.25935232 | Immune supportive | According to defined score in immune supporting state |
| 3.509866124 | 22.48417306 | Immune supportive | |
| 6.207468342 | 19.06964328 | Immune supportive | |
| 6.73782049 | 26.39353411 | Immune supportive | |

FIG. 23D-II 2D centroid model for DCs (continued)
C. Validation results centroid model
2D Centroid model for DCs for dataset GSE1891 with scores per sample (GSM numbers)

| Distance: sample to calibration LPS | Distance: sample to calibration resting | Detected as: | Summary |
|---|---|---|---|
| 23.903922 | 3.988480925 | Immune resting | According to defined score in immune resting state |
| 19.65150858 | 1.96672967 | Immune resting | |
| 18.48403568 | 3.253896886 | Immune resting | |
| 23.07233711 | 3.437135297 | Immune resting | |
| 22.03551571 | 3.015266353 | Immune resting | |
| 22.26381002 | 3.262728236 | Immune resting | |
| 24.28656841 | 6.665756827 | Immune resting | |
| 21.01338294 | 3.151358391 | Immune resting | |
| 21.47572607 | 4.560454823 | Immune resting | |
| 22.3511706 | 4.462639744 | Immune resting | |
| 22.03596417 | 5.007360157 | Immune resting | |
| 22.76045969 | 3.845747156 | Immune resting | |
| 21.21501921 | 3.857366354 | Immune resting | |
| 18.94279612 | 2.344373365 | Immune resting | |
| 17.4434948 | 5.00036539 | Immune resting | |
| 24.68084462 | 5.159127205 | Immune resting | |
| 18.40958529 | 2.725290986 | Immune resting | |
| 18.22618389 | 3.468866613 | Immune resting | |

FIG. 23D-II
(Continued)

2D centroid model for DCs
C. Validation results centroid model
2D Centroid model for DCs for dataset GSE1891 with scores per sample (GSM numbers)

Samples are respectively activated for 1,2,4,6,8,10, 12,14,16 or 18 hours

| GSE | Array | Title | Subgroup | NFKB | STAT1 2 | TGFB |
|---|---|---|---|---|---|---|
| GSE18791 | GSM466235 | 3.2.NDV.10 | Validation NDV 10h | 30.22974 | 6.473285 | -5.31132 |
| GSE18791 | GSM466192 | 2.1.NDV.12 | Validation NDV 12h | 23.77109 | 7.096555 | -0.68081 |
| GSE18791 | GSM466207 | 2.2.NDV.12 | Validation NDV 12h | 24.27 | 3.718259 | -3.52333 |
| GSE18791 | GSM466223 | 3.1.NDV.12 | Validation NDV 12h | 31.59425 | 8.196645 | -1.58095 |
| GSE18791 | GSM466236 | 3.2.NDV.12 | Validation NDV 12h | 32.11379 | 7.586813 | -1.74507 |
| GSE18791 | GSM466193 | 2.1.NDV.14 | Validation NDV 14h | 23.87794 | 7.886813 | -0.09138 |
| GSE18791 | GSM466208 | 2.2.NDV.14 | Validation NDV 14h | 21.46151 | 3.229423 | -7.24289 |
| GSE18791 | GSM466224 | 3.1.NDV.14 | Validation NDV 14h | 32.95536 | 7.432144 | 0.225501 |
| GSE18791 | GSM466237 | 3.2.NDV.14 | Validation NDV 14h | 31.96155 | 7.536545 | -1.69958 |
| GSE18791 | GSM466194 | 2.1.NDV.16 | Validation NDV 16h | 24.95362 | 7.903191 | -0.97043 |
| GSE18791 | GSM466209 | 2.2.NDV.16 | Validation NDV 16h | 21.89798 | 4.313294 | -6.57375 |
| GSE18791 | GSM466225 | 3.1.NDV.16 | Validation NDV 16h | 32.78408 | 7.853471 | 0.252069 |
| GSE18791 | GSM466238 | 3.2.NDV.16 | Validation NDV 16h | 28.23085 | 5.562716 | -4.73588 |
| GSE18791 | GSM466210 | 2.2.NDV.18 | Validation NDV 18h | 19.42147 | 4.957002 | -2.77141 |
| GSE18791 | GSM466226 | 3.1.NDV.18 | Validation NDV 18h | 32.28409 | 8.232329 | -0.32512 |
| GSE18791 | GSM466239 | 3.2.NDV.18 | Validation NDV 18h | 27.93095 | 5.164497 | -3.40514 |

FIG. 23D-III 2D centroid model for DCs
C. Validation results centroid model
2D Centroid model for DCs for dataset GSE1891 with scores per sample (GSM numbers)

| Distance: sample to calibration LPS | Distance: sample to calibration resting | Detected as: | Summary |
|---|---|---|---|
| 6.573576492 | 24.59960069 | Immune supportive | According to defined score in immune supporting state |
| 4.785491083 | 22.94603415 | Immune supportive | |
| 3.174774167 | 19.42114289 | Immune supportive | |
| 7.317492787 | 27.66921978 | Immune supportive | |
| 7.319068063 | 27.5272905 | Immune supportive | |
| 5.501541801 | 23.87418691 | Immune supportive | |
| 7.769389174 | 16.66972062 | IImmune supportive | |
| 8.02358113 | 28.63368602 | Immune supportive | |
| 7.16541759 | 27.40675808 | Immune supportive | |
| 5.006215943 | 24.00111024 | Immune supportive | |
| 7.078469043 | 17.93801386 | Immune supportive | |
| 8.127025306 | 28.81072478 | Immune supportive | |
| 4.691907587 | 22.771839 | Immune supportive | |
| 7.344441851 | 18.73827244 | Immune supportive | |
| 7.890410095 | 28.54271553 | Immune supportive | |
| 3.400180761 | 22.64657712 | Immune supportive | |

FIG. 23D-IV 3D centroid model for DCs
C. Validation results centroid model
3 State centroid model for DCs for datasets GSE13762 and GSE1891 with scores per sample (GSM numbers)

Samples are activated for resp. for 1,2,4, 6,8,10,12,14, 16,18 hours

| GSE | Array | Title | Subgroup | AP1 | FOXO | NFKB | STAT1 2 | TGFB |
|---|---|---|---|---|---|---|---|---|
| GSE18791 | GSM466186 | 2.1.NDV.1 | Validation NDV 01h | -5.03399 | 3.313884 | 13.64465 | -11.5295 | -12.9284 |
| GSE18791 | GSM466201 | 2.2.NDV.1 | Validation NDV 01h | -8.93957 | -0.82582 | 12.17247 | -11.0302 | -13.0814 |
| GSE18791 | GSM466217 | 3.1.NDV.1 | Validation NDV 01h | -6.8055 | -0.25521 | 15.81161 | -10.1713 | -14.6474 |
| GSE18791 | GSM466230 | 3.2.NDV.1 | Validation NDV 01h | -7.56636 | 3.0724 | 14.98252 | -11.0859 | -12.8345 |
| GSE18791 | GSM466187 | 2.1.NDV.2 | Validation NDV 02h | -5.39003 | 3.032031 | 16.66285 | -10.7057 | -9.17803 |
| GSE18791 | GSM466202 | 2.2.NDV.2 | Validation NDV 02h | -9.48918 | -2.9461 | 10.53704 | -10.384 | -11.8948 |
| GSE18791 | GSM466218 | 3.1.NDV.2 | Validation NDV 02h | -7.20877 | 0.195353 | 16.34712 | -10.187 | -12.5834 |
| GSE18791 | GSM466231 | 3.2.NDV.2 | Validation NDV 02h | -9.00751 | 5.349947 | 15.80425 | -10.35 | -11.0622 |
| GSE18791 | GSM466188 | 2.1.NDV.4 | Validation NDV 04h | -7.99051 | 8.918216 | 20.14277 | 0.490902 | -10.8805 |
| GSE18791 | GSM466203 | 2.2.NDV.4 | Validation NDV 04h | -9.69298 | -0.21436 | 14.96521 | -8.35142 | -11.3852 |
| GSE18791 | GSM466219 | 3.1.NDV.4 | Validation NDV 04h | -8.04639 | 2.377603 | 19.56267 | -2.78364 | -11.8349 |
| GSE18791 | GSM466232 | 3.2.NDV.4 | Validation NDV 04h | -9.11514 | 10.2946 | 22.05192 | 0.172263 | -9.96001 |
| GSE18791 | GSM466189 | 2.1.NDV.6 | Validation NDV 06h | -6.64532 | 8.595998 | 21.75355 | 2.396416 | -10.2473 |
| GSE18791 | GSM466204 | 2.2.NDV.6 | Validation NDV 06h | -10.674 | 0.487136 | 16.26691 | 0.107395 | -9.9798 |
| GSE18791 | GSM466220 | 3.1.NDV.6 | Validation NDV 06h | -6.07484 | 6.902588 | 28.05081 | 4.011108 | -12.6763 |
| GSE18791 | GSM466233 | 3.2.NDV.6 | Validation NDV 06h | -7.71084 | 12.10881 | 27.29405 | 2.909239 | -10.4938 |
| GSE18791 | GSM466190 | 2.1.NDV.8 | Validation NDV 08h | -7.00629 | 9.41843 | 23.55802 | 5.711256 | -9.43279 |
| GSE18791 | GSM466205 | 2.2.NDV.8 | Validation NDV 08h | -10.1277 | 5.054563 | 23.50421 | 2.646831 | -11.9163 |
| GSE18791 | GSM466221 | 3.1.NDV.8 | Validation NDV 08h | -6.76322 | 8.628645 | 28.59771 | 4.892127 | -8.88754 |
| GSE18791 | GSM466234 | 3.2.NDV.8 | Validation NDV 08h | -3.88662 | 11.09508 | 29.93034 | 4.546395 | -4.3029 |
| GSE18791 | GSM466191 | 2.1.NDV.10 | Validation NDV 10h | -4.71536 | 11.03265 | 25.89704 | 6.21576 | -2.76428 |
| GSE18791 | GSM466206 | 2.2.NDV.10 | Validation NDV 10h | -9.47272 | 6.405306 | 24.93862 | 3.957002 | -7.19207 |
| GSE18791 | GSM466222 | 3.1.NDV.10 | Validation NDV 10h | -5.60499 | 10.89244 | 31.11329 | 7.465019 | -3.1372 |

3D centroid model for DCs (continued)
C. Validation results centroid model
3 State centroid model for DCs for datasets GSE13762 and GSE1891 with scores per sample (GSM numbers)

| | GSE | Array | Title | Subgroup | AP1 | FOXO | NFKB | STAT1 2 | TGFB |
|---|---|---|---|---|---|---|---|---|---|
| Samples are not activated | GSE18791 | GSM466183 | 2.1.AF.0 | Validation resting | -6.47706 | 1.111484 | 12.77799 | -11.966 | -13.8588 |
| | GSE18791 | GSM466185 | 2.1.AF.10 | Validation resting | -3.63553 | 6.723717 | 17.13173 | -10.4346 | -9.77311 |
| | GSE18791 | GSM466184 | 2.1.AF.6 | Validation resting | -6.08071 | 4.327859 | 14.74605 | -9.65477 | -10.6259 |
| | GSE18791 | GSM466195 | 2.2.AF.0 | Validation resting | -8.08587 | -0.87566 | 12.13655 | -10.804 | -12.9048 |
| | GSE18791 | GSM466196 | 2.2.AF.1 | Validation resting | -8.34871 | -1.9178 | 13.30726 | -10.3272 | -12.8269 |
| | GSE18791 | GSM466199 | 2.2.AF.10 | Validation resting | -9.94038 | 0.192834 | 12.4404 | -8.98587 | -11.3003 |
| | GSE18791 | GSM466200 | 2.2.AF.18 | Validation resting | -9.40628 | 0.693644 | 10.55337 | -8.49966 | -9.97971 |
| | GSE18791 | GSM466197 | 2.2.AF.2 | Validation resting | -10.0996 | -0.21472 | 12.88144 | -10.2092 | -12.9117 |
| | GSE18791 | GSM466198 | 2.2.AF.6 | Validation resting | -10.2295 | 0.841097 | 7.605492 | -10.3313 | -8.81504 |
| | GSE18791 | GSM466211 | 3.1.AF.0 | Validation resting | -5.6423 | -1.34828 | 14.68603 | -10.6039 | -14.4586 |
| | GSE18791 | GSM466212 | 3.1.AF.1 | Validation resting | -6.31917 | -0.39303 | 14.2164 | -9.40135 | -14.6961 |
| | GSE18791 | GSM466215 | 3.1.AF.10 | Validation resting | -2.59885 | 5.011665 | 14.49898 | -9.29207 | -9.24962 |
| | GSE18791 | GSM466216 | 3.1.AF.18 | Validation resting | -3.63552 | 9.538266 | 17.8684 | -8.38762 | -11.2208 |
| | GSE18791 | GSM466213 | 3.1.AF.2 | Validation resting | -4.81285 | 0.134065 | 11.98082 | -10.0007 | -13.0303 |
| | GSE18791 | GSM466214 | 3.1.AF.6 | Validation resting | -3.27543 | 2.72673 | 11.98645 | -8.52986 | -11.617 |
| | GSE18791 | GSM466227 | 3.2.AF.0 | Validation resting | -8.09252 | -2.53981 | 9.632802 | -10.9222 | -12.7346 |
| | GSE18791 | GSM466229 | 3.2.AF.10 | Validation resting | -4.46312 | 10.23368 | 14.26794 | -8.82616 | -7.82849 |
| | GSE18791 | GSM466228 | 3.2.AF.6 | Validation resting | -4.05584 | 11.11462 | 15.19128 | -9.07611 | -9.33163 |
| | GSM | Array | Title | Subgroup | AP1 | FOXO | NFKB | STAT 1 2 | TGFB |
| Samples are suppressed | GSE13762 | GSM346559 | DC1 12h veh | Validation resting | -0.87422 | -3.93187 | 10.90234 | -11.6991 | -10.5253 |
| | GSE13762 | GSM346571 | DC2 12h veh | Validation resting | -2.55472 | -3.64277 | 9.356165 | -11.8695 | -11.0722 |
| | GSE13762 | GSM346590 | DC3 12h veh | Validation resting | -0.38065 | -3.18906 | 13.59223 | -12.4743 | -7.60275 |
| Samples are not activated | GSE13762 | GSM346562 | DC1 12h 1,25-vitD | Validation vitamine D | -0.24652 | -0.75997 | 8.992622 | -13.0359 | -12.7732 |
| | GSE13762 | GSM346574 | DC2 12h 1,25-vitD | Validation vitamine D | -2.56607 | -1.01655 | 7.600755 | -12.7425 | -12.8862 |
| | GSE13762 | GSM346591 | DC3 12h 1,25-vitD | Validation vitamine D | -1.17451 | -3.26444 | 14.14551 | -13.0227 | -9.96938 |

3D centroid model for DCs
C. Validation results centroid model
3 State centroid model for DCs for datasets GSE13762 and GSE1891 with scores per sample (GSM numbers)

| Distance: sample to calibration LPS | Distance: sample to calibration resting | Distance: sample to calibration dexamethasone | Detected as: | Summary |
|---|---|---|---|---|
| 27.23633434 | 3.759702635 | 9.320503381 | Immune resting | Samples are according to defined score in immune resting state as activation is too short to change state |
| 31.05758498 | 8.430504472 | 13.36461535 | Immune resting | |
| 28.86171934 | 8.036823613 | 13.2427434 | Immune resting | |
| 27.16314357 | 4.683703338 | 10.39858321 | Immune resting | |
| 24.27362074 | 3.981831298 | 10.44353526 | Immune resting | |
| 32.5760206 | 10.5946054 | 15.04587928 | Immune resting | |
| 27.60464661 | 6.973078899 | 12.74106011 | Immune resting | |
| 25.0712889 | 4.567420559 | 9.490778467 | Immune resting | |
| 16.94058473 | 14.07425571 | 12.75986672 | Immune suppressive | Samples are according to defined score in intermediate state between resting and supporting as activation |
| 27.94451908 | 8.318461474 | 13.00789655 | Immune resting | |
| 22.23170506 | 11.33212139 | 13.39531577 | Immune resting | |
| 15.87383125 | 15.34076389 | 14.35968706 | Immune suppressive | |
| 15.32209883 | 16.14887861 | 14.81473615 | Immune suppressive | |
| 24.53237516 | 14.04768878 | 15.1017862 | Immune resting | |
| 17.04267348 | 21.04880203 | 20.97041802 | Immune supportive | |
| 13.68993673 | 20.68966362 | 19.67669171 | Immune supportive | |
| 14.34259198 | 20.03720019 | 18.34398199 | Immune supportive | 21/23 samples are according to defined score in immune supporting state |
| 19.81741346 | 17.797128 | 18.01972909 | Immune resting | |
| 14.13633524 | 22.14368993 | 21.74534333 | Immune supportive | |
| 9.217040872 | 23.88885957 | 23.23971098 | Immune supportive | |
| 9.066761785 | 23.09319449 | 21.59386034 | Immune supportive | |
| 16.22349167 | 19.58309432 | 19.50844945 | Immune supportive | |
| 11.30552371 | 26.89043331 | 26.11255468 | Immune supportive | |

3D centroid model for DCs (continued)
C. Validation results centroid model
3 State centroid model for DCs for datasets GSE13762 and GSE1891 with scores per sample (GSM numbers)

| Distance: sample to calibration LPS | Distance: sample to calibration resting | Distance: sample to calibration dexamethasone | Detected as: | Summary |
|---|---|---|---|---|
| 29.75865194 | 6.297811255 | 11.5747142 | Immune resting | 16/18 samples are according to defined score in immune resting state |
| 21.73901614 | 3.677392588 | 8.201283522 | Immune resting | |
| 24.52194977 | 2.645851273 | 8.128949514 | Immune resting | |
| 30.67297329 | 8.074223242 | 13.00173899 | Immune resting | |
| 30.62153083 | 8.892607128 | 14.03211637 | Immune resting | |
| 29.14195248 | 8.055504492 | 12.2903199 | Immune resting | |
| 28.99646145 | 8.092690704 | 11.43102556 | Immune resting | |
| 30.34629518 | 8.479418674 | 13.19283296 | Immune resting | |
| 31.34017046 | 9.771316962 | 12.64795402 | Immune resting | |
| 29.79090174 | 8.426165859 | 13.63887231 | Immune resting | |
| 29.12437815 | 8.043891685 | 12.58263807 | Immune resting | |
| 22.81115145 | 3.485600586 | 7.275863688 | Immune resting | |
| 19.59525603 | 6.418568152 | 7.281479314 | Immune resting | |
| 29.0331094 | 6.832170395 | 11.15649808 | Immune resting | |
| 26.03542366 | 5.231480502 | 8.091209188 | Immune resting | |
| 32.8754772 | 10.24415337 | 14.47807911 | Immune resting | |
| 20.2449538 | 5.680424538 | 4.93787272 | Immune suppressive | |
| 20.02065334 | 6.078344175 | 5.101689632 | Immune suppressive | |
| Distance: sample to calibration LPS | Distance: sample to calibration resting | Distance: sample to calibration dexamethasone | Detected as: | |
| 31.5540112 | 11.0422541 | 15.48058574 | Immune resting | Samples are according to defined score in immune resting state |
| 32.52696855 | 10.86939375 | 15.10418792 | Immune resting | |
| 29.41100031 | 10.48458173 | 15.72760773 | Immune resting | |
| 31.94680696 | 10.05704059 | 13.56304619 | Immune resting | |
| 32.92531729 | 10.16722245 | 13.51449991 | Immune resting | |
| 30.16922524 | 9.971374129 | 15.65457913 | Immune resting | |

3D centroid model for DCs
C. Validation results centroid model
3 State centroid model for DCs for datasets GSE13762 and GSE1891 with scores per sample (GSM numbers)

Samples are activated for resp. for 1,2,4, 6,8,10,12,14, 16,18 hours

| GSE | Array | Title | Subgroup | AP1 | FOXO | NFKB | STAT1 2 | TGFB |
|---|---|---|---|---|---|---|---|---|
| GSE18791 | GSM466235 | 3.2.NDV.10 | Validation NDV 10h | -7.71606 | 10.6871 | 30.22974 | 6.473285 | -5.31132 |
| GSE18791 | GSM466192 | 2.1.NDV.12 | Validation NDV 12h | -5.80483 | 13.55952 | 23.77109 | 7.096555 | -0.68081 |
| GSE18791 | GSM466207 | 2.2.NDV.12 | Validation NDV 12h | -9.42411 | 6.014386 | 24.27 | 3.718259 | -3.52333 |
| GSE18791 | GSM466223 | 3.1.NDV.12 | Validation NDV 12h | -6.69187 | 10.90151 | 31.59425 | 8.196645 | -1.58095 |
| GSE18791 | GSM466236 | 3.2.NDV.12 | Validation NDV 12h | -3.0753 | 9.637972 | 32.11379 | 7.586813 | -1.74507 |
| GSE18791 | GSM466193 | 2.1.NDV.14 | Validation NDV 14h | -4.93297 | 13.01709 | 23.87794 | 7.886813 | -0.09138 |
| GSE18791 | GSM466208 | 2.2.NDV.14 | Validation NDV 14h | -8.82702 | 2.361238 | 21.46151 | 3.229423 | -7.24289 |
| GSE18791 | GSM466224 | 3.1.NDV.14 | Validation NDV 14h | -6.30332 | 12.83246 | 32.95536 | 7.432144 | 0.225501 |
| GSE18791 | GSM466237 | 3.2.NDV.14 | Validation NDV 14h | -2.21981 | 9.715489 | 31.96155 | 7.536545 | -1.69958 |
| GSE18791 | GSM466194 | 2.1.NDV.16 | Validation NDV 16h | -6.33377 | 15.93801 | 24.95362 | 7.903191 | -0.97043 |
| GSE18791 | GSM466209 | 2.2.NDV.16 | Validation NDV 16h | -9.49671 | 6.064017 | 21.89798 | 4.313294 | -6.57375 |
| GSE18791 | GSM466225 | 3.1.NDV.16 | Validation NDV 16h | -5.74215 | 13.8648 | 32.78408 | 7.853471 | 0.252069 |
| GSE18791 | GSM466238 | 3.2.NDV.16 | Validation NDV 16h | -4.99081 | 6.970771 | 28.23085 | 5.562716 | -4.73588 |
| GSE18791 | GSM466210 | 2.2.NDV.18 | Validation NDV 18h | -11.792 | 4.883697 | 19.42147 | 4.957002 | -2.77141 |
| GSE18791 | GSM466226 | 3.1.NDV.18 | Validation NDV 18h | -5.28366 | 13.42724 | 32.28409 | 8.232329 | -0.32512 |
| GSE18791 | GSM466239 | 3.2.NDV.18 | Validation NDV 18h | -5.36267 | 10.95835 | 27.93095 | 5.164497 | -3.40514 |

FIG. 23E-III 3D centroid model for DCs
C. Validation results centroid model
3 State centroid model for DCs for datasets GSE13762 and GSE1891 with scores per sample (GSM numbers)

| Distance: sample to calibration LPS | Distance: sample to calibration resting | Distance: sample to calibration dexamethasone | Detected as: | Summary |
|---|---|---|---|---|
| 12.6558195 | 25.22508182 | 24.54954025 | Immune supportive | |
| 9.014197883 | 24.24173302 | 21.91887339 | Immune supportive | |
| 15.56790298 | 19.90630753 | 19.9825812 | Immune supportive | 21/23 samples are according to defined score in immune supporting state |
| 12.29454078 | 28.18715644 | 27.4675882 | Immune supportive | |
| 11.26863113 | 27.86788672 | 27.35120897 | Immune supportive | |
| 9.054221572 | 24.94861386 | 22.63987015 | Immune supportive | |
| 19.39016892 | 17.42723364 | 17.92661918 | Immune resting | |
| 11.64162998 | 29.51656011 | 28.80625205 | Immune supportive | |
| 10.84093914 | 27.8340545 | 27.2552525 | Immune supportive | |
| 8.886720463 | 26.09492016 | 23.50816528 | Immune supportive | |
| 16.81599406 | 18.4801888 | 17.88267294 | Immune supportive | |
| 11.01902483 | 29.93251628 | 28.95720711 | Immune supportive | |
| 12.72487579 | 22.80329651 | 22.59704212 | Immune supportive | |
| 19.16602757 | 19.92998098 | 19.37452853 | Immune supportive | |
| 10.71875098 | 29.55137509 | 28.4870701 | Immune supportive | |
| 9.489773233 | 23.23400234 | 22.29070424 | Immune supportive | |

FIG. 23E-IV

Comparison IL-4 and IL-15 cultured DCs
3D model results on dataset GSE79184

Note that summation of the three probabilities score is 1.
According to our definition the state with the highest score defines the state attributed to the sample Comparison IL-4 and IL-15 cultured DCs
3D model results on dataset GSE79184

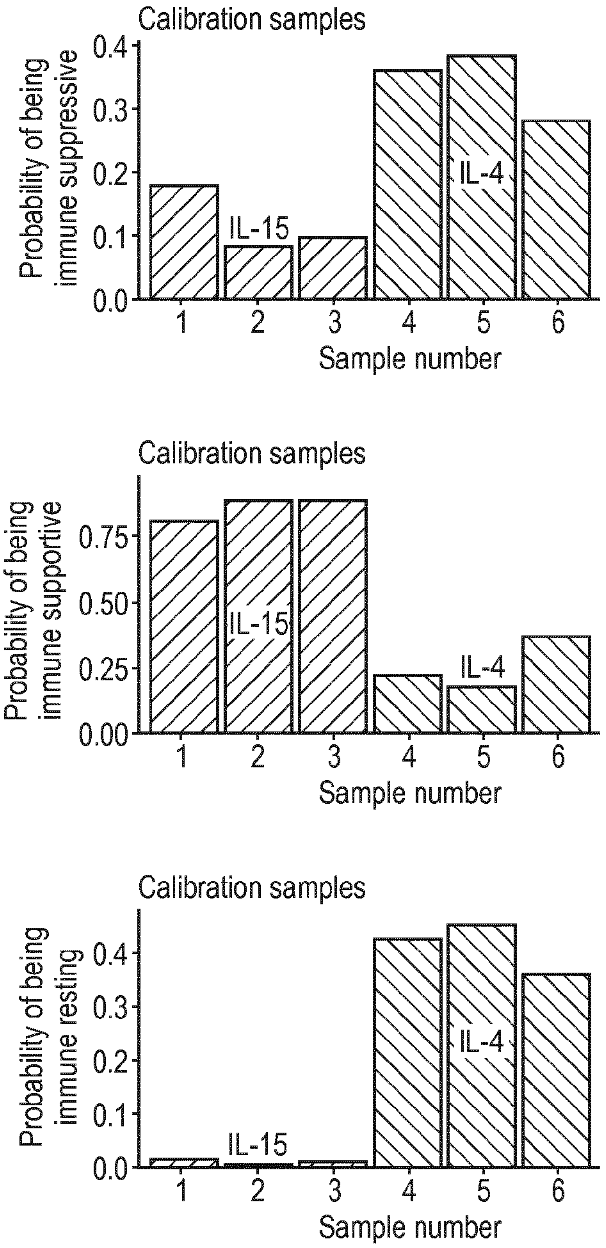

Summary

All three presentation indicate that IL-15 cultured DC have more supporting and IL-4 cultured more suppressing properties Probabilities of the IL-4 resting and suppressive state are very close, which makes it hard in turn to distinguish the two states Note that summation of the three probabilities score is 1.
According to our definition the state with the highest score defines the state attributed to the sample FIG. 24 (Continued)

Validation results of the 2D Bayesian model active/supporting versus inactive/resting
a. Validation dataset GSE18971 with pathway activity scores per sample (GSM numbers)

Samples are activated for resp. for 1,2,4,6,8,10,12,14,16,18 hours

| GSE | Array | Title | Subgroup | NFKB | STAT1 2 | TGFB |
|---|---|---|---|---|---|---|
| GSE18791 | GSM466186 | 2.1.NDV.1 | Validation NDV 01h | 13.64465 | -11.5295 | -12.9284 |
| GSE18791 | GSM466201 | 2.2.NDV.1 | Validation NDV 01h | 12.17247 | -11.0302 | -13.0814 |
| GSE18791 | GSM466217 | 3.1.NDV.1 | Validation NDV 01h | 15.81161 | -10.1713 | -14.6474 |
| GSE18791 | GSM466230 | 3.2.NDV.1 | Validation NDV 01h | 14.98252 | -11.0859 | -12.8345 |
| GSE18791 | GSM466187 | 2.1.NDV.2 | Validation NDV 02h | 16.66285 | -10.7057 | -9.17803 |
| GSE18791 | GSM466202 | 2.2.NDV.2 | Validation NDV 02h | 10.53704 | -10.384 | -11.8948 |
| GSE18791 | GSM466218 | 3.1.NDV.2 | Validation NDV 02h | 16.34712 | -10.187 | -12.5834 |
| GSE18791 | GSM466231 | 3.2.NDV.2 | Validation NDV 02h | 15.80425 | -10.35 | -11.0622 |
| GSE18791 | GSM466188 | 2.1.NDV.4 | Validation NDV 04h | 20.14277 | 0.490902 | -10.8805 |
| GSE18791 | GSM466203 | 2.2.NDV.4 | Validation NDV 04h | 14.96521 | -8.35142 | -11.3852 |
| GSE18791 | GSM466219 | 3.1.NDV.4 | Validation NDV 04h | 19.56267 | -2.78364 | -11.8349 |
| GSE18791 | GSM466232 | 3.2.NDV.4 | Validation NDV 04h | 22.05192 | 0.172263 | -9.96001 |
| GSE18791 | GSM466189 | 2.1.NDV.6 | Validation NDV 06h | 21.75355 | 2.396416 | -10.2473 |
| GSE18791 | GSM466204 | 2.2.NDV.6 | Validation NDV 06h | 16.26691 | 0.107395 | -9.9798 |
| GSE18791 | GSM466220 | 3.1.NDV.6 | Validation NDV 06h | 28.05081 | 4.011108 | -12.6763 |
| GSE18791 | GSM466233 | 3.2.NDV.6 | Validation NDV 06h | 27.29405 | 2.909239 | -10.4938 |
| GSE18791 | GSM466190 | 2.1.NDV.8 | Validation NDV 08h | 23.55802 | 5.711256 | -9.43279 |
| GSE18791 | GSM466205 | 2.2.NDV.8 | Validation NDV 08h | 23.50421 | 2.646831 | -11.9163 |
| GSE18791 | GSM466221 | 3.1.NDV.8 | Validation NDV 08h | 28.59771 | 4.892127 | -8.88754 |
| GSE18791 | GSM466234 | 3.2.NDV.8 | Validation NDV 08h | 29.93034 | 4.546395 | -4.3029 |
| GSE18791 | GSM466191 | 2.1.NDV.10 | Validation NDV 10h | 25.89704 | 6.21576 | -2.76428 |
| GSE18791 | GSM466206 | 2.2.NDV.10 | Validation NDV 10h | 24.93862 | 3.957002 | -7.19207 |
| GSE18791 | GSM466222 | 3.1.NDV.10 | Validation NDV 10h | 31.11329 | 7.465019 | -3.1372 |
| GSE18791 | GSM466235 | 3.2.NDV.10 | Validation NDV 10h | 30.22974 | 6.473285 | -5.31132 |
| GSE18791 | GSM466192 | 2.1.NDV.12 | Validation NDV 12h | 23.77109 | 7.096555 | -0.68081 |
| GSE18791 | GSM466207 | 2.2.NDV.12 | Validation NDV 12h | 24.27 | 3.718259 | -3.52333 |
| GSE18791 | GSM466223 | 3.1.NDV.12 | Validation NDV 12h | 31.59425 | 8.196645 | -1.58095 |
| GSE18791 | GSM466236 | 3.2.NDV.12 | Validation NDV 12h | 32.11379 | 7.586813 | -1.74507 |
| GSE18791 | GSM466193 | 2.1.NDV.14 | Validation NDV 14h | 23.87794 | 7.886813 | -0.09138 |
| GSE18791 | GSM466208 | 2.2.NDV.14 | Validation NDV 14h | 21.46151 | 3.229423 | -7.24289 |

FIG. 25A

Validation results of the 2D Bayesian model (continued) active/supporting versus inactive/resting
a. Validation dataset GSE18971 with pathway activity scores per sample (GSM numbers)

Samples are activated for resp. for 1,2,4,6,8,10,12,14,16,18 hours

| GSE | Array | Title | Subgroup | NFKB | STAT1 2 | TGFB |
|---|---|---|---|---|---|---|
| GSE18791 | GSM466224 | 3.1.NDV.14 | Validation NDV 14h | 32.95536 | 7.432144 | 0.225501 |
| GSE18791 | GSM466237 | 3.2.NDV.14 | Validation NDV 14h | 31.96155 | 7.536545 | -1.69958 |
| GSE18791 | GSM466194 | 2.1.NDV.16 | Validation NDV 16h | 24.95362 | 7.903191 | -0.97043 |
| GSE18791 | GSM466209 | 2.2.NDV.16 | Validation NDV 16h | 21.89798 | 4.313294 | -6.57375 |
| GSE18791 | GSM466225 | 3.1.NDV.16 | Validation NDV 16h | 32.78408 | 7.853471 | 0.252069 |
| GSE18791 | GSM466238 | 3.2.NDV.16 | Validation NDV 16h | 28.23085 | 5.562716 | -4.73588 |
| GSE18791 | GSM466210 | 2.2.NDV.18 | Validation NDV 18h | 19.42147 | 4.957002 | -2.77141 |
| GSE18791 | GSM466226 | 3.1.NDV.18 | Validation NDV 18h | 32.28409 | 8.232329 | -0.32512 |
| GSE18791 | GSM466239 | 3.2.NDV.18 | Validation NDV 18h | 27.93095 | 5.164497 | -3.40514 |

Samples are not activated

| GSE | Array | Title | Subgroup | NFKB | STAT1 2 | TGFB |
|---|---|---|---|---|---|---|
| GSE18791 | GSM466183 | 2.1.AF.0 | Validation resting | 12.77799 | -11.966 | -13.8588 |
| GSE18791 | GSM466184 | 2.1.AF.6 | Validation resting | 14.74605 | -9.65477 | -10.6259 |
| GSE18791 | GSM466185 | 2.1.AF.10 | Validation resting | 17.13173 | -10.4346 | -9.77311 |
| GSE18791 | GSM466195 | 2.2.AF.0 | Validation resting | 12.13655 | -10.804 | -12.9048 |
| GSE18791 | GSM466196 | 2.2.AF.1 | Validation resting | 13.30726 | -10.3272 | -12.8269 |
| GSE18791 | GSM466197 | 2.2.AF.2 | Validation resting | 12.88144 | -10.2092 | -12.9117 |
| GSE18791 | GSM466198 | 2.2.AF.6 | Validation resting | 7.605492 | -10.3313 | -8.81504 |
| GSE18791 | GSM466199 | 2.2.AF.10 | Validation resting | 12.4404 | -8.98587 | -11.3003 |
| GSE18791 | GSM466200 | 2.2.AF.18 | Validation resting | 10.55337 | -849966 | -9.97971 |
| GSE18791 | GSM466211 | 3.1.AF.0 | Validation resting | 14.68603 | -10.6039 | -14.4586 |
| GSE18791 | GSM466212 | 3.1.AF.1 | Validation resting | 14.2164 | -9.40135 | -14.6961 |
| GSE18791 | GSM466213 | 3.1.AF.2 | Validation resting | 11.98082 | -10.0007 | -13.0303 |
| GSE18791 | GSM466214 | 3.1.AF.6 | Validation resting | 11.98645 | -8.52986 | -11.617 |
| GSE18791 | GSM466215 | 3.1.AF.10 | Validation resting | 14.49898 | -9.29207 | -9.24962 |
| GSE18791 | GSM466216 | 3.1.AF.18 | Validation resting | 17.8684 | -8.38762 | -11.2208 |
| GSE18791 | GSM466227 | 3.2.AF.0 | Validation resting | 9.632802 | -10.9222 | -12.7346 |
| GSE18791 | GSM466228 | 3.2.AF.6 | Validation resting | 15.19128 | -9.07611 | -9.33163 |
| GSE18791 | GSM466229 | 3.2.AF.10 | Validation resting | 14.26794 | -8.82616 | -7.82849 |

FIG. 25A
(Continued)

Validation results of the 2D Bayesian model active/supporting versus inactive/resting b. 2D model validation results on samples are from dataset GSE18791

It should be noted that the activation of DCs takes several hours to turn them from resting to supporting Summary
The resting DCs have a high probability of being immune resting
The supporting DCs have a high probability of being immune supportive
Results of calibration and validation set are consistent Validation results of the 3D Bayesian model active/supporting versus inactive/resting and immune suppressed/tolerognic
a. Validation datasets GSE13672 and GSE18971 with pathway activity scores per sample (GSM numbers)

GSE18971

Samples are activated for resp. for 1,2,4,6,8,10,12,14,16,18 hours

| Array | Title | Subgroup | AP1 | FOXO | NFKB | STAT1 2 | TGFB |
|---|---|---|---|---|---|---|---|
| GSM466186 | 2.1.NDV.1 | Validation NDV 01h | -5.03399 | 3.313884 | 13.64465 | -11.5295 | -12.9284 |
| GSM466201 | 2.2.NDV.1 | Validation NDV 01h | -8.93957 | -0.82582 | 12.17247 | -11.0302 | -13.0814 |
| GSM466217 | 3.1.NDV.1 | Validation NDV 01h | -6.8055 | -0.25521 | 15.81161 | -10.1713 | -14.6474 |
| GSM466230 | 3.2.NDV.1 | Validation NDV 01h | -7.56636 | 3.0724 | 14.98252 | -11.0859 | -12.8345 |
| GSM466187 | 2.1.NDV.2 | Validation NDV 02h | -5.39003 | 3.032031 | 16.66285 | -10.7057 | -9.17803 |
| GSM466202 | 2.2.NDV.2 | Validation NDV 02h | -9.48918 | -2.9461 | 10.53704 | -10.384 | -11.8948 |
| GSM466218 | 3.1.NDV.2 | Validation NDV 02h | -7.20877 | 0.195353 | 16.34712 | -10.187 | -12.5834 |
| GSM466231 | 3.2.NDV.2 | Validation NDV 02h | -9.00751 | 5.349947 | 15.80425 | -10.35 | -11.0622 |
| GSM466188 | 2.1.NDV.4 | Validation NDV 04h | -7.99051 | 8.918216 | 20.14277 | 0.490902 | -10.8805 |
| GSM466203 | 2.2.NDV.4 | Validation NDV 04h | -9.69298 | -0.21436 | 14.96521 | -8.35142 | -11.3852 |
| GSM466219 | 3.1.NDV.4 | Validation NDV 04h | -8.04639 | 2.377603 | 19.56267 | -2.78364 | -11.8349 |
| GSM466232 | 3.2.NDV.4 | Validation NDV 04h | -9.11514 | 10.2946 | 22.05192 | 0.172263 | -9.96001 |
| GSM466189 | 2.1.NDV.6 | Validation NDV 06h | -6.64532 | 8.595998 | 21.75355 | 2.396416 | -10.2473 |
| GSM466204 | 2.2.NDV.6 | Validation NDV 06h | -10.674 | 0.487136 | 16.26691 | 0.107395 | -9.9798 |
| GSM466220 | 3.1.NDV.6 | Validation NDV 06h | -6.07484 | 6.902588 | 28.05081 | 4.011108 | -12.6763 |
| GSM466233 | 3.2.NDV.6 | Validation NDV 06h | -7.71084 | 12.10881 | 27.29405 | 2.909239 | -10.4938 |
| GSM466190 | 2.1.NDV.8 | Validation NDV 08h | -7.00629 | 9.41843 | 23.55802 | 5.711256 | -9.43279 |
| GSM466205 | 2.2.NDV.8 | Validation NDV 08h | -10.1277 | 5.054563 | 23.50421 | 2.646831 | -11.9163 |
| GSM466221 | 3.1.NDV.8 | Validation NDV 08h | -6.76322 | 8.628645 | 28.59771 | 4.892127 | -8.88754 |
| GSM466234 | 3.2.NDV.8 | Validation NDV 08h | -3.88662 | 11.09508 | 29.93034 | 4.546395 | -4.3029 |
| GSM466191 | 2.1.NDV.10 | Validation NDV 10h | -4.71536 | 11.03265 | 25.89704 | 6.21576 | -2.76428 |
| GSM466206 | 2.2.NDV.10 | Validation NDV 10h | -9.47272 | 6.405306 | 24.93862 | 3.957002 | -7.19207 |
| GSM466222 | 3.1.NDV.10 | Validation NDV 10h | -5.60499 | 10.89244 | 31.11329 | 7.465019 | -3.1372 |
| GSM466235 | 3.2.NDV.10 | Validation NDV 10h | -7.71606 | 10.6871 | 30.22974 | 6.473285 | -5.31132 |
| GSM466192 | 2.1.NDV.12 | Validation NDV 12h | -5.80483 | 13.55952 | 23.77109 | 7.096555 | -0.68081 |
| GSM466207 | 2.2.NDV.12 | Validation NDV 12h | -9.42411 | 6.014386 | 24.27 | 3.718259 | -3.52333 |
| GSM466223 | 3.1.NDV.12 | Validation NDV 12h | -6.69187 | 10.90151 | 31.59425 | 8.196645 | -1.58095 |
| GSM466236 | 3.2.NDV.12 | Validation NDV 12h | -3.0753 | 9.637972 | 32.11379 | 7.586813 | -1.74507 |
| GSM466193 | 2.1.NDV.14 | Validation NDV 14h | -4.93297 | 13.01709 | 23.87794 | 7.886813 | -0.09138 |
| GSM466208 | 2.2.NDV.14 | Validation NDV 14h | -8.82702 | 2.361238 | 21.46151 | 3.229423 | -7.24289 |
| GSM466224 | 3.1.NDV.14 | Validation NDV 14h | -6.30332 | 12.83246 | 32.95536 | 7.432144 | 0.225501 |
| GSM466237 | 3.2.NDV.14 | Validation NDV 14h | -2.21981 | 9.715489 | 31.96155 | 7.536545 | -1.69958 |

FIG. 27A

Validation results of the 3D Bayesian model (continued) active/supporting versus inactive/resting and immune suppressed/tolerognic a. Validation datasets GSE13672 and GSE18971 with pathway activity scores per sample (GSM numbers)

| | Array | Title | Subgroup | AP1 | FOXO | NFKB | STAT1 2 | TGFB |
|---|---|---|---|---|---|---|---|---|
| GSE18971 Samples are activated for resp. for 1,2,4,6,8,10,12,14,16,18 hours | GSM466194 | 2.1.NDV.16 | Validation NDV 16h | -6.33377 | 15.93801 | 24.95362 | 7.903191 | -0.97043 |
| | GSM466209 | 2.2.NDV.16 | Validation NDV 16h | -9.49671 | 6.064017 | 21.89798 | 4.313294 | -6.57375 |
| | GSM466225 | 3.1.NDV.16 | Validation NDV 16h | -5.74215 | 13.8648 | 32.78408 | 7.853471 | 0.252069 |
| | GSM466238 | 3.2.NDV.16 | Validation NDV 16h | -4.99081 | 6.970771 | 28.23085 | 5.562716 | -4.73588 |
| | GSM466210 | 2.2.NDV.18 | Validation NDV 18h | -11.792 | 4.883697 | 19.42147 | 4.957002 | -2.77141 |
| | GSM466226 | 3.1.NDV.18 | Validation NDV 18h | -5.28366 | 13.42724 | 32.28409 | 8.232329 | -0.32512 |
| | GSM466239 | 3.2.NDV.18 | Validation NDV 18h | -5.36267 | 10.95835 | 27.93095 | 5.164497 | -3.40514 |
| | Array | Title | Subgroup | AP1 | FOXO | NFKB | STAT 12 | TGFB |
| GSE18971 Samples are not activated | GSM466183 | 2.1.AF.0 | Validation resting | -6.47706 | 1.111484 | 12.77799 | -11.966 | -13.8588 |
| | GSM466184 | 2.1.AF.6 | Validation resting | -6.08071 | 4.327859 | 14.74605 | -9.65477 | -10.6259 |
| | GSM466185 | 2.1.AF.10 | Validation resting | -3.63553 | 6.723717 | 17.13173 | -10.4346 | -9.77311 |
| | GSM466195 | 2.2.AF.0 | Validation resting | -8.08587 | -0.87566 | 12.13655 | -10.804 | -12.9048 |
| | GSM466196 | 2.2.AF.1 | Validation resting | -8.34871 | -1.9178 | 13.30726 | -10.3272 | -12.8269 |
| | GSM466197 | 2.2.AF.2 | Validation resting | -10.0996 | -0.21472 | 12.88144 | -10.2092 | -12.9117 |
| | GSM466198 | 2.2.AF.6 | Validation resting | -10.2295 | 0.841097 | 7.605492 | -10.3313 | -8.81504 |
| | GSM466199 | 2.2.AF.10 | Validation resting | -9.94038 | 0.192834 | 12.4404 | -8.98587 | -11.3003 |
| | GSM466200 | 2.2.AF.18 | Validation resting | -9.40628 | 0.693644 | 10.55337 | -8.49966 | -9.97971 |
| | GSM466211 | 3.1.AF.0 | Validation resting | -5.6423 | -1.34828 | 14.68603 | -10.6039 | -14.4586 |
| | GSM466212 | 3.1.AF.1 | Validation resting | -6.31917 | -0.39303 | 14.2164 | -9.40135 | -14.6961 |
| | GSM466213 | 3.1.AF.2 | Validation resting | -4.81285 | 0.134065 | 11.98082 | -10.0007 | -13.0303 |
| | GSM466214 | 3.1.AF.6 | Validation resting | -3.27543 | 2.72673 | 11.98645 | -8.52986 | -11.617 |
| | GSM466215 | 3.1.AF.10 | Validation resting | -2.59885 | 5.011665 | 14.49898 | -9.29207 | -9.24962 |
| | GSM466216 | 3.1.AF.18 | Validation resting | -3.63552 | 9.538266 | 17.8684 | -8.38762 | -11.2208 |
| | GSM466227 | 3.2.AF.0 | Validation resting | -8.09252 | -2.53981 | 9.632802 | -10.9222 | -12.7346 |
| | GSM466228 | 3.2.AF.6 | Validation resting | -4.05584 | 11.11462 | 15.19128 | -9.07611 | -9.33163 |
| | GSM466229 | 3.2.AF.10 | Validation resting | -4.46312 | 10.23368 | 14.26794 | -8.82616 | -7.82849 |
| GSE13672 | Array | Title | Subgroup | AP1 | FOXO | NFKB | STAT 12 | TGFB |
| Samples are suppressed | GSM346562 | DC1 12h 1,25-vitD | Immune suppressive | -0.24652 | -0.75997 | 8.992622 | -13.0359 | -12.7732 |
| | GSM346574 | DC2 12h 1,25-vitD | Immune suppressive | -2.56607 | -1.01655 | 7.600755 | -12.7425 | -12.8862 |
| | GSM346591 | DC3 12h 1,25-vitD | Immune suppressive | -1.17451 | -3.26444 | 14.14551 | -13.0227 | -9.96938 |
| Samples are not activated | GSM346559 | DC1 12h veh | Immune resting | -0.87422 | -3.93187 | 10.90234 | -11.6991 | -10.5253 |
| | GSM346571 | DC2 12h veh | Immune resting | -2.55472 | -3.64277 | 9.356165 | -11.8695 | -11.0722 |
| | GSM346590 | DC3 12h veh | Immune resting | -0.38065 | -3.18906 | 13.59223 | -12.4743 | -7.60275 |

FIG. 27A (Continued)

Validation results of the 3D Bayesian model active/supporting versus inactive/resting b. 3D model validation results on samples from dataset GSE18791 comprising only samples annotated as resting and supporting Immune suppressive/tolerogenic score Calibration and validation samples

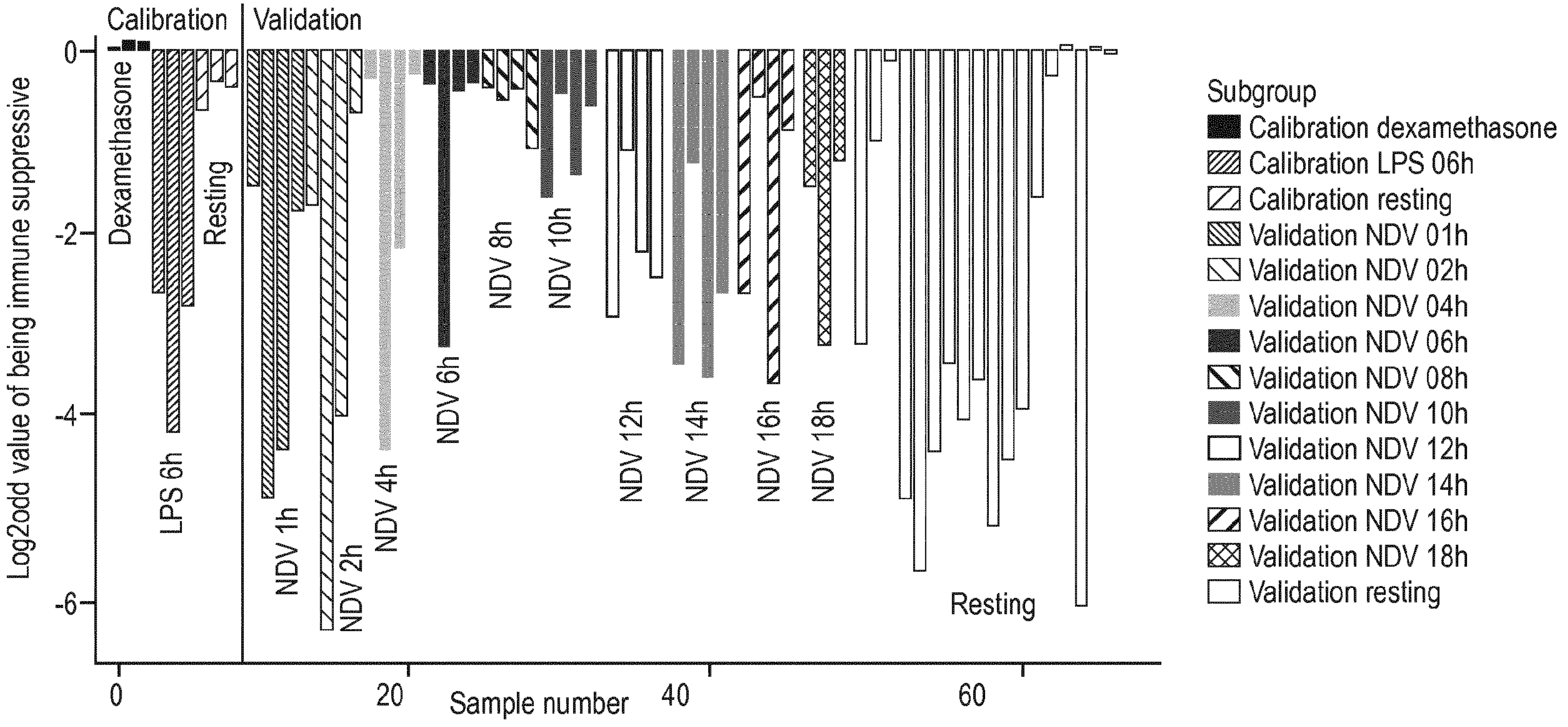

Summary: The resting and immune suppressive DCs have a nearly equally high probability of being immune suppressive
Note that summation of the three probabilities score is 1. According to our definition
the state with the highest score defines the state attributed to the sample

FIG. 27B

Summary: The supportive DCs have a high probability of being immune supportive
Note that summation of the three probabilities score is 1. According to our definition the state with the highest score defines the state attributed to the sample Summary: The supportive DCs have a high probability of being immune supportive
Note that summation of the three probabilities score is 1. According to our definition the state with the highest score defines the state attributed to the sample Summary: The resting and immune suppressive DCs have a nearly equally high probability of being immune resting
Note that summation of the three probabilities score is 1. According to our definition the state with the highest score defines the state attributed to the sample Summary: The resting and immune suppressive DCs have a nearly equally high probability of being immune resting
Note that summation of the three probabilities score is 1. According to our definition the state with the highest score defines the state attributed to the sample

Validation results of the 3D Bayesian model Bayesian, active/supporting versus inactive/resting b. 3D model validation results on samples from dataset GSE13791 comprising only samples annotated as resting and suppressing

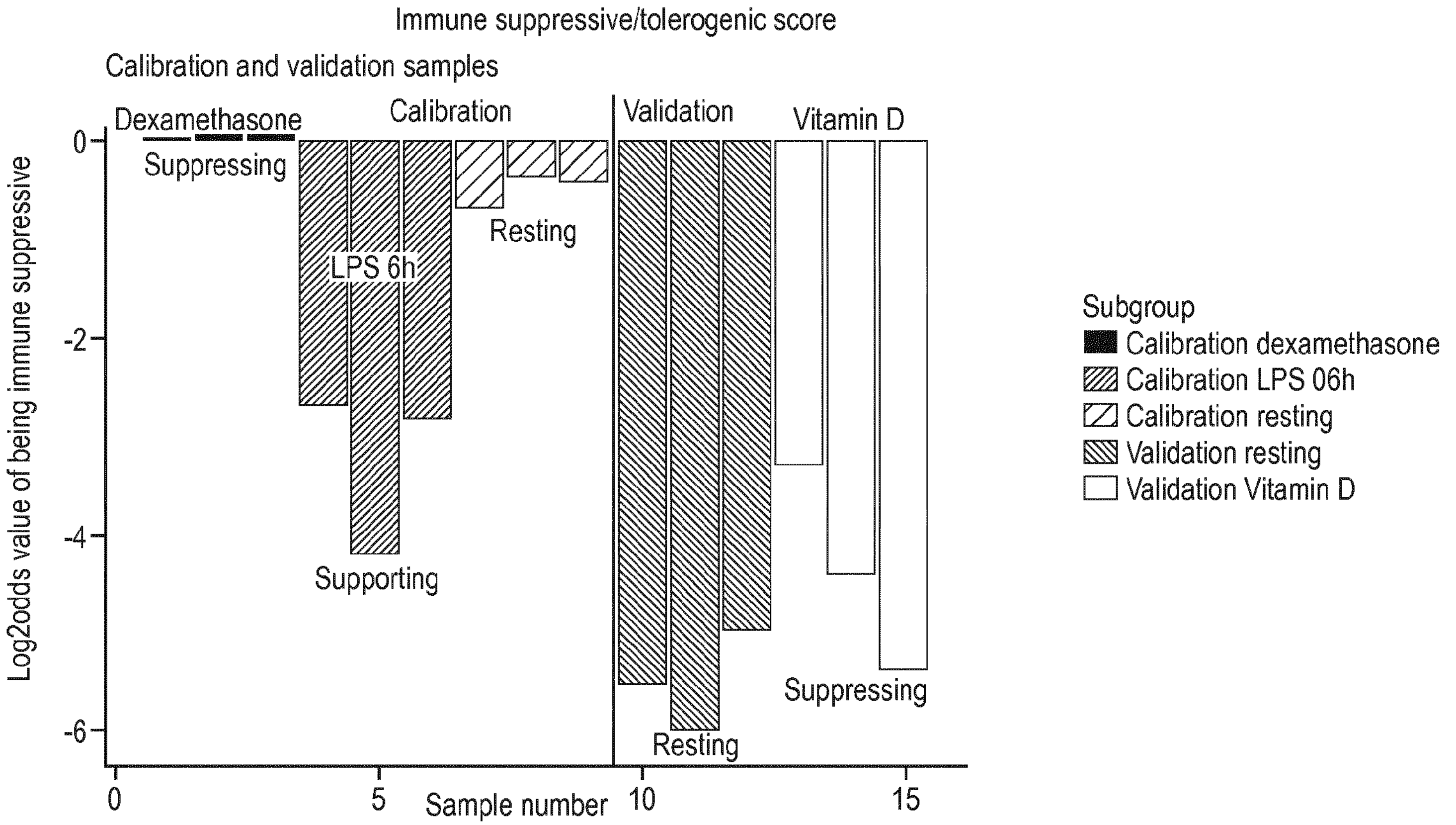

Summary: The suppressive DCs have a low probability of being immune suppressive
Note that summation of the three probabilities score is 1. According to our definition the state with the highest score defines the state attributed to the sample

FIG. 27C

Validation results of the 3D Bayesian model Bayesian, active/supporting versus inactive/resting b. 3D model validation results on samples from dataset GSE13791 comprising only samples annotated as resting and suppressing

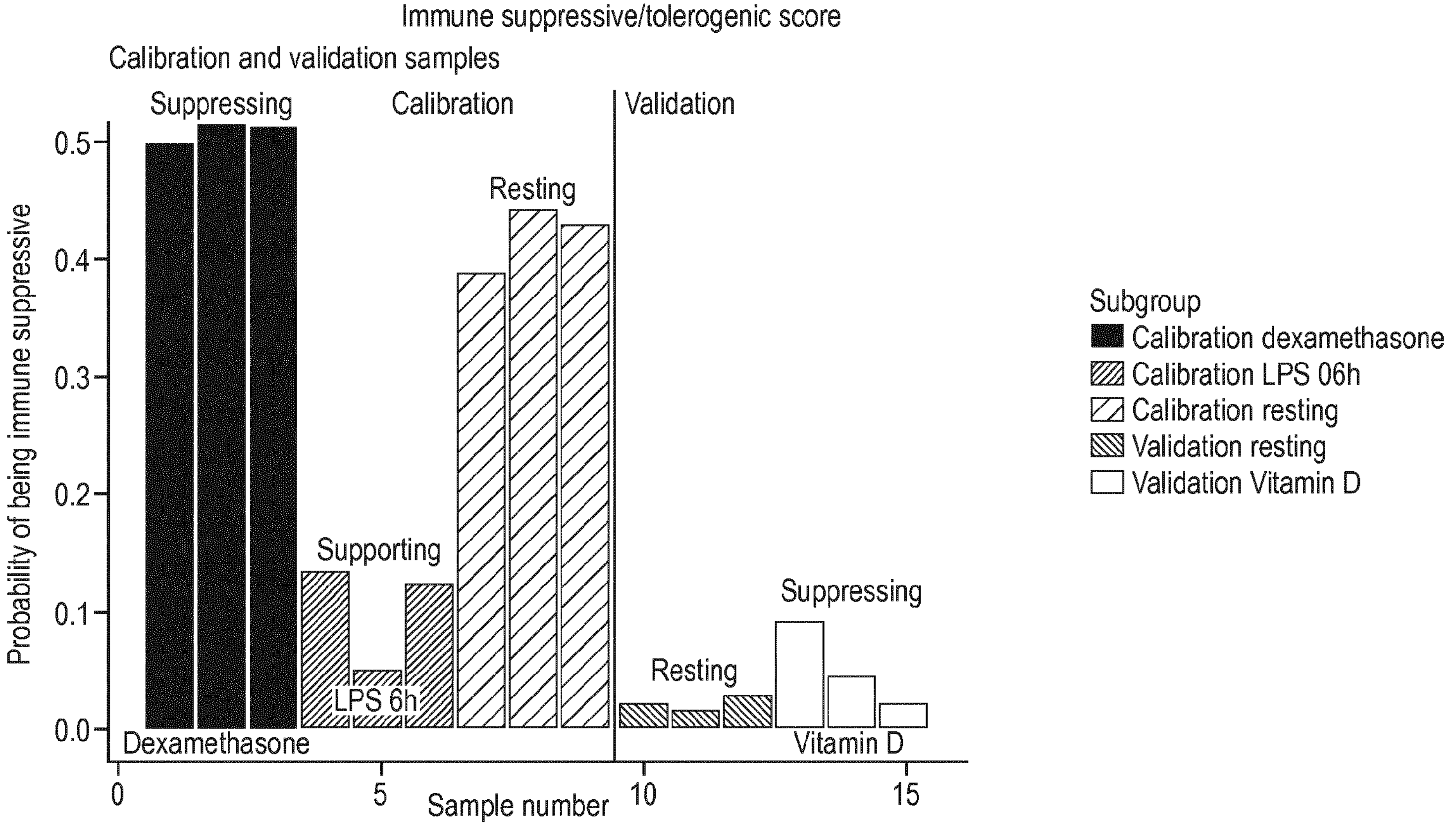

Summary: The suppressive DCs have a low probability of being immune suppressive
Note that summation of the three probabilities score is 1. According to our definition the state with the highest score defines the state attributed to the sample FIG. 27C (Continued)

Summary: The resting and suppressive samples have a very low probability of being immune supportive
Note that summation of the three probabilities score is 1. According to our definition the state with the highest score defines the state attributed to the sample Summary: The resting and suppressive samples have a very low probability of being immune supportive
Note that summation of the three probabilities score is 1. According to our definition the state with the highest score defines the state attributed to the sample Summary: The resting and suppressive DCs have a nearly equally high probability of being immune resting
Note that summation of the three probabilities score is 1. According to our definition the state with the highest score defines the state attributed to the sample Summary: The resting and suppressive DCs have a nearly equally high probability of being immune resting
Note that summation of the three probabilities score is 1. According to our definition the state with the highest score defines the state attributed to the sample

DETERMINING FUNCTIONAL STATUS OF IMMUNE CELLS TYPES AND IMMUNE RESPONSE

CROSS-REFERENCE TO PRIOR APPLICATIONS

This application is the U.S. National Phase application under 35 U.S.C. § 371 of International Application No. PCT/EP2018/076614, filed on Oct. 1, 2018, which claims the benefit of U.S. Patent Application Nos. 62/683,710 and 62/566,755, filed on Jun. 12, 2018 and Oct. 2, 2017. These applications are hereby incorporated by reference herein.

FIELD OF THE INVENTION

The present invention generally relates to the field of bioinformatics, immunology and diagnostics, genomic processing, proteomic processing, and related arts. More particularly, the present invention relates to a method for determining functional status of at least one immune cell type in at least one sample of a subject based on activity of at least one signaling pathway in the at least one immune cell type. The present invention further relates to a method for determining innate or adaptive immune system activity status of a subject based on functional status of at least one different innate or adaptive immune cell type in at least one sample of the subject. The present invention further relates to a method for determining overall immune system activity status of a subject based on innate and adaptive immune system activity status of the subject, or based on functional status of at least one different innate immune cell type and at least one different adaptive immune cell type in at least one sample of the subject. The present invention further relates to an apparatus comprising at least one digital processor configured to perform at least one of the above methods. The present invention further relates to a non-transitory storage medium storing instructions that are executable by a digital processing device to perform at least one of the above methods. The present invention further relates to a computer program comprising program code means for causing a digital processing device to perform at least one of the above methods, when the computer program is run on a digital processing device. The present invention further relates to a kit as well as a system for performing at least one of the above methods.

BACKGROUND OF THE INVENTION

An appropriately functioning immune system is crucial for maintaining health and limiting the damage of disease. An appropriate immune response protects against disease, is relevant for the course of a disease and may be required for optimal effect of therapeutics.

The immune system is made up by a large number of immune cell types that work together in a coordinated manner to produce the right immune response to for example an invading pathogen or an internal disease like cancer. A distinction is made between the innate immune system which controls the early non-specific inflammatory response, and the adaptive immune response that controls long term specific immune responses.

The mechanistic principle behind its functioning is that the immune system generates an immune response to non-self antigens, like an infectious agent or an abnormal protein on a cancer cell. Recognition of such antigens is at the core of a functioning immune system. After an elaborate process in which non-self antigens are recognized as non-self, effector T cells are instructed to find and recognize the specific antigen and attack the invader carrying the antigen.

The right balance between over and underactivity of the system is crucial for development of disease and correction of the balance is an important therapeutic approach.

Both overactivity as well as inactivity can lead to disease, and multiple drugs are available and being developed to correct a defect in the immune response causing a specific disease, either to increase the activity of the immune system, like in cancer or infections, or to reduce its activity, like in auto-immune disease, or allogenic transplantations.

Predicting and monitoring which therapy is most effective is difficult, specifically also in the case of (drug-based) therapies which specifically target a cellular mechanism underlying the abnormal function of the immune system.

A few example diseases in which the immune response is therapeutically modulated in order to treat the disease are cancer, kidney transplantation, rheumatoid arthritis, psoriasis, diabetes.

Especially for treatment of cancer patients with immunotherapy recently a lot of progress has been made and many drugs have been, and are being developed, for this purpose. In case of cancer, in addition to effects of changes in the genome of cancer cells, cancer growth and metastasis are influenced by the cancer cell microenvironment, mainly consisting of fibroblasts and cells of the immune system. Infiltration of cancer tissue by immune cells, both of the innate and adaptive immune system, e.g. of the monocyte macrophage lineage and a variety of lymphocyte subtypes plays an important role, either in mounting an immune response (appropriately active antigen-presenting dendritic cells, cytotoxic T cells and CD4+ helper T cells) or creating immune tolerance to the cancer cells (regulatory/suppressor T cells, inhibition of activity of immune cells by production of IL10 or TGF-β), or even promoting tumor progression. Thus, immune cell infiltration can have both tumor suppressive as well as tumor promoting effects, depending on the immune subtypes present, their functional status and the type of cancer cell.

In general, in cancer, especially in advanced cancer, the immune response has failed, either because it is not aware of cancer cells present, or it has become exhausted ("tolerant") by continuous interaction with cancer antigens.

Immunotherapy for cancer aims at respectively enabling or restoring an effective anti-cancer immune response. In the first case when the immune system was not aware of the cancer being present, full cure of cancer may in principle be possible once an effective immune response is generated, for example by vaccination with cancer antigens, and therapy duration is limited. In contrast, in the case of an exhausted immune system cure will in general not be possible, which necessitates continuation of therapy as long as possible, in this case by interfering with the immune suppressive (inter) actions of cancer cells and various immune cells, especially CD8+ T cells by checkpoint inhibitor drugs. A large number of immunotherapy drugs which activate the immune response in a targeted manner is in development, for example by blocking PD1-PDL1 (immune activity checkpoint) interaction and signaling, and also to enhance antigen presentation function of dendritic cells.

Dendritic cells play a key role in the immune response by their unique capability to recognize, process and present antigens, for example from cancer cells, but also from other sources like pathogens, and either use the presentation of these antigens within HLA type II molecules on the cell membrane to locally present to naïve lymphocytes or to lymphocytes in lymph nodes. In the latter case the dendritic cells travel to the lymph node.

Dendritic cells can be a clinically very useful target for immunotherapy in cancer, for example dendritic cells can be isolated from blood of a (melanoma) cancer patient and in vitro confronted with relevant cancer antigens, to be subsequently reintroduced into the patient to activate tumor killing lymphocytes; alternatively radiotherapy can be used to release cancer antigens from a metastatic tumor, resulting in activation of the antigen-presenting function of dendritic cells, which may lead to an in vivo vaccination against the cancer (called: "abscopal effect"), which in a percentage of patients leads to a generalized immune response against cancer and a complete cure of the disease; alternatively drugs can be used to activate the antigen-processing/presenting function of the dendritic cells by administration of specific drugs, leading to enhanced antigen presentation.

In all cases it has not been possible to date to identify responders to such a dendritic cell-targeted therapy before start of the therapy, and assessment of response is only possible after months of therapy, which is costly and causes side effects. When a good biomarker would be available to predict response and rapidly measure actual response after start of the therapy (that is, within 3 months, preferably weeks), this is expected to increase the response rate, reduce costs associated with treatment and side effects, and increase quality of life of the patient.

Many other diseases, specifically (auto)immuno-mediated diseases and immunodeficiency diseases are also treated with immunomodulatory drugs, in the first case the immune response needs to be dampened, in the second case it needs to be increased in effectiveness. In all cases it is important that the effect of the drug is as specific in correcting the defect as possible. Also here, a large number of drugs are being developed, with often the same challenges as described for cancer.

In immunotherapy (for all diseases) such as dendritic cell-targeted therapy, there are a number of clinical challenges: (1) predict therapy response in the individual patient, since only a small percentage will respond; this also includes prediction of response to combination immunotherapy versus monotherapy, in case of cancer also in vivo vaccination by inducing release of antigens from the cancer cells (e.g. by radiation), and other vaccination therapies; (2) assess as soon as possible whether a therapy is effective in view of side effects and costs; (3) identify patients that are at risk of severe side-effects of immunotherapy.

Neither of the challenges has been adequately addressed. For example, for cancer, quantification of CD8+ and CD3/4+ cells is available as well as PD1 and PD-L1 staining to predict therapy response, however neither is reliable. Therapy response assessment is generally possible about 3-6 months after initiation of therapy.

Therefore, there is a high need for biomarker-based assays which can predict and assess/monitor therapy response to specific immunotherapy drugs or drug/therapy combinations, in case of cancer also including combinations between immunotherapy drugs and other therapies which induce release of antigens from cancer cells, like radiation, chemotherapy and targeted therapy.

SUMMARY OF THE INVENTION

In accordance with a first aspect of the present invention, the above problem is solved by a method for determining functional status of at least one immune cell type in at least one sample of a subject, wherein the method comprises: determining the functional status of the at least one immune cell type based on activity of at least one signaling pathway in the at least one immune cell type in the at least one sample of the subject. In one embodiment, the method further comprises providing the functional status of the at least one immune cell type, e.g. as an input variable or input value for further methods, in particular the methods according to the second, third and fourth aspect of the present invention.

In another embodiments, the method further comprises providing the functional status of the at least one immune cell type for the purpose of the various uses discloses herein, such as diagnosis, or the like.

In a preferred embodiment, the functional status of the at least one immune cell type is based on an activity profile of signaling pathways in the at least one immune cell type in the at least one sample of the subject. An activity profile of signaling pathways may include 1, 2, 3, 4, 5, 6, 7 or 8, or even more, different signaling pathways.

Every immune cell type, like CD4+Th1 and Th2 cells, CD8+ T-cells, T-Reg cells, B-cells, neutrophils, monocytes, macrophages, and dendritic cells has a specific function in the immune response by which it can be in principle characterized and recognized. For each immune cell type there is an inactive (herein also referred to as "resting") state and an activated (herein also referred as a "supportive" state) in which activity is directed towards eradicating an immune target like a cancer antigen or a pathogen. For some types of immune cells (dendritic cells, Treg cells) there is also a "suppressive" state in which the immune cell suppresses other immune cells in their function. Immune cells communicate with each other using cell-cell interaction and through soluble molecules like cytokines and chemokines to coordinate their activity. AR, ER, HH, JAK-STAT1/2 (comprising the JAK-STAT1/2 IFN Type I (which is activated by the Interferon type I cytokines) and JAK-STAT1/2 type II IFN (which is activated by the Interferon type II cytokines)), JAK-STAT3, MAPK-AP-1, NFkB, Notch, PI3K, TGF-β, and Wnt are signal transduction pathways which mediate such communication between cells and determine functional activities in cells as a consequence of the communication. These signaling pathways also play important roles in the functioning of the different immune cell types.

The present invention is based on the finding that analysis of signal transduction pathway activity can be used to characterize the type of immune cells as well as the functional status of the various immune cell types that play a role in the immune response. The resultant immune response as a consequence of communication between immune cells of various types can be towards activity, for example anti-tumor activity, or towards immunosuppression or tolerance against antigens, like is normally the case for self-antigens in the body, but can also be the case in cancer when the immune system does not attack the cancer cells. In the latter case, as an example some membrane proteins interfering with adequate anti-tumor immune cell activity are PD1 on the CD8+ lymphocytes and PD-L1 on the cancer cells. Some (limited) signaling pathway activities in immune cells have been described in relation to their function: PD1 signaling may result in increased FOXO transcription factor activity and reduced PI3K pathway activity (these are inversely related), and increased TGF-β pathway activity; PD-L1 signaling (tumor and immune cells) may activate NFkB and MAPK-AP-1 pathways; effective T cell receptor signaling induces PI3K pathway activity; IL2 activates dendritic cell antigen presentation through activation of the JAK-STAT1/2 pathway. How these pathway activities relate to each other in determining the functional state of the various immune cells has not been known.

The present invention for the first time provides a method which enables interpretation of the pathway activities and determination of the functional status of immune cells. The inventors found that the functional status (e.g. resting, supportive, suppressive, naïve, memory) of individual immune cell types can be assessed by measuring activity of one or more signal pathways that control immune cell function in the different immune cell types in an immune cell type-specific manner. The inventors therefore inferred the activity of different signal pathways (AR, ER, HH, JAK-STAT1/2, JAK-STAT3, MAPK-AP-1, NFkB, Notch, PI3K, TGF-β3, and Wnt pathways) in different immune cell types having a known functional status and developed a computational model for interpretation per immune cell type the measured pathway activities to be able to predict the functional status of the immune cell types having an unknown functional status based on pathway activity. The JAK-STAT1/2 pathway is used to indicate one or both of its variants (JAK-STAT1/2 Interferon type I (IFN type I) and JAK-STAT1/2 Interferon type II (IFN type II)) unless one of the variants is specifically mentioned.

The activity of one or more signaling pathways can thus be used as a biomarker that characterizes the functional state of an immune cell, e.g. a dendritic cell, which will be useful for therapy choice in patients with cancer or other diseases in which the immune response needs to be activated, but also in patients with for example rheumatoid arthritis, or other diseases in which the immune response needs to be dampened.

The term "subject", as used herein, refers to any living being. In some embodiments, the subject is an animal, preferably a mammal. In certain embodiments, the subject is a human being, preferably a medical subject, in particular a subject having cancer. In still other embodiments, the subject is a cell line, cultured cells or tissue.

The terms "pathway", "signal transduction pathway" and "signaling pathway" are used interchangeably herein. The at least one signaling pathway may control immune cell function of the at least one immune cell type.

The term "activity of the at least one signaling pathway" may refer to the activity of a signaling pathway associated transcription factor (TF) element in the sample, the TF element controlling transcription of target genes, in driving the target genes to expression, i.e., the rate by which the target genes are transcribed, e.g. in terms of high activity (i.e. high rate) or low activity (i.e. low rate), or respective scores, values or parameters related to such activity. The transcription factor activity is a readout for activity of the associated pathway. The pathway activity may be represented by, for example, by an activity level. Such activity level is preferably a numerical value that represents the activity of the pathway.

The term "functional status" is interchangeably used herein with the terms "functional state", "functional activity state" or "activity state", and may describe a status, e.g. an activity, of an immune function of an immune cell, for example whether the immune function is active or inactive. The term may also refer to a score that is indicative for the functional status. "Functional" refers in this document to activity status of an immune cell type and/or immune response. The term "score indicative for the functional status" is interchangeably used herein with the terms activity score and immune cell activity score.

The sample(s) to be used in accordance with the present invention can be generally an extracted sample, that is, a sample that has been extracted from the subject. Examples of the sample include, but are not limited to, a tissue, cells, blood and/or a body fluid such as a bronchial aspirate, bone marrow aspirate or a sample drawn from a body cavity of a subject.

According to a preferred embodiment of the first, second, third and fourth aspect of the present invention and the various embodiments thereof, the at least one sample may stem from a location of the subject, where the at least one immune cell type is present. In particular, the sample is an immune cell type-containing tissue, lymph node (e.g. draining lymph node) and/or blood sample. Cells comprised in the sample can also be isolated from a bronchial aspirate, bone marrow aspirate or a body cavity. Accordingly, the sample can also be an immune cell type-containing bronchial aspirate, bone marrow aspirate and/or a body cavity sample. In some embodiments, immune cells from all of tissue, lymph node and blood are assessed. The functional immune response against cancer has been summarized and explained using the so called "immune cycle" (FIG. 8; cf. Chen D. S. and Mellman I., "Oncology meets immunology: The cancer-immunity cycle", Immunity, Vol. 39, No. 1, July 2013, pages 1 to 10). Simplified, the cycle shows that for an effective anti-cancer immune response, in the tumor tissue cancer antigens are taken up by dendritic cells, carried to the draining lymph node and presented to CD4+ and CD8+ T cells, that are activated; CD4+ T cells are activated into TH1 cells which co-activate CD8+ cells, which travel through the blood to the cancer tissue where they attack cancer cells. NK cells are activated in the tumor by the absence of a normal HLA-I complex. In the cancer tissue, cancer cells can fail in presenting the proper antigens, they can suppress activity of dendritic cells and T cells, resulting in a lack of anti-tumor activity.

For example, in a patient with cancer a tissue sample can be taken from a tumor tissue, a lymph node and/or peripheral blood, and/or from another location as described further above, and from the sample(s) immune cells such as antigen presenting cells like dendritic cells can be isolated using appropriate recognizing antibodies, for example for blood samples anti-CD1c+ and anti-CD141+ for myeloid DCs and anti-CD303+ for plasmacytoid DCs. Based on the result and the provided functional state, or the score indicative for the functional state, of the dendritic cells, it can be decided that the patient is likely to benefit from a form of immunotherapy. In another example prediction of response is based on a single sample type analysis.

In another example the patient is receiving a form of immunotherapy, or immunomodulatory therapy, and a blood sample or blood samples at different time points can be taken to isolate (subpopulations of) immune cell types, e.g. dendritic cells, and determine the activity status to assess the efficacy of the treatment. By measuring pathway activity (or preferably pathway activity profiles, i.e. each activity of 1, 2, 3, 4, 5, 6, 7 or 8 or more pathways) in the immune cell types from the three locations (or one or two locations) and assessing the activity or immune suppressed status, functional activity status of the dendritic cell types, or mixtures of dendritic immune cell types, in terms of signaling pathway activity can be characterized, for example resting state versus (e.g. anti-tumor) activated state versus immune suppressive (e.g. tumor tolerant or tolerogenic) state.

In another example the patient does not have cancer but another disease, like for example an auto-immune disease, like for example rheumatoid arthritis or SLE. In this case a tissue sample can be taken from the diseases tissue, for example synovial tissue in the case of rheumatoid arthritis, and/or a cell sample from blood, from which for example dendritic cells isolated, and the activity status determined to predict or monitor response to therapy (cf. Khan S., Greenberg J. D., Bhardwaj N., "Dendritic cells as targets for therapy in rheumatoid arthritis", Nature Reviews Rheumatology, Vol. 5, No. 10, October 2009, pages 566 to 571).

The term "sample", as used herein, also encompasses the case where e.g. a tissue and/or draining lymph node and/or blood of the subject have been taken from the subject and, e.g., have been put on a microscope slide, and where for performing the claimed method a portion of this sample is extracted, e.g., by means of Laser Capture Microdissection (LCM), or by scraping off the cells of interest from the slide, or by fluorescence-activated cell sorting techniques.

By measuring pathway activity and preferably pathway activity profiles in the immune cell types, e.g. dendritic cell types, and assessing the activity or immune suppressed status, functional activity status, or a score indicative of the functional activity status of the immune cell types, e.g. dendritic cell types, or mixtures of dendritic immune cell types can be characterized, for example resting state versus (e.g. anti-tumor) activated state and optionally versus immune suppressive (e.g. tumor tolerant or tolerogenic) state. This can be used to assess the immune response, specifically the role of the immune cell type such as dendritic cells therein, against the tumor prior to start of therapy, measure therapy response during therapy, adjust/optimize the dosage of the therapy, monitor the immune response state during any disease, predict side effects of immunomodulatory therapy, or to measure compliance to immunomodulatory drugs, and/or monitor an immune mediated disease. The therapy can be immunotherapy, but also another therapy (e.g. chemo, targeted, radiation, etc.) which will, by killing tumor cells, release antigens from tumor cells which have an effect on the immune response.

According to a preferred embodiment of the first, second, third and fourth aspect of the present invention and the various embodiments thereof, the at least one immune cell type is selected from the group consisting of: (i) innate immune cells, in particular Natural Killer (NK) cells, polymorphonuclear leukocytes (PMNs), in particular neutrophils, macrophages, monocytes, dendritic cells, including myeloid dendritic cells, plasmacytoid dendritic cells and classical dendritic cells, peripheral and blood mononuclear cells (PBMCs) and (ii) adaptive immune cells, in particular B lymphocytes, T lymphocytes and subtypes thereof, in particular CD4+ T cells, CD4+Th1 cells, CD4+Th2 cells, CD4+T regulatory (T-reg) cells, CD4+T memory cells, CD8+ T cells and CD8+T memory cells.

According to a preferred embodiment of the first, second, third and fourth aspect of the present invention and the various embodiments thereof, the functional status of the at least one immune cell type to be determined by the method of the present invention is selected from the group consisting of a resting status, a supportive status, a suppressive status, a memory status and a naive status.

As discussed above, each immune cell type may be present in an inactive, i.e. "resting", state and an activated, i.e. "supportive" state in which activity is directed towards eradicating an immune target like a cancer antigen or a pathogen. For some types of immune cells (e.g. dendritic cells, Treg cells) there is also a "suppressive" state in which the immune cell suppresses other immune cells in their function.

As used herein, "resting" is the default state of all immune cell types, when they are not activated or in a suppressive state. "Immune supportive" generally describes a state, in which the cell's activity is directed towards eradicating an immune target, whereas the term "immune suppressed" indicates a state, in which a cell's activity is directed towards suppression of one or more other immune cell(s) in function.

"Naïve", as used herein, means that the cells have not yet encountered a specific antigen, whereas "memory" as used herein, means that the cells have encountered a specific antigen but are in a "sleeping" state to become immediately active upon antigen exposure.

According to a preferred embodiment of the first aspect of the present invention and the various embodiments thereof, the determination of the functional status of the immune cell type is done by means of a mathematical model (herein also denoted as immune system pathway model), in particular a calibrated mathematical model. This model may be programmed to interpret the activity of the at least one signaling pathway so as to determine the functional state of the immune cell type based on the at least one signaling pathway activity and preferably a pathway activity profile as disclosed herein. In particular, the determination of the functional status of the at least one immune cell type comprises (i) receiving activity of the at least one signaling pathway in the at least one immune cell type, (ii) determining the functional status of the at least one immune cell type, the determining being based on evaluating a calibrated mathematical model relating the activity of the at least one signaling pathway to the score indicative for the functional status of the at least one immune cell type.

In a preferred embodiment of the first aspect of the present invention and the various embodiments thereof, the calibrated mathematical pathway model is a centroid or a linear model, or a Bayesian network model based on conditional probabilities. For example, the calibrated mathematical pathway model may be a probabilistic model, preferably a Bayesian network model, based on conditional probabilities relating the functional status, or the score indicative for the functional status and the activity, or activity level, of at least 1, 2, 3 or 4 of the at least one signaling pathway, or the calibrated mathematical pathway model may be based on one or more linear combination(s) of the activity of at least 1, 2, 3 or 4 of the at least one signaling pathway.

In accordance with the mathematical model, the activity of the signaling pathway(s) are interpreted to provide a score indicative for the functional status of an immune cell type. This score predicts or provides a probability of the functional status of the immune cell type, in terms of, e.g., resting, supportive, suppressive, naive or memory.

In a preferred embodiment of the first aspect of the present invention and the various embodiments thereof, the determination of the functional status of the at least one immune cell type comprises discriminating between two or three functional states of the at least one immune cell type. The discrimination may be done based on the following relationships. It is to be understood that for the purposes of the present invention at least 1, preferably at least 2, or even 3, 4 or even more (if present) of the relationships per one immune cell type applies. To make an example, in order to discriminate between functional states of neutrophils, the at least one signaling pathways activities may be chosen from AR, ER, HH, JAK-STAT1/2, JAK-STAT3, MAPK-AP-1, NFkB, Notch, PI3K, TGF-β, and Wnt, and it may be determined whether, e.g. PI3K pathway activity is increased or not (as compared to neutrophils in the supportive state) based on the flowing relationships:

In neutrophils, a resting status is characterized by a higher PI3K, a lower NFkB, a lower TGF-β, a lower JAK-STAT1/2, a lower JAK-STAT3, a lower Wnt and a lower Notch pathway than a supportive status;

in monocytes a resting status is characterized by a higher PI3K, a lower NFkB, a lower TGF-β, a lower Notch and a lower JAK-STAT3 pathway than a supportive status;

in dendritic cells a resting status is characterized by a lower PI3K, a lower NFkB, a lower JAK-STAT1/2, a lower TGF-β and a lower JAK-STAT3 pathway than a supportive status;

in dendritic cells a resting status is characterized by a lower PI3K, a higher NFkB and a lower JAK-STAT1/2 pathway than a suppressive status;

in dendritic cells a supportive status is characterized by a higher PI3K, a higher NFkB, a higher JAK-STAT1/2 and a higher TGF-β pathway than a suppressive status;

in macrophages a resting status is characterized by a lower NFkB, a lower Notch, a lower JAK-STAT1/2 and a lower JAK-STAT3 pathway than a supportive status;

in CD4+ T cells a resting status is characterized by a higher PI3K, a lower NFkB, a lower JAK-STAT3, a lower Notch and a lower JAK-STAT1/2 pathway than a supportive status;

in CD4+ T cells a resting status is characterized by a lower PI3K, a lower NFkB, a lower JAK-STAT3 and a lower TGF-β pathway than a suppressive status;

in CD4+ T cells a supportive status is characterized by a lower PI3K, a higher NFkB, a higher JAK-STAT3, a lower TGF-β and a lower JAK-STAT1/2 pathway than a suppressive status;

CD4+Th1 cells are characterized by a lower PI3K, a higher NFkB, a higher TGF-β and a higher JAK-STAT1/2 pathway than CD4+Th2 cells;

in T-reg cells a resting status is characterized by a lower PI3K, a lower NFkB, a lower JAK-STAT3, a lower TGF-β and a lower Notch pathway than a suppressive status;

in CD8+ T cells a resting status is characterized by a lower PI3K, a lower NFkB, a lower JAK-STAT3, a lower TGF-β, a lower Notch and a lower JAK-STAT1/2 pathway than a supportive status;

T memory cells are characterized by a higher PI3K, a higher NFkB and a higher TGF-β pathway than T naïve cells;

in B lymphocytes a resting status is characterized by a higher PI3K, a lower NFkB and a lower JAK-STAT3 pathway than a supportive status.

According to a preferred embodiment of the first, second, third and fourth aspect of the present invention and the various embodiments thereof, the at least one signaling pathway is selected from the group of AR, ER, HH, JAK-STAT1/2, JAK-STAT3, MAPK-AP-1, NFkB, Notch, PI3K, TGF-β, and Wnt signaling pathways.

In a preferred embodiment, the at least one signaling pathway comprises two or more signaling pathways selected from the aforementioned group and the determining is based on activity of the two or more signaling pathways.

Preferably, the at least one signaling pathway comprises at least 1, 2, 3, 4, 5, 6, 7 or all of MAPK-AP-1, PI3K, NFkB, TGF-β, JAK-STAT3, JAK-STAT1/2, Notch and Wnt signaling pathways. More preferably, the at least one signaling pathway comprises at least 1, 2, 3, 4 or all of PI3K, NFkB, TGF-β, JAK-STAT1/2 and JAK-STAT3 signaling pathways. Even more preferably, the at least one signaling pathway comprises at least 1 or both of PI3K and NFkB signaling pathways, or at least 1, 2, 3 or all of PI3K, NFkB, JAK-STAT3 and TGF-β signaling pathways in case of innate immune cell types and/or at least 1, 2 or all of PI3K, NFkB and JAK-STAT3 in case of adaptive immune cell types.

All functions of immune cells are described in the Immune Cycle (FIG. 8; cf. Chen D. S. and Mellman I., "Oncology meets immunology: The cancer-immunity cycle", Immunity, Vol. 39, No. 1, July 2013, pages 1 to 10), including antigen presenting cells like dendritic cells. They are controlled by signal transduction pathways, of which the JAK-STAT1/2, JAK-STAT3, MAPK-AP-1, NFkB, Notch, PI3K, and TGF-β pathways are found to be important. Pathway analysis as described herein and its quantitative interpretation makes it possible to characterize immune cells, including antigen-presenting cells, and dendritic cells, with respect to their functional status. This enables for example to predict and assess immunotherapy efficacy.

According to a preferred embodiment of the first, second, third and fourth aspect of the present invention and the various embodiments thereof, the activity of signal pathways of the various immune cell types is determinable, e.g., in cell or issue sample isolated from a subject, by pathway analysis as described herein.

Pathway analysis enables quantitative measurement of signal transduction pathway activity in immune cells present in tissue/cell samples, based on inferring activity of a signal transduction pathway from measurements of mRNA levels of the well-validated direct target genes of the transcription factor associated with the respective signaling pathway (see, for example, Verhaegh W. et al., "Selection of personalized patient therapy through the use of knowledge-based computational models that identify tumor-driving signal transduction pathways", Cancer research, Vol. 74, No. 11, June 2014, pages 2936 to 2945; Verhaegh W., van de Stolpe A., "Knowledge-based computational models", Oncotarget, Vol. 5, No. 14, July 2014, pages 5196 and 5197).

According to a preferred embodiment of the first, second, third and fourth aspect of the present invention and the various embodiments thereof, the determining of the activity of one or more pathways, the combination of multiple pathway activities and applications thereof is performed as described for example in the following documents, each of which is hereby incorporated in its entirety for the purposes of determining activity of the respective signaling pathway: International patent applications WO2013011479 (titled "Assessment of cellular signaling pathway activity using probabilistic modeling of target gene expression"), WO2014102668 (titled "Assessment of cellular signaling pathway activity using linear combination(s) of target gene expressions"), WO2015101635 (titled "Assessment of PI3K cellular signaling pathway activity using mathematical modelling of target gene expression"), WO2016062891 (titled "Assessment of TGF-β cellular signaling pathway activity using mathematical modelling of target gene expression"), WO2017029215 (titled "Assessment of NFKB cellular signaling pathway activity using mathematical modelling of target gene expression"), WO2014174003 (titled "Medical prognosis and prediction of treatment response using multiple cellular signaling pathway activities"), WO2016062892 (titled "Medical prognosis and prediction of treatment response using multiple cellular signaling pathway activities"), WO2016062893 (titled "Medical prognosis and prediction of treatment response using multiple cellular signaling pathway activities"), WO2018096076 (titled "Method to distinguish tumor suppressive FOXO activity from oxidative stress"), PCT/EP2018/07633 (filed on Sep. 27, 2018, titled "Assessment of JAK-STAT1/2 cellular signaling pathway activity using mathematical modelling of target gene expression"), PCT/EP2018/076232 (filed on Sep. 27, 2018, titled "Assessment of JAK-STAT3 cellular signaling pathway activity using mathematical modelling of target gene expression"), PCT/EP2018/076488 (filed on Sep. 28, 2018, titled "Assessment of Notch cellular signaling pathway activity using mathematical modelling of target gene expression"), PCT/EP2018/076513, (filed on Sep. 28, 2018, "Assessment of MAPK-AP 1 cellular signaling pathway activity using mathematical modelling of target gene expression"), US patent applications U.S. Ser. No. 16/143,885 (filed on Sep. 27, 2018, titled "DETERMINATION OF JAK-STAT1/2 PATHWAY ACTIVITY USING UNIQUE COMBINATION OF TARGET GENES"), U.S. Ser. No. 16/143,708 (filed on Sep. 27, 2018, titled "DETERMINATION OF JAK-STAT3 PATHWAY ACTIVITY USING UNIQUE COMBINATION OF TARGET GENES"), U.S. Ser. No. 16/145,263 (filed on Sep. 28, 2018, titled "DETERMINATION OF NOTCH PATHWAY ACTIVITY USING UNIQUE COMBINATION OF TARGET GENES"), U.S. Ser. No. 16/145,722 (filed on Sep. 28, 2018, titled "DETERMINATION OF MAPK-AP-1 PATHWAY ACTIVITY USING UNIQUE COMBINATION OF TARGET GENES"), and EP patent applications EP16200697.7 (filed on Nov. 25, 2016; titled "Method to distinguish tumor suppressive FOXO activity from oxidative stress"), EP17194288.1 (filed on Oct. 2, 2017; titled "Assessment of Notch cellular signaling pathway activity using mathematical modelling of target gene expression"), EP17194291.5 (filed on Oct. 2, 2017; titled "Assessment of JAK-STAT1/2 cellular signaling pathway activity using mathematical modelling of target gene expression"), EP17194293.1 (filed on Oct. 2, 2017; titled "Assessment of JAK-STAT3 cellular signaling pathway activity using mathematical modelling of target gene expression") and EP17209053.2 (filed on Dec. 20, 2017, titled "Assessment of MAPK-AP-1 cellular signaling pathway activity using mathematical modelling of target gene expression"). The models have been biologically validated for JAK-STAT1/2, JAK-STAT3, MAPK-AP-1, NFkB, Notch, PI3K, TGF-β, and Wnt pathways on several cell types. It is noted that the mathematical models employed in the patent applications that are not yet published as well as the calibration and use of these models in these applications generally correspond to the models, calibration and use disclosed in the already published patent applications.

To facilitate rapid identification of references, the above-mentioned references have been assigned to each signaling pathway of interest here and exemplarily corresponding target genes suitable for determination of the signaling pathway's activity have been indicated. In this respect, particular reference is also made to the sequence listings for the target genes provided with the above-mentioned references.

AR: KLK2, PMEPA1, TMPRSS2, NKX3 1, ABCC4, KLK3, FKBP5, ELL2, UGT2B15, DHCR24, PPAP2A, NDRG1, LRIG1, CREB3L4, LCP1, GUCY1A3, AR and EAF2 (WO 2013/011479, WO 2014/102668); KLK2, PMEPA1, TMPRSS2, NKX3 1, ABCC4, KLK3, FKBP5, ELL2, UGT2B15, DHCR24, PPAP2A, NDRG1, LRIG1, CREB3L4, LCP1, GUCY1A3, AR, and EAF2 (WO 2014/174003);

ER: CDH26, SGK3, PGR, GREB1, CA12, XBP1, CELSR2, WISP2, DSCAM, ERBB2, CTSD, TFF1 and NRIP1 (WO 2013/011479, WO 2014/102668); GREB1, PGR, XBP1, CA12, SOD1, CTSD, IGFBP4, TFF1, SGK3, NRIP1, CELSR2, WISP2, and AP1B1 (WO 2014/174003); AP1B1, ATP5J, COL18A1, COX7A2L, CTSD, DSCAM, EBAG9, ESR1, HSPB1, KRT19, NDUFV3, NRIPI, PGR, PISD, PRDM15, PTMA, RARA, SOD1, TFF1, TRIM25, XBP1, GREB1, IGFBP4, MYC, SGK3, WISP2, ERBB2, CA12, CDH26, and CELSR2 (WO 2016/062892, WO 2016/062893);

HH: GLI1, PTCH1, PTCH2, IGFBP6, SPP1, CCND2, FST, FOXL1, CFLAR, TSC22D1, RAB34, S100A9, S100A7, MYCN, FOXM1, GLI3, TCEA2, FYN and CTSL1 (WO 2013/011479, WO 2014/102668, WO 2014/174003); GLI1, PTCH1, PTCH2, HHIP, SPP1, TSC22D1, CCND2, HI 9, IGFBP6, TOM1, JUP, FOXA2, MYCN, NKX2-2, NKX2-8, RAB34, MIF, GLI3, FST, BCL2, CTSL1, TCEA2, MYLK, FYN, PITRM1, CFLAR, IL1R2, S100A7, S100A9, CCND1, JAG2, FOXM1, FOXF1, and FOXL1 (WO 2016/062892, WO 2016/062893);

JAK-STAT1/2: BID, GNAZ, IRF1, IRF7, IRF8, IRF9, LGALS1, NCF4, NFAM1, OAS1, PDCD1, RAB36, RBX1, RFPL3, SAMM50, SMARCB1, SSTR3, ST13, STAT1, TRMT1, UFD1L, USP18, and ZNRF3, preferably, from the group consisting of: IRF1, IRF7, IRF8, IRF9, OAS1, PDCD1, ST13, STAT1 and USP18 (EP17194291.5, supra);

JAK-STAT3: AKT1, BCL2, BCL2L1, BIRC5, CCND1, CD274, CDKN1A, CRP, FGF2, FOS, FSCN1, FSCN2, FSCN3, HIF1A, HSP90AA1, HSP90AB1, HSP90B1, HSPA1A, HSPA1B, ICAM1, IFNG, IL10, JunB, MCL1, MMP1, MMP3, MMP9, MUC1, MYC, NOS2, POU2F1, PTGS2, SAA1, STAT1, TIMP1, TNFRSF1B, TWISTI, VIM and ZEB1 (EP17194293.1, supra);

MAPK-AP-1: BCL2L11, CCND1, DDIT3, DNMT1, EGFR, ENPP2, EZR, FASLG, FIGF, GLRX, IL2, IVL, LOR, MMP1, MMP3, MMP9, SERPINE1, PLAU, PLAUR, PTGS2, SNCG, TIMP1, TP53 and VIM (EP17209053.2, supra);

NFkB: BCL2L1, BIRC3, CCL2, CCL3, CCL4, CCL5, CCL20, CCL22, CX3CL1, CXCL1, CXCL2, CXCL3, ICAM1, IL1B, IL6, IL8, IRF1, MMP9, NFKB2, NFKBIA, NFKB IE, PTGS2, SELE, STAT5A, TNF, TNFAIP2, TNIP1, TRAF1 and VCAM1 (WO 2017/029215);

Notch: CD28, CD44, DLGAP5, DTX1, EPHB3, FABP7, GFAP, GIMAP5, HES1, HES4, HES5, HES7, HEY1, HEY2, HEYL, KLF5, MYC, NFKB2, NOX1, NRARP, PBX1, PIN1, PLXND1, PTCRA, SOX9 and TNC (EP 17194288.1, supra);

PI3K: AGRP, BCL2L11, BCL6, BNIP3, BTG1, CAT, CAV1, CCND1, CCND2, CCNG2, CDK 1A, CDK 1B, ESR1, FASLG, FBX032, GADD45A, INSR, MXI1, NOS3, PCK1, POMC, PPARGCIA, PRDX3, RBL2, SOD2 and TNFSF10 (WO 2015/101635); ATP8A1, BCL2L11, BNIP3, BTG1, ClOorflO, CAT, CBLB, CCND1, CCND2, CDKNIB, DDB1, DYRK2, ERBB3, EREG, ESR1, EXT1, FASLG, FGFR2, GADD45A, IGF1R, IGFBP1, IGFBP3, INSR, LGMN, MXII, PPM1D, SEMA3C, SEPP1, SESN1, SLC5A3, SMAD4, SOD2, TLE4, and TNFSF10 (WO 2016/062892, WO 2016/062893); SOD2, BNIP3, MXII, PCK1, PPARGC1A and CAT (EP16200697.7, supra);

TGF-β: ANGPTL4, CDC42EP3, CDKNIA, CDKN2B, CTGF, GADD45A, GADD45B, HMGA2, ID1, IL11, SERPINE1, INPP5D, JUNB, MMP2, MMP9, NKX2-5, OVOL1, PDGFB, PTHLH, SGK1, SKIL, SMAD4, SMAD5, SMAD6, SMAD7, SNAI1, SNAI2, TIMP1 and VEGFA (WO 2016/062891, WO 2016/062893);

Wnt: KIAA1199, AXIN2, RNF43, TBX3, TDGF1, SOX9, ASCL2, IL8, SP5, ZNRF3, KLF6, CCND1, DEFA6 and FZD7 (WO 2013/011479, WO 2014/102668, WO 2014/174003); ADRA2C, ASCL2, AXIN2, BMP7, CCND1, CD44, COL18A1, DEFA6, DKK1, EPHB2, EPHB3, FAT1, FZD7, GLUL, HNF1A, CXCL8 (previously known as IL8), CEMIP (previously known as KIAA1 199), KLF6, LECT2, LEF1, LGR5, MYC, NKD1, OAT, PPARG, REGIB, RNF43, SLC1A2, SOX9, SP5, TBX3, TCF7L2, TDGF1, and ZNRF3 (WO 2016/062892, WO 2016/062893);

Common to the pathway analysis methods for determining the activities of the different signaling pathways as disclosed herein is a concept, which is preferably applied herein for the purposes of the present invention, wherein the activity of a signaling pathway in a cell such as an immune cell present in a sample is determinable by receiving expression levels of one or more, preferably three or more, target genes of the signaling pathway, determining an activity level of a signaling pathway associated transcription factor (TF) element in the sample, the TF element controlling transcription of the three or more target genes, the determining being based on evaluating a calibrated mathematical pathway model relating expression levels of the three or more target genes to the activity level of the signaling pathway, and optionally inferring the activity of the signaling pathway in the cell based on the determined activity level of the signaling pathway associated TF element in the sample. As described herein, the activity level may be directly used as an input to determine the functional status of the at least one immune cell type. Therefore, it is may not be necessary to explicitly infer the activity of the signaling pathway based the activity level of the TF element, but the activity level of the TF element may be directly used as the activity level of the signaling pathway.

As indicated above, the term "transcription factor element" (TF element), as used herein, preferably refers to an intermediate or precursor protein or protein complex of the active transcription factor, or an active transcription factor protein or protein complex which controls the specified target gene expression. For example, the protein complex may contain at least the intracellular domain of one of the respective signaling pathway proteins, with one or more co-factors, thereby controlling transcription of target genes. Preferably, the term refers to either a protein or protein complex transcriptional factor triggered by the cleavage of one of the respective signaling pathway proteins resulting in a intracellular domain.

The term "activity level" of a TF element, as used herein, denotes the level of activity of the TF element regarding transcription of its target genes.

The term "target gene", as used herein, means a gene whose transcription is directly or indirectly controlled by a respective transcription factor element. The "target gene" may be a "direct target gene" and/or an "indirect target gene" (as described herein).

The calibrated mathematical pathway model may be a probabilistic model, preferably a Bayesian network model, based on conditional probabilities relating the activity level of the signaling pathway associated TF element and the expression levels of the three or more target genes, or the calibrated mathematical pathway model may be based on one or more linear combination(s) of the expression levels of the three or more target genes. For the purposes of the present invention, the calibrated mathematical pathway model is preferably a centroid or a linear model, or a Bayesian network model based on conditional probabilities.

In particular, the determination of the expression levels of the target genes and optionally the inferring of the activity of a signaling pathway in the subject may be performed, for example, by inter alia (i) evaluating a portion of a calibrated probabilistic pathway model, preferably a Bayesian network, representing the cellular signaling pathways for a set of inputs including the expression levels of the three or more target genes of the cellular signaling pathway measured in a sample of the subject, (ii) estimating an activity level in the subject of a signaling pathway associated transcription factor (TF) element, the signaling pathway associated TF element controlling transcription of the three or more target genes of the cellular signaling pathway, the estimating being based on conditional probabilities relating the activity level of the signaling pathway associated TF element and the expression levels of the three or more target genes of the cellular signaling pathway measured in the sample of the subject, and optionally (iii) inferring the activity of the cellular signaling pathway based on the estimated activity level of the signaling pathway associated TF element in the sample of the subject. This is described in detail in the published international patent application WO 2013/011479 A2 ("Assessment of cellular signaling pathway activity using probabilistic modeling of target gene expression"), the contents of which are herewith incorporated in their entirety.

In an exemplary alternative, the determination of the expression level and optionally the inferring of the activity of a cellular signaling pathway in the subject may be performed by inter alia (i) determining an activity level of a signaling pathway associated transcription factor (TF) element in the sample of the subject, the signaling pathway associated TF element controlling transcription of the three or more target genes of the cellular signaling pathway, the determining being based on evaluating a calibrated mathematical pathway model relating expression levels of the three or more target genes of the cellular signaling pathway to the activity level of the signaling pathway associated TF element, the mathematical pathway model being based on one or more linear combination(s) of expression levels of the three or more target genes, and optionally (ii) inferring the activity of the cellular signaling pathway in the subject based on the determined activity level of the signaling pathway associated TF element in the sample of the subject. This is described in detail in the published international patent application WO 2014/102668 A2 ("Assessment of cellular signaling pathway activity using linear combination (s) of target gene expressions"), the contents of which are herewith incorporated in their entirety.

Further details regarding the inferring of cellular signaling pathway activity using mathematical modeling of target gene expression can be found in Verhaegh W. et al., "Selection of personalized patient therapy through the use of knowledge-based computational models that identify tumor-driving signal transduction pathways", Cancer Research, Vol. 74, No. 11, 2014, pages 2936 to 2945.

In an embodiment the signaling pathway measurements are performed using qPCR, multiple qPCR, multiplexed qPCR, ddPCR, RNAseq, RNA expression array or mass spectrometry. For example, a gene expression microarray data, e.g. Affymetrix microarray, or RNA sequencing methods, like an Illumina sequencer, can be used.

In accordance with a second aspect of the present invention, the problem is solved by a method for determining innate immune system activity status of a subject, wherein the method comprises: determining the innate immune system activity status based on functional status of at least one innate immune cell type in at least one sample of the subject. The functional status of the at least one innate immune cell type is preferably determinable by the method of the first aspect of the present invention.

In one embodiment, the method further comprises providing the innate immune system activity status, e.g. as an input variable or input value for further methods, in particular the method according to the fourth aspect of the present invention.

In another embodiment, the method further comprises providing the innate immune system activity status, e.g. for the various purposes as disclosed herein.

In accordance with a third aspect of the present invention, the problem is solved by a method for determining adaptive immune system activity status of a subject, wherein the method comprises: determining the adaptive immune system activity status based on functional status of at least one adaptive immune cell type in at least one sample of the subject. The functional status of the at least one adaptive immune cell type is preferably determinable by the method of the first aspect of the present invention.

In one embodiment, the method further comprises providing the adaptive immune system activity status, e.g. as an input variable or input value for the method according to the fourth aspect of the present invention.

In another embodiment, the method further comprises providing the adaptive immune system activity status, e.g. for the various purposes as disclosed herein.

In accordance with a fourth aspect of the present invention, the problem is solved by a method for determining overall immune system activity status of a subject, wherein the method comprises determining the overall immune system activity status based on innate and adaptive immune system activity status of the subject, the innate and/or adaptive immune system activity status being determinable by the method according to the second and third aspects of the present invention. Alternatively, the overall immune system activity status may be determined based on functional states of at least one different innate immune cell type and at least one different adaptive immune cell type in at least one sample of the subject, the functional states of the at least one different innate and/or adaptive immune cell type(s) being preferably determinable by the method according to the first aspect of the present invention.

In one embodiment, the method further comprises providing the overall immune system activity status of the subject, e.g. as an input variable or input value for further methods or for the various purposes as disclosed herein.

The terms "innate immune system activity status", "adaptive immune system activity status" and "overall immune system activity status" may describe an activity of the immune response of the respective immune system, and/or a contribution of the respective immune system to the overall immune response, e.g. in terms of active, resting or suppressive. As described herein, the score indicative for the functional status of the at least one immune cell type can be directly used as an input to determine the innate immune system activity status. Therefore, the term may also refer to a score that is indicative for the immune system activity status.

The inventors found that the immune system activity status, either individually for the innate and/or adaptive immune system, or for the overall immune system can be advantageously determined based on the functional status of immune cell type(s). Immune cells do not act on their own and together they orchestrate the immune response. Hence, for the purposes of the present invention, interpretation of measurements on one immune cell type may be sufficient. In certain cases, the interpretation may be verified by assessment of, or the interpretation may be based on, one or more other immune cell types. Accordingly, for the purposes of the present invention, analysis of multiple immune cell types is envisaged, too, to predict the status of an immune response. For example, in the method according to the second, third and fourth aspect of the present invention, the innate immune cell types and/or the adaptive immune cell types may each include 1, 2, 3, 4, 5, or even more different immune cell types.

Advantageously, the methods allow to determine whether the innate immune response effectively regulates (aspecific) inflammation in tissue and communicates with the adaptive immune system to recruit its specific action against a target, like a cancer cell or pathogen (when determined to be active, i.e. supportive). It is further possible to determine whether the adaptive immune response effectively regulates a highly specific response to the target, aided by the innate immune response (when determined to be active). It is further possible to determine whether the contribution of the innate respectively adaptive immune response to the overall immune response, in particular where depending on the disease the response can be more innate or more adaptive.

According to a preferred embodiment of the second aspect of the present invention and the various embodiments thereof, the determination is based on at least 3 and preferably 4 different innate immune cell types. According to a preferred embodiment of the third aspect of the present invention and the various embodiments thereof, the determination is based on at least 3, preferably at least 4, more preferably at least 5, even more preferably at least 6 and most preferably 7 different innate immune cell types. According to a preferred embodiment of the fourth aspect of the present invention and the various embodiments thereof, the determination is based on at least 3 and preferably 4 different innate immune cell types and/or at least 3, preferably at least 4, more preferably at least 5, even more preferably at least 6 and most preferably 7 different innate immune cell types. Generally, the more different cell types the more accurate the results. Hence, more immune cell types can be considered to improve accuracy.

According to a preferred embodiment of the second, third and fourth aspect of the present invention and the various embodiments thereof, the determination of the innate, adaptive and/or overall immune system activity status is done by means of a mathematical model (herein also denoted as immune response computational model), in particular a calibrated mathematical model. This model may be programmed to interpret the functional states of different immune cell types so as to determine the immune system status based on the combined functional states of said different immune cell types.

In particular, the innate immune system activity status of the subject is determinable by a method comprising (i) receiving functional status of the at least one innate immune cell type, the functional status being determinable by the method according to the first aspect of the present invention, and the various embodiments thereof, (ii) determining the innate immune system status (herein also referred to as "immune response activity score") of the subject, the determining being based on evaluating a calibrated mathematical model relating the functional states of the at least one innate immune cell type to the innate immune system activity status of the subject, and optionally (iii) providing the innate immune system activity status of the subject, e.g. for the various purposes described herein.

The adaptive immune system activity status of the subject is determinable by a corresponding method. In particular, this method comprises (i) receiving functional status of the at least one adaptive immune cell type, the functional status being determinable by the method according to the first aspect of the present invention, and the various embodiments thereof, (ii) determining the adaptive immune system activity status of the subject, the determining being based on evaluating a calibrated mathematical model relating the functional state of the at least one adaptive immune cell type to the adaptive immune system activity status of the subject, and optionally (iii) providing the adaptive immune system activity status of the subject, e.g. for the various purposes described herein.

The overall immune system activity status of the subject is determinable by either interpretation of the combined methods for determining the adaptive and innate immune system activity status, or by using innate immune cell functional states and adaptive immune cell functional states as input values. In particular, the overall immune system activity status of the subject is determinable by a method comprising (i) receiving functional status of each of the at least one adaptive and the at least one innate immune cell type, the functional status being determinable by the method according to the first aspect of the present invention, and the various embodiments thereof, (ii) determining the overall immune system activity status, of the subject, the determining being based on evaluating a calibrated mathematical model relating the functional states, of the at least one adaptive and the at least one innate immune cell type to the overall immune system activity status, of the subject, and optionally (iii) providing the overall immune system activity status of the subject, e.g. for the various purposes described herein.

In a preferred embodiment of the second, third and fourth aspect of the present invention and the various embodiments thereof, the calibrated mathematical pathway model is a centroid or a linear model, or a Bayesian network model based on conditional probabilities. For example, the calibrated mathematical pathway model may be a probabilistic model, preferably a Bayesian network model, based on conditional probabilities relating the immune system status and the functional states of the at least one immune cell type, or the calibrated mathematical pathway model may be based on one or more linear combination(s) of the functional states of the at least one immune cell type.

In accordance with the computational model the functional states of the at least one immune cell type are interpreted to provide the overall immune system state, e.g. in the form of a variable or value, which predicts, or provides a probability of, the activity status of the overall immune response (herein also referred to as "immune system activity status"), in terms of immune active, immune suppression, or resting. The model can also be used to measure the activity of the innate immune response and the adaptive immune response separately. The model may either intrinsically provide immune system activity states for these different types of immune response, which are part of the calculation of the overall state of the immune response, or the model may be easily divided into two separate parts, for respectively the innate and adaptive immune response. In the Bayesian model this can be read out already from the described model.

In a preferred embodiment of the second, third and fourth aspect of the present invention and the various embodiments thereof, the method further comprises:

- determining or predicting whether the innate immune system status, the adaptive immune system status and/or the overall immune system status is in a supportive state, a resting state or an immune suppressive state;
- determining or predicting whether the overall immune system status is predominantly governed by the innate immune system status;
- determining or predicting whether the overall immune system status is predominantly governed by the adaptive immune system status;
- determining or predicting whether the at least one immune cell type has an abnormal functional status, wherein abnormal means another functional status than it should be given in a certain situation, e.g. in case of cancer the functional status should be active, in case of an autoimmune disease it should be inactive;
- predicting, monitoring or determining response to therapy;
- predicting, monitoring or determining effectiveness of therapy;
- predicting, monitoring or determining immune response against tumor;
- determining or monitoring whether the subject complies with therapy;
- determining, optimizing or adjusting therapy, a dosage and/or a dosage regimen;
- diagnosing or subtyping a disease, in particular an immune-mediated disease;
- monitoring an activity status of an immune-mediated disease;
- monitoring immune response state during disease or therapy;
- predicting side effects of therapy on the immune system status;
- diagnosing or screening of individuals for high risk at diseases like cancer;
- diagnosis of immunocompromised state; or
- diagnosis of over active immune response;
- wherein the determining, predicting, monitoring, optimizing, adjusting or diagnosing is based on the functional status of at least one immune cell type, the functional immune cell activity of the at least one innate immune cell type and/or the at least one adaptive immune cell type, and
- wherein the therapy is preferably selected from the group of immunotherapy, in particular anti-tumor immunotherapy, chemotherapy, targeted therapy, radiation therapy, immune activating therapy, immune modulating therapy, immune suppressing therapy, vaccination, in vivo vaccination, in vitro dendritic cell vaccination, anti-pathogen or anti-infection therapy, e.g. antibiotics or antiviral therapy or antifungal therapy.

In accordance with a fifth aspect of the present invention, an apparatus comprises a digital processor configured to perform any one of the methods according to the first, second, third and fourth aspects of the invention, and the various embodiments thereof.

In accordance with a sixth aspect of the present invention, a non-transitory storage medium stores instructions that are executable by a digital processing device to perform any one of the methods according to the first, second, third and fourth aspects of the invention, and the various embodiments thereof. The non-transitory storage medium may be a computer-readable storage medium, such as a hard drive or other magnetic storage medium, an optical disk or other optical storage medium, a random-access memory (RAM), read only memory (ROM), flash memory, or other electronic storage medium, a network server, or so forth. The digital processing device may be a handheld device (e.g., a personal data assistant or smartphone), a notebook computer, a desktop computer, a tablet computer or device, a remote network server, or so forth.

In accordance with a seventh aspect of the present invention, a computer program comprises program code means for causing a digital processing device to perform any one of the methods according to the first, second, third and fourth aspects of the invention, and the various embodiments thereof, when the computer program is run on the digital processing device. The digital processing device may be a handheld device (e.g., a personal data assistant or smartphone), a notebook computer, a desktop computer, a tablet computer or device, a remote network server, and so forth.

In accordance with an eighth aspect of the present invention, a kit for performing any one of the methods according to the first, second, third and fourth aspects of the invention, and the various embodiments thereof, comprises:

- components for quantifying expression of one, preferably three or more of target genes of a transcription factor of the following signaling pathways each:
- NFkB and PI3K (transcription factor FOXO); and optionally one or more of:
- components for quantifying expression of one, preferably three or more of target genes of the following signaling pathways each:
- AR, ER, HH, JAK-STAT1/2 (transcription factor STAT1/2), JAK-STAT3 (transcription factor STAT3), MAPK-AP-1 (transcription factor AP-1), Notch, TGF-β, and Wnt.

In a preferred embodiment, the kit comprises the components for the FOXO, NFkB and STAT3 target genes, and optionally at least one of the components for the TGF-β, STAT1/2, Notch, Wnt, AP-1, AR, ER and HH target genes. In another preferred embodiment, the kit comprises the components for the FOXO, NFkB and TGF-β target genes, and optionally at least one of the components for the STAT3, STAT1/2, Notch, Wnt, AP-1, AR, ER and HH target genes. In another preferred embodiment, the kit comprises the components for the FOXO, NFkB, STAT3 and TGF-β target genes, and optionally at least one of the components for the STAT1/2, Notch, Wnt, AP-1, AR, ER and HH target genes. In another preferred embodiment, the kit comprises the components for the FOXO, NFkB, STAT3, TGF-β and STAT1/2 target genes, and optionally at least one of the components for the Wnt, Notch, AP-1, AR, ER and HH target genes.

The one or more components or means for measuring the expression levels of the target genes can be selected from the group consisting of: a DNA array chip, an oligonucleotide array chip, a protein array chip, an antibody, a plurality of probes, for example, labeled probes, a set of RNA reverse-transcriptase sequencing components, and/or RNA or DNA, including cDNA, amplification primers. In a preferred embodiment, the kit is selected from the group consisting of qPCR, multiple qPCR, multiplexed qPCR, ddPCR, RNAseq, RNA expression array and mass spectrometry. In an embodiment, the kit includes a set of labeled probes directed to a portion of an mRNA or cDNA sequence of the target genes as described herein. In an embodiment, the kit includes a set of primers and probes directed to a portion of an mRNA or cDNA sequence of the target genes. In an embodiment, the labeled probes are contained in a standardized 96-well plate. In an embodiment, the kit further includes primers or probes directed to a set of reference genes. Such reference genes can be, for example, constitutively expressed genes useful in normalizing or standardizing expression levels of the target gene expression levels described herein.

In accordance with a ninth aspect of the present invention, a system comprises:

- the kit of the present invention as described herein, and
- the apparatus of the present invention as described herein, the non-transitory storage medium of the present invention as described herein, or the computer program of the present invention as described herein.

In accordance with another disclosed aspect, the kit or the system of the present invention as described herein are used in performing the methods of the present invention as described herein.

The present invention as described herein can, e.g., also advantageously be used in at least one of the following activities:

The present invention as described herein can, e.g., also advantageously be used in at least one of the following activities:

- predict response to immunotherapy/immune activating drugs/immune modulating drugs/immune suppressing drugs/vaccination/in vivo vaccination/in vitro dendritic cell vaccination;
- monitor response to immunotherapy;
- quantify response to immunotherapy;
- for cancer, auto-immune/immune-mediated diseases, infectious diseases, inflammatory diseases, other diseases with an immune component;
- identify on a sample consisting of immune cell types such as dendritic immune cells whether the cells are functionally in a resting state, activated, or immune suppressed;
- identify on a sample consisting of dendritic immune cells whether the cells are functionally in a resting state, activated, or immune suppressed;
- identify on a tissue sample from an organ/tissue containing dendritic cells whether the dendritic cells are resting, active or suppressed;
- identify on a tissue sample from cancer tissue containing dendritic cells whether the dendritic cells are resting, active or suppressed;
- identify on a tissue sample from a tumor-draining lymph node whether the dendritic cells are resting, active or suppressed;
- identify on a tissue sample containing dendritic cells from a patient with an auto-immune disease whether the dendritic cells are resting, active or suppressed; identify on a blood sample whether the dendritic cells are resting, active or suppressed;
- identify on a patient sample whether an immunotherapy will be effective;
- identify on a blood sample whether an immunotherapy will be effective;
- identify on a tissue sample whether an immunotherapy will be effective;
- identify on dendritic cells from a sample whether an immunotherapy will be effective;
- identify on a sample from a patient whether the installed therapy is effective;
- identify on a sample from a patient whether the installed immunotherapy is effective;
- identify on a blood sample whether the patient is compliant with respect to immune activating therapy, especially dendritic cell activating immunotherapy or vaccination therapy;
- identify on a sample from a patient with cancer whether immune activating therapy will be effective, especially dendritic cell activating immunotherapy;
- identify on a sample from a patient with cancer whether dendritic cell activating immunotherapy will be effective;

- identify on dendritic cells from a patient with cancer whether dendritic cell activating immunotherapy will be effective;
- identify on dendritic cells from a patient whether in vivo vaccination will be effective;
- identify on in vitro activated dendritic cells whether subsequent in dendritic cell vaccination will be effective;
- identify on dendritic cells from blood after dendritic cell vaccination therapy whether this therapy was effective;
- identify on dendritic cells whether STING pathway activating drugs will be effective;
- identify on dendritic cells whether applied STING pathway activating drugs were/are effective;
- predict response to immunotherapy, for example on the assumption that when the immune response for example in the tumor is already active, additional stimulation may not be effective;
- characterizing the functional immune activity or immune suppressive state of an antigen presenting immune cell type, specifically a dendritic cell;
- predicting therapy response, based on the functional immune activity or immune suppressive state of an antigen-presenting immune cell type, specifically a type of dendritic cell;
- predicting response to a form of immunomodulating therapy, based on the functional immune activity or immune suppressive state of an antigen-presenting immune cell type, specifically a type of dendritic cell;
- predicting response to an immune-stimulating therapy, based on the functional immune activity or immune suppressive state of an antigen-presenting immune cell type, specifically a type of dendritic cell;
- predicting response to immunosuppressive therapy, based on the functional immune activity or immune suppressive state of an antigen-presenting immune cell type, specifically a type of dendritic cell;
- assessment of efficacy of therapy (all the above-mentioned), based on the functional immune activity or immune suppressive state of an antigen-presenting immune cell type, specifically a type of dendritic cell;
- monitoring of therapy response, based on the functional immune activity or immune suppressive state of an antigen-presenting immune cell type, specifically a type of dendritic cell;
- assessment or monitoring of therapy compliance, based on the functional immune activity or immune suppressive state of an antigen-presenting immune cell type, specifically a type of dendritic cell.

In an embodiment of any of the aspects herein, pathway analysis can be performed on lymph node tissue, or a specific part of lymph node tissue like a follicle or germinal center area, in such a way that different immune cell types can be analyzed separately in different functional areas of the lymph node to assess the functional activity of the lymph node in the immune response.

In an embodiment of any of the aspects herein, pathway analysis can be performed on lymph-node like areas in cancer tissue, like areas with a follicle or germinal center like structure, to assess antitumor activity of the immune cells in the tumor, and combine this information with pathway analysis on immune cells in the lymph node and/or blood.

In an embodiment, all cancer types and cancer subtypes; and immune system-mediated diseases like inflammatory bowel disease, rheumatoid arthritis, psoriasis, SLE, multiple sclerosis, etc., and inflammatory diseases like asthma, atherosclerosis, diabetes, psychiatric diseases like depression and schizophrenia, acne, endometriosis, etc., and infectious diseases, like bacterial or viral infections, or parasitic infections, measuring the combined pathway activity profile in immune cell types, either separate or mixed, in diseased or infected tissue and blood facilitates diagnosis, subtyping of the disease, for example in the case of an immune-mediated disease.

A method comprising determining the maturity and/or and functional activity of dendritic cells, optionally including their capacity for effector cell recruitment, is described.

In an embodiment of any of the aspects herein, pathway analysis of dendritic cells is used to assess the maturity stage and/or functional activity with respect to effector cell recruitment of dendritic cells.

In an embodiment the maturity state of dendritic cells is measured to base the decision on administration of an immunotherapy to a patient with cancer on the results, for example a dendritic cell-stimulating therapy to increase effector immune cell recruitment, as an anti-cancer therapy, is more likely to be effective when the dendritic cells do not have the required maturity status, associated with activity of JAK-STAT1/2, JAK-STAT3, NFkB, TGF-β and Notch pathways and reduced activity of the PI3K pathway (inversely related to increased FOXO transcription factor activity).

In an embodiment the maturity state of dendritic cells is measured to base the decision on administration of an immunosuppressive therapy to a patient with an auto-immune disease on the results, for example an immunosuppressive drug, like a JAK-STAT1/2 or JAK-STAT3 inhibitor is likely to interfere with effector cell recruitment, resulting in reduction of symptoms.

In an embodiment patient derived PMBCs or dendritic cells, are differentiated or matured to mature dendritic cells in vitro and exposed to specific cancer antigens as in vitro vaccination procedure, prior to returning them to the patient as treatment against their cancer. The functional state of the DCs is assessed before and after in vitro exposure to decide on efficacy of the DC priming procedure, and after return to the patient to assess in vivo efficacy.

An exemplary method is performed by obtaining a sample, either blood or tissue, or any other body fluid or source for dendritic cells, like a cell culture model, and from isolated dendritic cells the sample RNA is isolated and subsequently pathway analysis is performed as described above by measuring the levels of the target gene mRNAs of the respective signaling pathways and inferring a pathway activity score as log 2odds or probability for the AR, ER, HH, JAK-STAT1/2, JAK-STAT3, MAPK-AP-1, NFkB, Notch, PI3K, TGF-β, and Wnt pathways. From activity of the pathways, the functional activity status and capacity for effector cell recruitment is inferred.

A method comprising determining the functional activity status of dendritic cells, is described. The method comprises measurement of one or more signal transduction pathways in combination with a mathematical computational model which interprets the signaling pathway measurements to provide a calculated functional cell activity score which indicates in a quantitative manner whether the antigen-presenting cell, more specifically the dendritic cell, is in an activated state (meaning antigen uptake, processing, presentation and migration to the proper location for presentation to lymphocytes), or a resting/inactive state, or an immuno-suppressed/tolerogenic (non-functional) state. The terms "pathway", "signal transduction pathway" and "signaling pathway" are used interchangeably herein.

A method comprising determining the combined signaling pathway activity profile of dendritic immune cells or different dendritic immune cell types and interpreting the measurement towards a functional activity score using a mathematical model, is described.

In an embodiment of any aspects herein, the sample is blood and/or the subject is a healthy individual.

In an embodiment of any aspects herein, JAK-STAT1/2, JAK-STAT3, PI3K, TGF-β, Wnt, Notch, NFkB pathway activity measurement in dendritic immune cell types obtained from a blood sample indicates whether immune function of a dendritic immune cell type in an individual deviates from normal, as defined to be found in a healthy individual.

In an embodiment of any of the aspects herein, in blood all dendritic immune cell types (like mDCs, pDCs) can be isolated using standard technologies (e.g. flowcytometry, Miltenyi beads), to be separately analyzed with respect to activity/immune suppressive status by measuring the pathway activity profile.

In an embodiment of any of the aspects herein blood is drawn from an individual to measure and interpret the combined pathway activity profile in the individual or combined dendritic immune cell types to conclude whether the functional dendritic immune cell activity of the patient deviates from that in healthy individuals.

In an embodiment of any of the aspects herein blood is drawn from an individual to measure and interpret the combined pathway activity profile in the individual or combined dendritic immune cell types to conclude whether the patient is healthy or diseased.

In an embodiment of any of the aspects herein blood is drawn from an individual before and after start of a therapy to measure the combined pathway activity profile in the individual or combined dendritic immune cell types to assess the effect of the therapy on the functional activity status, as measured on pathway activities, in the different or combined dendritic immune cells.

In an embodiment of any of the aspects herein blood is drawn from an individual before and after start of a therapy to measure and interpret the combined pathway activity profile in the individual or combined dendritic immune cell types to predict side effects of immunomodulatory therapy.

An exemplary method is performed by drawing blood from a human being, the different dendritic immune cells, like mDCs and pDCs, are separated using a method like FACS, RNA is isolated and subsequently pathway analysis as described is performed by measuring the levels of the target gene mRNAs of the respective signaling pathways and inferring a pathway activity score as log 2odds or probability (or another score) for the JAK-STAT1/2, JAK-STAT3, PI3K, NFkB, TGF-β, Wnt and Notch pathways. Measured pathway scores in the sample are interpreted by the mathematical model (e.g. Bayesian model or linear model) to provide a functional immune activity score and compared with functional immune activity scores for healthy individuals. Pathway scores deviating from the normal values in one or more, or a combination of dendritic immune cell types indicate an abnormal immune function of that cell type. This may be caused by disease or a treatment.

Further advantages will be apparent to those of ordinary skill in the art upon reading and understanding the attached figures, the following description and, in particular, upon reading the detailed examples provided herein below.

This application describes several preferred embodiments. Modifications and alterations may occur to others upon reading and understanding the preceding detailed description. It is intended that the application is construed as including all such modifications and alterations insofar as they come within the scope of the appended claims or the equivalents thereof.

Other variations to the disclosed embodiments can be understood and effected by those skilled in the art in practicing the claimed invention, from a study of the drawings, the disclosure, and the appended claims.

It shall be understood that the methods of, the apparatus, the non-transitory storage medium, the computer program, the kit, and the system as disclosed herein have similar and/or identical preferred embodiments.

In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

Calculations like the determination of the risk score performed by one or several units or devices can be performed by any other number of units or devices.

A computer program may be stored/distributed on a suitable medium, such as an optical storage medium or a solid-state medium, supplied together with or as part of other hardware, but may also be distributed in other forms, such as via the Internet or other wired or wireless telecommunication systems.

It shall be understood that a preferred embodiment of the present invention can also be any combination of the dependent claims or above embodiments with the respective independent claim.

These and other aspects of the invention will be apparent from and elucidated with reference to the embodiments described hereinafter.

BRIEF DESCRIPTION OF THE DRAWINGS

General: In all the figures where signal transduction pathway analysis scores are depicted, these are given as log 2odds scores for pathway activity, derived from the probability scores for pathway activity provided by the Bayesian pathway model analysis. Log 2odds scores indicate the level of activity of a signaling pathway on a linear scale. Analyzed public datasets are indicated with their GSE number, and individual samples with their GSM number (in principle most left column). Annotation per sample, as present in the GEO database is included in the figure in specific columns with a heading as to the annotation information (left of the pathway analysis scores). Scores on activity of the immune cell type, immune system/immune response have been added for each sample in columns at the right side from the columns containing the respective pathway scores. In the pathway analysis columns: FOXO or PI3K-FOXO means: activity of the FOXO transcription factor which is the reverse of the PI3K pathway activity, i.e., when FOXO lod2odds score is high, PI3K signal transduction pathway activity is low; NFkB means the NFkB signal transduction pathway; Notch means the Notch signaling pathway; STAT12_1 means the JAK-STAT1/2 pathway, specifically activated by type I interferons; STAT12_2 means the JAK-STAT1/2 pathway, specifically activated by type II interferons; STAT3_blood means the JAK-STAT3 signaling pathway, calibrated for specific use on blood cells; TGFB_1 or TGFB means the TGF-β signaling pathway; AP1 means the MAPK-AP1 signaling pathway.

All validation samples for a signaling pathway model or an immune response/system model are independent samples and have not been used for calibration of the respective model to be validated.

In the following drawings:

Figure 1B:
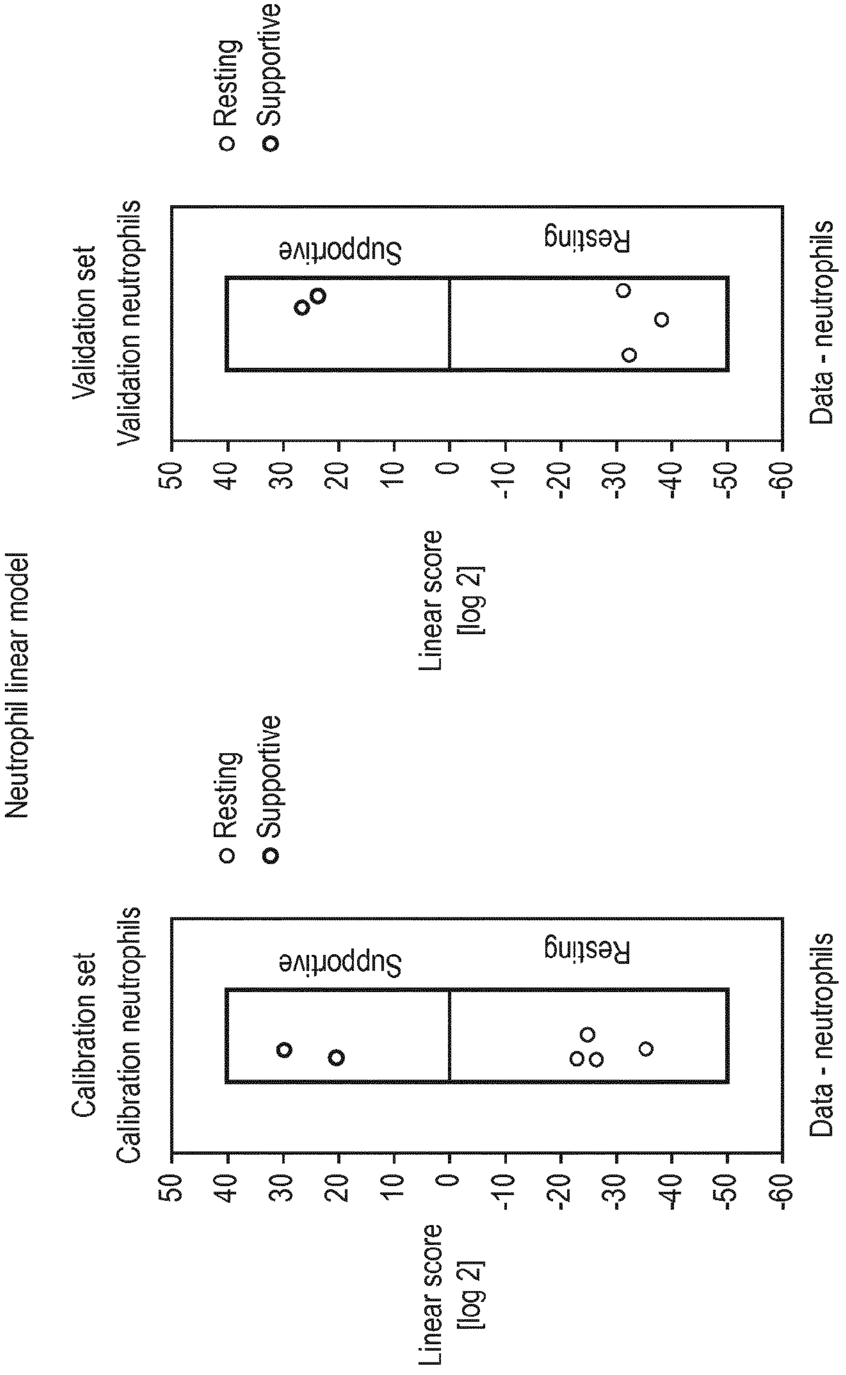

FIGS. 1A and 1B show exemplarily calibration and validation results of a two-state (resting, supportive) immune model for neutrophils based on pathway analysis, respectively the centroid (A) and the linear (B) model; FIG. 1B (continued) shows the separation between resting and supportive samples with a threshold. PI3K, NFkB, Notch, JAK-STAT1/2-1 (interferon type I) and JAK-STAT1/2-2 (interferon type II), JAK-STAT3 (blood calibrated), TGF-β3, Wnt pathways were used for the model. The calibration set included unstimulated blood-derived neutrophils (resting), and LPS-stimulated blood-derived neutrophils (supportive), all samples were from healthy individuals (GSE22103). LPS is known to activate neutrophils, and these samples were designated as immune supportive. The independent model validation set contained similarly treated samples (GSE28490). Both the centroid and the linear model scored the functional activity state of the neutrophils both in the calibration set as well as in the validation set 100% correct. In the column "state" the ground truth cell state (resting, supportive) is indicated. In the validation set, the most right column contains for each sample the conclusion of the model; OK means: correct and in line with the ground truth, false means wrong, not in line with the ground truth. This is the same for all the following figures containing similar sample analysis results.

Figure 2B:
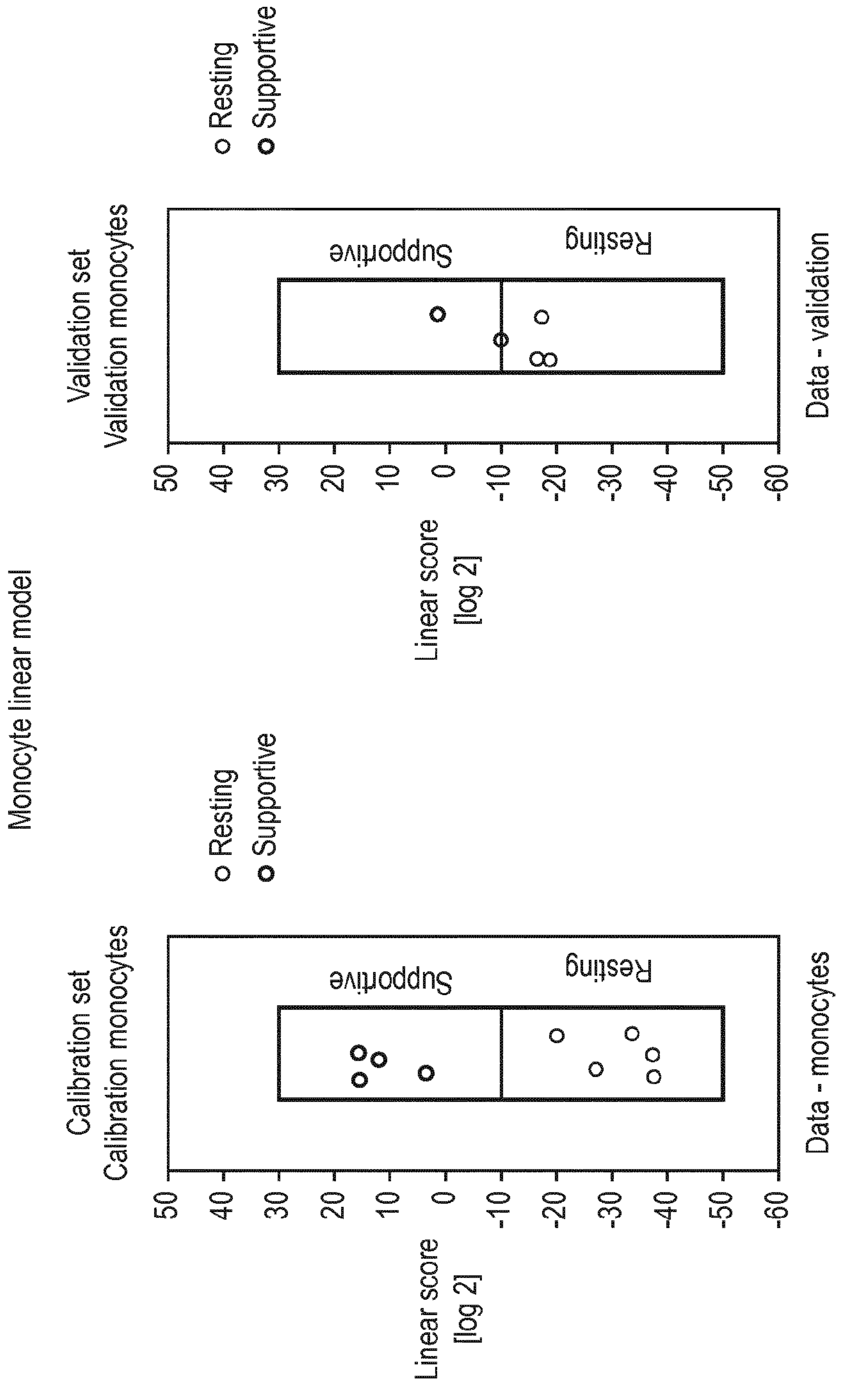

FIGS. 2A and 2B show exemplarily calibration and validation results of a two-state (resting, supportive) immune model for monocytes based on pathway analysis, respectively the centroid (A) and the linear (B) model; FIG. 2B (continued) shows the separation between resting and supportive samples with a threshold. PI3K, NFkB, Notch, JAK-STAT1/2-1 (interferon type I) and JAK-STAT1/2-2 (interferon type II) JAK-STAT3 (blood calibrated), TGF-β pathways were used for the model. The calibration set included unstimulated pooled (from 10 donors per analyzed mRNA sample) blood-derived monocytes, all samples were from healthy individuals (GSE28490). From a second dataset sample data were used that were obtained from monocytes that were isolated from peripheral blood mononuclear cells (PBMCs) from the blood of healthy human donors (GSE43700). PBMCs were activated by Ficoll-Hypaque processing, adhering to cell culture plates, and culturing for 24 hours in culture medium with 10% FBS (Fetal Bovine Serum), and subsequently activated CD14+ monocytes were isolated from this cell population. Two independent model validation sets contained samples from unstimulated blood-derived CD14+ monocytes (resting) from normal individuals (GE72642), and CD14+ monocytes that were similarly activated as in the calibration set (supportive) (GSE16385). The centroid model scored the functional activity state of the monocytes both in the calibration set as well as in the validation set 100% correct. The linear model scored slightly less (80%).

Figure 3B:
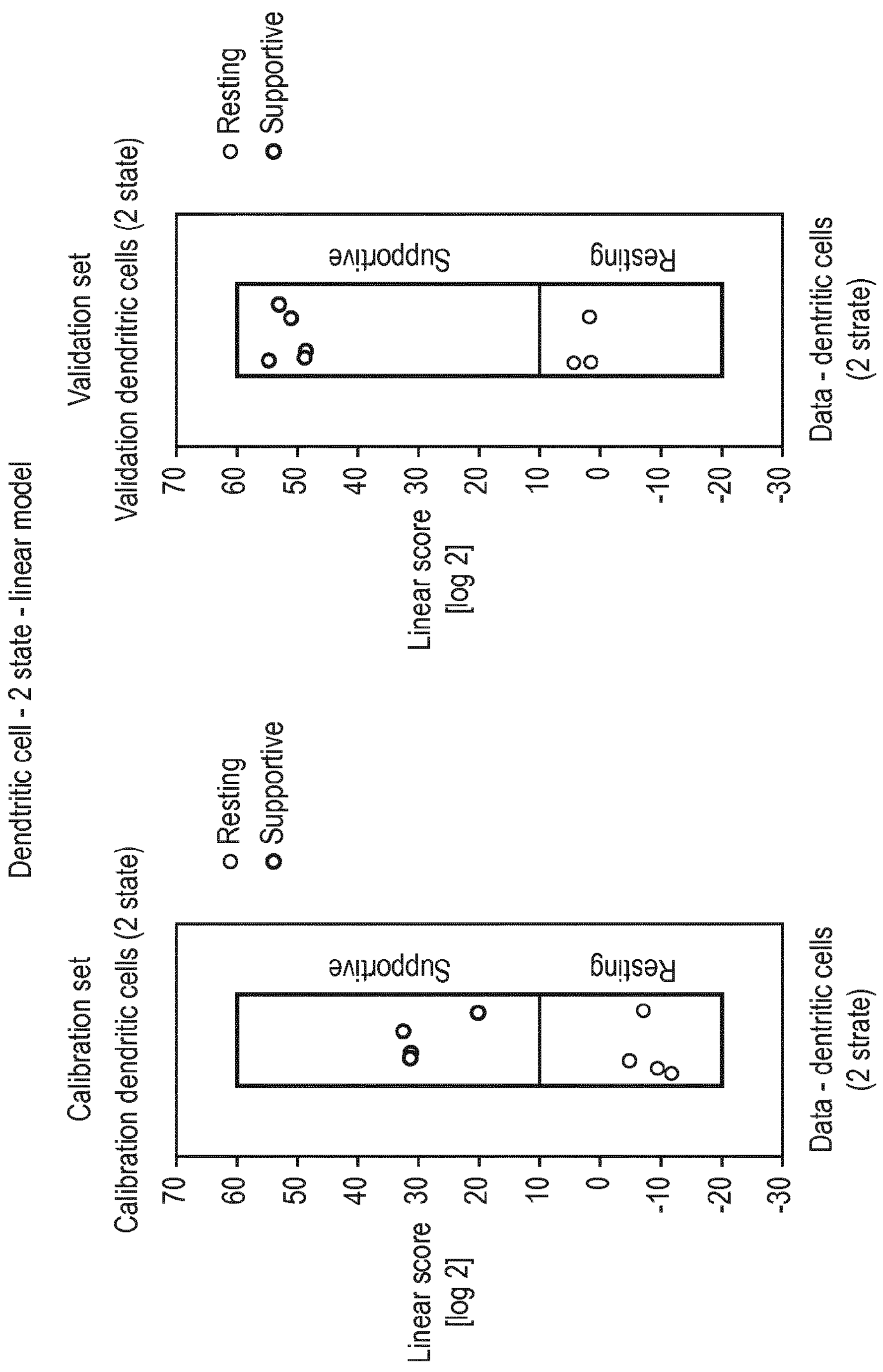

FIGS. 3A and 3B show exemplarily calibration and validation results of a two-state (resting, supportive) immune model for dendritic cells based on pathway analysis, respectively the centroid (A) and the linear (B) model; FIG. 3B (continued) shows the separation between resting and supportive samples with a threshold. PI3K, NFkB, Notch, JAK-STAT1/2-1 (interferon type I) and JAK-STAT1/2-2 (interferon type II) JAK-STAT3 (blood calibrated), TGF-β pathways were used for the model. The calibration set included blood-derived monocytic cells from 2 healthy donors that were differentiated to immature dendritic cells using standard protocols (described in: Zaslavsky E. et al., "Antiviral response dictated by choreographed cascade of transcription factors", Journal of Immunology, Vol. 184, No. 6, March 2010, pages 2908 to 2917), and subsequently infected with either vehicle (top 4 samples, designated as resting) or the Newcastle Disease Virus (NDV) (bottom 4 samples, designated as supportive), for 18 hours (GSE18791). This NDV infection is a model system for normal activation of dendritic cells (Zaslavsky E. et al., "Antiviral response dictated by choreographed cascade of transcription factors", Journal of Immunology, Vol. 184, No. 6, March 2010, pages 2908 to 2917) and at 18 hours the maximal activation status has been obtained. The validation set contained data from samples with naïve dendritic cells (resting), cells exposed to the supernatant of NDV infected cells (supportive) and NDV infected cells (supportive) (GSE52081). Both the centroid and the linear model scored the functional activity state of the dendritic cells in the calibration and validation set 100% correct.

Figure 4B:
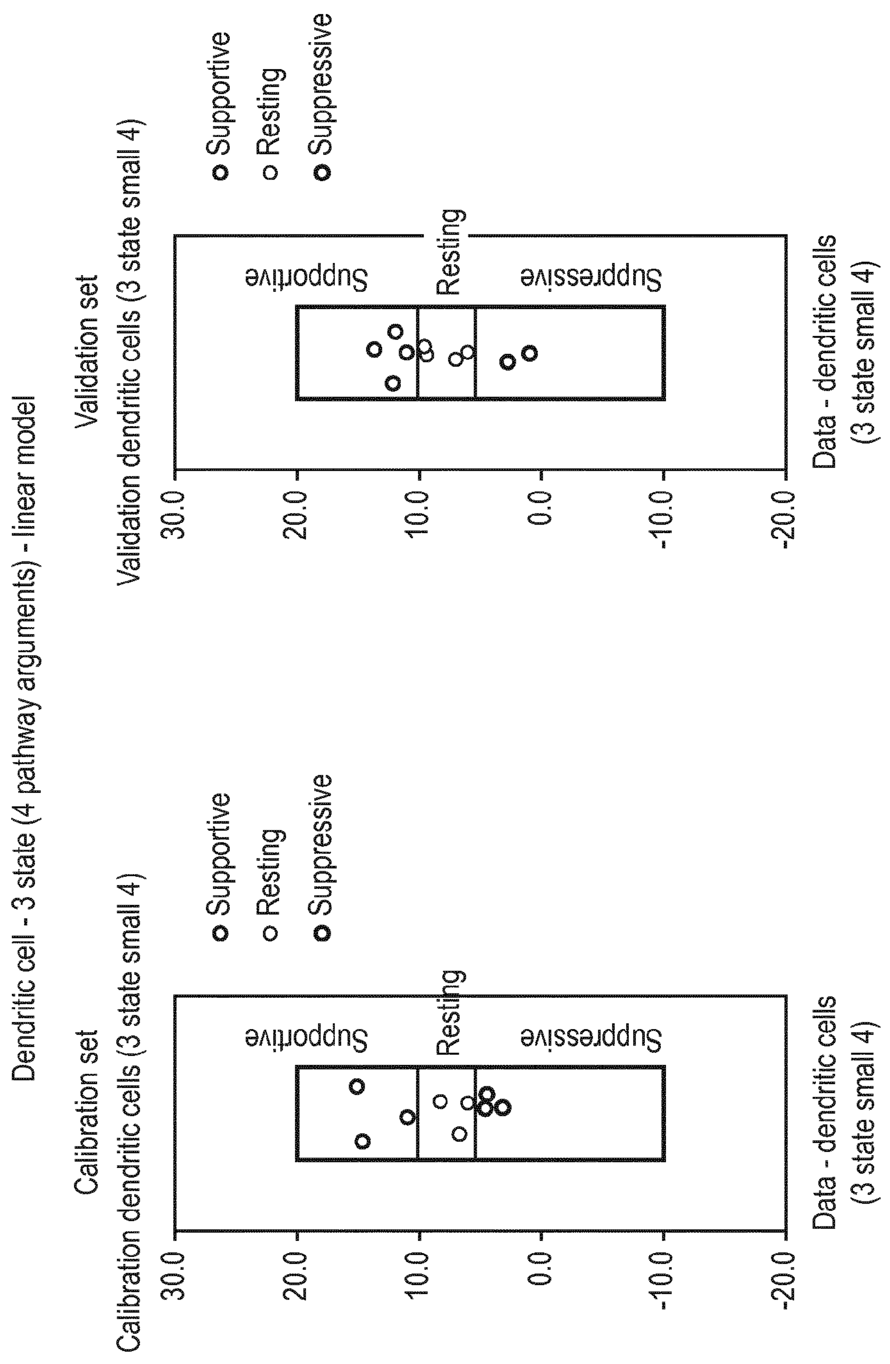

FIGS. 4A and 4B show exemplarily calibration and validation results of a three-state (resting, supportive, suppressed) immune model for dendritic cells based on pathway analysis of four signaling pathways, respectively the centroid (A) and the linear (B) model; FIG. 4B (continued) shows the separation between resting and supportive samples with a threshold. PI3K, NFkB, JAK-STAT1/2-1 (interferon type I), and TGF-β pathways were used for the model. The calibration set included three samples of blood-derived CD14+ monocytic cells from one healthy donor that were differentiated to immature dendritic cells using GM-CSF and IL4 (resting), and either matured/activated with LPS (supportive), or immune suppressed with IL10/dexamethasone combination (suppressive) (Jansen B. J. et al., "MicroRNA genes preferentially expressed in dendritic cells contain sites for conserved transcription factor binding motifs in their promoters", BMC Genomics, June 2011, 12:330) (GSE23371). The validation set consisted of samples of blood-derived CD14+ monocytic cells that were differentiated to immature dendritic cells using GM-CSF and IL4 (resting), and of similarly obtained immature dendritic cells that were subsequently matured/activated with IL-1β, IL-6, TNF-α, and $PGE_2$ (supportive) (Cabezón R. et al., "MERTK as negative regulator of human T cell activation", Journal of Leukocyte Biology, Vol. 97, No. 4, pages 751 to 760) (GSE13762+GSE56017). The centroid model scored the functional activity state of the dendritic cells in the validation set 100% correct. The linear model scored rather poorly (11% correct).

Figure 5B:
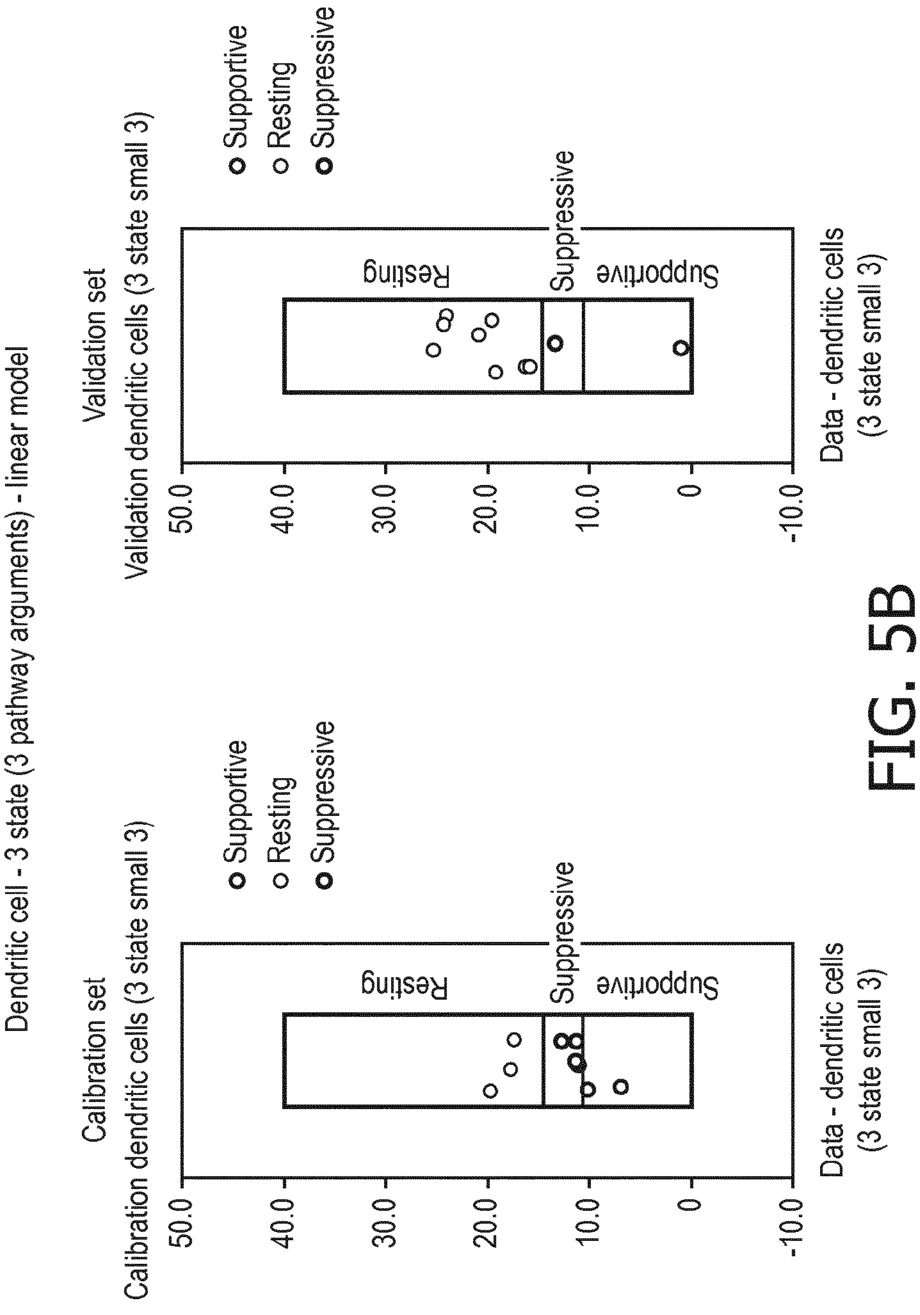

FIGS. 5A and 5B show exemplarily calibration and validation results of a three-state (resting, supportive, suppressed) immune model for dendritic cells based on pathway analysis of three signaling pathways, respectively the centroid (A) and the linear (B) model; FIG. 5B (continued) shows the separation between resting and supportive samples with a threshold. PI3K, NFkB, and TGF-β pathways were used for the model. The same calibration and validation samples were used as in FIG. 4 (Calibration GSE23371; validation GSE13762+GSE56017). The centroid model performed as good as the 4-pathway model described in FIG. 4A, illustrating that this example alternative combination of pathway analysis also performs well (100% correct). The linear model scored rather poor (interpretation is being reevaluated).

Figure 6B:
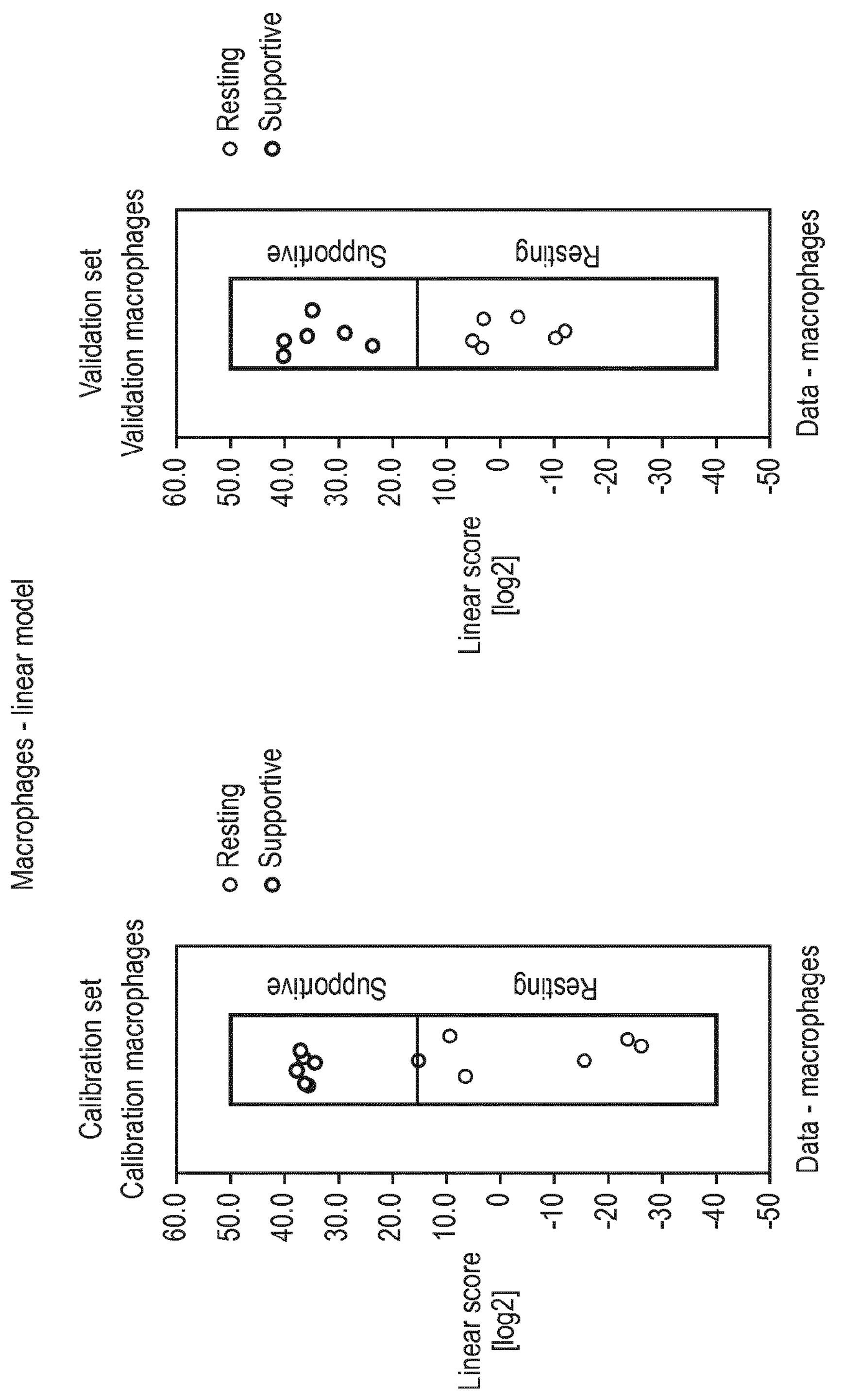

FIGS. 6A and 6B show exemplarily calibration and validation results of a two-state (resting, supportive) immune model for macrophages M1 based on pathway analysis, respectively the centroid (A) and the linear (B) model; FIG. 6B (continued) shows the separation between resting and supportive samples with a threshold. PI3K, NFkB, Notch, JAK-STAT1/2-1 (interferon type I) and JAK-STAT1/2-2 (interferon type II), JAK-STAT3 (blood calibrated), TGF-β pathways were used for the model. The calibration set included macrophages derived from peripheral blood monocytes from two healthy individuals (three replicates) that were differentiated in vitro to macrophages (resting), or subsequently activated with LPS (supportive) (GSE43596). The validation set contained data from samples of lung-derived macrophages obtained from 7 healthy volunteers, who had either saline installed into the lung segment (resting) or LPS (supportive), prior to bronchoalveolar lavage (GSE40885). Both the centroid and the linear model scored the functional activity state of the macrophages in the calibration and validation set 100% correct.

Figure 7B:
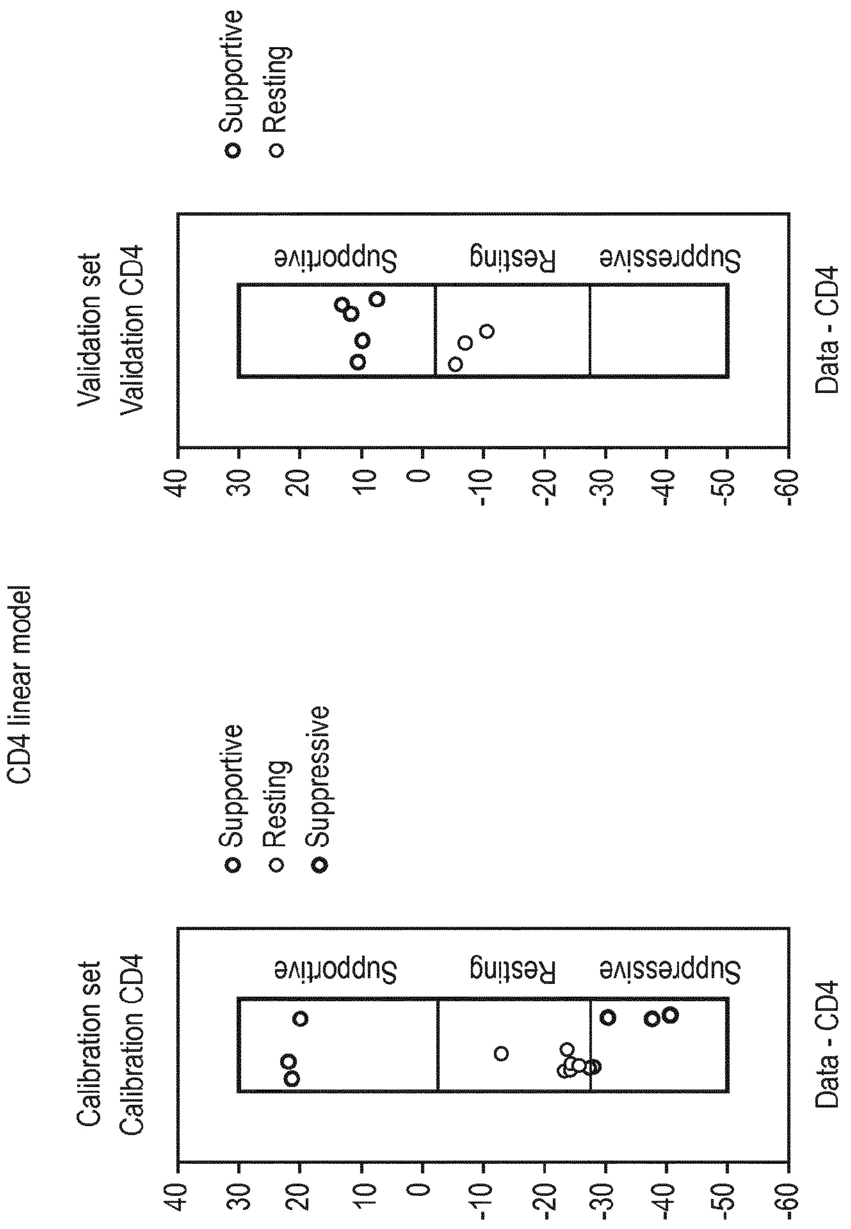

FIGS. 7A and 7B show exemplarily calibration and validation results of a two-state (resting, supportive) immune model for CD4+ lymphocytes based on pathway analysis, respectively the centroid (A) and the linear (B) model; FIG. 7B (continued) shows the separation between resting and supportive samples with a threshold. PI3K, NFkB, Notch, JAK-STAT1/2-1 (interferon type I) and JAK-STAT1/2-2 (interferon type II), JAK-STAT3 (blood calibrated), TGF-β pathways were used for the model. The calibration set contained data from 7 samples containing non-activated CD4+ memory T cells obtained from healthy individuals (resting), and three samples in which the CD4+ memory T cells were activated in a standard manner using antibodies against CD3 and CD28 (sample 8, 9, 10; supportive), and the bottom four samples (11-14) which contained similarly activated CD4+ T cells that were treated with immune-suppressive breast cancer supernatant from 4 patients (suppressive) (GSE36766). The validation set contained data from one non-stimulated CD4+ T effector lymphocyte sample (resting) and samples from a time series of CD4+ T effector cell samples that were activated with anti-CD3/-CD28 (supportive) (GSE11292). The centroid model scored the functional activity state of the CD4+T lymphocytes in the validation set 100% correct. The linear model scored the functional activity in the calibration and validation set, respectively 71% and 100% correct.

Figure 8B:
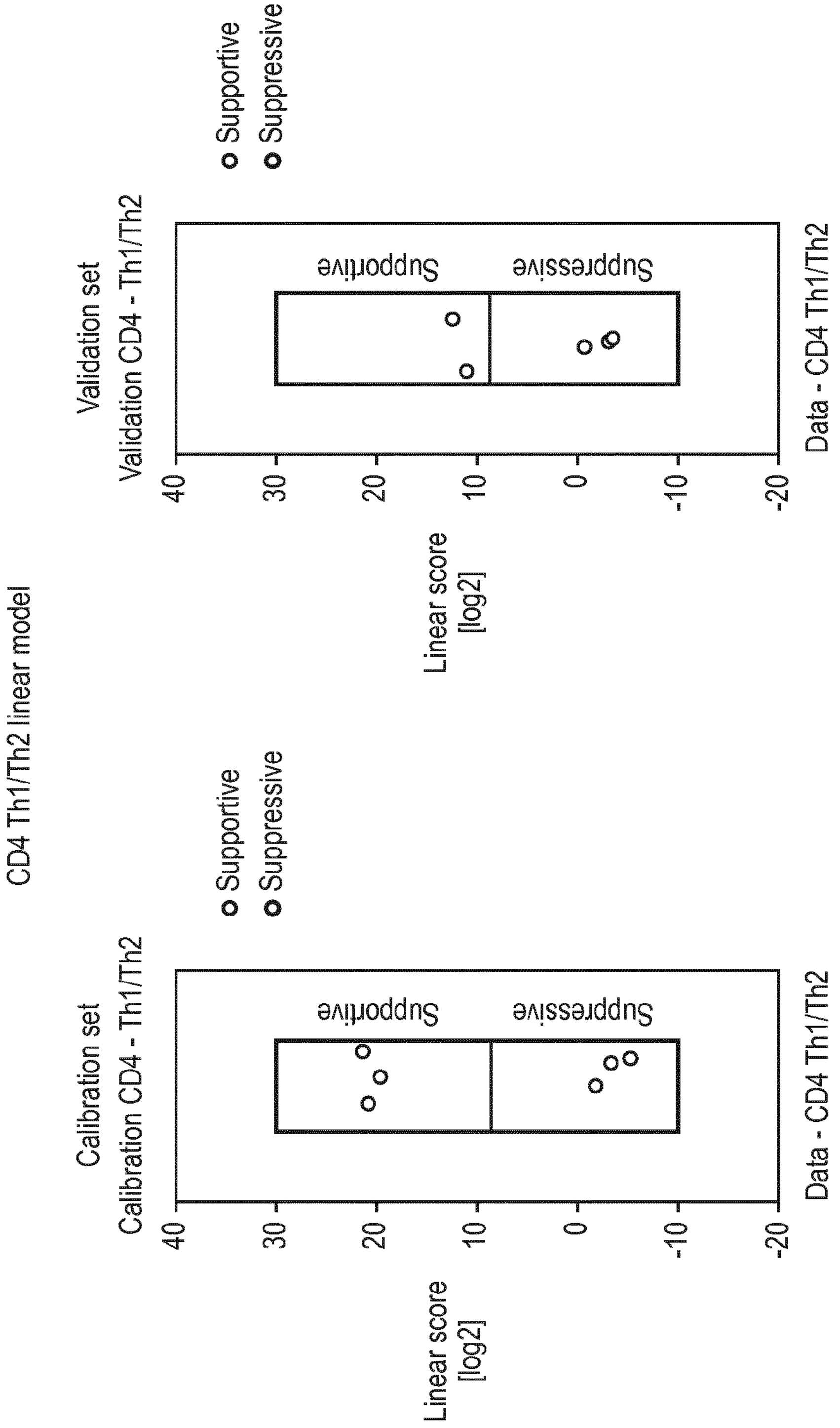

FIGS. 8A and 8B show exemplarily calibration and validation results of a two-state (resting, supportive) immune model for Th1 and Th2 CD4+T lymphocytes based on pathway analysis, respectively the centroid (A) and the linear (B) model; FIG. 8B (continued) shows the separation between resting and supportive samples with a threshold. PI3K, NFkB, JAK-STAT1/2-1 (interferon type I) and JAK-STAT1/2-2 (interferon type II), TGF-β pathways were used for the model. The calibration set contained 3 samples (replicates) of CD4+ T cells (from cord blood) differentiated towards T helper1 (Th1) lymphocytes (using Act+IL12) (supportive) and 3 samples (replicates) in which CD4+ cells were differentiated to T helper2 lymphocytes (Th2) (using Act+IL4) (suppressive) (GSE71566). The validation set contained similar samples (3 biological replicates each) treated with either IL12 (supportive) or IL4 in combination with anti-IL12 (suppressive) (GSE32959). Both the centroid and the linear model scored the functional activity state of the Th1 and Th2 lymphocytes in the validation set 100% correct, and as such could very well distinguish between Th1 and Th2 lymphocytes. Supportive=Th1; Suppressive=Th2.

Figure 9B:
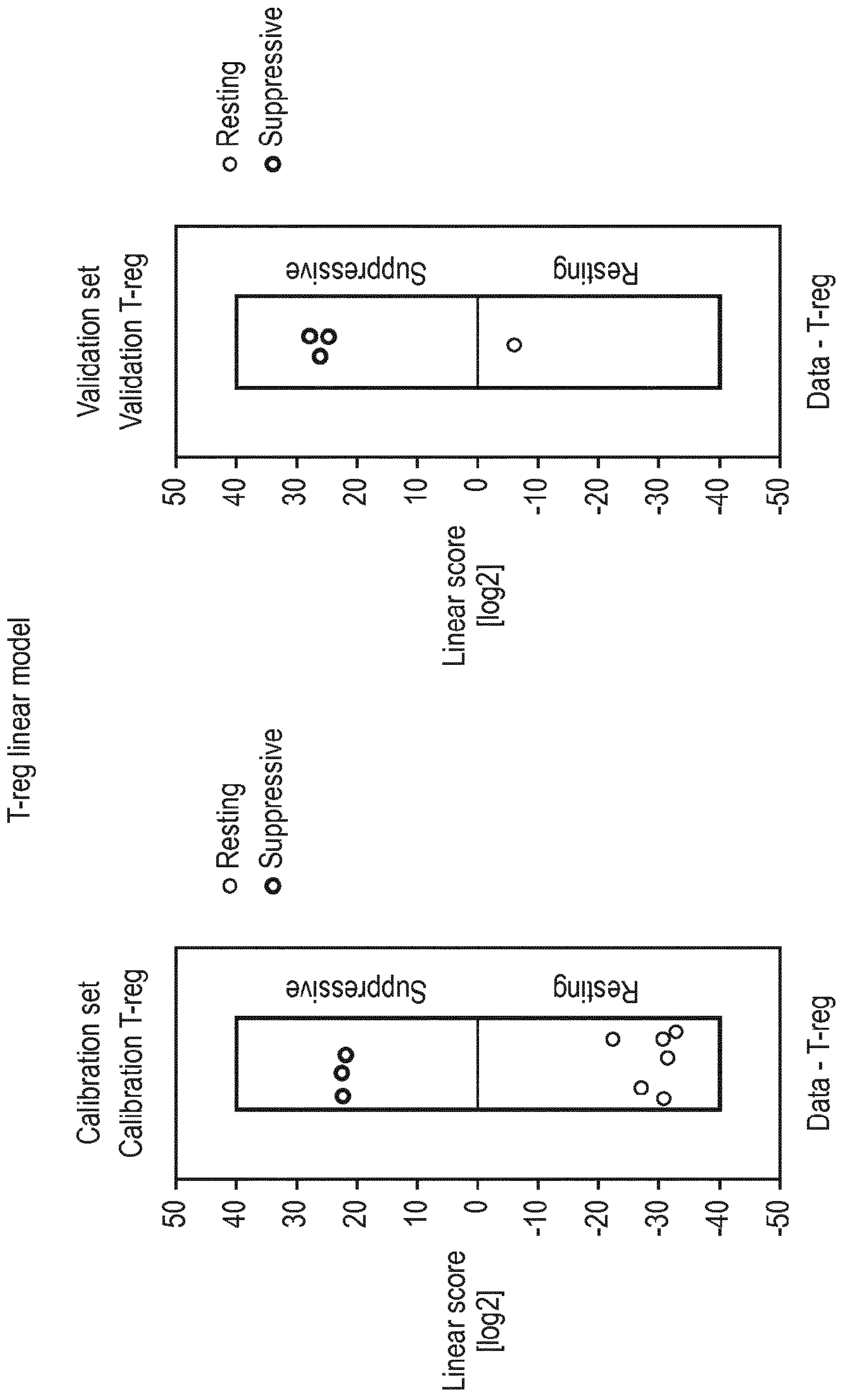

FIGS. 9A and 9B show exemplarily calibration and validation results of a two-state (resting, supportive) immune model for T regulatory lymphocytes (T-reg cells) based on pathway analysis, respectively the centroid (A) and the linear (B) model; FIG. 9B (continued) shows the separation between resting and supportive samples with a threshold. PI3K, NFkB, Notch, JAK-STAT1/2-1 (interferon type I) and JAK-STAT1/2-2 (interferon type II), JAK-STAT3 (blood calibrated), TGF-β pathways were used for the model. The calibration dataset contained data from samples with sorted regulatory T-cells (T-reg cells) isolated from peripheral blood from 6 healthy controls (GSE65010, resting), and a time series of T-reg cells stimulated with anti-CD3/-CD28/IL2 (GSE11292, suppressive). The independent validation dataset contained one untreated sample of T-reg cells (resting) and a time series of T-reg cells stimulated with anti-CD3/-CD28/IL2, necessary to create an immune-suppressive function (GSE11292, suppressive). Both the centroid and the linear model scored the functional activity state of the T-reg lymphocytes in the calibration and validation set 100% correct.

Figure 10B:
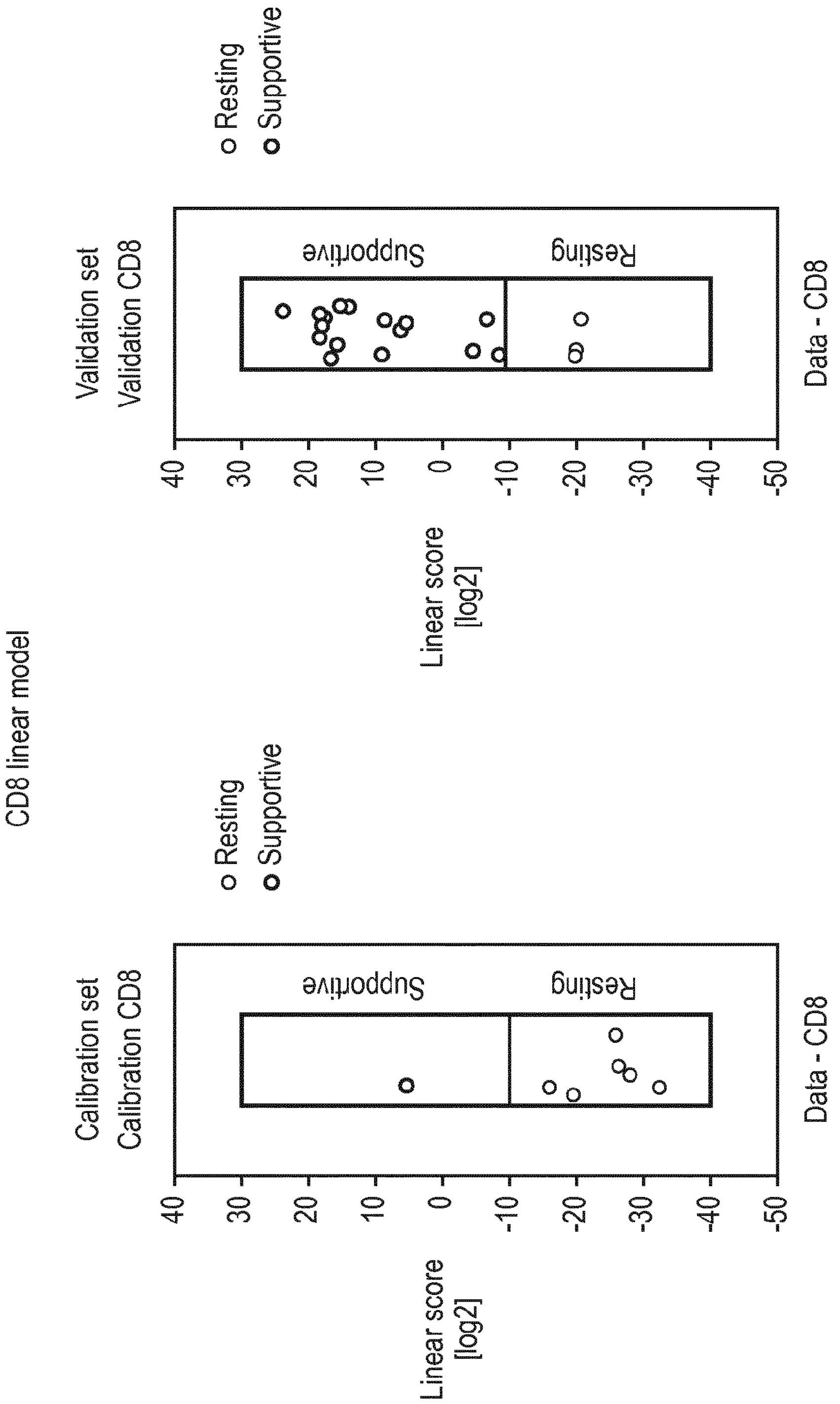

FIGS. 10A and 10B show exemplarily calibration and validation results of a two-state (resting, supportive) immune model for CD8+T lymphocytes based on pathway analysis, respectively the centroid (A) and the linear (B) model; FIG. 10B (continued) shows the separation between resting and supportive samples with a threshold. PI3K, NFkB, Notch, JAK-STAT1/2-1 (interferon type I) and JAK-STAT1/2-2 (interferon type II), JAK-STAT3 (blood calibrated), TGF-β pathways were used for the model. The calibration set contained naïve CD8+T lymphocytes (GSE26347, resting), and one sample containing CD8+ T cells, activated in the presence of their specific antigen (GSE63129, supportive). The validation set contained resting CD8+T lymphocytes from blood from healthy individuals (GSE72642, resting), and samples of CD8+ T cell clones expanded with IL-2/anti-CD3 antibody and either eAPC or eAPC:4-1BBL (GSE86284, supportive). Both the centroid and the linear model scored the functional activity state of the CD8+ lymphocytes in the calibration and validation set 100% correct. No data were available of CD8+ T cells in the suppressed state.

Figure 11B:
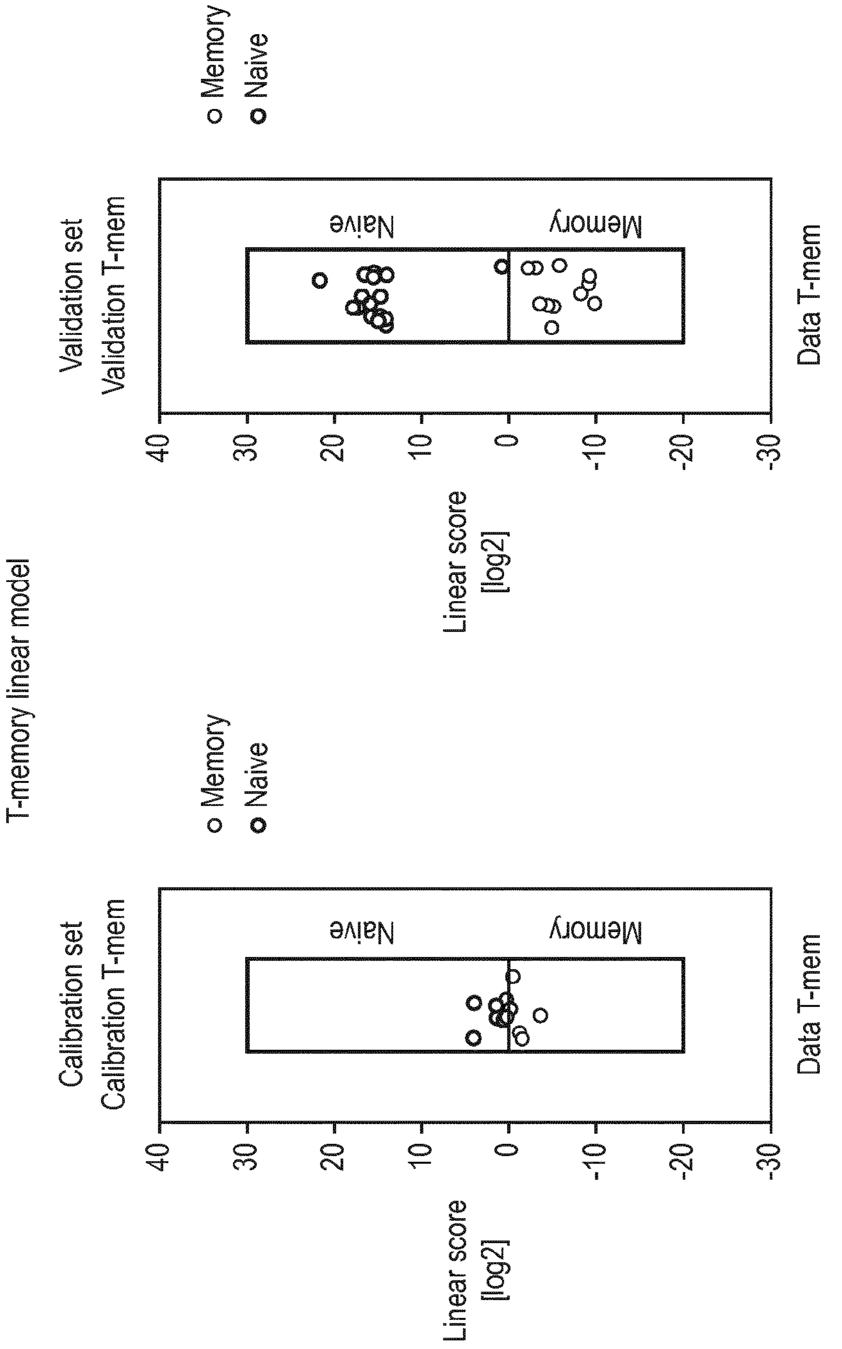

FIGS. 11A and 11B show exemplarily calibration and validation results of a two-state (naive, memory) immune model for T memory lymphocytes based on pathway analysis respectively the centroid (A) and the linear (B) model; FIG. 11B (continued) shows the separation between resting and supportive samples with a threshold. PI3K, NFKB, TGF-I3 pathways were used for the model. The calibration set contained memory T effector cells (memory) and naïve T effector cells (naïve), isolated from peripheral blood of 6 healthy individuals (GSE65010). The validation set contained samples with memory T cells (GSE65010+GSE26495, memory) from peripheral blood from healthy individuals, and naive CD8 T cells (GSE26495) and naïve T-reg cells (GSE65010, naive) from healthy individuals.

Figure 12B:
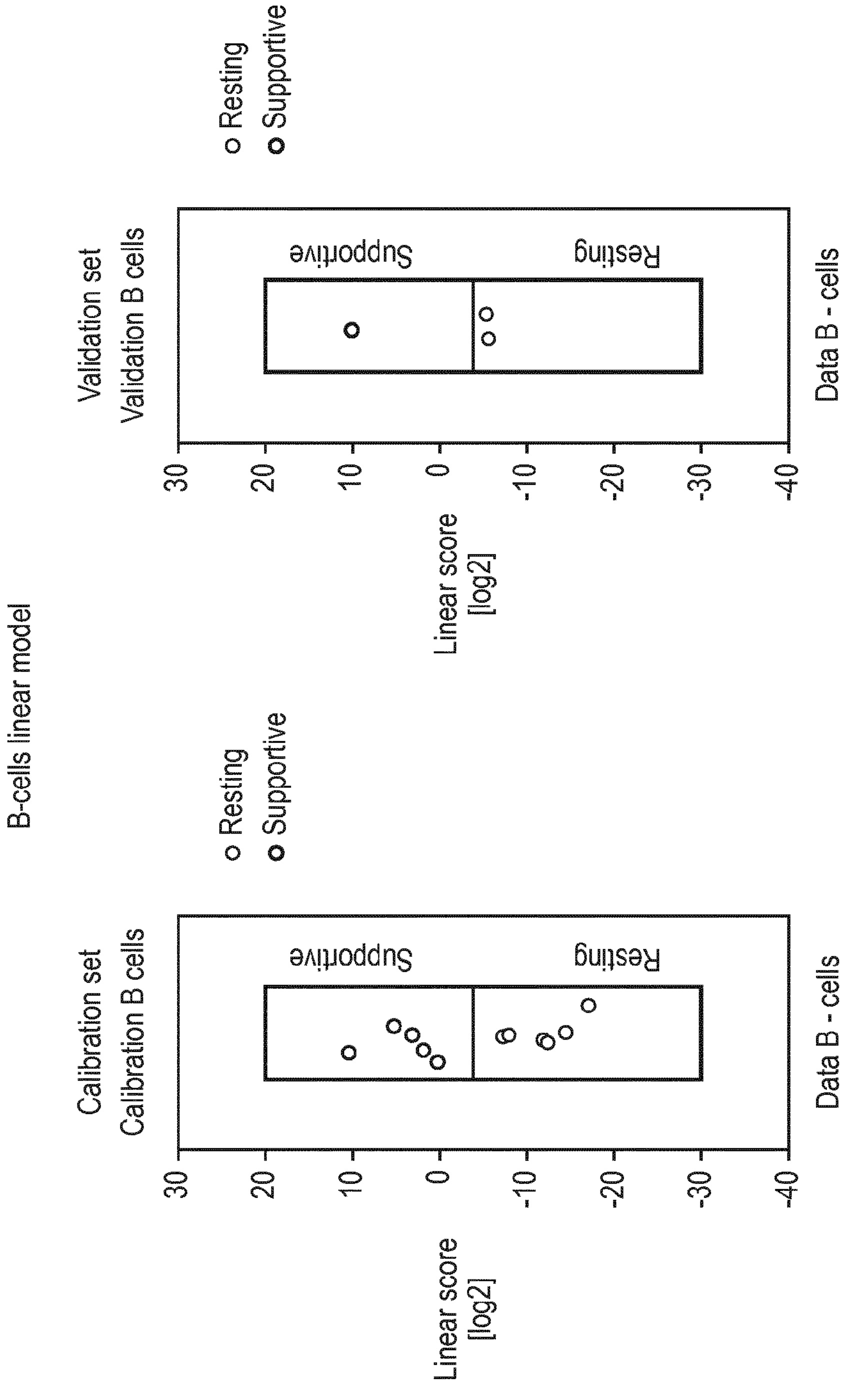

FIGS. 12A and 12B show exemplarily calibration and validation results of a two-state (resting, supportive) immune model for B lymphocytes based on pathway analysis respectively the centroid (A) and the linear (B) model; FIG. 12B (continued) shows the separation between resting and supportive samples with a threshold. PI3K, NFKB, JAK-STAT3 pathways were used for the model. The calibration set contained samples with B lymphocytes from blood from healthy individuals (GSE39411), either unstimulated (resting), or as a time series of B cells in culture in which the B-cell receptor was stimulated with goat F (ab') 2 anti-human IgM (supportive). The validation set (GSE9119) contained samples with similarly treated B lymphocytes from healthy individuals (resting, supportive). The model scored the functional activity state of the B-cells in the validation set 75% correct.

Figure 13A:
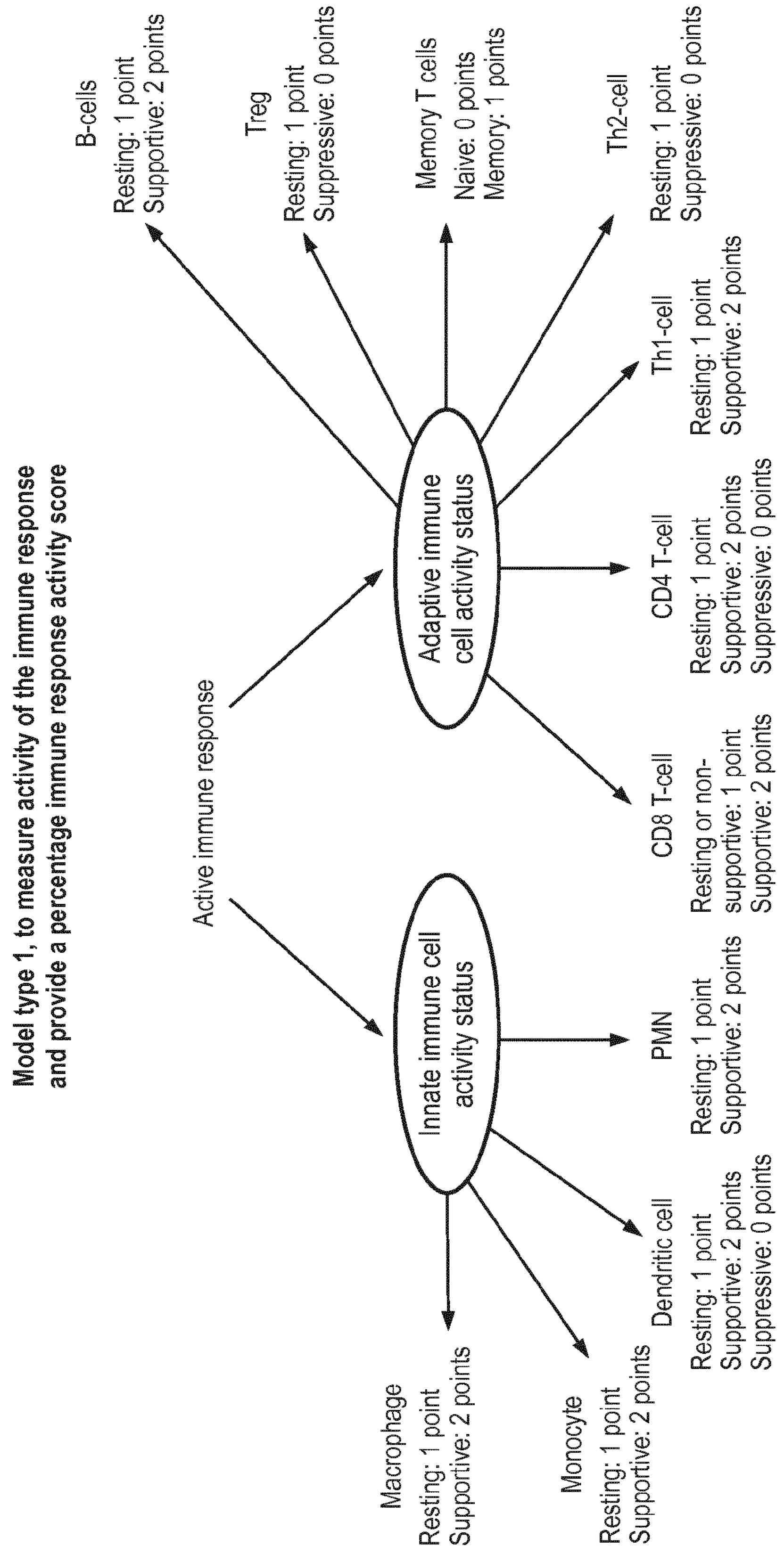
Figure 13B:
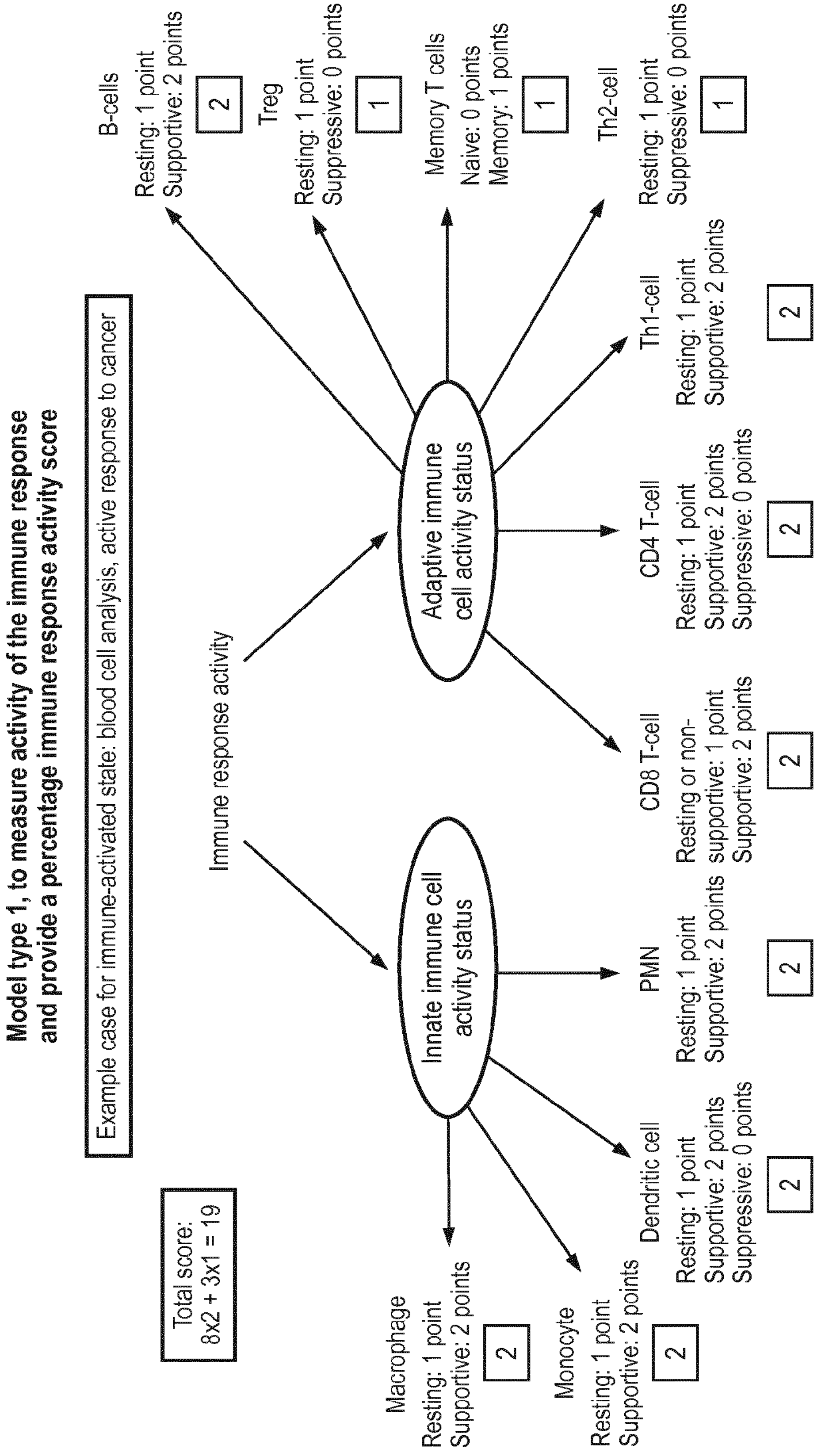
Figure 13C:
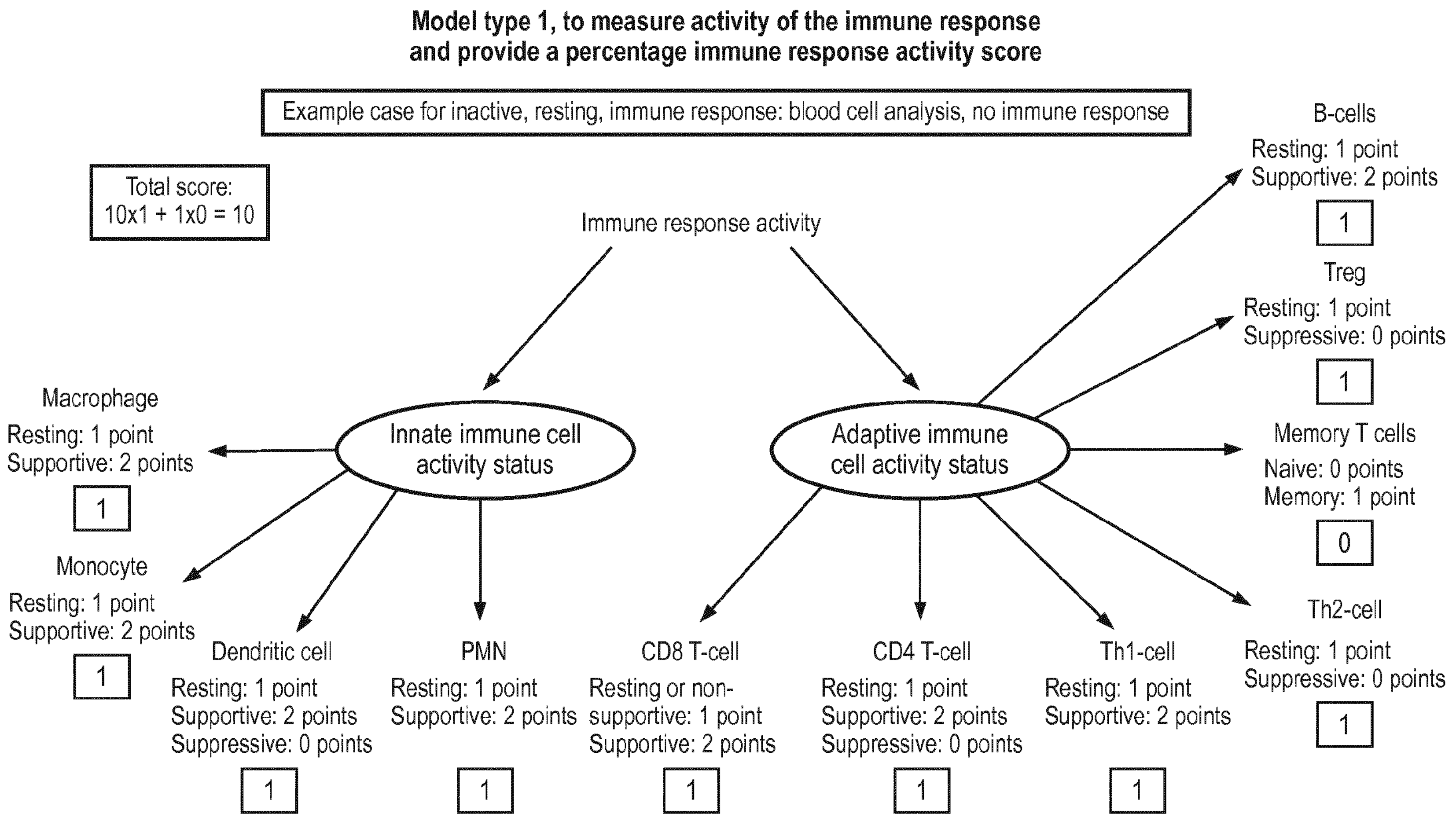
Figure 13D:
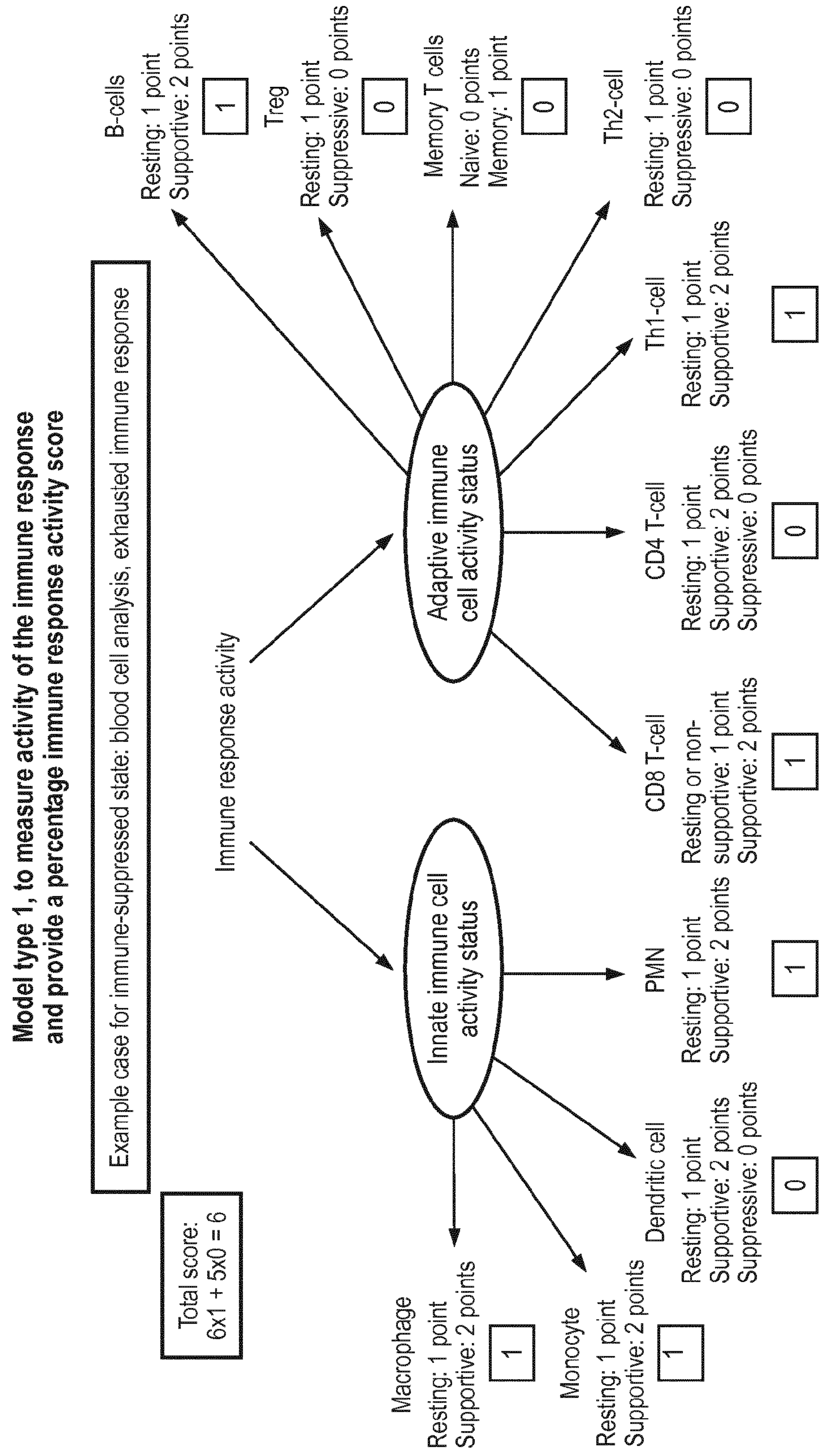
Figure 13F:
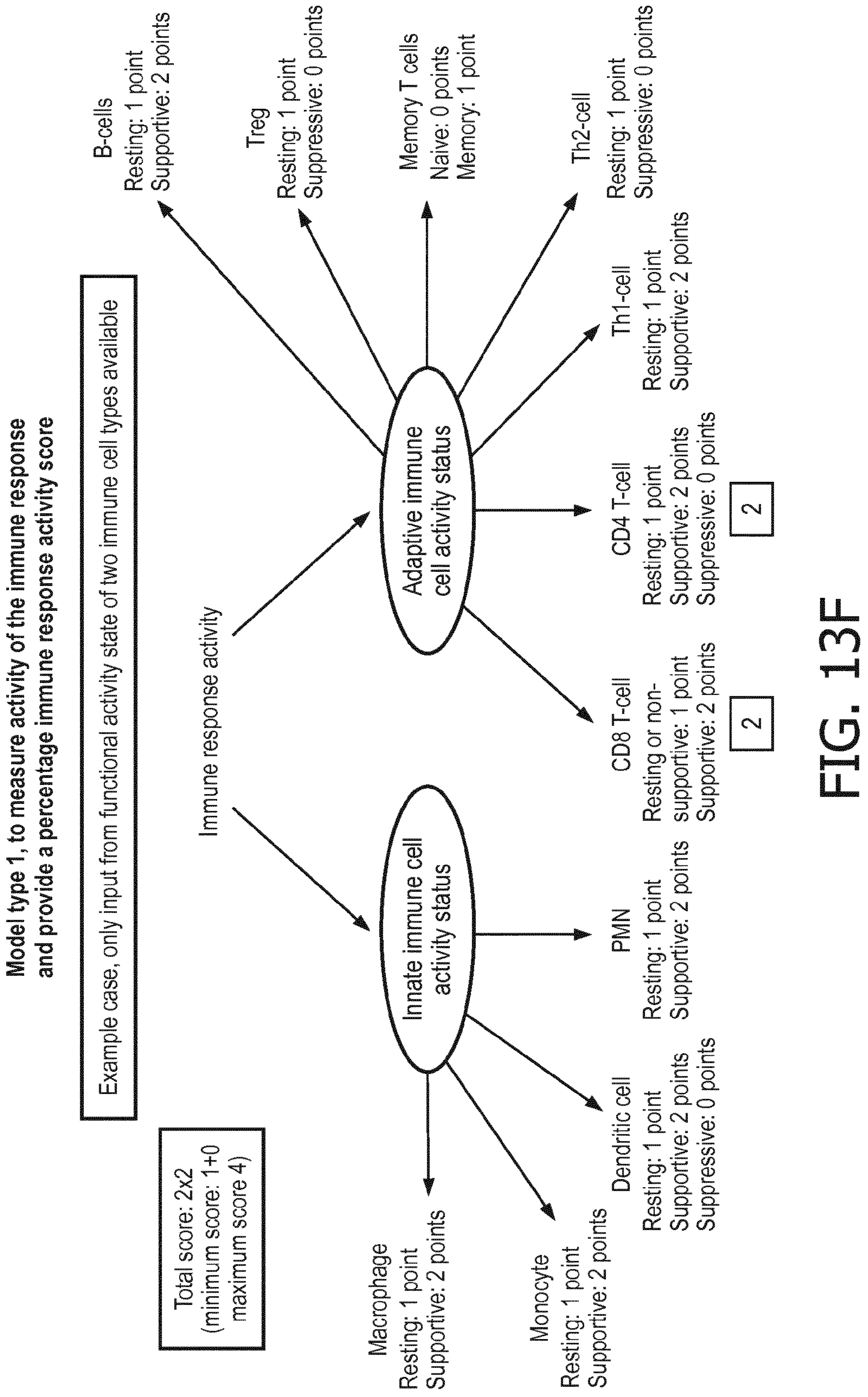

FIG. 13A to 13G show exemplarily and schematically an approach to calculate a percentage of immune response activity (herein also referred to as immune system status) based on a mathematical model (functional Immune Response model "Type 1") providing an immune activity response score (A). In this example the total score ranges can lie between 19 (maximum, fully active immune system) and 6 (minimum, suppressed immune system). Subtracting 6 from 19 delivers 13, to be divided over a scale from 1-100% immune response activation. The linear activity score can be translated into percentage activation by the following equation: Percentage immune activity=[(cumulative points-6)/13]×100%. A percentage >77% indicates an active immune response; a percentage lower than 77% increasingly indicates an immune suppressed immune response. To change this readout into a quantitative score for immune activity versus immune suppression, called immune response status: this "resting" threshold can be reset from 77% to 0, while removing the % sign. The equation becomes as follows: % immune response activity−77=immune activity status, where a positive number means that the immune response is active and a negative number means that it is suppressed. When incorporated into the earlier equation: Immune response status {[(cumulative points−6)/13]×100}−77. Negative number indicates immune response suppression; positive number indicates immune response activity (FIG. 13E). In case not all input values are available (F) the percentage immune activity can be calculated as follows: Percentage immune activity=[(score-min)/max-min]×100%, where: min=minimal point value for measured immune cell types (in the example: 0+1=1); max=maximal point value for measured immune cell types (in the example: 2+2=4). For the example case percentage immune activity=[(score−1)/3]×100%. In the example case: 100%, however the uncertainty is high because only two observable observables were entered into the model. The (un)certainty can be calculated as follows: When all 11 observables (meaning the input variables into the model, that is, functional activity scores of the immune cell types) are available as input into the model=maximum certainty with respect to prediction of immune activity status=defined as 100% certainty. Assumption: Linear contribution of observables to final score: (100/11)=9% certainty contribution per observable. In the example case, 2 cumulative points input provides an immune activity score of 100%, associated with 82% uncertainty. FIG. 13A: Model for calculation of immune response, consisting of two parts of the immune response, innate and adaptive. Input variables or observables into the model are the functional activity scores of the immune cell types, determined by signal transduction pathway analysis in each cell type. Observable scores are added up, to provide scores for innate and adaptive immune system activity, and for overall immune system activity. FIG. 13B to 13D: Example cases for calculation immune system activity based on a blood cell analysis. FIG. 13B: Example case for immune-activated state: Blood cell analysis, active response to cancer. FIG. 13C: Example case for inactive, resting, immune response: Blood cell analysis, no active immune response. FIG. 13D: Example case for immune-suppressed state: Blood cell analysis, exhausted immune response. FIG. 13F: Example case, only input from functional activity state of two immune cell types available. Calculation of percentage immune activity in case not all input values are available: Percentage immune activity=[(score−min)/max−min]×100%, where: min=minimal point value for measured immune cell types (in the example: 0+1=1); Max=maximal point value for measured immune cell types (in the example: 2+2=4). For the example case percentage immune activity=[(score−1)/3]×100%. The result in the example case is 100% activity, however the uncertainty is high because only two observables were entered into the model. When incorporating the associated uncertainty into the result: 2 cumulative points input provides an immune system activity score of 100%, with 82% uncertainty. FIG. 13G: Calculation of the score.

FIG. 14 shows exemplarily and schematically an approach to calculate a probability or Log 2odds score of immune response activity based on a mathematical model based on a Bayesian network model (functional Immune Response model "Type 2"). FIG. 14A: Directed acyclic graph for the Bayesian network model with arrows pointing from innate and adaptive immune cell activity states to immune response activity and from innate immune cell activity status to adaptive immune activity status. Arrow directions have a defining meaning in a Bayesian network model. Example Bayesian network model node parameters for each of the immune cell types that are part of the model are indicated in the figure in the tables, that is, parameters for two-state (resting and supportive) and 3 state model (resting, supportive, suppressed) nodes for immune cell types with respectively 2 and 3 immune activity states. They enable calculation of the activity status of the innate and adaptive immune system separately. FIG. 14B: Determination of the a status activity of the overall immune response/immune system. From the immune activity scores of the innate and adaptive immune system, a result can be obtained on the activity status of the overall immune response. Overall Immune Response is effectively a look up table. There is no probabilistic dependency. Upper figure table: this is a table for a node with 2 parents (innate and adaptive immune system), in transposed format. The bottom right figure table should be read as follows: the probability of Adaptive Immune system in a resting state given that the Innate immune system is suppressive is 0.3. Note that the probabilities in a column add up to one (but not necessarily in a row) because given Innate Immune is active, (1st column) the 3 options for AI are active, resting suppressive and hence the column must sum to 1.

Figure 15A:
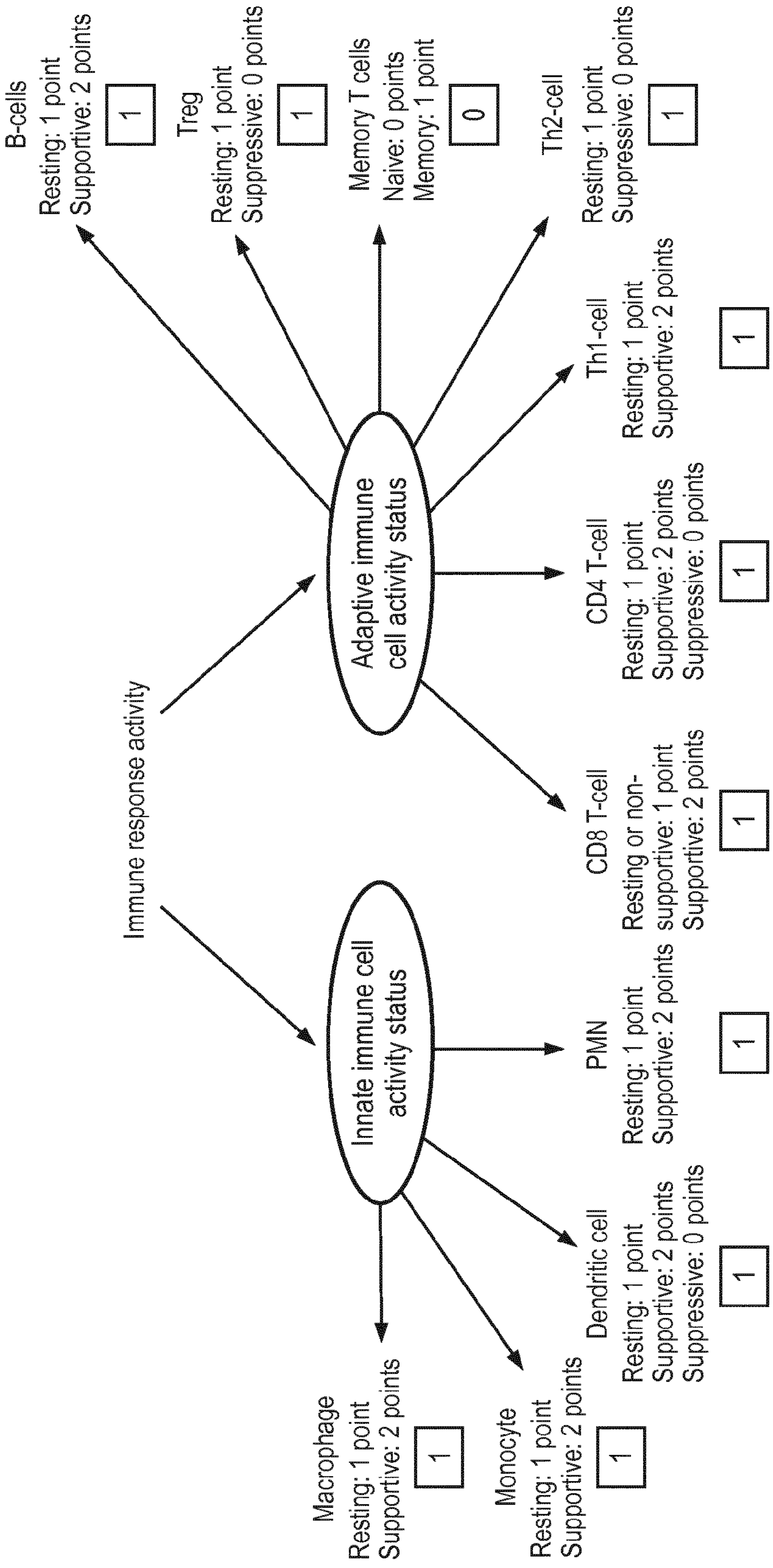

FIG. 15 shows exemplarily and schematically an approach to calculate a numerical immune score of immune response activity based on a linear model (Immune Response model "Type 3"). FIG. 15A: The constructed model for calculating the immune response. In the pictured example, the score is 10, indicating a maximally active immune system/response. FIG. 15B: Calculation of immune response activity: Cumulative points higher than 10 points increasingly indicates that an immune response is not inactive/suppressive, whereas cumulative points below 10 increasingly indicates that an immune response is in a suppressed state. In the pictured example, the score is 10, indicating a maximally active immune system/response.

Figure 16A:
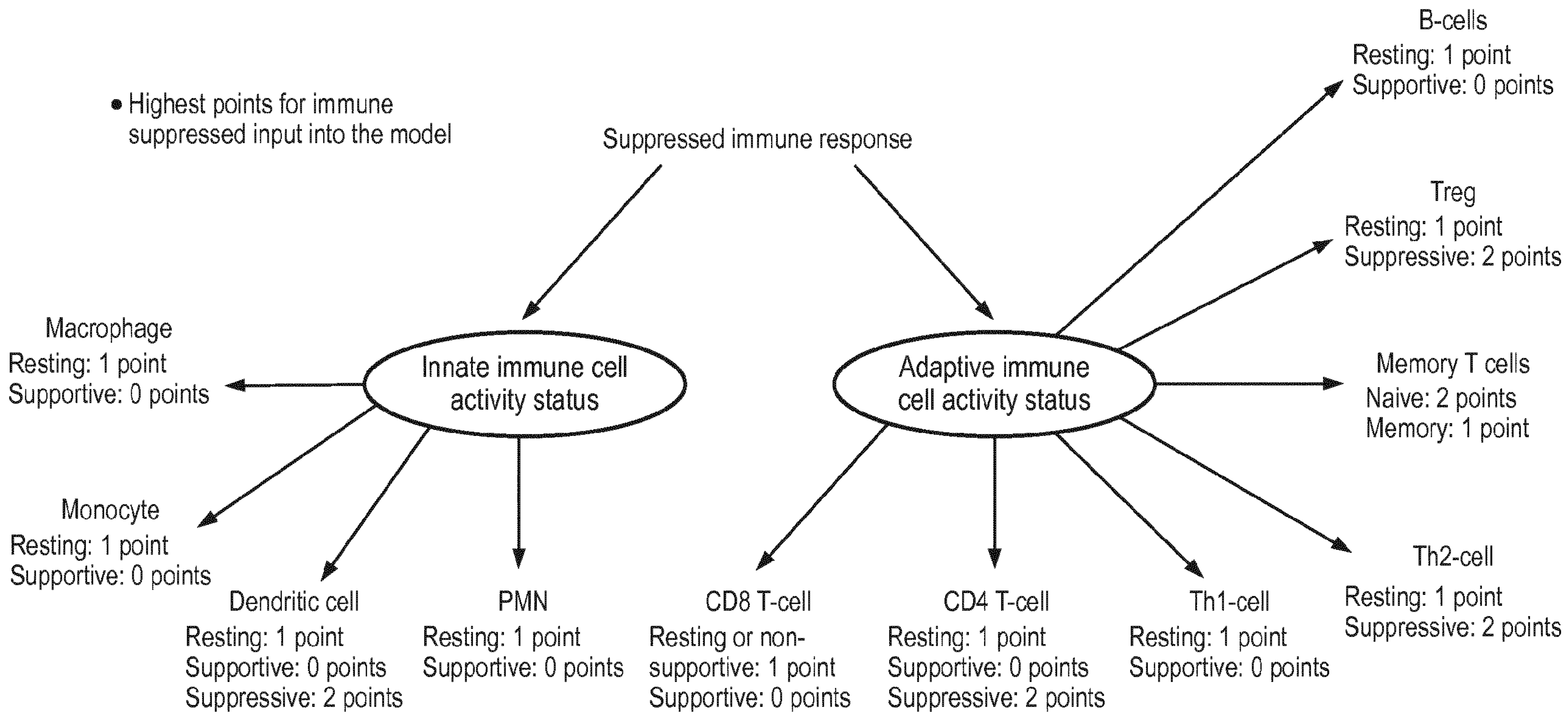
Figure 16B:
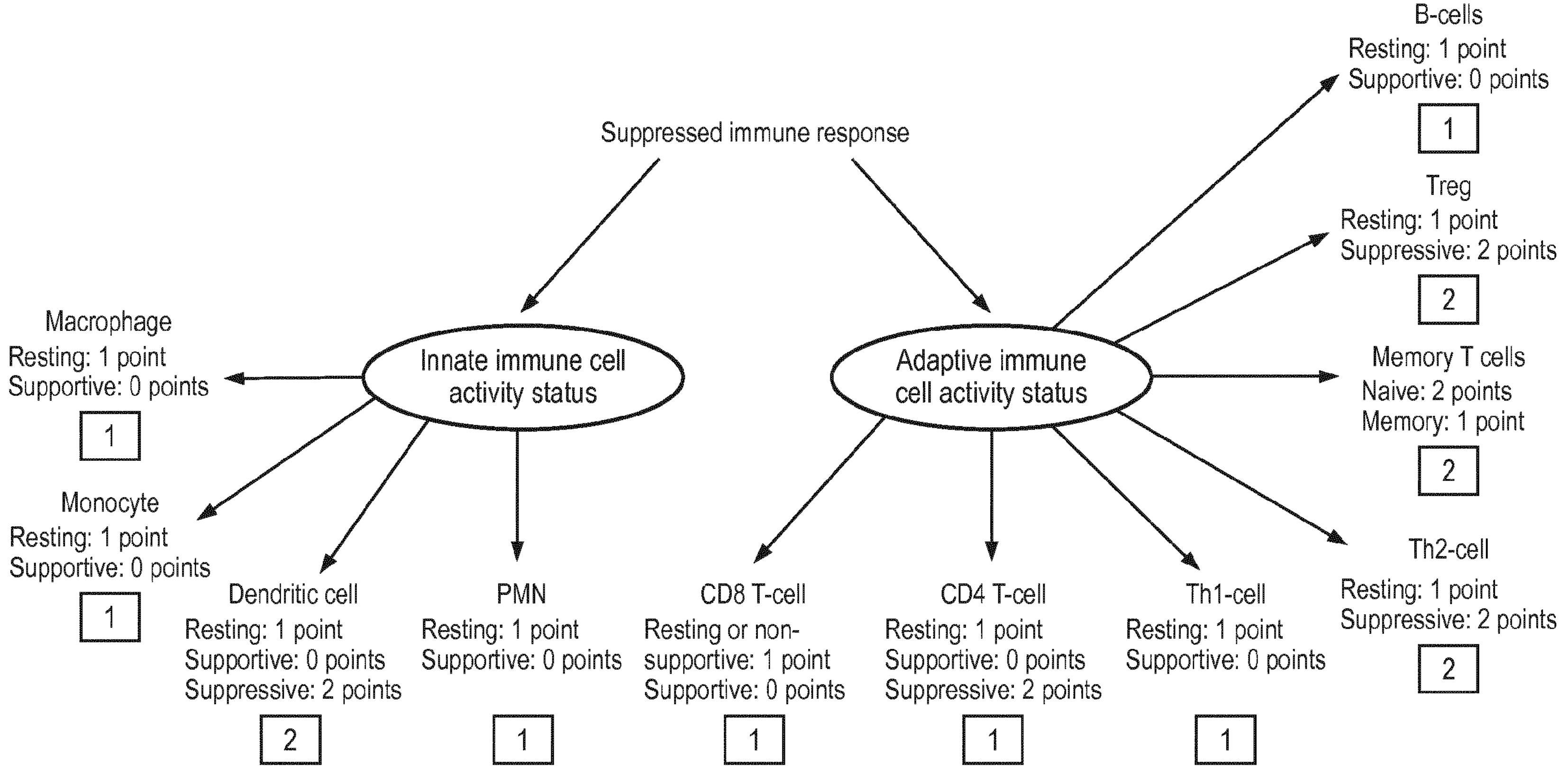

FIGS. 16A and 16B show exemplarily and schematically an approach to specifically measure immune suppressed status of the immune response based on a linear model (Linear Immune Response model "Type 3 variant A") or a linear-converted to percentage model. Conversion from points to percentage is similar as has been described (FIG. 13). In this example, the highest immune suppressed immune response score is 15. The lowest immune suppressed response score is 3 points. Immune suppressed immune response score=[(cumulative points-3)/12]×100%.

FIG. 16A: Figure of the model for immune suppression calculation. FIG. 16B: Example of maximally immune-suppressed immune response/system. FIG. 16C: In this example, the highest immune suppressed immune response score was 15 points and the lowest immune suppressed response score was 3 points (calculated as [(cumulative points-3)/12]×100%).

Figure 17A:
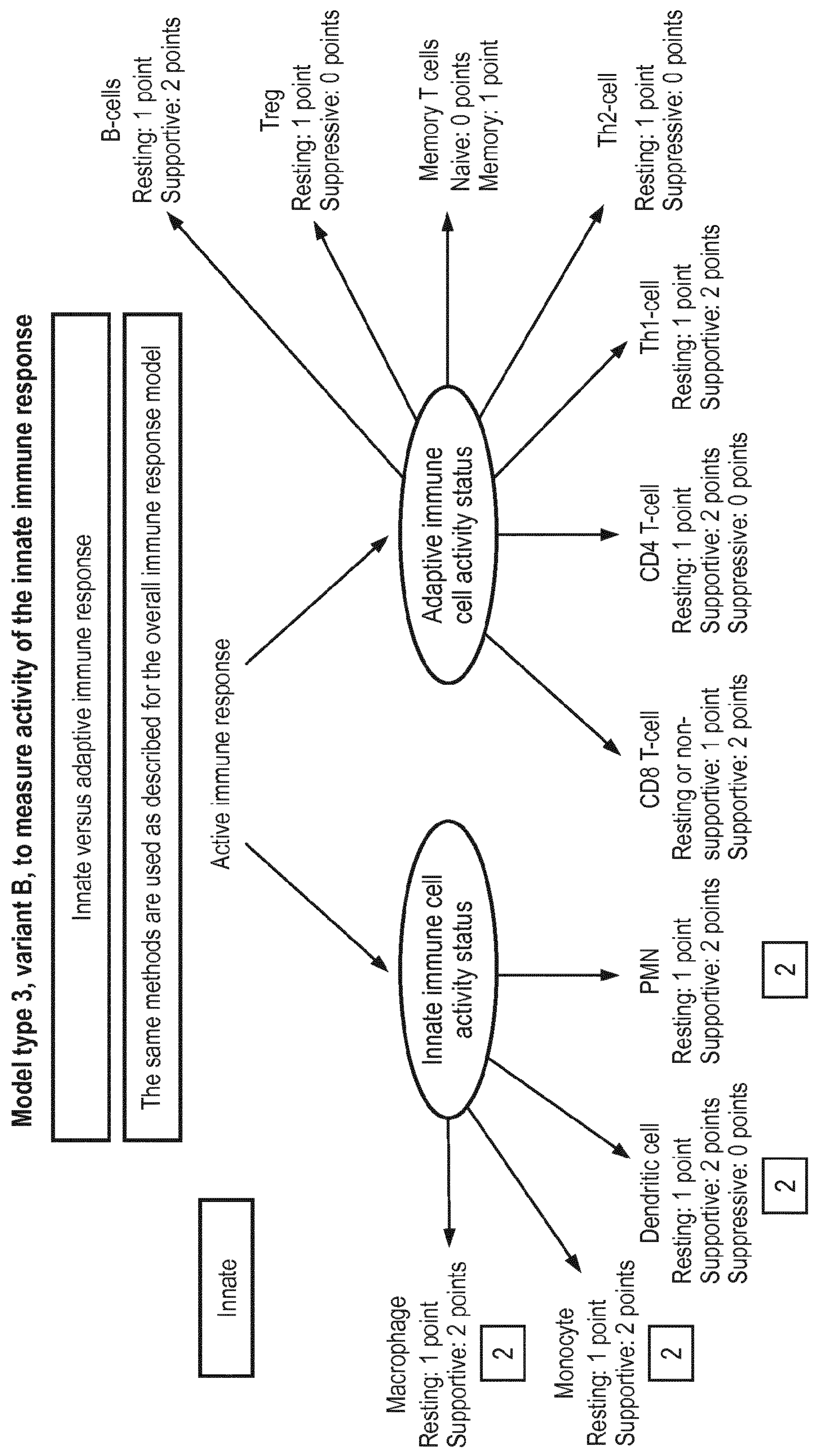
Figure 17B:
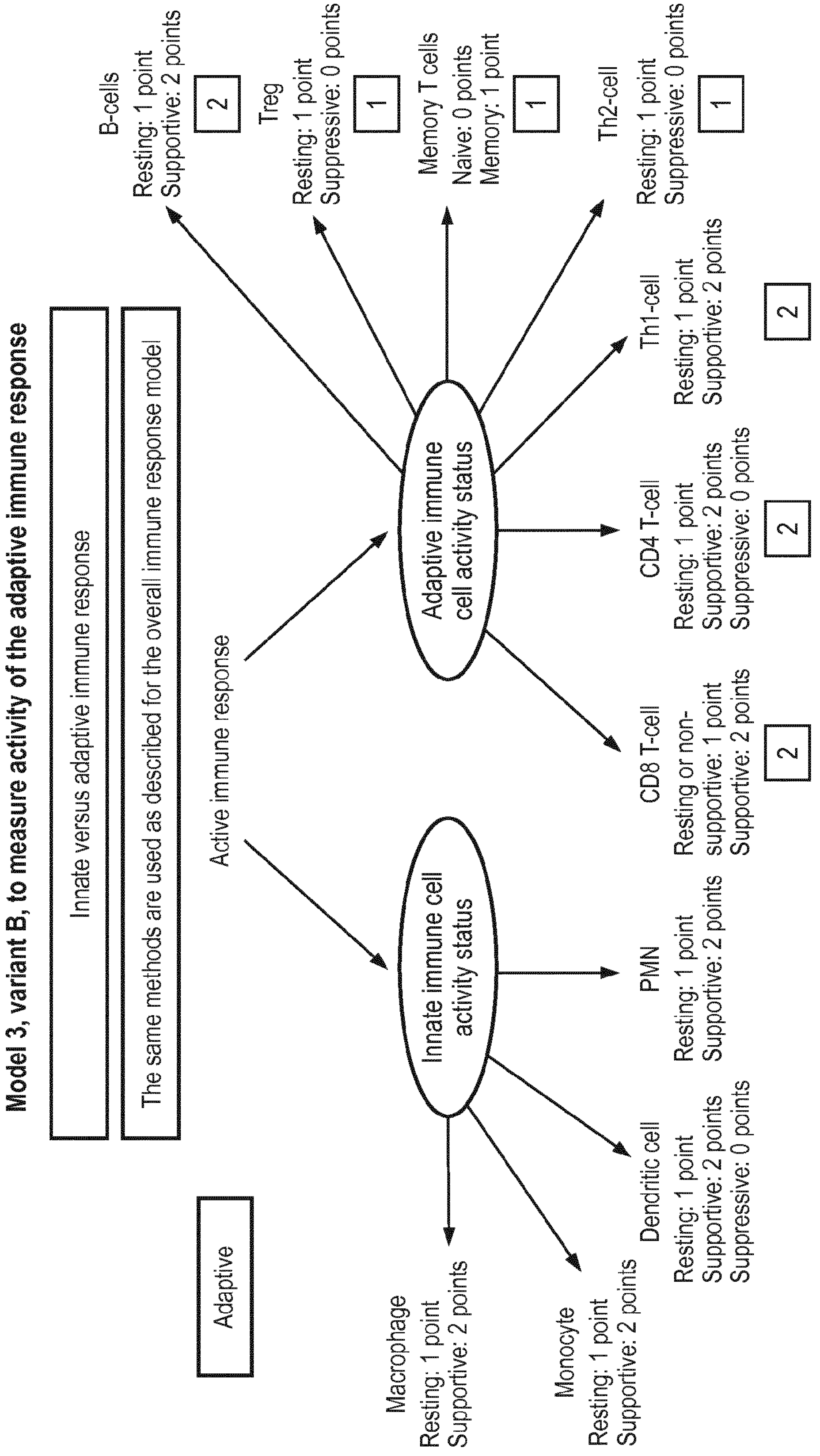

FIGS. 17A and 17B show exemplarily and schematically an approach to measure activity of the innate immune response (herein also referred to as innate immune system status) and the adaptive immune response (herein also referred to as adaptive immune system status) using a mathematical model ("Type 3 variant B"). The same approach can be used to describe the overall immune response model. FIG. 17A: Exemplarily illustrates an active innate immune system. FIG. 17B: Exemplarily illustrates an active adaptive immune system.

FIGS. 18A and 18B show exemplarily results for measurement of immune response status (dataset GSE72462). Different immune cell types (CD4+, CD8+ and B-lymphocytes, neutrophils, monocytes) were isolated from peripheral blood samples of 3 healthy individuals, and Microarray results we analyzed with the here described method to assess functional activity status of the various immune cell types using the Centroid Models, and the model results functioned as input for the Type 1 (percentage Immune Response Activity) Immune Response model. FIG. 18A: Series showing pathway analysis results, together with the Centroid model results for sequentially CD4 lymphocytes, CD8 lymphocytes, B-cells, Monocytes, PMNs ("resting" score for all three samples, all immune cell types of which data were available). Bottom part of figures shows the position of the analyzed samples relative to the functional Immune cell activity model calibration samples for the respective immune cell types. FIG. 18B: Immune response model calculation (based on Centroid model results from FIG. 18A): Percentage immune activity=[(score−min)/(max−min)]×100%. (5−4)/(10−4)×100%=17%. Uncertainty calculation: missing observable/variables=6. Uncertainty 6×9=54% uncertainty. Range: 0-71%, threshold for an active immune response lies at 77%, indicating high confidence that these samples are representative for an inactive immune response. In this case, all three samples in the dataset scored similar. FIG. 18C: Results are shown of the analysis using Type 2 (Bayesian model Immune response activity) immune response model. The centroid model results of immune cell activity analysis (FIG. 18A) functioned also as input for the Type 2 (Bayesian model Immune response activity) Immune response model.

One set of evidence to the Bayesian Network is formed by taking the cell types CD4, CD8, B cells, Monocytes and PMNs and attribute these a 100% certain resting state. For each of the three replicates a dataset was generated where the state is not 100% certain resting, but is defined probabilistic. The probability is derived from the distances obtained with the centroid model (as reported in FIG. 18A)—with the highest probability attributed to the state with the smallest distance. The following Softmax approach is used to determine probabilities:

$$\text{SoftMax}\left(-\begin{pmatrix} a \\ b \end{pmatrix}\right) = \left(\frac{e^{-a}}{e^{-a}+e^{-b}} \; \frac{e^{-b}}{e^{-a}+e^{-b}}\right)$$

The result of the Bayesian Immune response model calculations shows that both innate immune cell types, adaptive immune cell types, as well as the overall immune response, has highest probability for the activity state the normal/resting state, in full agreement with the immune response activity status expected for healthy individuals.

Figure 19:
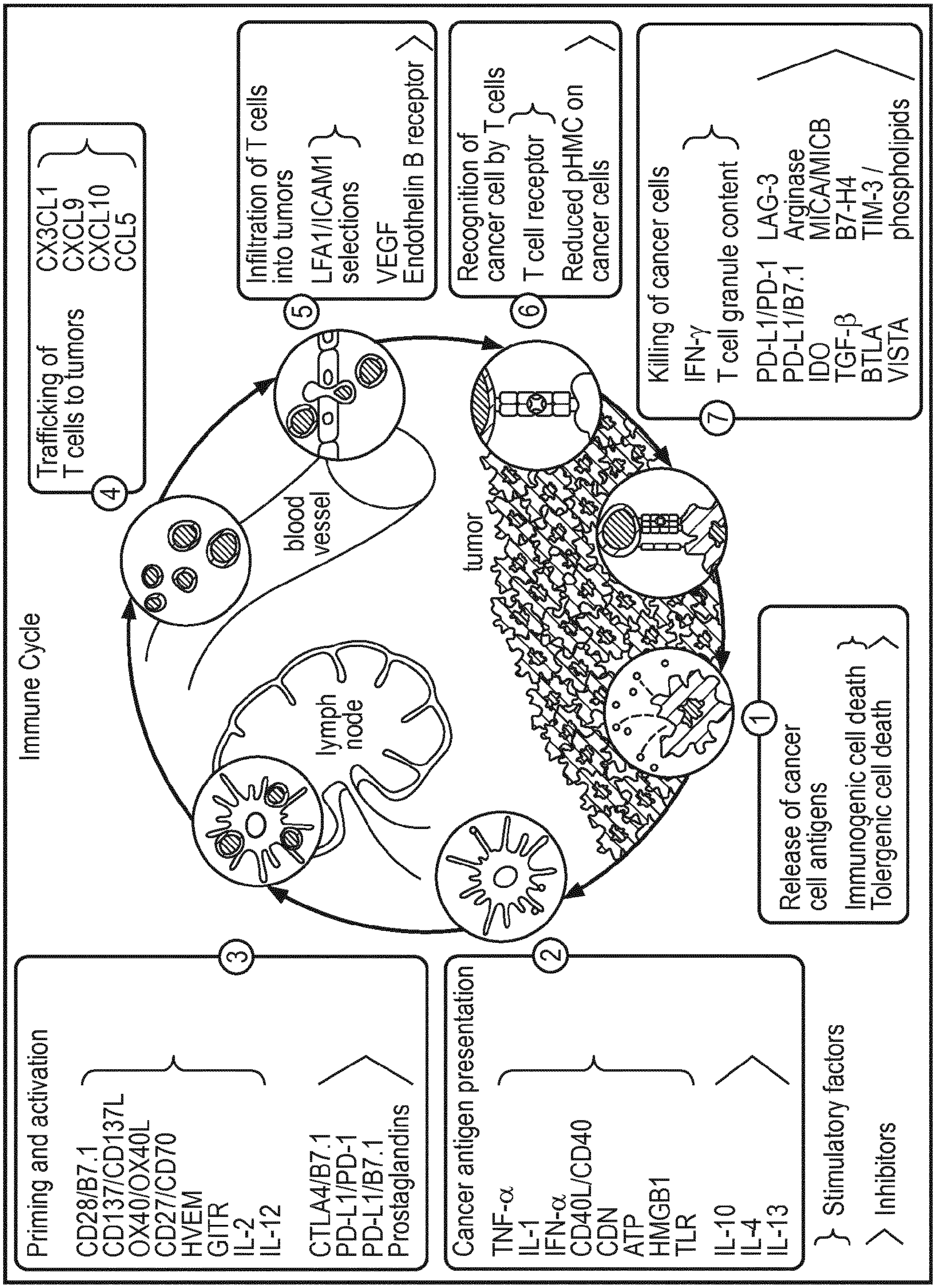

FIG. 19 illustrates schematically the immune cycle and indicates the main three locations in the immune system where immune cells can be obtained in a patient with cancer.

Figure 20A:
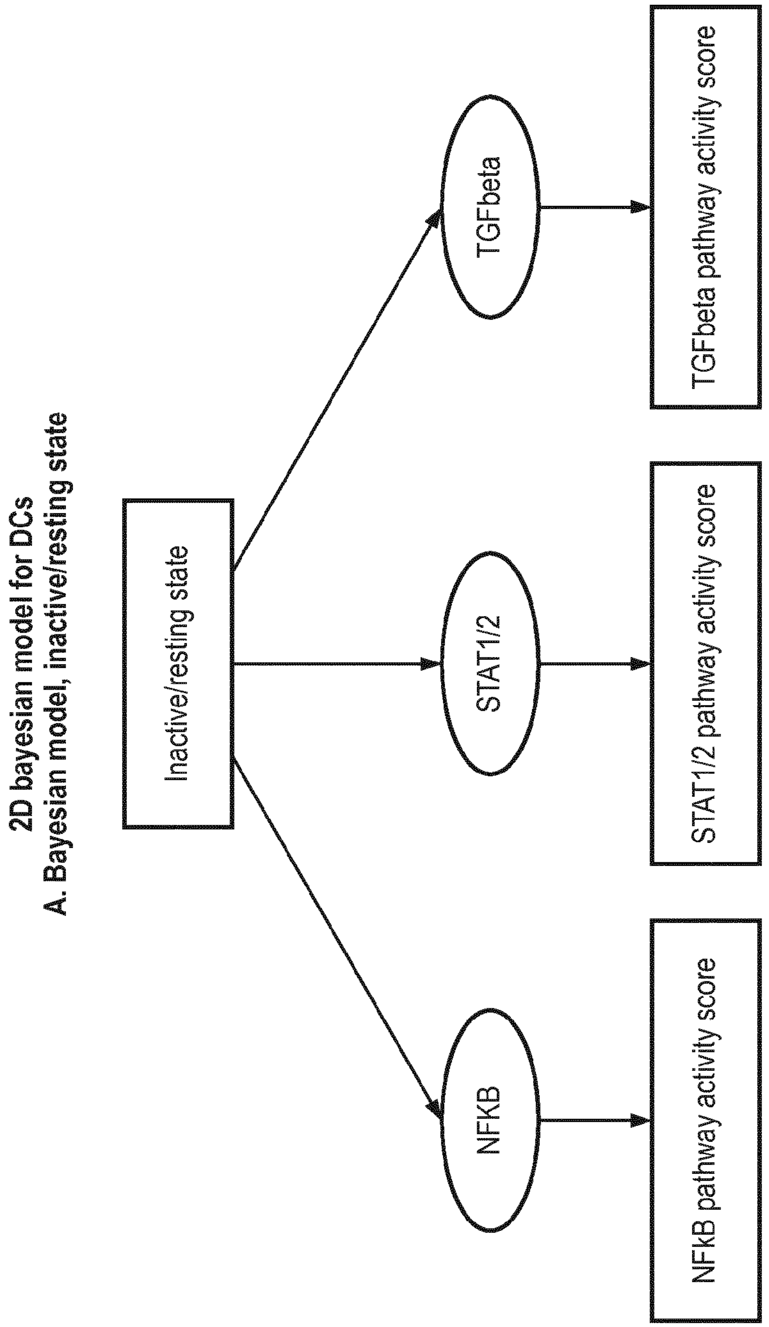
Figure 20B:
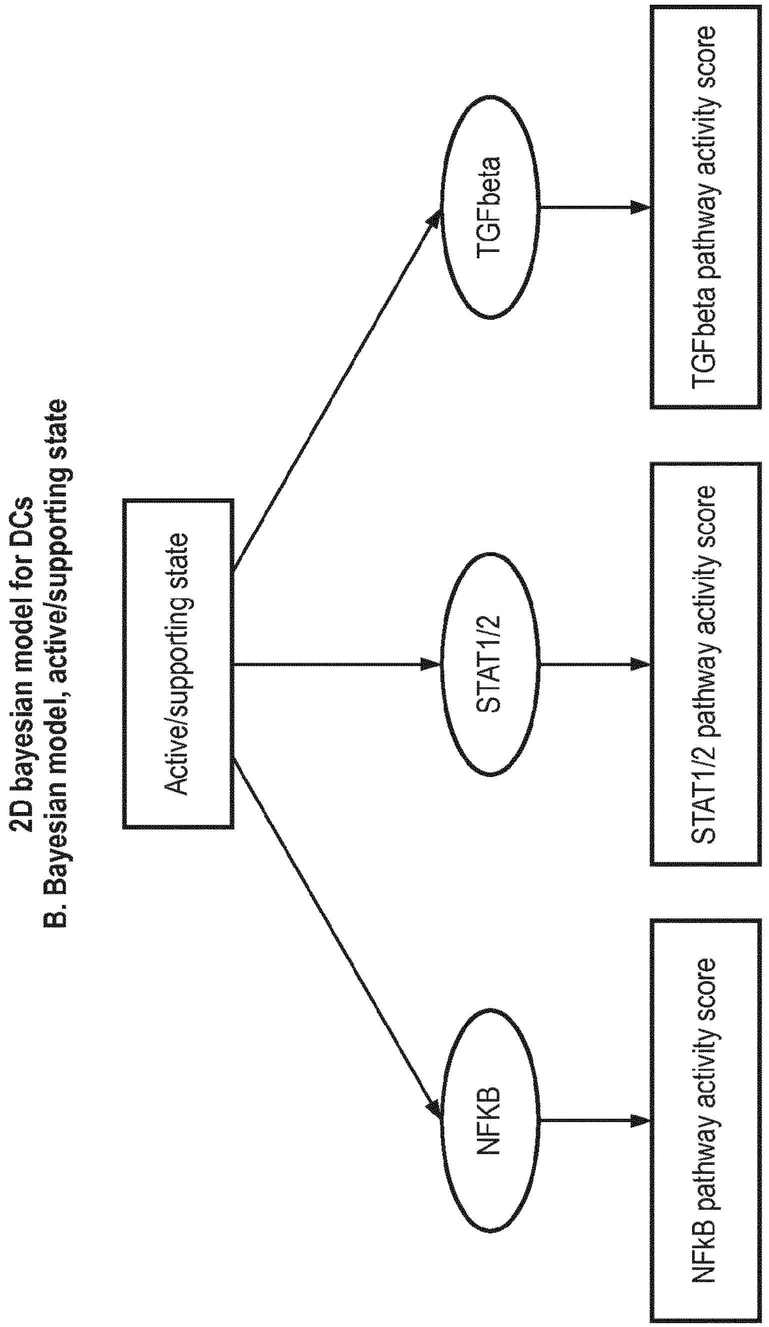

FIG. 20A to 20D schematically and exemplarily show an approach and calibration results for the prediction of the functional state of dendritic cells based on NFkB, JAK-STAT1/2 and TGF-β pathway activity scores using a 2-state (resting vs. supportive) Bayesian model. (Validation of the Bayesian model on independent datasets is shown in later Figures). FIGS. 20A and 20B schematically illustrates the approach. FIG. 20A: Bayesian model for calculation of resting (inactive) state of the dendritic cells. FIG. 20B: Bayesian model for calculation of supportive (active) state of the dendritic cells. FIG. 20C: Top: CPT values (Bayesian node parameters) for each of the three pathways that are part of the Bayesian model; Bottom: Calibration dataset pathway analysis results using dataset GSE23371, with pathway activity scores indicated per analyzed sample (GSM numbers). FIG. 20D: Calibration results on dataset GSE23371. In the bar graphs, each analyzed sample is represented by a bar. Left: Immune score as calculated by the mode in log 2odds on y-axis for calibration results with sample numbers on x-axis, negative log 2odds means resting positive log 2odds means supportive; Right: Immune score as calculated by the model probability on y-axis for calibration results sample numbers on x-axis, low probability means resting, high probability means supportive. Ground truth was either immune resting or immune supportive. The resting DCs were found to have a high probability/log 2odds of being immune resting (not active). The supporting DCs were found to have a high probability/log 2odds of being immune supportive.

Figure 21A:
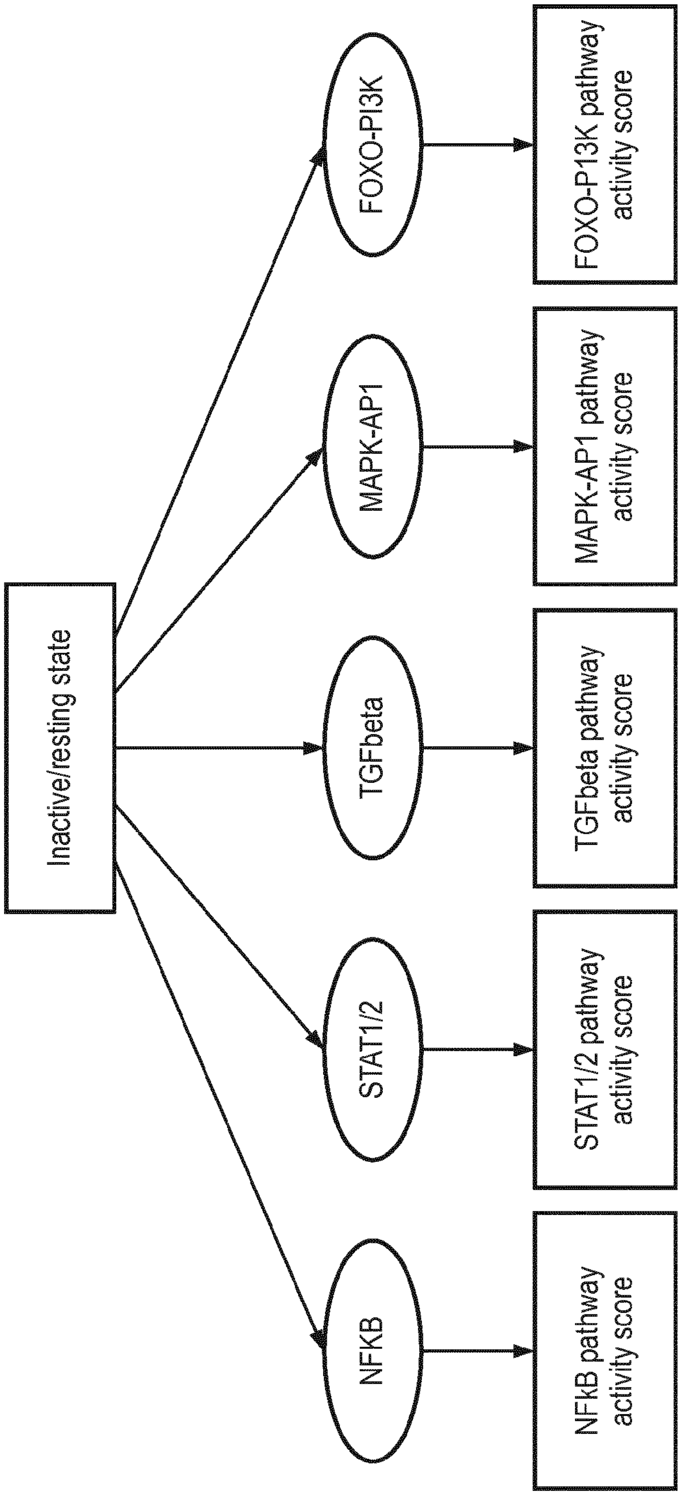
Figure 21B:
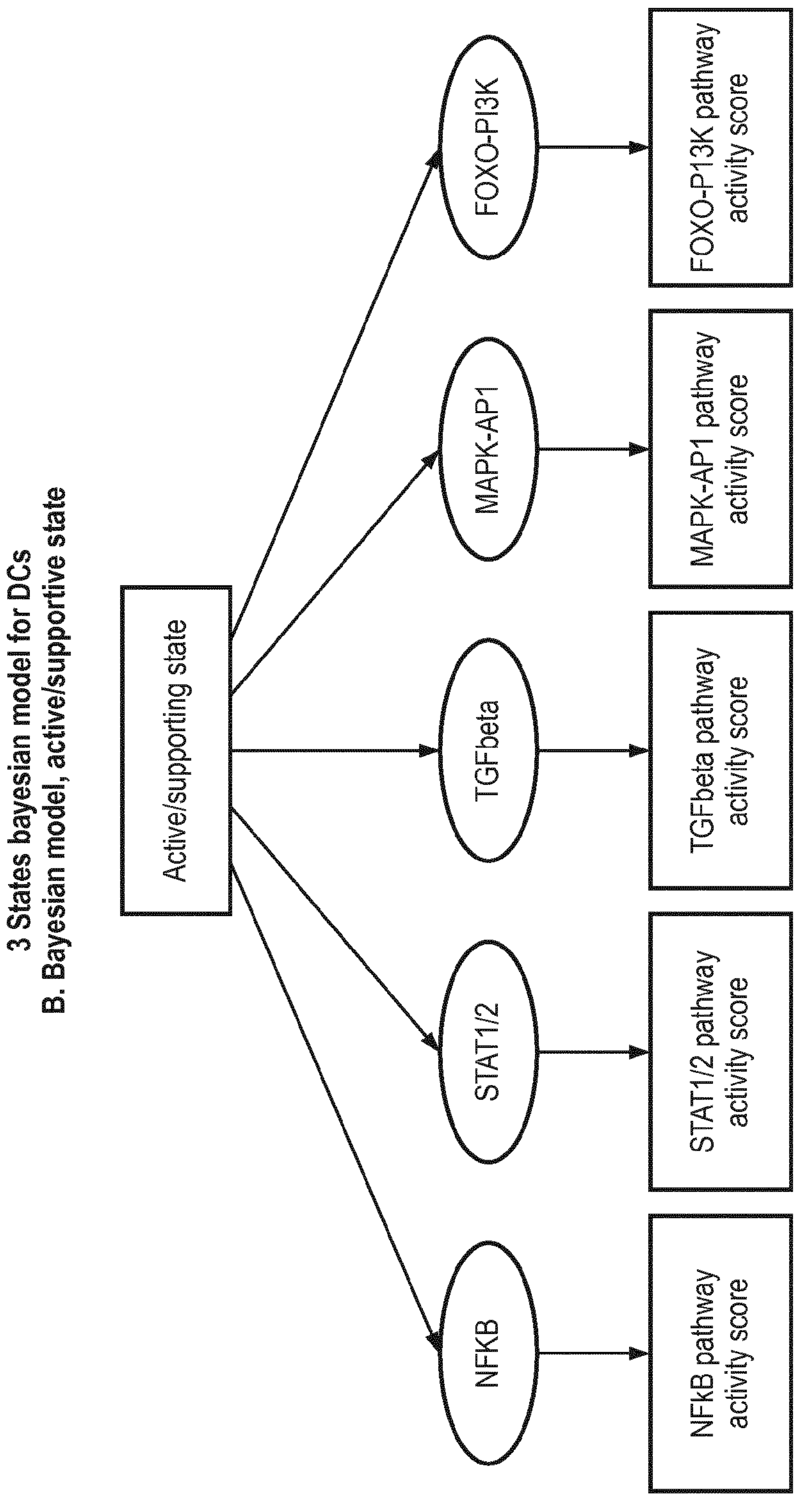
Figure 21C:
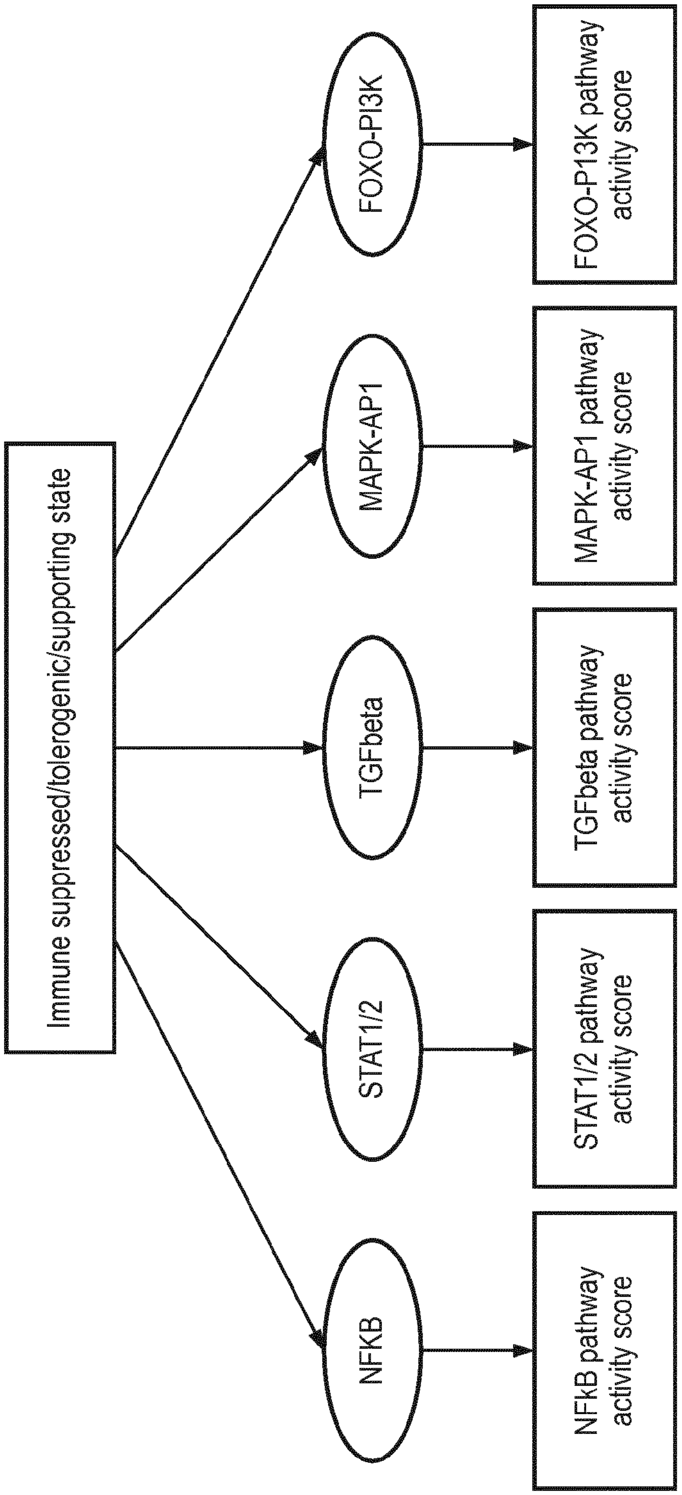
Figure 21E:
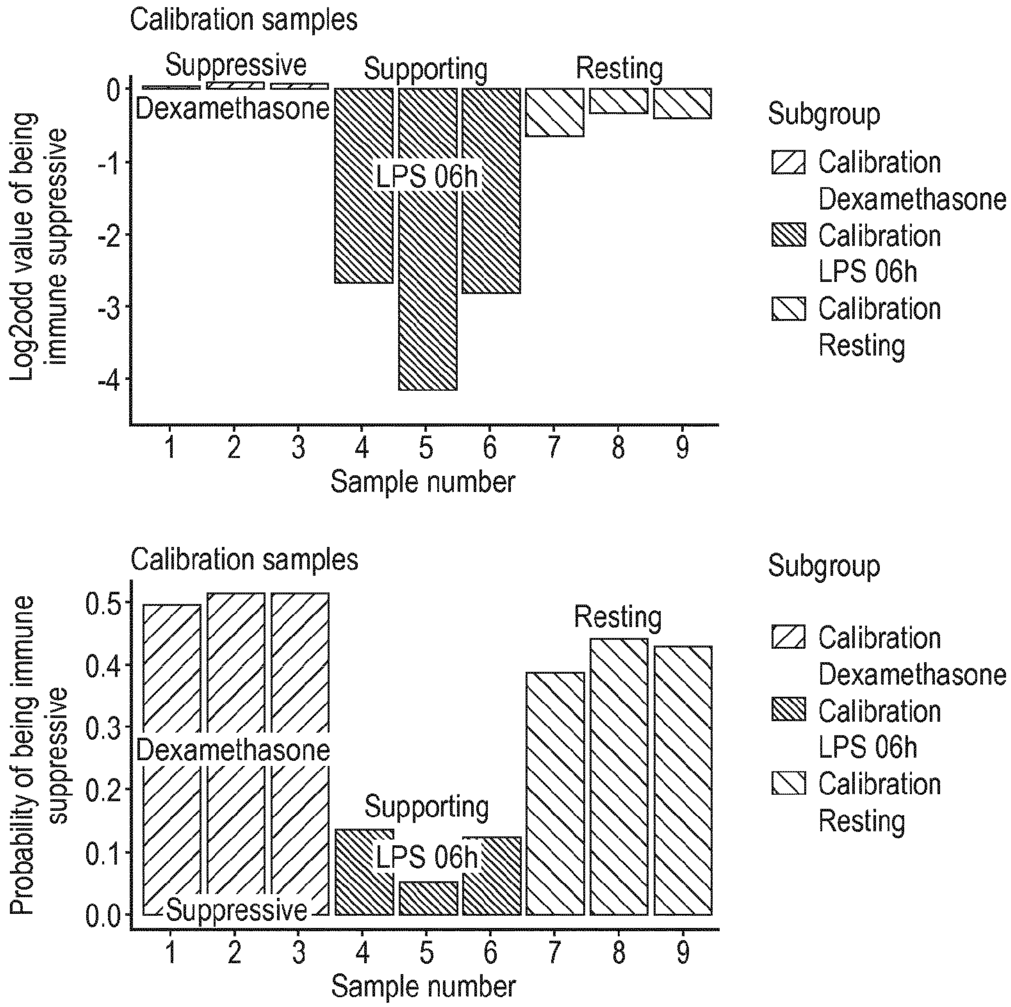
Figure 21E:
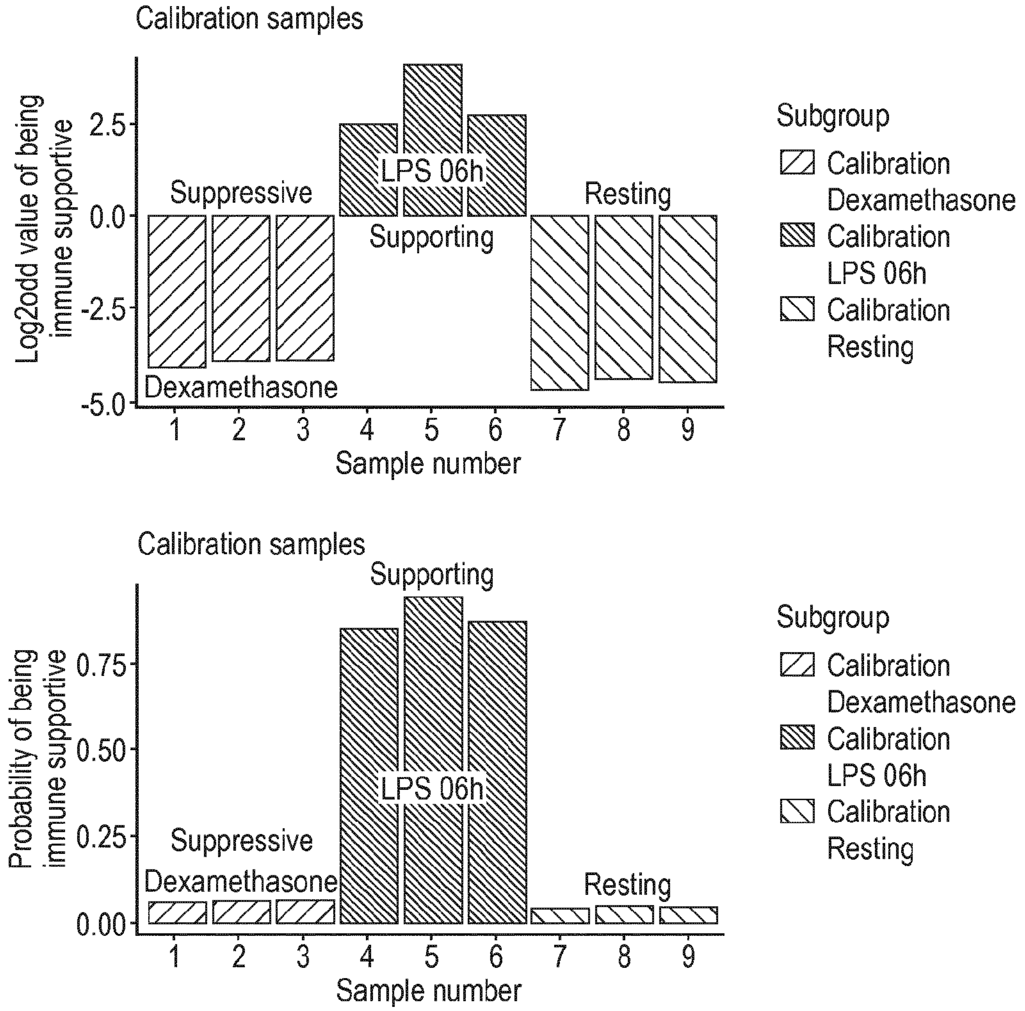

FIG. 21A to 21D show schematically and exemplarily an approach and calibration results for the prediction of the functional state of dendritic cells based on NFkB, JAK-STAT1/2, TGF-β, MAPK-AP1 and PI3K pathway activity scores using a 3-state (resting vs. supportive vs. suppressive) Bayesian model. FIG. 21A to 21C schematically illustrates the approach. FIG. 21A: Three-state Bayesian model for calculation of inactive resting state in dendritic cells. FIG. 21B: Three-state Bayesian model for calculation of immune supportive state in dendritic cells. FIG. 21C: Three-state Bayesian model for calculation of immune suppressed state in dendritic cells. FIG. 21D: CPT values (Bayesian network node parameters). FIG. 21D, continued: Calibration dataset pathway analysis results using dataset GSE23371 with pathway activity scores indicated per analyzed sample (GSM numbers). FIG. 21E: Bayesian model calibration results on dataset GSE23371. First two bar graphs show model results for assessment of immune-suppressed state; bar graphs 3/4 show results for assessment of immune supportive state; bar graphs 5/6 show results for assessment of resting state. The y-axis shows the respective score, for bar graphs 1, 3, 5 this is in log 2odds score; for bar graphs 2, 4, 6 this is in probability score. In the bar graphs, each analyzed sample is represented by a bar. In each bar graph the left three bars represent scores of samples with an "immune-suppressed" state ground truth; bars 4 to 6 represent samples with "immune supportive" state ground truth; bars 7 to 9 represent samples with "resting" state ground truth. The ground truth state is indicated in each of the bar graphs underneath or on top of the bars. Results: The suppressive DCs have the highest probability of being immune suppressive. The supportive DCs have the highest probability of being immune supportive. The resting DCs have the highest probability of being immune resting.

Figure 22A:
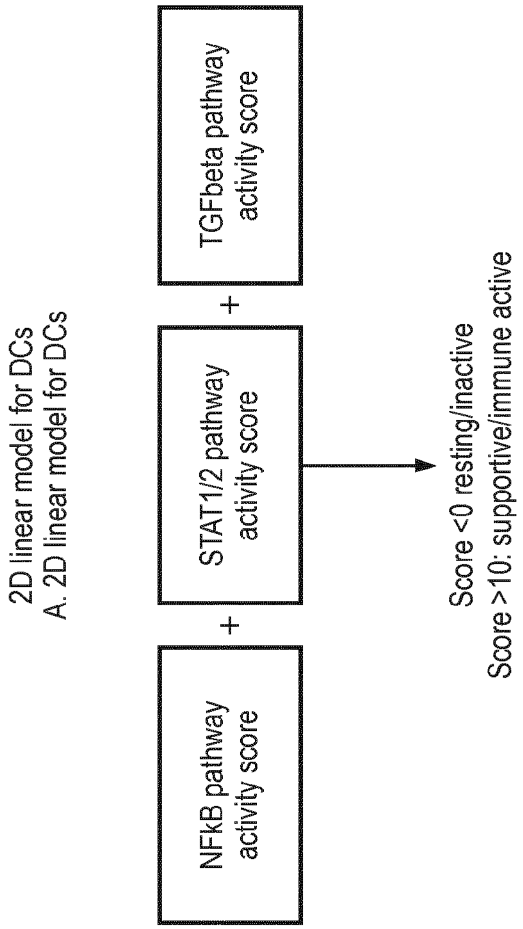
Figure 22B:
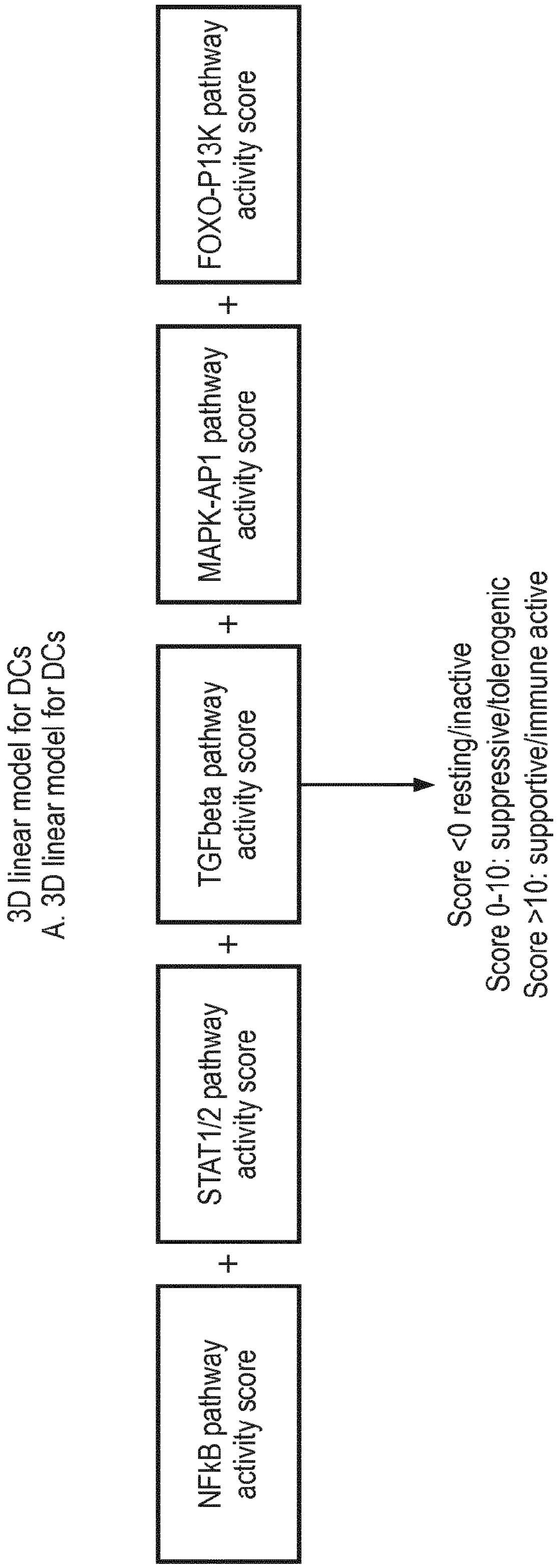

FIG. 22A to 22E show schematically and exemplarily an approach, calibration and validation results for the prediction of the functional state of dendritic cells based on pathway activity scores using a linear model. FIG. 22A: Score for 2-state (resting vs. supportive) model. FIG. 22B: Score for 3-state (resting vs. supportive vs. suppressive). FIG. 22C: Calibration pathway analysis results for 2-state model (top) and 3-state model (bottom), pathway analysis results are indicated for each individual sample (indicated by GSM number), as well as the sum (cumulative values) of the pathway activities (most right column). FIG. 22D: Validation results on independent dataset GSE18791 for the 2-state model. Samples in this dataset were immune-activated using Newcastle Disease Virus (NDV) infection for respectively 1, 2, 4, 6, 8, 10, 12, 14, 16, 18 hours, or not activated (Reference: Zaslavsky E. et al., "Antiviral response dictated by choreographed cascade of transcription factors", Journal of Immunology, Vol. 184, No. 6, March 2010, pages 2908 to 2917). Results: Samples activated for a short period (up to 4 hours) are, according to a defined score, in immune resting state. Activation for an intermediate duration results in an intermediate state between resting and supporting. Longer activation (>8 hours) consistently results in immune supporting state. When the samples are not activated (the whole series of control samples that were not infected with the NDV) they are in an immune resting state (FIG. 22D, continued). FIG. 23E: Validation results on dataset GSE13762 and GSE18791 for the 3-state model. Dataset GSE13762 contains samples of resting and immune suppressed (tolerogenic) dendritic cells (Reference: Széles L. et al., "1,25-dihydroxyvitamin D3 is an autonomous regulator of the transcriptional changes leading to a tolerogenic dendritic cell phenotype", Journal of Immunology, Vol. 182, No. 4, February 2009, pages 2074 to 2083). Dataset GSE18791 is described under FIG. 22D: Samples were activated for respectively for 1, 2, 4, 6, 8, 10, 12, 14, 16, 18 hours with NDV, or not activated, or suppressed. Results for analysis of the samples from the GSE18792 dataset were similar to results described under FIG. 22D: Samples activated for a short period are, according to a defined score, in immune resting state. Activation for an intermediate duration results in an intermediate state between resting and supporting. Longer activation results in immune supporting state. The model correctly predicted the ground truth dendritic cell activity status. FIG. 22D, continued, shows the control untreated samples set from GSE18792, and at the bottom the 6 samples from dataset GSE13762. The column "subgroup" contains the ground truth designation "resting" or "immune suppressive". Result of the model calculation: The samples are scored correctly by the model as resting or immune suppressive.

Figure 23A:
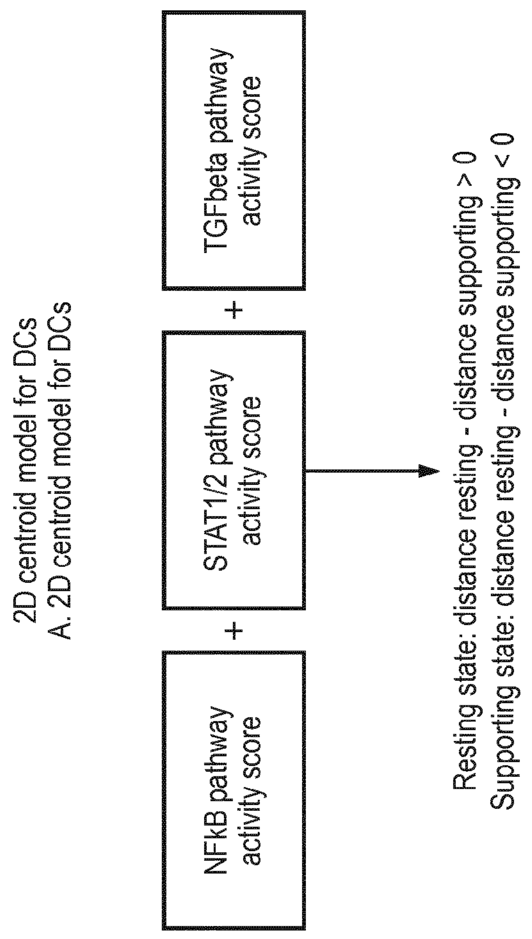
Figure 23B:
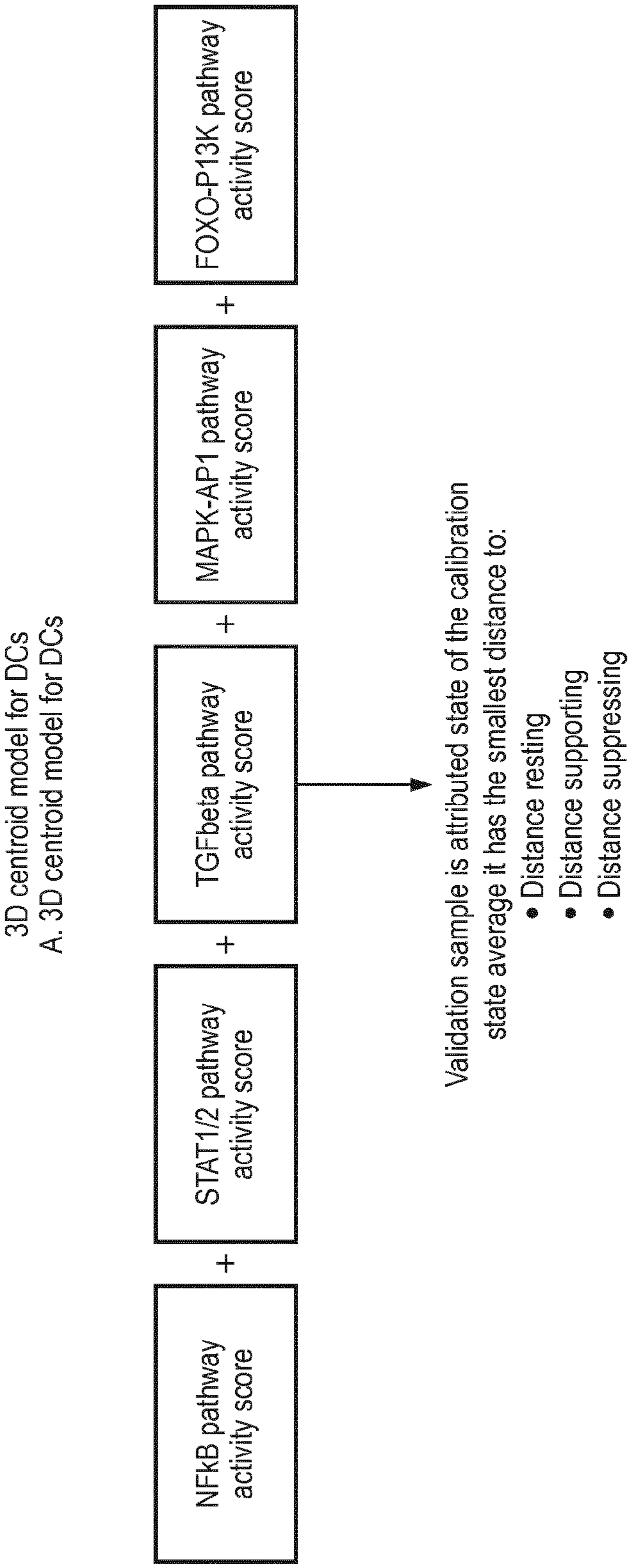

FIG. 23A to 23E show schematically and exemplarily an approach, calibration and validation results for the prediction of the activity state of dendritic cells based on pathway activity scores using a centroid model. FIG. 23A: 2-state (resting vs. supportive) model. FIG. 23B: 3-state (resting vs. supportive vs. suppressive). FIG. 23C: Calibration dataset pathway analysis results for 2-state model (top) and 3-state model (bottom). Centroid model calibration results are shown at the bottom of each calibration dataset. FIG. 23D: Validation results on independent dataset GSE18791 (described in FIG. 22) for the 2-state model. Samples were activated with NDV infection for respectively for 1, 2, 4, 6, 8, 10, 12, 14, 16, 18 hours, or not activated. Results: Similar to those reported in the description of FIG. 22. FIG. 23E: Validation results on dataset GSE13762 and GSE18791 for the 3-state model. Results: Similar to those reported in the description of FIG. 22.

Figure 24:
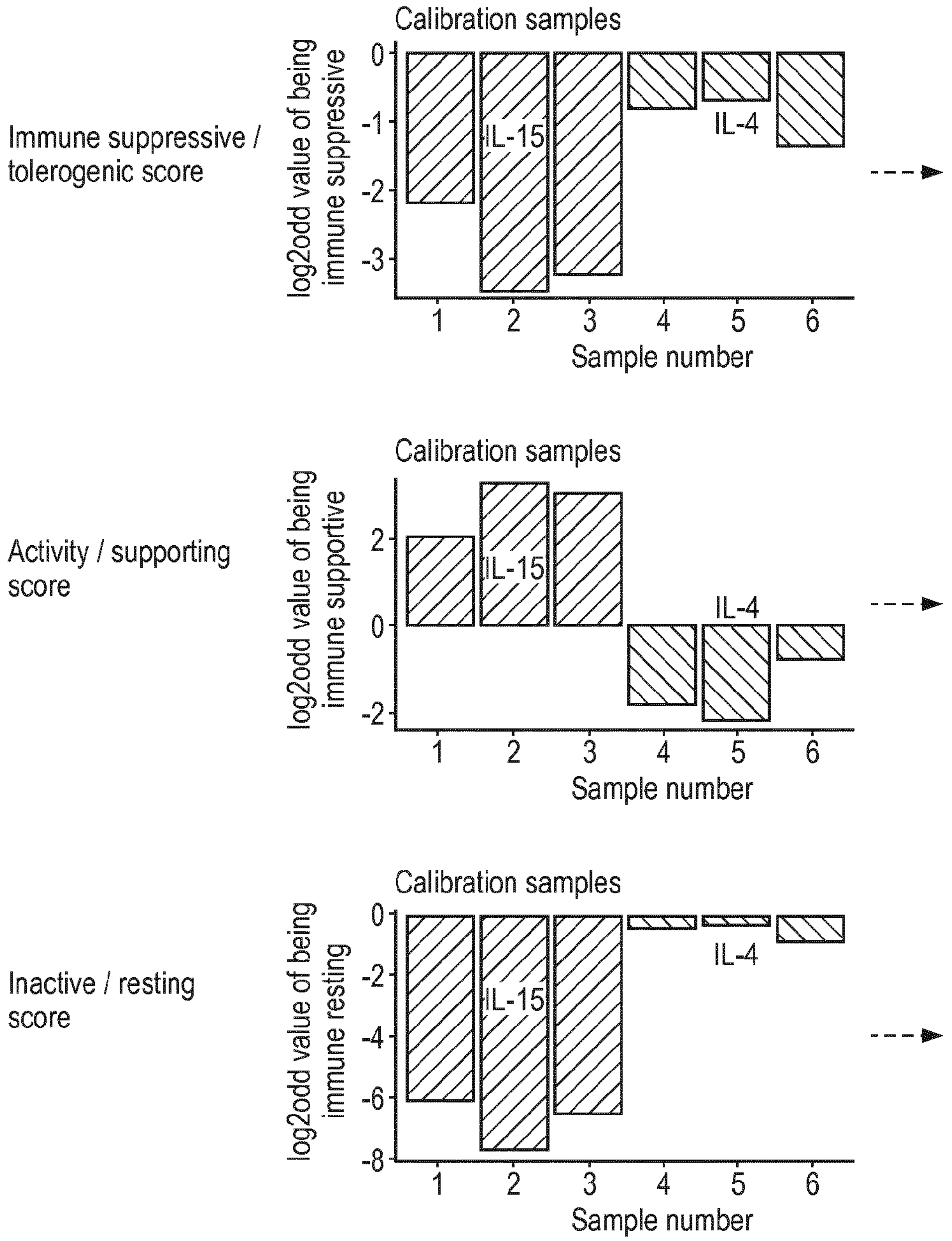

FIG. 24: Validation of the Bayesian model for dendritic cells. Exemplarily results for the determination of the functional status of IL-4 and IL-15 cultured dendritic cells using the 3-state Bayesian model on dataset GSE79184. IL-15 cultured DC have more supporting and IL-4 cultured more suppressing/tolerogenic properties (ground truth provided by the reference associated with this dataset (Reference: van Acker H. H. et al., "Desirable cytolytic immune effector cell recruitment by interleukin-15 dendritic cells", Oncotarget, Vol. 8, No. 8, 2017, pages 13652 to 13665). The y-axis shows the respective score, for left bar graphs this is in log 2odds score; for right bar graphs this is in probability score. In the bar graphs, each analyzed sample is represented by a bar. In each bar graph the left three bars represent scores of samples with an "immune-supportive" state (associated with IL-15) ground truth; the right three bars represent samples with "immune suppressed" state (associated with IL-4) ground truth. On the left of the bar graphs is indicated which model readout was used for the analysis, from top to bottom: immune suppressive, immune supportive, resting. Note that summation of the three probabilities score is 1. According to the definition as used herein the state with the highest score defines the state attributed to the sample.

Figure 25B:
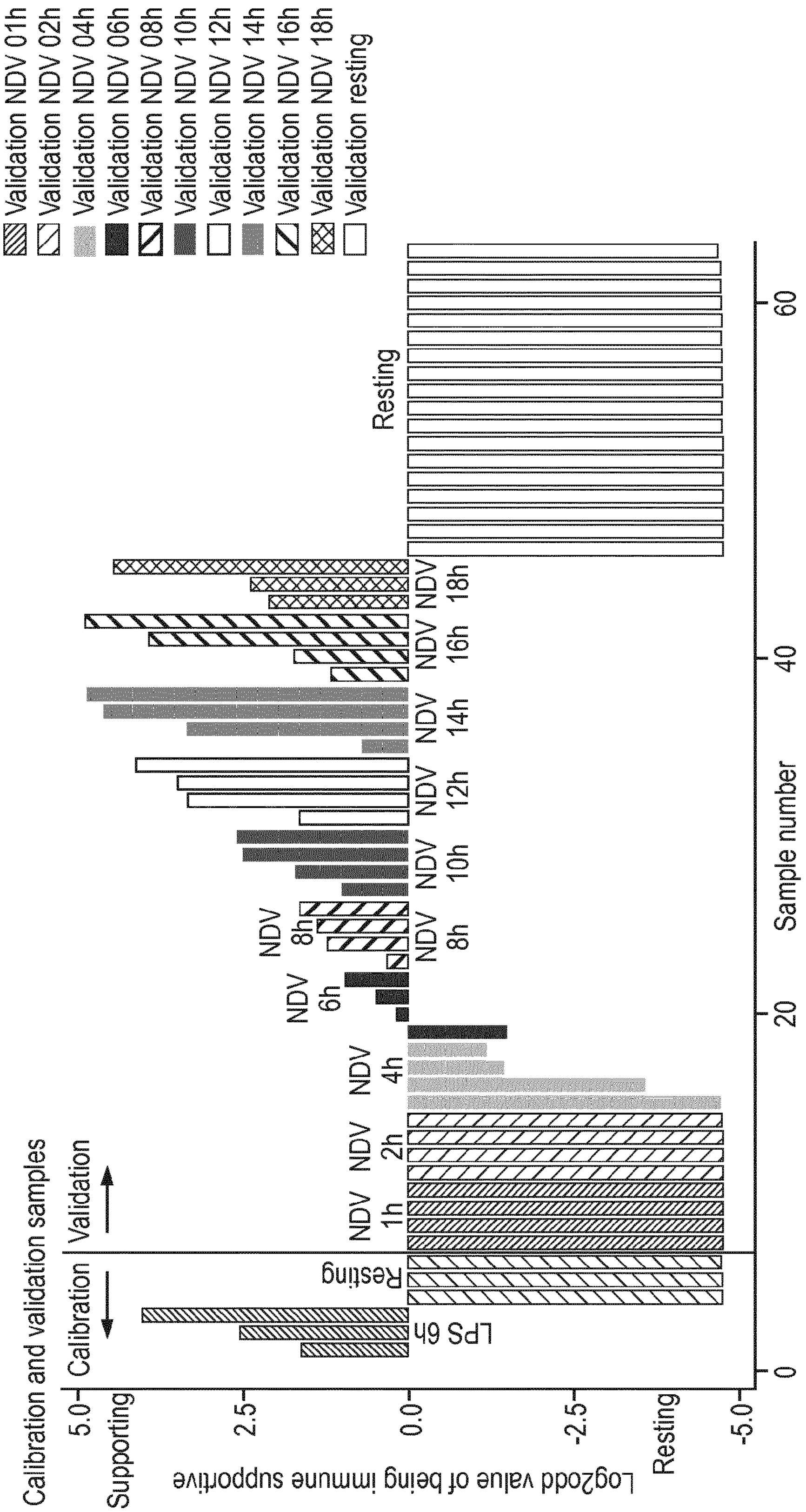

FIGS. 25A and 25B show exemplarily validation results of the Bayesian 2-state model (immune suppressive and immune supportive) for dataset GSE18971 (described in FIG. 22). Samples were activated for respectively 1, 2, 4, 6, 8, 10, 12, 14, 16, 18 hours with NDV, or not activated. For every bar graph, calibration samples are indicated at the left of the vertical line, and every bar represents an analyzed dendritic cell sample (bars 1-3 represent immune suppressed dendritic cells, bars 4-6 represent immune supportive dendritic cells, bars 7-9 represent resting dendritic cells). Validation samples of GSE18791 are at the right side of the vertical line: bars 1-4 represent control samples before start of the activation by NDV; bars 5-8 represent samples 2 hours after start of NDV activation; bars 9-12 represent samples 4 hours after start of NDV activation, bars 13-16 represent samples 6 hours after start of NDV activation; bars 17-20 represent samples 8 hours after start of NDV activation; bars 21-24 represent samples 10 hours after start of NDV activation; bars 25-28 represent samples 12 hours after start of NDV activation; bars 29-32 represent samples 14 hours after start of NDV activation; bars 33-36 represent samples 16 hours after start of NDV activation; bars 37-39 represent samples 18 hours after start of NDV activation; bars 40-57 represent control dendritic cell samples that were not activated by NDV. It should be noted that the activation of DCs takes several hours to turn them from resting to supporting. FIGS. 25A and 25A continued: Pathway analysis results on validation dataset GSE18971 with pathway activity scores per sample (GSM numbers). FIG. 25B: Model validation results on samples are from dataset GSE18791. Calibration sample results are depicted at the left side and indicated as "calibration" in the bar graph Each bar represents a sample result with on the y-axis log 2odds score (top graph) and probability score (bottom graph). Summary: The resting DCs have a high probability of being immune resting. The supporting DCs have a high probability of being immune supportive. The results of calibration and validation set are consistent.

Figure 25B:
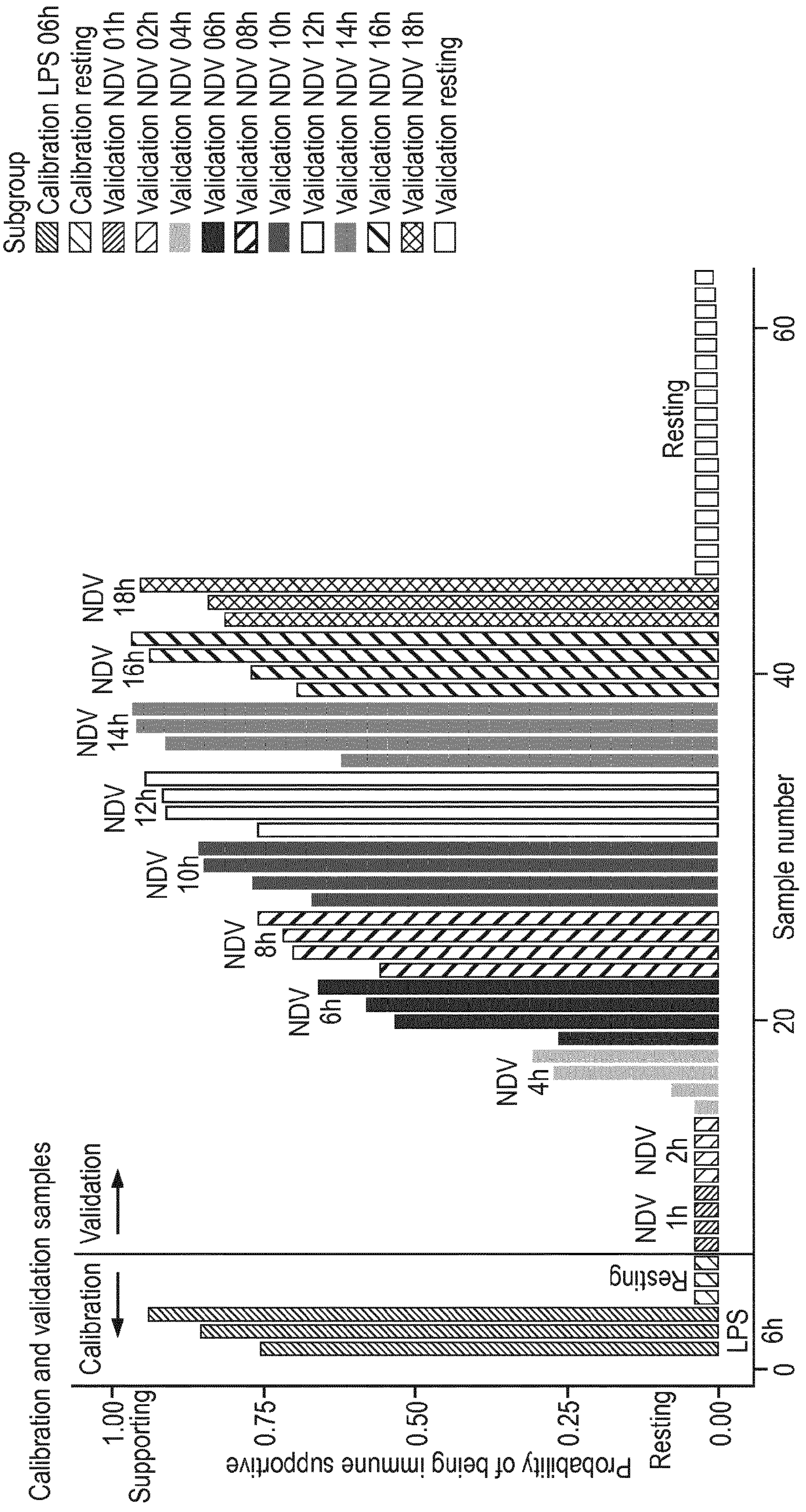
Figure 26:
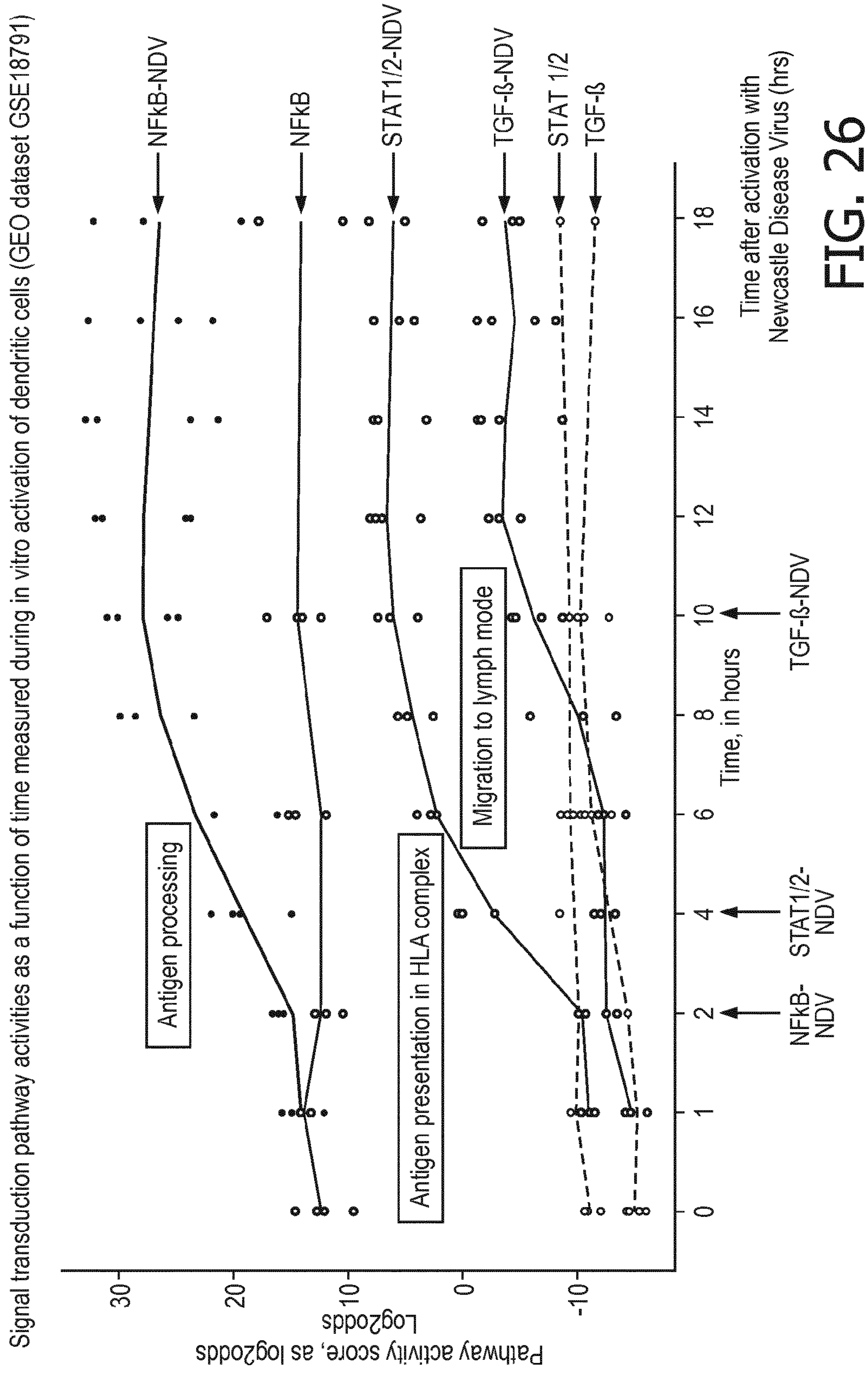

FIG. 26 shows exemplarily results of signal transduction pathway activities (pathway activities were indicated as log 2odds on the y-axis) as a function of time (in hours, on the X-axis) measured during in vitro activation of dendritic cells using the GEO dataset GSE18791 (described in FIG. 22). In FIGS. 22, 23 and 25 the corresponding dendritic cell activity scores as analyzed by the various models is shown. At multiple timepoints after activation with NDV, signal transduction pathway activity was measured on dendritic cell samples. Average pathway activities per timepoint are depicted for the NFkB, the JAK-STAT1/2 and the TGF-β pathway, and connected through a line. Pathway identities are indicated in the figure with an arrow. The signal transduction pathway analysis, performed as described, showed that already after 1 hour the NFkB pathway becomes active; after 4 hours the JAK-STAT1/2 pathway, and after 10 hours the TGF-β pathway. This observed sequential activation of the signaling pathways runs parallel with gradual increase in the activity score of these dendritic cell samples, and is in agreement with the known functions of these signaling pathway in dendritic cells: i.e. the NFKB pathway is important for antigen processing, the JAK-STAT1/2 pathway is important for antigen presentation, and finally, the TGF-I3 Pathway is known to be involved in migratory behavior of cells, and is activated to enable the antigen-expressing dendritic cell to migrate to the lymph node to activate the adaptive immune response.

Figure 27B:
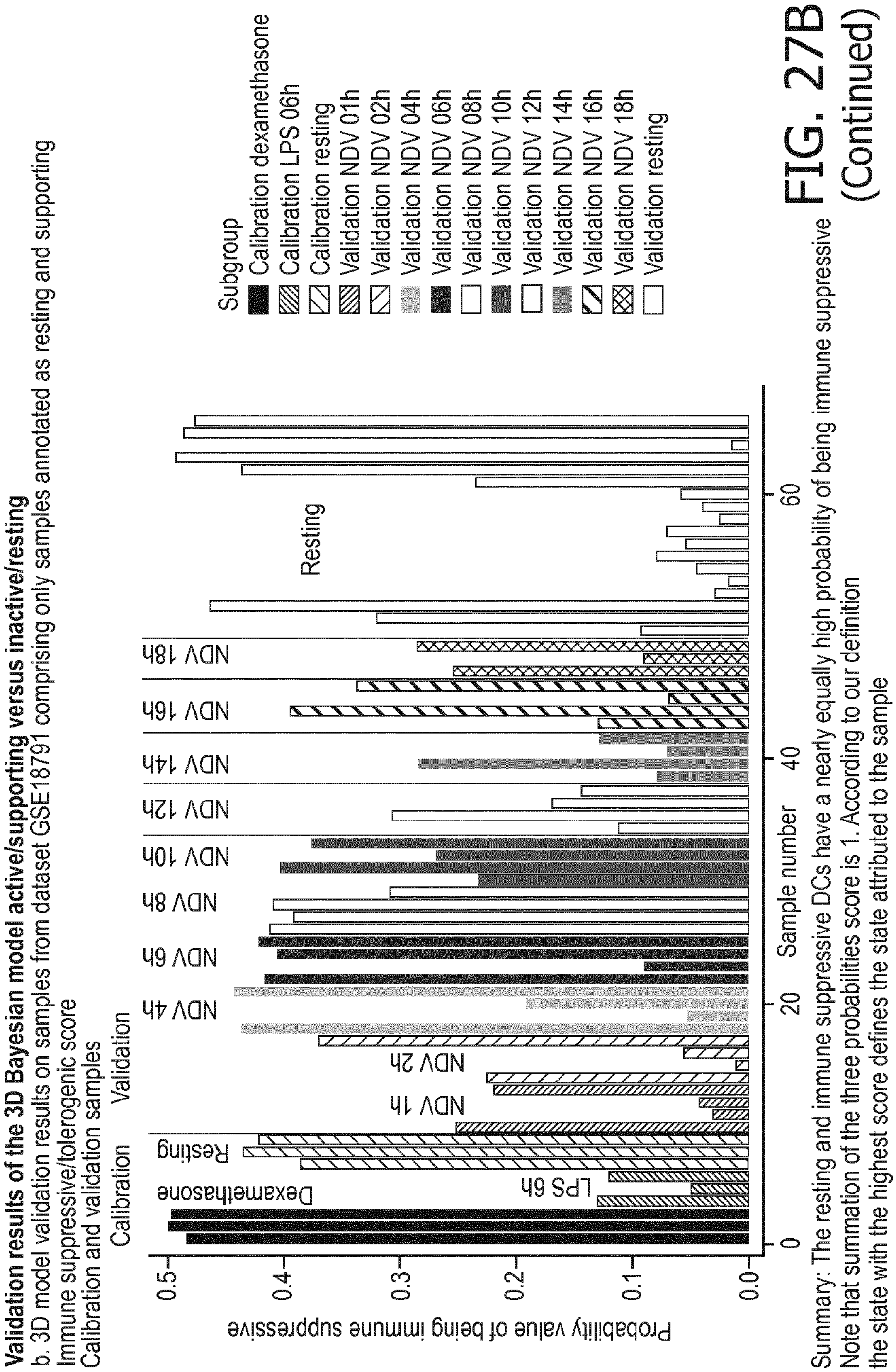
Figure 27B:
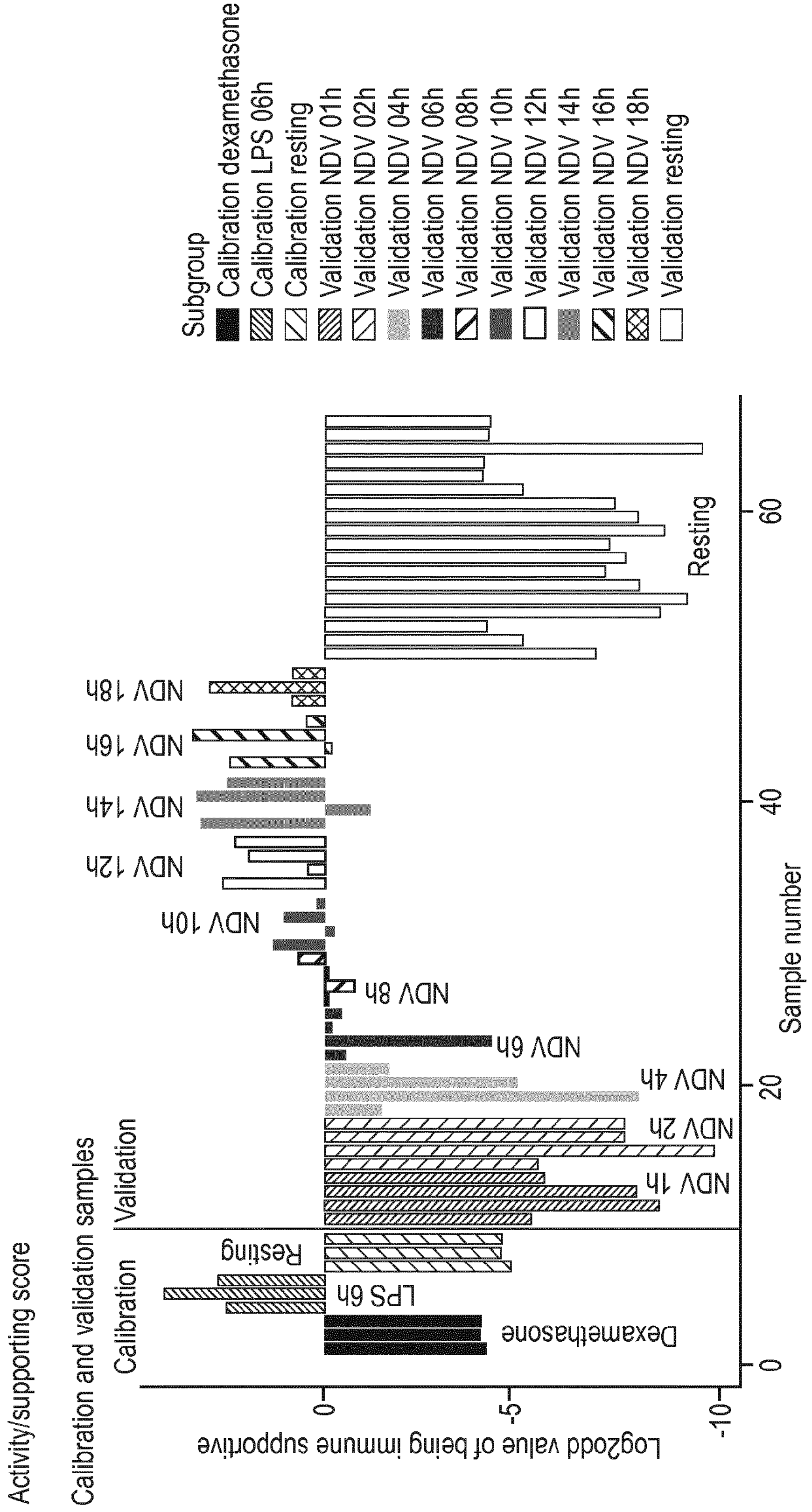
Figure 27B:
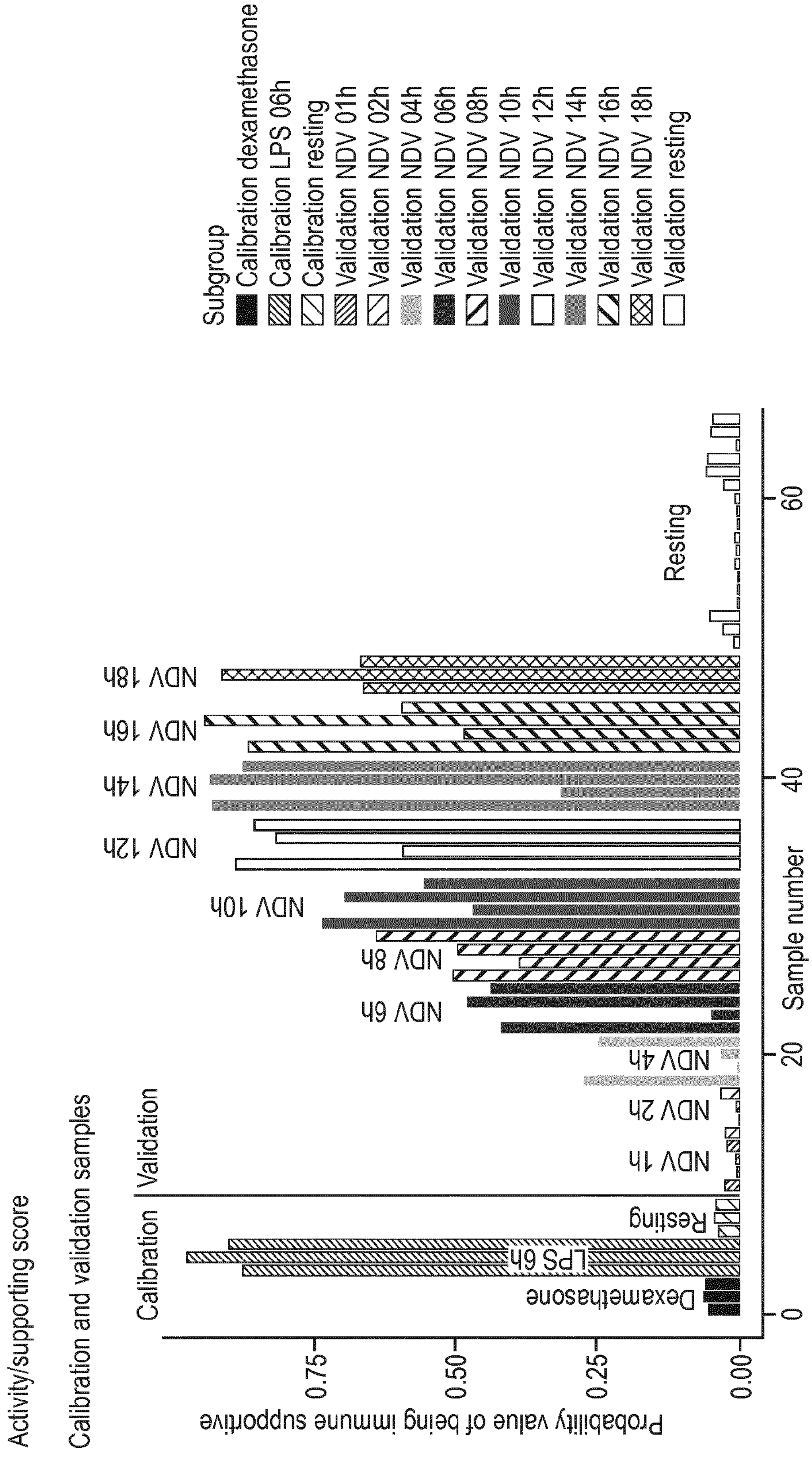
Figure 27B:
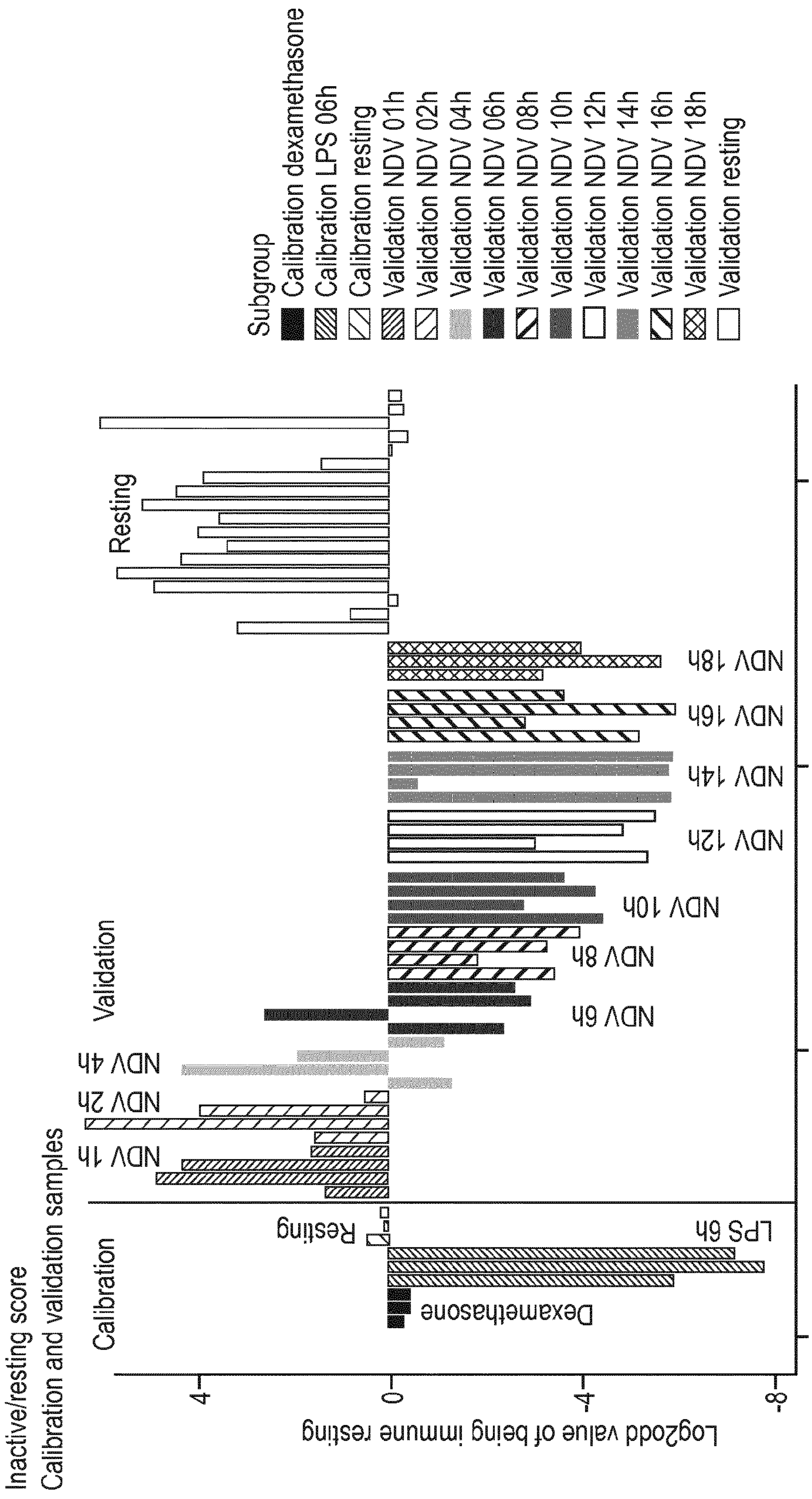
Figure 27B:
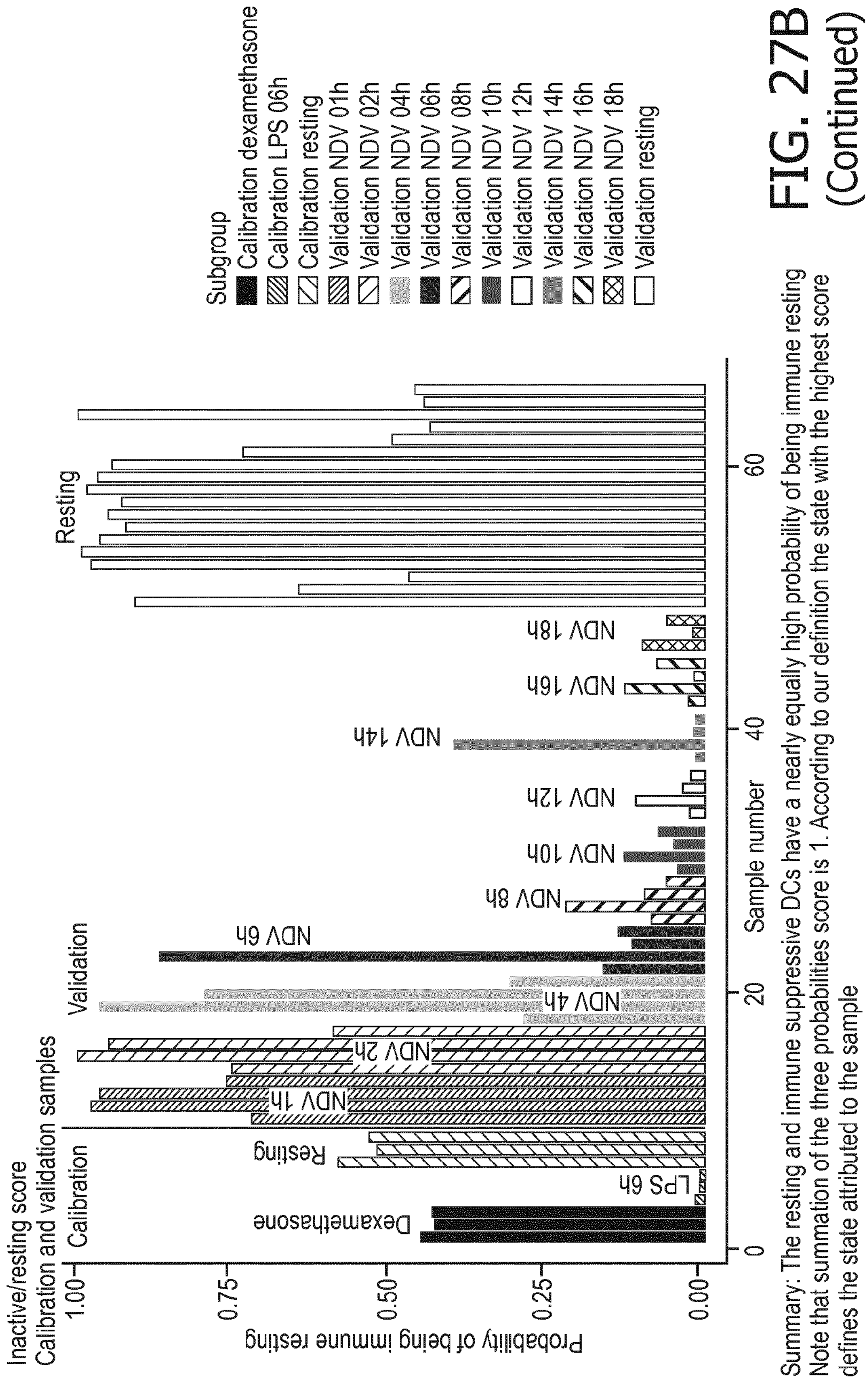
Figure 27C:
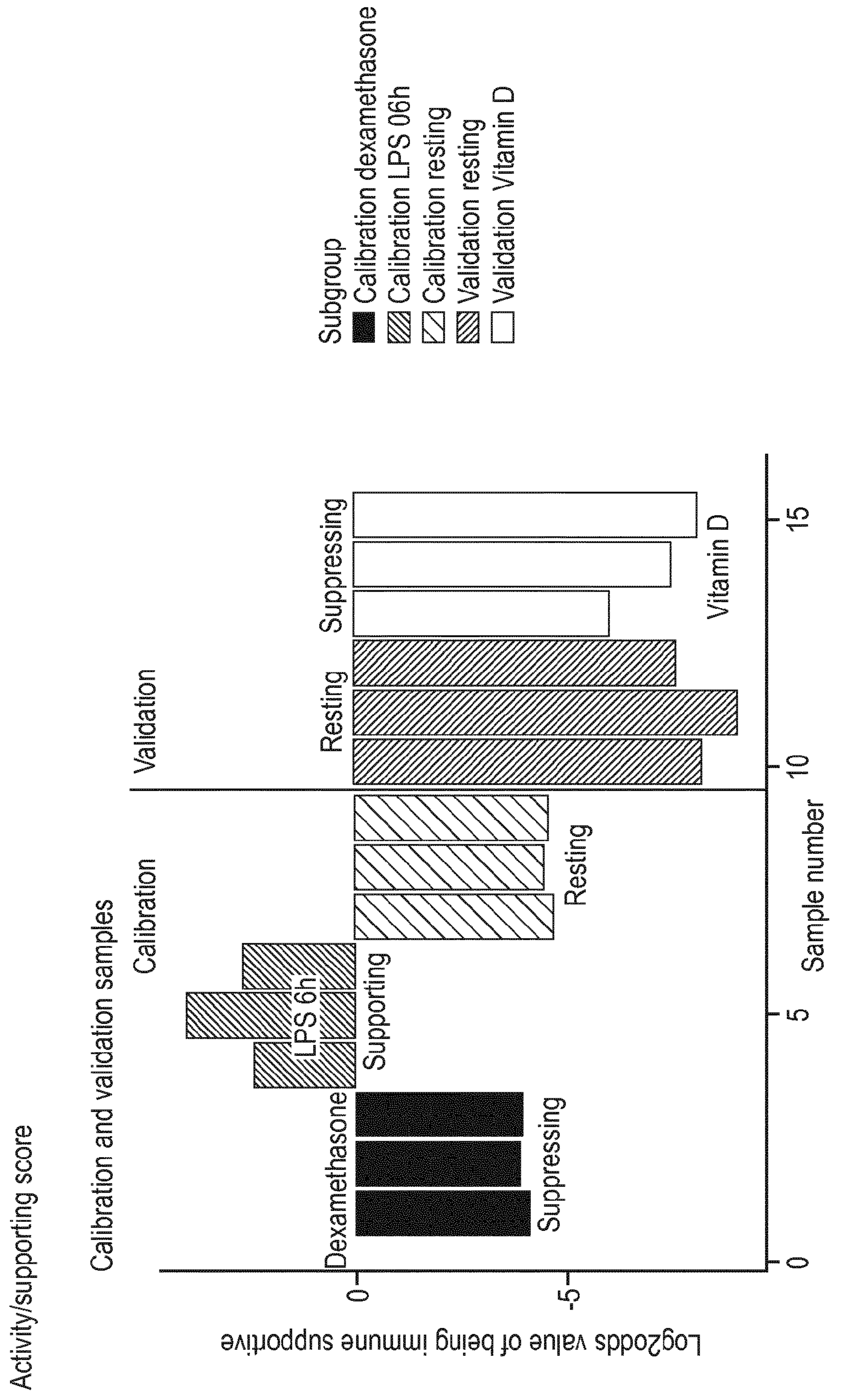
Figure 27C:
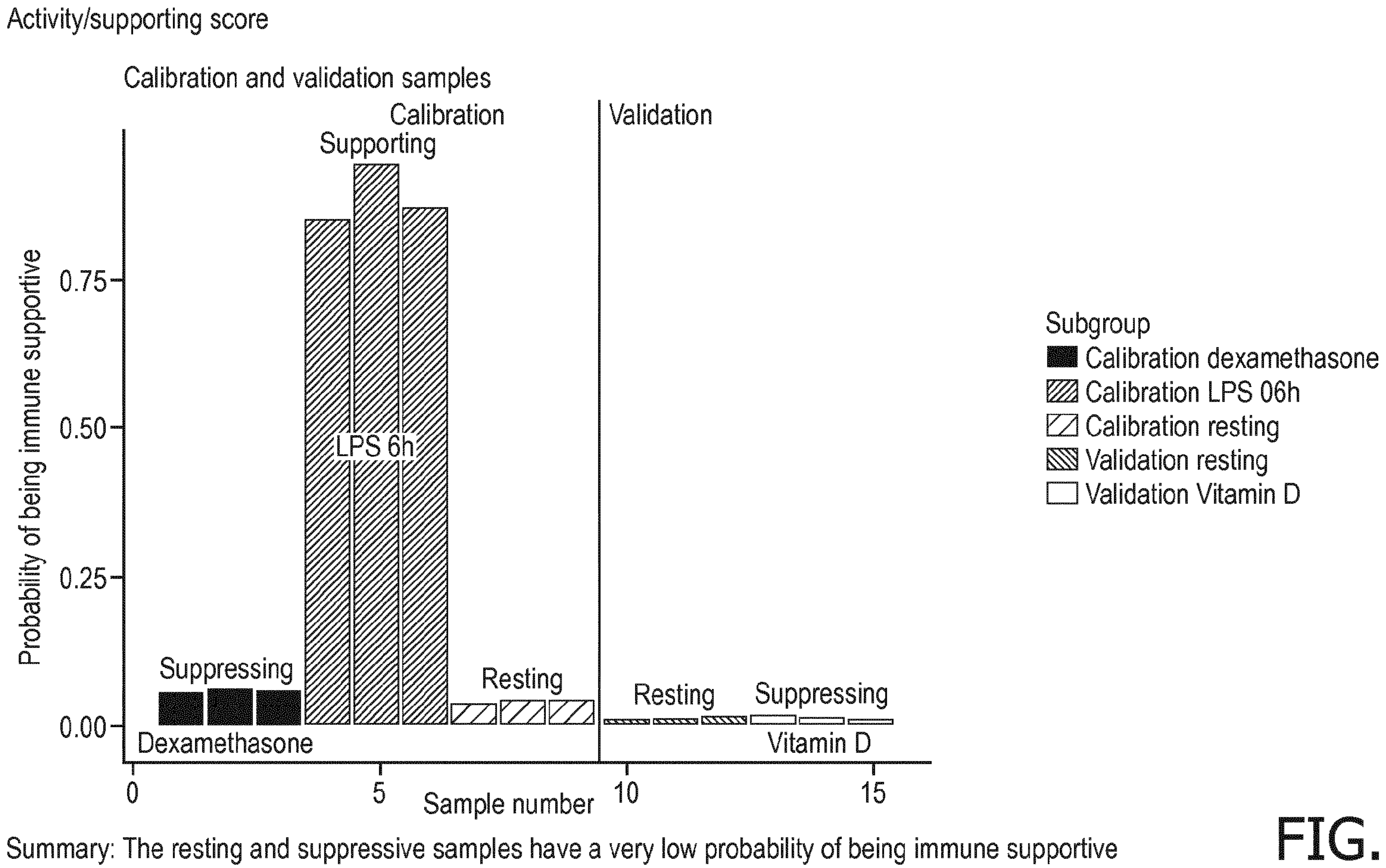
Figure 27C:
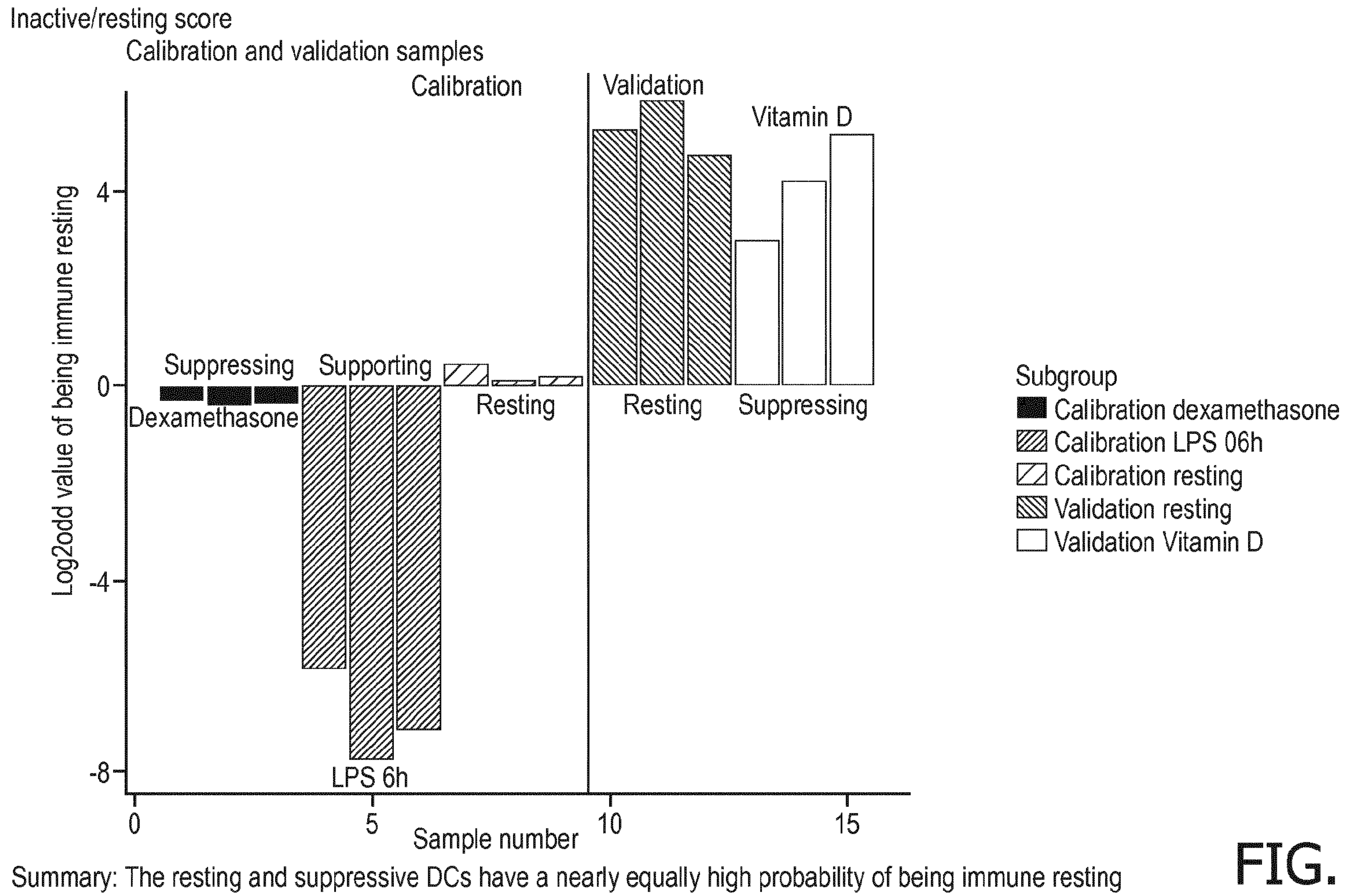
Figure 27C:
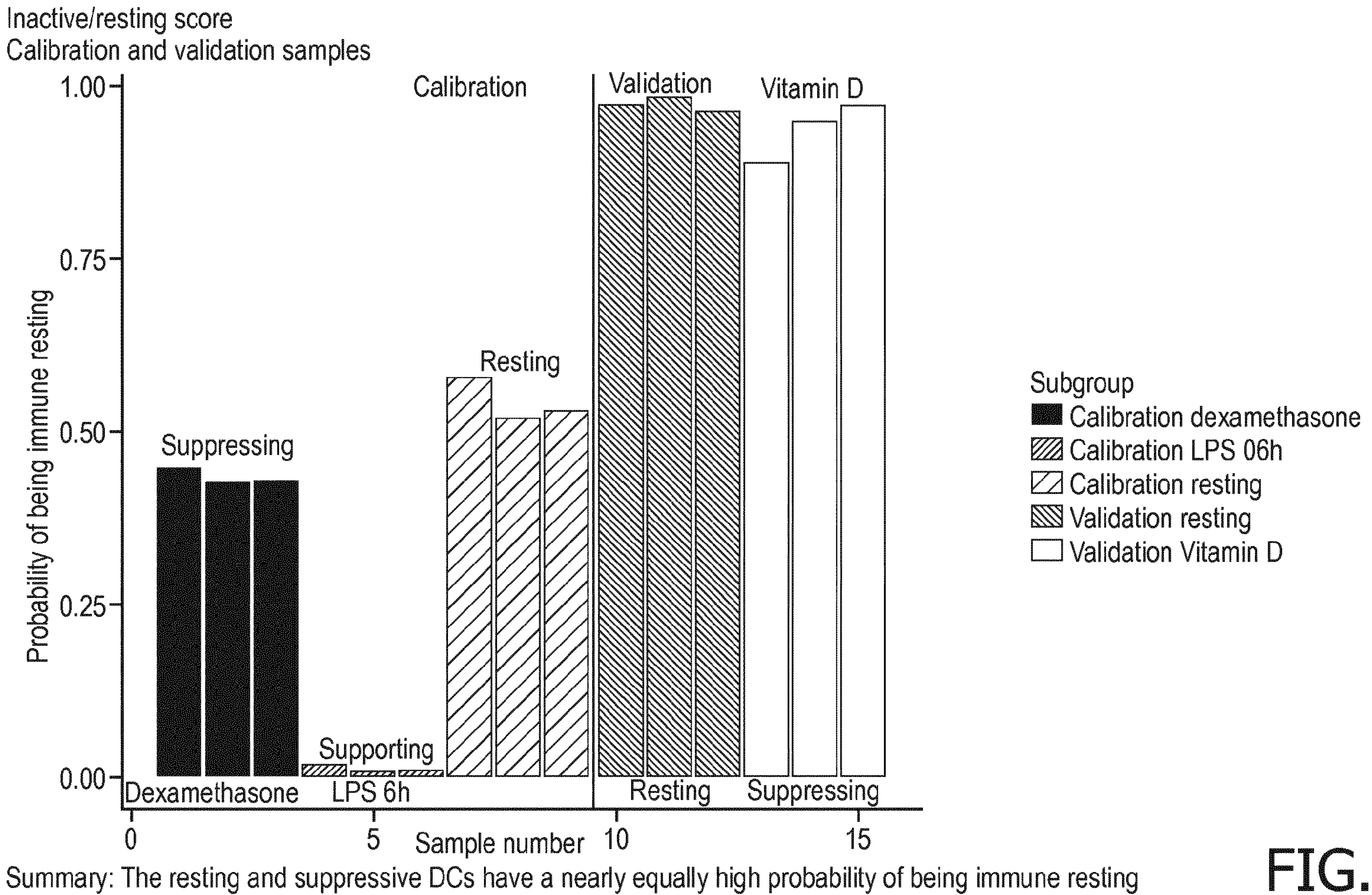

FIG. 27A to 27C show exemplarily validation results for the Bayesian 3-state (immune suppressive, immune supportive, immune resting) computational model for assessment of dendritic cell activity state. For all three states a score is provided; according to our definition the state with the highest score defines the state attributed to the sample (note that summation of the three provided activity probability scores is 1). FIG. 27A and FIG. 27A continued: Validation datasets GSE13672 and GSE18971 with calculated pathway activity scores (AP1, FOXO, STAT1/2, TGF-β) per sample (GSM numbers). For description of the datasets we refer to FIG. 23. FIG. 27B: Model validation results on samples from dataset GSE18791 comprising only samples annotated as resting and supporting. For every bar graph, calibration samples are indicated at the left of the vertical line, and every bar represents an analyzed dendritic cell sample (bars 1-3 represent immune suppressed dendritic cells, bars 4-6 represent immune supportive dendritic cells, bars 7-9 represent resting dendritic cells). Validation samples of GSE18791 are at the right side of the vertical line: bars 1-4 represent control samples before start of the activation by NDV; bars 5-8 represent samples 2 hours after start of NDV activation; bars 9-12 represent samples 4 hours after start of NDV activation, bars 13-16 represent samples 6 hours after start of NDV activation; bars 17-20 represent samples 8 hours after start of NDV activation; bars 21-24 represent samples 10 hours after start of NDV activation; bars 25-28 represent samples 12 hours after start of NDV activation; bars 29-32 represent samples 14 hours after start of NDV activation; bars 33-36 represent samples 16 hours after start of NDV activation; bars 37-39 represent samples 18 hours after start of NDV activation; bars 40-57 represent control dendritic cell samples that were not activated by NDV. Left bar graph shows results on the log 2odds scale (Y-axis); right bar graph shows the results on the probability scale (Y-axis). Using the 3-state Bayesian model, scores are obtained for the immune suppressed state (the first 2 bar graphs), the immune supportive state (the next two bar graphs) (FIG. 27 continued) and the resting state (the final two bar graphs) (FIG. 27 continued). Results are similar for the readout as log 2odds scores and as probability scores. The resting and immune suppressive (tolerogenic) scores of DCs lie close together score, but can still be reliably distinguished. The supportive DCs have a high immune supportive score for. FIG. 27C: Model validation results on samples from dataset GSE13791 (described in FIG. 22) comprising only samples annotated as resting and suppressing. Left bar graph shows results on the log 2odds scale (Y-axis); right bar graph shows the results on the probability scale (Y-axis). Samples bars left of the vertical line are calibration samples, on the right side of the line are validation samples. The ground truth state of the dendritic cell samples is indicated in each bar graph. Calibration samples: bars 1-3 represents immune suppressive samples; bars 4-6 represents immune supportive samples; bars 7-9 represents immune resting samples. Validation samples: bars 1-3 represents resting dendritic cell samples; bars 4-6 represent immune suppressive (tolerogenic) dendritic cell samples. First 2 bar graphs show the immune supportive score (FIG. 27C), bar graphs 3-4 show the resting score (FIG. 27C continued). Results: The supportive dendritic cells have a low immune suppressive and resting score and high immune supportive score. The immune suppressive and resting samples have a low probability of being immune supportive; and highest resting score; thus, they were classified by the model as resting which is often close to the immune suppressed state.

DETAILED DESCRIPTION OF EMBODIMENTS

The following examples merely illustrate particularly preferred methods and selected aspects in connection therewith. The teaching provided herein may be used for constructing several tests and/or kits, e.g., to detect, predict and/or diagnose the functional status of one or more immune cell types, the adaptive immune system, the innate immune system or the overall immune system. Furthermore, upon using methods as described herein drug prescription can advantageously be guided, drug response prediction and monitoring of drug efficacy (and/or adverse effects) can be made, drug resistance can be predicted and monitored, e.g., to select subsequent test(s) to be performed (like a companion diagnostic test). The following examples are not to be construed as limiting the scope of the present invention.

1: Methodology and Sample Description

Using the GEO dataset database Affymetrix 2.0Plus data from samples from clinical and preclinical studies in which various types of immune cells were investigated in resting and under various activity states, stimulated and unstimulated with relevant cytokines, were analyzed with respect to activity of signal transduction pathways using the Pathway models (FIGS. 1 to 12). This enabled identification of characteristic pathway activity combinations for different immune cell types in the resting state and activity or immune suppressive state and for each immune cell type a characteristic immune function pathway profile was defined related to exposure to activating or immune-suppressing cytokines or other factors.

The functional status of the immune response can be measured at various locations where an immune response is generated or effectuated, like in the diseased tissue, in a draining lymph node or in blood. In the example case of cancer these locations are summarized in the so-called "immune cycle" (FIG. 19). Simplified, for an effective anti-cancer immune response, in the tumor tissue cancer, in the appropriate inflammatory environment, antigens are taken up by dendritic cells, carried to the draining lymph node and presented to CD4+ and CD8+ T cells, that are activated; CD4+ T cells can become activated to change into Th1 cells which co-activate CD8+ cells, which travel through the blood to the cancer tissue where they attack cancer cells. In the cancer tissue, cancer cells can fail in presenting the proper antigens, they can suppress activity of dendritic cells and T cells, resulting in a lack of anti-tumor activity. By measuring pathway activity profiles in the different immune cell types from the three locations and assessing their individual activity or immune suppressed status, the functional state of the overall immune response, for example resting state, (anti-tumor) activated state, or immune suppressive (tumor tolerant) state. This can be used to predict the immune response against the tumor prior to start of therapy, and to predict and monitor response to (immuno-)therapy, or adjust/optimize the dosage of the therapy, or to monitor the immune response state during any disease, or to predict side effects of immunomodulatory therapy, or to measure compliance to immunomodulatory drugs, or to monitor an immune mediated disease. The therapy can be immunotherapy, but for example in the case of cancer also another therapy (e.g. chemo, targeted, radiation etc.) which will by killing tumor cells release antigens from tumor cells which have an effect on the immune response.

For the following immune cell types that play a role in the innate immune system/response and in the adaptive immune system/response public GEO datasets have been identified in which Affymetrix data were available from the respective cell type in different functional activity states for the specific immune cell type, like a resting state, an activated or immune supporting state, a tolerogenic or immune suppressed state, memory cell state. For each analyzed sample it was required that a ground truth with respect to activity status was known.

From these datasets for each immune cell type a calibration set and at least one evaluation/validation set was defined.

Subsequently pathway analysis, as disclosed herein, was performed on the different cell types in the available activity states as described herein, using per immune cell type the defined calibration set.

It is conceivable that following collection of immune cell data in the future, using this method, the basic pathway models, as disclosed herein, can be further improved based on data-analysis, and target gene combinations selected that function better for the here described immune analysis application. Collecting data in combination with a "ground truth" evidence with respect to immune cell status or Immune response status allows improvements in target gene combinations or addition of new target genes for the immune application.

A. Innate Immune Response:

- a. Monocyte, resting, immune supportive (Calibration GSE28490+GSE43700/Validation GSE72642+GSE16385)
- b. Macrophage, resting and immune supportive (Calibration GSE43596/Validation GSE40885)
- c. Dendritic cell, resting and immune supportive, 2-state model (Calibration GSE18791/Validation 52081); resting and immune supportive and immune suppressed, 3-state models for respectively 3 (Calibration GSE23371/Validation GSE13762+GSE56017) and 4 (Calibration GSE23371/Validation GSE13762+GSE56017) signaling pathway activities as input
- d. Neutrophil: resting, supportive (Calibration GSE22103/Validation GSE28490)

B. Adaptive Immune Response

- a. CD4+ T cell: resting, immune supportive. (Calibration: GSE36766/Validation: GSE11292)

- b. CD4 Th1 subtype, immune supportive and CD4 Th2 subtype, immune suppressed (Calibration: GSE71566/Validation: GSE32959)
- c. CD8+ T cell: resting, immune supportive, immune suppressed (Calibration GSE26347/Validation GSE72642)
- d. Treg cell: resting, immune suppressive (Calibration GSE65010/Validation GSE11292)
- e. B cells: resting, immune supportive (Calibration GSE39411/Validation GSE9119)
- f. T memory, naïve, memory (Calibration GSE65010/Validation GSE65010+GSE26495)

For all Affymetrix datasets obtained from the GEO database for each sample the functional activity status of the immune cell was listed according to the ground truth provided by the authors of the corresponding paper or the annotation provided in GEO. Subsequently Pathway analysis (ER, AR, PI3K, etc.) was performed on the different cell types in the designated functional activity states, using per immune cell type the defined calibration set and validation set.

Pathway Analysis of Various Immune Cell Types

Pathway analysis of the different immune cell types revealed for each immune cell types specific combinations of active signal transduction pathways in the various functional immune states, that is, resting, immune supportive or immune suppressive (FIGS. 1 to 12).

A. Immune Cells Contributing to the Innate Immune Response

Neutrophils (FIG. 1) in the resting state have an active FOXO transcription factor, indicating an inactive or low active PI3K pathway, associated with low activity of the immune pathways NFkB, JAK-STAT1/2 (type I interferon and Type II interferon) and JAK-STAT3, and both Notch and Wnt pathways were inactive. In the supportive state, the FOXO transcription factor activity decreases, indicating increased PI3K pathway activity, the immune pathways are more active, as well as Notch/Wnt.

Monocytes (FIG. 2) show a similar pattern as neutrophils in FOXO, NFkB, JAK-STAT1/2 type II interferon and Notch and JAK-STAT3 pathways.

In dendritic cells (FIGS. 3 to 5) NFkB, JAK-STAT1/2 (both types), and TGF-β were more active in the supportive state, while in the suppressed (tolerogenic) state NFkB activity was lowest, and FOXO transcription factor activity intermediate in activity between resting and supportive.

In macrophages (FIG. 6) a similar pattern was found for the supportive state, including also an active JAK-STAT3 and Notch pathway.

B. Immune Cells Contributing to the Adaptive Immune Response

The cell types of the adaptive immune response are very different in function and use of pathway activities compared to the cell types of the innate immune response. CD4 (FIG. 7) lymphocytes in a supportive state show a low FOXO transcription factor activity, indicating an increase in PI3K pathway activity, combined with increased activity of the immune pathways NFkB, JAK-STAT1/2, JAK-STAT3, and a reduced activity of the TGF-β pathway. The CD4+ lymphocyte subtypes Th1 and Th2 (FIG. 8) which are respectively supportive and suppressive, can be distinguished based on FOXO transcription factor activity (lowest in immune supportive Th1, indicating higher PI3K pathway activity), and NFkB, JAK-STAT1/2 and JAK-STAT3 and TGF-β pathways which are higher in the Th1 cells. Treg cells (FIG. 9) become immunosuppressive (suppressive)

when activated, and then clearly show an increased FOXO, NFkB, Notch, JAK-STAT1/2, JAK-STAT3 and TGF-β activity profile.

For CD8 lymphocytes (FIG. 10) unfortunately there was only one sample available for the supportive state, however observed pathway activity was in line with what was expected based on immunology knowledge, that is, a reduced FOXO transcription factor activity, indicative for increased PI3K activity (indicating cell proliferation), increased NFkB, JAK-STAT1/2 and JAK-STAT3 pathways. For use in the overarching functional immune response prediction model, we use the designation "non-supportive" as a surrogate for suppressive.

T memory cells (FIG. 11) arise after an antigen stimulus has disappeared and can be distinguished from naïve T cells which have not yet encountered antigen, by more active FOXO transcription factor (less active PI3K pathway activity and proliferation), more active NFkB and higher TGF-β pathway activity. B cells (FIG. 12) produce antibodies and in the supportive state showed a decrease in FOXO transcription factor activity, indicating PI3K pathway activity, and increased NFkB and JAK-STAT3 activity.

Clearly, while in the adaptive immune system cells activity of PI3K, NFkB and JAK-STAT3 pathways are in general indicative for an immune supportive state (with exception of Treg), other pathways like TGF-β and Notch have highly specific functional roles depending on the specific cell type.

Development of a Computational Model for Predicting the Functional Status of Immune Cell Types Subsequently, multiple computational models were generated for each of the immune cell types, using pathway results of the calibration datasets as input to calibrate the model (FIGS. 1 to 12). Subsequently each model was frozen and validated on the corresponding independent validation dataset to test the accuracy of the model (FIGS. 1 to 12). The activity status of the signal transduction pathways that have a known role (scientific literature) in determining the functional state of the immune cells were used for creating the model.

Model examples are described, based on a varying number of signaling pathway analyses as input. The described signaling pathway combination per immune cell types is in general not the only possible combination of pathway models. A sub-group/another combination of the pathways that are used in an example model may sometimes function just as well to predict the functional activity state of the respective immune cell type (illustrated in FIGS. 4A and 5A as well as FIGS. 4B and 5B). Some types of models performed better.

Three different types of models where created to analyze the individual immune cell types, a centroid model, a linear model and a Baysian model, as described herein.

Development of a Model for Predicting Immune System Status

Three models were developed to predict the functional status of the immune response (herein also referred to as immune system status) from the functional immune cell activity (herein also referred to as functional state/status of the immune cell) measured on at least two different immune cell types.

Immune cells do not act on their own and together they orchestrate the immune response, reason why interpretation of measurements on multiple immune cell types provides a better method to predict the status of an immune response. Finally, after developing and validating computational models to distinguish the functional states of each of the immune cell types of the innate and adaptive immune response, two computational models were developed that use the functional activity result of the immune cell type-specific computational models that provide a functional immune cell activity score per analyzed cell type as input to predict the overall status of the immune response in an individual (healthy or diseased), that is whether the immune response is in a resting inactive state (resting), or the immune system is active (supportive), or suppressive (suppressive), and whether any activity or suppression is manifest in the innate or adaptive immune system.

In one type of Immune Response model, the highest and lowest immune activation scores were defined, based on virtual individuals with respectively a completely active immune response and an immune suppressed immune response (FIG. 13A to 13G). A computational equation was created with which a score for immune response status can be calculated in the form of percentage activity. Each input variable for the model is assigned 0, 1, 2 points (FIG. 13A). The total score of added points lies between 19 and 6 (FIG. 13B to 13D). The immune response activity is calculated as percentage activation (FIG. 13E), and for models with reduced input observables (meaning immune cell activity scores).

Percentage immune response activity can be calculated as follows:

$$\text{Percentage immune response activity}=[(\text{cumulative points}-6)/13]\times 100\%$$

An immune resting state is defined as 10 points. This can be used to create a threshold to distinguish between an activated immune response (>10points) and a suppressed immune response (<10 points). A 10-point resting state is calculated as a 77% immune activation state. Thus, a percentage >77% indicates an active immune response; a percentage lower than 77% increasingly indicates an immune suppressed immune response. To change this read-out into a quantitative score for immune activity versus immune suppression, this threshold can be reset to 0.

The equation becomes as follows:

$$\%\text{ immune response activity}-77=\text{immune activity status, where a positive number means that the immune response is active and a negative number means that it is suppressed.}$$

Incorporation into the earlier equation gives:

$$\text{Percentage immune activity}=\{[(\text{cumulative points}-6)/13]\times 100\%\}-77.$$

In case not all input values are available (e.g. because the functional activity status has not been measured on all immune cell types), the model can still provide an immune response activity score, however with an estimated uncertainty.

Another Immune Response model is a Bayesian model that interprets the scores of the individual immune cell type analysis into a probability that the immune response is in an active, resting or suppressed state (FIGS. 14A and 14B).

Another model is a linear model. Immune response activity is calculated as follows:

Cumulative points higher than 10 points increasingly indicates that an immune response is not inactive/suppressive; cumulative points below 10 increasingly indicates that an immune response is in a suppressed state (FIG. 15).

A model variant on the linear model can be used to specifically measure the immune suppressed state of the immune response (FIGS. 16A and 16B).

Each of the models can also be used to measure the activity of the innate immune response and the adaptive immune response separately. The Bayesian model approach will intrinsically provide activity scores for these different types of immune response, which are part of the calculation of the overall state of the immune response. The percentage and linear Immune Response computational models can be easily divided into two separate parts, for respectively the innate and adaptive immune response (Example in FIGS. 17A and 17B) but also for the alternative models (Example in FIGS. 16A and 16B). In the Bayesian model this can be read out already from the described model.

For all models it is possible to further increase the accuracy of prediction by changing the weight of one or more immune cell type input values (that are obtained by the functional immune activity analysis based on pathway analysis). For example, it is expected that the Treg cells when in the suppressive state are highly specific for an immune suppressed immune response; in the percentage immune activity model and the linear model this knowledge can be incorporated by for example changing the "0" to "−1" as input for the model; in the Bayesian model the node parameters can be easily adapted to increase specificity (by changing 0.9 into 0.99 for example; and reducing 0.1 to 0.001).

Model Validation and Results

FIGS. 1 to 6 show the results on cell types of the innate immune response. FIGS. 7 to 12 show results on cell types of the adaptive immune response. The pathway activity results (for the signal transduction pathways that are included in the respective computational model) are depicted as log 2 odds; the functional status of the immune cells in the sample is indicated (resting, supportive, suppressive, naïve, memory), and the functional status score provided by the model is given on the right; OK means a correct functional designation; FALSE means an incorrect functional designation. In FIGS. 1B to 12B, two adjacent states are separated by a boundary value that is determined by the total average of the average linear value of the first state and the average linear value of the second state. The boundary values are given in the following table.

| | State | Boundary Value Between States |
|---|---|---|
| FIG. 1B | Resting—Supportive | −1.05 |
| FIG. 2B | Resting—Supportive | −9.76 |
| FIG. 3B | Resting—Supportive | 10.50 |
| FIG. 4B | Resting—Supportive | 10.20 |
| | Resting—Suppressive | 5.52 |
| FIG. 5B | Resting—Supportive | 14.36 |
| | Resting—Suppressive | 14.72 |
| FIG. 6B | Resting—Supportive | 15.29 |
| FIG. 7B | Resting—Supportive | −2.26 |
| | Resting—Suppressive | −27.37 |
| FIG. 8B | Supportive—Suppressive | 8.80 |
| FIG. 9B | Supportive—Suppressive | 0.01 |
| FIG. 10B | Resting—Supportive | −9.50 |
| FIG. 11B | Memory—Naïve | 0.10 |
| FIG. 12B | Resting—Supportive | −3.64 |

For immune response model validation purposes (FIG. 18) various clinical datasets were identified in which at least two immune cell types per sample were analyzed using the Affymetrix microarray. Validation was performed on a number of clinical sample datasets, consisting of a varying number of immune cell types, showing that the input for the immune response model can vary with respect to the number of immune cell types available in the respective sample.

For example, FIGS. 18A and 18B show the results for measurement of immune system status using dataset GSE72462. Different immune cell types (CD4+, CD8+ and B-lymphocytes, neutrophils, monocytes) were isolated from peripheral blood samples of 3 healthy individuals, and Microarray results we analyzed with the here described method to assess functional (activity) status of the various immune cell types using the Centroid Models. The centroid model results of immune cell activity analysis of FIG. 18A functioned also as input for the Type 2 (Bayesian model Immune response activity) Immune response model. The result of the Bayesian Immune response model calculations shows that both innate immune cell types, adaptive immune cell types, as well as the overall immune response, has highest probability for the activity state the normal/resting state, in full agreement with the immune response activity status expected for healthy individuals. For each of the three replicates a dataset was generated where the state is not 100% certain resting but is defined probabilistic. The probability is derived from the in the centroid model distances (as reported in FIG. 18A)—with the highest probability attributed to the state with the smallest distance. The softmax approach was used to determine probabilities. The results are summarized in the following table.

| node | state | 100% resting | replicate 1 | replicate 2 | replicate 3 |
|---|---|---|---|---|---|
| AdaptiveImmune | Active | 0 | 0.02 | 0.01 | 0.03 |
| AdaptiveImmune | Resting | 0.78 | 0.79 | 0.8 | 0.79 |
| AdaptiveImmune | Suppressive | 0.21 | 0.19 | 0.19 | 0.19 |
| ImmuneResponse | A) Normal | 0.52 | 0.4 | 0.41 | 0.4 |
| ImmuneResponse | B) Inflammatory | 0.02 | 0.19 | 0.2 | 0.19 |
| ImmuneResponse | C) Suppressed | 0.25 | 0.19 | 0.2 | 0.19 |
| ImmuneResponse | D) Adaptive | 0 | 0.02 | 0.01 | 0.03 |
| ImmuneResponse | E) Exhausted | 0.21 | 0.19 | 0.19 | 0.19 |
| InnateImmune | Active | 0.02 | 0.23 | 0.23 | 0.23 |
| InnateImmune | Resting | 0.58 | 0.45 | 0.46 | 0.45 |
| InnateImmune | Suppressive | 0.4 | 0.32 | 0.32 | 0.31 |

2: Determining the Functional Status of Dendritic Cells

Using the GEO dataset database Affymetrix 2.0Plus data from samples from clinical and preclinical studies in which dendritic immune cells were investigated in resting and under various activity and tolerogenic states, stimulated and unstimulated with relevant cytokines, were analyzed with respect to activity of signal transduction pathways using the Pathway models This enabled identification of characteristic pathway activity profiles for dendritic cell types in the resting state and activity or immune suppressive (tolerogenic) state and a characteristic immune function pathway profile was defined related to exposure to activating or immune-suppressing cytokines or other factors.

Pathway analysis of microarray data and computational interpretation of pathway results per sample enabled characterization of dendritic cells with respect to typical signal transduction pathway activity in healthy individuals, expressed as log 2odds activity scores (referring to abovementioned pathway model patents).

Models were developed for two situations:

(1) to provide a score on activity status versus resting status of dendritic cells (called the 2D model);

(2) to provide a score on activity, versus resting, versus tolerogenic status of dendritic cells (called the 3D model).

For both situations, a Bayesian reasoning (a) and a linear mathematical model (b) and a centroid computational model were developed as examples of models that can be used to interpret the measured pathway activity scores.

The models were calibrated using samples from publicly available GEO datasets containing Affymetrix U133 Plus2.0 samples with a "ground truth" with respect to the respectively 2 (active/supporting; inactive/resting) or 3 functional activity status possibilities (active/supporting; inactive/resting; immune suppressive/tolerogenic) of the dendritic cells. For each sample, the activity score of each pathway is given as input for the parameter calculation.

Subsequently the 2-state and 3-state (herein also referred to as 2D and 3D) models were validated on independent public GEO datasets containing Affymetrix U133 Plus2.0 samples with again a "ground truth" with respect to respectively 2 (active/supporting; inactive/resting) or 3 functional activity status possibilities (active/supporting; inactive/resting; immune suppressive/tolerogenic) of the dendritic cells. For each sample, the activity score of each pathway is given as input for the parameter calculation.

For the Bayesian models, models were created and CPT nodes were set manually (FIG. 20A to 20D for the 2D model; FIG. 21A to 21E for the 3D model). For the 2D model: pathway activities of the NFkB, JAK-STAT1/2, and TGF-β pathways were used as input for the parameter nodes. For the 3D model: pathway activities of the MAPK-AP-1, PI3K, NFkB, JAK-STAT1/2, and TGF-β pathways were used as input for the parameter nodes. An optional additional criterium can be that the other measured pathways are not discriminating between the functional states of the dendritic cells.

For the linear computational model pathway activity scores of the measured pathway (3 pathways in the case of the 2D model, and 5 pathways in the case of the 3D model) are added up, and the multiple pathway activity score indicates the functional activity status of the dendritic cells. Inactive/resting has a score below zero, immune-suppressed/tolerogenic has a score between zero and 10, immune activated/supporting has a score >10 (FIGS. 22A and 22B). Selected pathways for the 2D and 3D model and the optional additional criterium are the same as described above for the Bayesian models.

For the Centroid model pathway activity scores of the measured pathways are based on the calculation of the Euclidian distance using for 3 pathways in the case of the 2D model equations:

$$\text{Distance Resting}=\sqrt{(x_{ri}-\bar{x}_r)^2+(y_{ri}-\bar{y}_r)^2+(z_{ri}-\bar{z}_r)^2}$$

$$\text{Distance Supportive}=\sqrt{(x_{si}-\bar{x}_s)^2+(y_{si}-\bar{y}_s)^2+(z_{si}-\bar{z}_s)^2}$$

and for 5 pathways in the case of the 3D model equations $$\text{Distance Resting}=\sqrt{(v_{ri}-\overline{v_r})^2+(w_{ri}-\overline{w_r})^2+(x_{ri}-\overline{x_r})^2+(y_{ri}-\overline{y_r})^2+(z_{ri}-\overline{z_r})^2}$$

$$\text{Distance supportive}=\sqrt{(v_{si}-\overline{v_s})^2+(w_{si}-\overline{w_s})^2+(x_{si}-\overline{x_s})^2+(y_{si}-\overline{y_s})^2+(z_{si}-\overline{z_s})^2}$$

$$\text{Distance suppressive}=\sqrt{(v_{SPi}-\overline{v_{SP}})^2+(w_{SPi}-\overline{w_{SP}})^2+(x_{SPi}-\overline{x_{SP}})^2+(y_{SPi}-\overline{y_{SP}})^2+(z_{SPi}-\overline{z_{SP}})^2}$$

with x, y and z representation the 3 pathways, with v, w, x, y and z representation the 5 pathways with average subscripts r, s and SP are referring to averages of calibration data, and with subscripts ri, si and SPI referring to values of individual validation samples. Shortest distance defines the state, resp resting or supporting in 2 state model, and resting, supporting or suppressive in 3 state model (FIGS. 23A and 23B). Selected pathways for the 2D and 3D model and the optional additional criterium are the same as described above for the Bayesian models.

Myeloid dendritic cells and monocytes stem from a common progenitor cell, and in the study that was used as calibration set (GSE23371), blood derived monocytes were matured towards dendritic cells by adding IL4 and GMCSF to the culture medium, as described in the literature and most commonly used (de Vries, et al, J. Immunother 2002, 25(5):429-438). In a more recent publication it was shown that replacement of IL4 by IL15 during this maturation procedure may lead to mature DCs which have improved a capacity for attracting effector lymphocytes, compared to IL4-matured DCs which tend to exert more suppressive effects on T-cells, as manifest by production of cytokines which enhances generation of Treg and Th2 cell types (Source: Dataset GSE79184; van Acker H.H. et al., "Desirable cytolytic immune effector cell recruitment by interleukin-15 dendritic cells", Oncotarget, Vol. 8, No. 8, 2017, pages 13652 to 13665). This explains why the described 3D model only shows a relatively small difference between the "resting" and tolerogenic state, which makes it difficult to distinguish between these two inactive states. Using Affymetrix data from the IL15-matured DCs as "resting" calibration set would have resulted in the opposite, that is, a model which cannot distinguish very well between the active/supporting state and the "resting" state. Since the most important function of the model is to identify whether DCs are in the active/supporting state, versus a non-active state, we chose for the IL4-matured DC data as "resting" calibration data. Using the 3D model on the GSE79184 dataset, containing data from IL4- and IL15-matured DCs, shows that the IL5-matured DCs are classified as slightly activated (FIG. 24).

Exemplary Validation Results, Bayesian Models

The 2D model provides a score on active/supporting status versus inactive/resting status of dendritic cells on a log 2odds scale (FIGS. 25A and 25B). Affymetrix 2.0Plus data from peripheral blood-derived differentiated dendritic cells, that were either according to the state of the art induced towards an active/supporting or kept in inactive/resting state, where analyzed for pathway activities and the model used to provide an immune activity score as log 2odds. Calibration sample results are depicted at the left side and indicated as "calibration" in the figure legend. The 2D Bayesian model was validated on dataset GSE18791 and correctly predicted activity scores of the samples in this/these datasets.

The dataset GSE18791 (FIG. 26) contains samples from human peripheral blood monocyte-derived conventional DCs of 2 different donors that were infected with Newcastle disease virus (NDV) or as control with allantoic fluid (AF). The infection with NDV is used to create an in vitro model system for dendritic cell activation in the body. At multiple timepoints after NDV infection, as indicated in the figures, signal transduction pathway activity was measured on cell samples, and this analysis showed that already after 1 hour the NFkB pathway becomes active, probably reflecting the antigen processing mechanism; after 4 hours the JAK-STAT1/2 pathway, probably reflecting the antigen presentation mechanism, and after 10 hours at full activation the TGF-β pathway which may reflect activation of migratory mechanisms in the dendritic cell (FIG. 27). (Reference: Zaslavsky E. et al., "Antiviral response dictated by choreographed cascade of transcription factors", Journal of Immunology, Vol. 184, No. 6, March 2010, pages 2908 to 2917.) The second used dataset GSE14000 contains samples from human peripheral blood monocyte-derived DCs that were activated (active/supporting functional state) in an alternative manner by adding lipopolysaccharide (LPS) to the cells, and measurements were performed at two timepoints, where the 4-hour timepoint represents partial activation and the 16-hour timepoint full activation. (Reference: Ceppi M. et al., "Ribosomal protein mRNAs are translationally-regulated during human dendritic cells activation by LPS", Immunome Research, November 2009 November 5:5).

The 3D model provides a score on active/supporting status versus inactive/resting status, versus immune suppressed/tolerogenic state of dendritic cells on a log 2odds scale (FIGS. 27A and 27B). Affymetrix 2.0Plus data from peripheral blood-derived differentiated dendritic cells that were either according to the state of the art induced towards an active/supporting or immune suppressed/tolerogenic state or kept in inactive/resting state, where analyzed for pathway activities and the model used to provide an immune activity score as log 2odds. Calibration sample results are depicted at the left side and indicated as "calibration". The 3D Bayesian model was validated on dataset GSE18791 and correctly predicted activity scores of the samples in these datasets.

Exemplary Validation Results, Linear Model

The linear model was validated on dataset GSE18791 for the 2D model and on dataset GSE13672 and GSE18791 for the 3D model, and correctly predicted activity scores of the samples in the dataset (FIGS. 22C and 22D).

Exemplary Validation Results, Centroid Model

The centroid model was validated on dataset GSE18791 for the 2 state model and on dataset GSE13672 and GSE18791 for the 3 states model and correctly predicted activity scores of the samples in the dataset (FIGS. 23C and 23D).

The invention claimed is:

1. A method for treating a cancer subject, comprising:

receiving a determined functional status of at least one immune cell type in at least one sample of the cancer subject, wherein the functional status of the at least one immune cell type is based on an inferred activity of at least one signaling pathway in the at least one immune cell type, and wherein the determined functional status of at least one immune cell type in the at least one sample of the cancer subject is an inactive functional status, and wherein the functional status is determined by:

receiving an expression level of one or more target genes of the at least one signaling pathway;

determining an activity level of a signaling pathway associated transcription factor (TF) element, the signaling pathway associated TF element controlling transcription of the three or more target genes, the determining being based on evaluating a calibrated mathematical pathway model relating expression levels of the one or more target genes to the activity level of the at least one signaling pathway, wherein the calibrated mathematical pathway model is a centroid or a linear model, or a Bayesian network model based on conditional probabilities, wherein the calibrated mathematical pathway model is calibrated using a calibration dataset, the calibration dataset comprising measured expression levels of the one or more target genes each associated with a ground truth with respect to a plurality of different possible functional activity statuses of the signaling pathway, the plurality of different possible functional activity statuses comprising at least an inactive functional status and an active functional status, wherein at least some of the measured expression levels of the one or more target genes are associated with a ground truth of an inactive functional status and at least some of the measured expression levels of the one or more target genes are associated with a ground truth of an active functional status;

inferring the activity of the at least one signaling pathway in the at least one immune cell type based on the determined activity level of the signaling pathway associated TF element, wherein the inferred activity of the at least one signaling pathway is an inactive activity; and determining, based on the inferred inactive activity of at least one signaling pathway, a functional status of at least one immune cell type in the at least one sample of the cancer subject, wherein the determined functional status is an inactive functional status; and administering, in response to receiving the determined inactive functional status of the at least one immune cell type in the at least one sample of the cancer subject, a cancer therapy to the cancer subject, wherein the administered therapy is immunotherapy, chemotherapy, and/or radiation therapy.

2. The method of claim 1, wherein the determined functional status of the at least one immune cell type is a resting status, a supportive status, a suppressive status, a naive status, or a memory status.

3. The method of claim 1, wherein the at least one signaling pathway is selected from the group of P13K, NFKB, TGF-β, JAK-STAT3, JAK-STAT1/2, Notch, Wnt, MAPK-AP-1, AR, ER, and HH signaling pathways.

* * * * *